United States Patent
Beall et al.

(10) Patent No.: US 12,195,390 B2
(45) Date of Patent: *Jan. 14, 2025

(54) PRECURSOR GLASSES AND GLASS-CERAMICS COMPRISING A CRYSTALLINE PHASE HAVING A JEFFBENITE CRYSTALLINE STRUCTURE

(71) Applicant: CORNING INCORPORATED, Corning, NY (US)

(72) Inventors: George Halsey Beall, Big Flats, NY (US); John Philip Finkeldey, Elkland, PA (US); Charlene Marie Smith, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,559

(22) Filed: Oct. 25, 2023

(65) Prior Publication Data

US 2024/0051866 A1   Feb. 15, 2024

Related U.S. Application Data

(63) Continuation of application No. 18/226,311, filed on Jul. 26, 2023, now Pat. No. 11,851,367, which is a continuation of application No. PCT/US2023/012905, filed on Feb. 13, 2023, and a continuation-in-part of application No. 17/887,012, (Continued)

(51) Int. Cl.
*C03C 3/085*       (2006.01)
*C03C 10/00*       (2006.01)

(52) U.S. Cl.
CPC .......... *C03C 3/085* (2013.01); *C03C 10/0045* (2013.01)

(58) Field of Classification Search
CPC .. C03C 10/0045; C03C 2204/00; C03B 32/02
See application file for complete search history.

(56) References Cited

U.S. PATENT DOCUMENTS 11,753,331 B1 *  9/2023  Beall ................... C03B 32/02
                                                             428/220
11,851,367 B1 * 12/2023  Beall ................... C03C 3/087
(Continued)

FOREIGN PATENT DOCUMENTS

WO     2019/108823 A1    6/2019

OTHER PUBLICATIONS

Harris et al. ("A New Tetragonal Silicate Mineral Occurring as Inclusions in Lower-Mantle Diamonds", Nature, vol. 387, 1997, p. 486-488).*

(Continued)

*Primary Examiner* — Travis M Figg
(74) *Attorney, Agent, or Firm* — Russell S. Magaziner

(57) ABSTRACT

Disclosed herein are glass-ceramic articles including a crystalline phase comprising a jeffbenite crystalline structure. The glass-ceramic articles may include a first surface, a second surface opposite the first surface, and a perimeter defining a shape of the glass-ceramic article. The glass-ceramic articles may further include a phase assemblage comprising one or more crystalline phases and a glass phase. The one or more crystalline phases may include a crystalline phase having the jeffbenite crystalline structure.

20 Claims, 26 Drawing Sheets

Related U.S. Application Data filed on Aug. 12, 2022, now Pat. No. 11,753,331, said application No. PCT/US2023/012905 is a continuation-in-part of application No. 17/887,012, filed on Aug. 12, 2022, now Pat. No. 11,753,331.

(60) Provisional application No. 63/309,667, filed on Feb. 14, 2022.

(56) References Cited

U.S. PATENT DOCUMENTS

| | | |
|---|---|---|
| 2005/0008051 A1* | 1/2005 | Sumida ............... H01S 3/0632 372/39 |
| 2014/0141285 A1 | 5/2014 | Momono et al. |
| 2015/0018194 A1 | 1/2015 | Li et al. |
| 2016/0039709 A1 | 2/2016 | Yamamoto et al. |
| 2016/0102010 A1 | 4/2016 | Beall et al. |
| 2018/0099901 A1 | 4/2018 | Beally et al. |
| 2019/0161397 A1 | 5/2019 | Beall et al. |
| 2021/0130225 A1 | 5/2021 | Beall et al. |
| 2022/0002189 A1 | 1/2022 | Furuta et al. |
| 2022/0277768 A1 | 9/2022 | Sato et al. |

OTHER PUBLICATIONS

Gunter et al. ("Jeffbenite (Mg3Al2Si3O12)", Handbook of Mineralogy, 2016-2017).*

Nestola et al. ("Tetragonal Almandine-Pyrope Phase, TAPP: Finally a Name for it, the New Mineral Jeffbenite", Mineralogical Magazine, Vo. 80, Issue 7, 2016, p. 11219-11232).*

Gunter et al. ("Jeffoenite(Mg3Al2Si3O12)", HandbookofMineralogy,2016-2017).

Harris, et al., "A New Tetragonal Silicate Mineral Occurring as Inclusions in Lower-Mantle Diamonds", Ature, vol. 387, 1997, pp. 486-488.

Inaba S. et al., "Empirical Equation for Calculating the Density of Oxide Glasses", Journal of the American Ceramic Society, 2009, vol. 93, issue 1, pp. 217-220.

International Search Report and Written Opinion of the International Searching Authority; PCT/US2023/012904; dated May 16, 2023; 11 pages; US Patent Office.

M. Gunter, et al., Jeffbenite (Mg3Al2Si3O12), in Handbook Of Mineralogy, 2016-2017.

Nestola Fabrizio et al., "Mg3Al2Si3O12 Jeffbenite Inclusion In Super-Deep Diamonds Is Thermodynamically Stable at Very Shallow Earth's depths", Scientific Reports, vol. 13, No. 1, Jan. 2023, 10 pages.

Nestola, et al., "Tetragonal Almandine-Pyrope Phase, Tapp: Finally a Name for It, The New Mineral Jeffbenite", Mineralogical Magazine, vol. 80, Issue 7, 2016 pp. 1219-1232.

Smyth, et al., "Ferromagnesian Jeffbenite Synthesized at 15 GPA and 1200° C."; American Mineralogist, vol. 107 No. 3, pp. 405-412.

Wang, et al., "High-Pressure Crystal Structure and Equation of State of Ferromagnesian Jeffbenite: Implications for Stability in the Transition Zone and Uppermost Lower Mantle", Contributions to Mineralogy and Petrology, vol. 176 No. 93, 2021.

European Patent Application No. 24186315.8 Extended European Search Report dated Oct. 11, 2024; 9 Pages; European Patent Office.

* cited by examiner

PRECURSOR GLASSES AND GLASS-CERAMICS COMPRISING A CRYSTALLINE PHASE HAVING A JEFFBENITE CRYSTALLINE STRUCTURE

CROSS-REFERENCE TO RELATED APPLICATIONS

This Application is a continuation of U.S. application Ser. No. 18/226,311 filed Jul. 26, 2023, which is a continuation of International App. No. PCT/US23/12905 filed Feb. 13, 2023, which claims priority benefit of U.S. App. No. 63/309,667 filed Feb. 14, 2022 and is a continuation-in-part of U.S. application Ser. No. 17/887,012 filed Aug. 12, 2022, which issued on Sep. 12, 2023 as U.S. Pat. No. 11,753,331, and U.S. application Ser. No. 18/226,311 is also a continuation-in-part of U.S. application Ser. No. 17/887,012 filed Aug. 12, 2022, which issued on Sep. 12, 2023 as U.S. Pat. No. 11,753,331, and this Application hereby incorporates by reference in its entirety each of the above-referenced applications.

FIELD

The present specification relates to precursor glasses and glass-ceramic articles made therefrom.

BACKGROUND

Glass articles, such as cover glasses, glass backplanes, housings, and the like, are employed in both consumer and commercial electronic devices, such as smart phones, tablets, portable media players, personal computers, and cameras. The mobile nature of these portable devices makes the devices and the glass articles included therein particularly vulnerable to accidental drops on hard surfaces, such as the ground. Moreover, glass articles, such as cover glasses, may include "touch" functionality, which necessitates that the glass article be contacted by various objects including a user's fingers and/or stylus devices. Accordingly, the glass articles must be sufficiently robust to endure accidental dropping and regular contact without damage, such as scratching. Indeed, scratches introduced into the surface of the glass article may reduce the strength of the glass article as the scratches may serve as initiation points for cracks leading to catastrophic failure of the glass.

Accordingly, a need exists for alternative materials that have improved mechanical properties relative to glass.

SUMMARY

Features and advantages of the precursor glasses and glass-ceramics described herein will be set forth in the detailed description that follows, and in part will be readily apparent to those skilled in the art from that description or recognized by practicing the embodiments described herein, including the detailed description that follows, the claims, as well as the appended drawings.

The present Applicant has discovered that the jeffbenite crystalline structure associated with inclusions in "super-deep" diamonds may provide many useful advantages and properties if formed in glass as a crystalline phase of glass-ceramic, as explained herein. The Applicant believes that a crystalline phase having a jeffbenite crystalline structure has never before been grown in or otherwise formed in glass-ceramic. The Applicant further believes that a crystalline phase having a jeffbenite crystalline structure has never before been formed into or otherwise incorporated into glass-ceramic articles, such as sheets of glass-ceramic, glass-ceramic containers, windows, panels, housings, plates, counters, kitchenware, rods, fibers, or other such articles. Further, in contrast to jeffbenite in (anisotropic) diamonds or in isolation, Applicant believes that crystalline phases having a jeffbenite crystalline structure have never been included in articles with isotropic material properties (e.g., properties such as the tensile strength, elasticity, and fracture toughness that remain the same when tested in different directions), as may be effectively achieved by inclusion of relatively small crystal grains, as disclosed herein, randomly-oriented and homogenously distributed within the residual glass, to form glass-ceramic, or within another isotropic solid media (e.g., polymer). Applicant believes that a glass-ceramic with crystalline phase having a jeffbenite crystalline structure has never before been manufactured, even in nature; grown from precursor glasses; or formed at temperatures (e.g., <1600K, <1400K) and pressures (e.g., <12 GPa, such as <10 GPa, <8 GPa, <1 GPa, such as even 1 atm), as disclosed herein. Enabled by the present discoveries, large volumes of crystals having the jeffbenite crystalline structure may be now produced in a single batch, in part because extreme temperatures and pressures, associated with formation super-deep within the Earth's mantle, are unnecessary.

Furthermore, the glass-ceramics described herein may achieve excellent hardness and stiffness values, and therefore enable thin and light mobile phone and tablet display faces. The same features allow opaque or colored glass-ceramics for phone and tablet housings. Moreover, these glass-ceramics may be free of lithium and still amenable to strengthening by ion exchange, reducing need for this scarce resource.

Aspect 1 includes a glass-ceramic article comprising a first surface; a second surface opposite the first surface; a perimeter defining a shape of the glass-ceramic article; and a phase assemblage comprising one or more crystalline phases and a glass phase, the one or more crystalline phases comprising a jeffbenite crystalline structure.

Aspect 2 includes the glass-ceramic article of Aspect 1, wherein the one or more crystalline phases comprising the jeffbenite crystalline structure is a primary crystalline phase.

Aspect 3 includes the glass-ceramic article of any preceding aspect, wherein the one or more crystalline phases comprising the jeffbenite crystalline structure has a composition according to the formula: $(Mg,R^{2+})_{3+x}(Zr,R^{4+})_x Al_{2-2x}Si_3O_{12}$, where $R^{2+}$ are divalent metal cations, $R^{4+}$ are tetravalent metal cations, and x is greater than or equal to 0 to less than 1.

Aspect 4 includes the glass-ceramic article of Aspect 1 or Aspect 2, wherein the crystalline phase comprising the jeffbenite crystalline structure has a composition according to the formula: $(Mg,R^{2+})_{3+x}(Zr,R^{4+})_x Al_{2-2x}Si_3O_{12}$, where $R^{2+}$ are divalent metal cations, $R^{4+}$ are tetravalent metal cations, and x is greater than or equal to 0 to less than or equal to 1.

Aspect 5 includes the glass-ceramic article of Aspect 4, wherein wherein $R^{2+}$ is one or more divalent metal cations selected from $Ca^{2+}$, $Mn^{2+}$, $Fe^{2+}$, and wherein $R^{4+}$ is one or more tetravalent metal cations selected from $Ti^{4+}$, $Sn^{4+}$, $Hf^{4+}$.

Aspect 6 includes the glass-ceramic article of any preceding aspect, wherein the one or more crystalline phases comprising the jeffbenite crystalline structure has a composition according to the formula: $(Mg,Fe,Mn,Zn)_{3+x}(Zr,Ti,Sn)_xAl_{2-2x}Si_3O_{12}$, where x is greater than or equal to 0 to less than 1.

Aspect 7 includes the glass-ceramic article of any preceding aspect, wherein the one or more crystalline phases comprising the jeffbenite crystalline structure has a composition according to the formula: $Mg_{3+x}Zr_xAl_{2-2x}Si_3O_{12}$, where x is greater than or equal to 0 to less than 1.

Aspect 8 includes the glass-ceramic article of any preceding aspect, wherein the one or more crystalline phases comprises one or more accessory crystalline phases.

Aspect 9 includes the glass-ceramic article of Aspect 8, wherein the one or more accessory crystalline phases comprises a $ZrO_2$ crystalline phase.

Aspect 10 includes the glass-ceramic article of Aspect 8, wherein the one or more accessory crystalline phases comprises a $ZrTiO_4$ crystalline phase.

Aspect 11 includes the glass-ceramic article of any preceding aspect, wherein the phase assemblage comprises greater than or equal to 25 wt % of the one or more crystalline phases and less than or equal to 75 wt % of the glass phase.

Aspect 12 includes the glass-ceramic article of any preceding aspect, wherein at least some grains of the at least on crystalline phase comprising the jeffbenite crystalline structure have a dimension greater than or equal to 20 nm to less than or equal to 100 nm.

Aspect 13 includes the glass-ceramic article of any preceding aspect, wherein the glass-ceramic article has an average transmittance of at least 75% for a light in a wavelength range from 400 nm to 800 nm at an article thickness of 0.6 mm.

Aspect 14 includes the glass-ceramic article of Aspects 1-12, wherein the glass-ceramic article has an average transmittance in a range from 20% to less than 75% for light in a wavelength from 400 nm to 800 nm at an article thickness of 0.6 mm.

Aspect 15 includes the glass-ceramic article of Aspects 1-12, wherein the glass-ceramic article has an average transmittance in a range of less than 20% for light in a wavelength range from 400 nm to 800 nm at an article thickness of 0.6 mm.

Aspect 16 includes the glass-ceramic article of any preceding aspect, comprising: greater than or equal to 35 mol. % to less than or equal to 65 mol. % $SiO_2$; greater than or equal to 5 mol. % to less than or equal to 20 mol. % $Al_2O_3$; greater than or equal to 10 mol. % to less than or equal to 45 mol. % MgO; greater than or equal to 1 mol. % to less than or equal to 7 mol. % $ZrO_2$; greater than or equal to 0 mol. % to less than or equal to 15 mol. % $Na_2O$; greater than or equal to 0 mol. % to less than or equal to 15 mol. % $K_2O$; greater than or equal to 0 mol. % to less than or equal to 9 mol. % FeO; greater than or equal to 0 mol. % to less than or equal to 1 mol. % $MnO_2$; and greater than or equal to 0 mol. % to less than or equal to 12 mol. % ZnO.

Aspect 17 includes the glass-ceramic article of Aspects 1-15, comprising: greater than or equal to 35 mol. % to less than or equal to 65 mol. % $SiO_2$; greater than or equal to 5 mol. % to less than or equal to 20 mol. % $Al_2O_3$; greater than or equal to 7 mol. % to less than or equal to 65 mol. % MgO; greater than or equal to 0 mol. % to less than or equal to 7 mol. % $ZrO_2$; greater than or equal to 0 mol. % to less than or equal to 15 mol. % $Na_2O$; greater than or equal to 0 mol. % to less than or equal to 15 mol. % $K_2O$; greater than or equal to 0 mol. % to less than or equal to 9 mol. % FeO; greater than or equal to 0 mol. % to less than or equal to 10 mol. % $MnO_2$; and greater than or equal to 0 mol. % to less than or equal to 15 mol. % ZnO, wherein the glass-ceramic comprises a phase assemblage comprising one or more crystalline phases and a glass phase, the one or more crystalline phases comprising a crystalline phase comprising a jeffbenite crystalline structure.

Aspect 18 includes the glass-ceramic article of any preceding aspect, comprising greater than or equal to 48 mol. % to less than or equal to 54 mol. % $SiO_2$.

Aspect 19 includes the glass-ceramic article of any preceding aspect, comprising greater than or equal to 9 mol. % to less than or equal to 13 mol. % $Al_2O_3$.

Aspect 20 includes the glass-ceramic article of any preceding aspect, comprising greater than or equal to 1 mol. % to less than or equal to 15 mol. % $Na_2O$.

Aspect 21 includes the glass-ceramic article of any preceding aspect, comprising greater than or equal to 1 mol. % to less than or equal to 15 mol. % $K_2O$.

Aspect 22 includes the glass-ceramic article of any preceding aspect, wherein $Na_2O$ (mol. %)+$K_2O$ (mol. %) is greater than or equal to 2 mol. % to less than or equal to 15 mol. %.

Aspect 23 includes the glass-ceramic article of any preceding aspect, wherein $Na_2O$ (mol. %)/($Na_2O$ (mol. %)+$K_2O$ (mol. %)) is greater than or equal to 0.3.

Aspect 24 includes the glass-ceramic article of Aspects 1-22, wherein $Na_2O$ (mol. %)/($Na_2O$ (mol. %)+$K_2O$ (mol. %)) is greater than or equal to 0.2.

Aspect 25 includes the glass-ceramic article of any preceding aspect, further comprising greater than or equal to 0.3 mol. % to less than or equal to 7 mol. % $TiO_2$.

Aspect 26 includes the glass-ceramic article of any preceding aspect, wherein $ZrO_2$ (mol. %)+$TiO_2$ (mol. %) is greater than or equal to 2 mol. %.

Aspect 27 includes the glass-ceramic article of any preceding aspect, wherein $ZrO_2$ (mol. %)/($ZrO_2$ (mol. %)+$TiO_2$ (mol. %)) is greater than or equal to 0.3.

Aspect 28 includes the glass-ceramic article of any preceding aspect, comprising greater than or equal to 1 mol. % to less than or equal to 12 mol. % ZnO.

Aspect 29 includes the glass-ceramic article of any preceding aspect, further comprising less than or equal to 3 mol. % $Li_2O$.

Aspect 30 includes the glass-ceramic article of any preceding aspect, wherein the glass-ceramic article is substantially free of $Li_2O$.

Aspect 31 includes the glass-ceramic article of any preceding aspect, further comprising greater than or equal to 1 mol. % to less than or equal to 8 mol. % BaO.

Aspect 32 includes the glass-ceramic article of any preceding aspect, further comprising greater than or equal to 0.2 mol. % to less than or equal to 1.7 mol. % of at least one of CaO and SrO.

Aspect 33 includes the glass-ceramic article of any preceding aspect, wherein the glass-ceramic article is substantially free of $P_2O_5$.

Aspect 34 includes the glass-ceramic article of Aspects 1-32, wherein the glass-ceramic article comprises greater than 0 mol. % to less than or equal to 4 mol. % $P_2O_5$.

Aspect 35 includes the glass-ceramic article of any preceding aspect, wherein the glass-ceramic article comprise greater than or equal to 1.5 mol. % to less than or equal to 3 mol. % $ZrO_2$.

Aspect 36 includes the glass-ceramic article of any preceding aspect, wherein the glass-ceramic article comprises greater than 0 mol. % to less than or equal to 12 mol. % $HfO_2$, wherein a sum of $ZrO_2$ and $HfO_2$ is greater than 1 mol %.

Aspect 37 includes the glass-ceramic article of any preceding aspect, wherein the glass-ceramic article comprises greater than 0 mol. % to less than or equal to 15 mol. % CaO.

Aspect 38 includes the glass-ceramic article of any preceding aspect, wherein the glass-ceramic article comprises from greater than 0 mol. % to less than or equal to 7 mol. % $La_2O_3$.

Aspect 39 includes a glass-ceramic article comprising: greater than or equal to 35 mol. % to less than or equal to 65 mol. % $SiO_2$; greater than or equal to 5 mol. % to less than or equal to 20 mol. % $Al_2O_3$; greater than or equal to 10 mol. % to less than or equal to 45 mol. % MgO; greater than or equal to 1 mol. % to less than or equal to 7 mol. % $ZrO_2$; greater than or equal to 0 mol. % to less than or equal to 15 mol. % $Na_2O$; greater than or equal to 0 mol. % to less than or equal to 15 mol. % $K_2O$; greater than or equal to 0 mol. % to less than or equal to 9 mol. % FeO; greater than or equal to 0 mol. % to less than or equal to 1 mol. % $MnO_2$; and greater than or equal to 0 mol. % to less than or equal to 12 mol. % ZnO, wherein the glass-ceramic article comprises a glass phase and a crystalline phase having a jeffbenite crystalline structure.

Aspect 40 includes a glass-ceramic article comprising: greater than or equal to 35 mol. % to less than or equal to 65 mol. % $SiO_2$; greater than or equal to 5 mol. % to less than or equal to 20 mol. % $Al_2O_3$; greater than or equal to 7 mol. % to less than or equal to 65 mol. % MgO; greater than or equal to 0 mol. % to less than or equal to 7 mol. % $ZrO_2$; greater than or equal to 0 mol. % to less than or equal to 15 mol. % $Na_2O$; greater than or equal to 0 mol. % to less than or equal to 15 mol. % $K_2O$; greater than or equal to 0 mol. % to less than or equal to 9 mol. % FeO; greater than or equal to 0 mol. % to less than or equal to 10 mol. % $MnO_2$; and greater than or equal to 0 mol. % to less than or equal to 15 mol. % ZnO, wherein the glass-ceramic article comprises a glass phase and a crystalline phase having a jeffbenite crystalline structure.

Aspect 41 includes the glass-ceramic article of Aspect 39 or Aspect 40, wherein the crystalline phase comprising the jeffbenite crystalline structure has a composition according to the formula: $(Mg,R^{2+})_{3+x}(Zr,R^{4+})_xAl_{2-2x}Si_3O_{12}$, where $R^{2+}$ are divalent metal cations, $R^{4+}$ are tetravalent metal cations, and x is greater than or equal to 0 to less than 1.

Aspect 42 includes the glass-ceramic article of Aspect 39 or Aspect 40, wherein the crystalline phase comprising the jeffbenite crystalline structure has a composition according to the formula: $(Mg,R^{2+})_{3+x}(Zr,R^{4+})_xAl_{2-2x}Si_3O_{12}$, where $R^{2+}$ are divalent metal cations, $R^{4+}$ are tetravalent metal cations, and x is greater than or equal to 0 to less than or equal to 1.

Aspect 43 includes the glass-ceramic article of Aspect 42, wherein $R^{2+}$ is one or more divalent metal cations selected from $Ca^{2+}$, $Mn^{2+}$, $Fe^{2+}$, and wherein $R^{4+}$ is one or more tetravalent metal cations selected from $Ti^{4+}$, $Sn^{4+}$, $Hf^{4+}$.

Aspect 44 includes the glass-ceramic article of Aspects 39-43, wherein the crystalline phase comprising the jeffbenite crystalline structure has a composition according to the formula: $(Mg,Fe,Mn,Zn)_{3+x}(Zr,Ti,Sn)_xAl_{2-2x}Si_3O_{12}$, where x is greater than or equal to 0 to less than 1.

Aspect 45 includes the glass-ceramic article of Aspects 39-44, wherein the crystalline phase comprising the jeffbenite crystalline structure has a composition according to the formula: $Mg_{3+x}Zr_xAl_{2-2x}Si_3O_{12}$, where x is greater than or equal to 0 to less than 1.

Aspect 46 includes the glass-ceramic article of Aspects 39-45, wherein the crystalline phase comprising the jeffbenite crystalline structure is a primary crystalline phase.

Aspect 47 includes the glass-ceramic article of Aspects 39-46, comprising greater than or equal to 48 mol. % to less than or equal to 54 mol. % $SiO_2$.

Aspect 48 includes the glass-ceramic article of Aspects 39-47, comprising greater than or equal to 9 mol. % to less than or equal to 13 mol. % $Al_2O_3$.

Aspect 49 includes the glass-ceramic article of Aspects 39-48, comprising greater than or equal to 1 mol. % to less than or equal to 15 mol. % $Na_2O$.

Aspect 50 includes the glass-ceramic article of Aspects 39-49, comprising greater than or equal to 2 mol. % to less than or equal to 5 mol. % $Na_2O$.

Aspect 51 includes the glass-ceramic article of Aspects 49-50, comprising greater than or equal to 1 mol. % to less than or equal to 15 mol. % $K_2O$.

Aspect 52 includes the glass-ceramic article of Aspects 39-51, comprising greater than or equal to 1 mol. % to less than or equal to 5 mol. % $K_2O$.

Aspect 53 includes the glass-ceramic article of Aspects 39-52, wherein $Na_2O$ (mol. %)+$K_2O$ (mol. %) is greater than or equal to 2 mol. % to less than or equal to 15 mol. %.

Aspect 54 includes the glass-ceramic article of Aspects 39-53, wherein $Na_2O$ (mol. %)/($Na_2O$ (mol. %)+$K_2O$ (mol. %)) is greater than or equal to 0.3.

Aspect 55 includes the glass-ceramic article of Aspects 39-53, wherein $Na_2O$ (mol. %)/($Na_2O$ (mol. %)+$K_2O$ (mol. %)) is greater than or equal to 0.2

Aspect 56 includes the glass-ceramic article of Aspects 39-55, further comprising greater than or equal to 0.3 mol. % to less than or equal to 7 mol. % $TiO_2$.

Aspect 57 includes the glass-ceramic article of Aspects 39-56, wherein $ZrO_2$ (mol. %)+$TiO_2$ (mol. %) is greater than or equal to 2 mol. %.

Aspect 58 includes the glass-ceramic article of Aspects 39-57, wherein $ZrO_2$ (mol. %)/($ZrO_2$ (mol. %)+$TiO_2$ (mol. %)) is greater than or equal to 0.3.

Aspect 59 includes the glass-ceramic article of Aspects 39-58, comprising greater than or equal to 1 mol. % to less than or equal to 12 mol. % ZnO.

Aspect 60 includes the glass-ceramic article of Aspects 39-59, further comprising less than or equal to 3 mol. % $Li_2O$.

Aspect 61 includes the glass-ceramic article of Aspects 39-60, wherein the glass-ceramic article is substantially free of $Li_2O$.

Aspect 62 includes the glass-ceramic article of Aspects 39-61, further comprising greater than or equal to 1 mol. % to less than or equal to 8 mol. % BaO.

Aspect 63 includes the glass-ceramic article of Aspects 39-62, further comprising greater than or equal to 0.2 mol. % to less than or equal to 1.7 mol. % of at least one of CaO and SrO.

Aspect 64 includes the glass-ceramic article of Aspects 39-63, wherein the glass-ceramic article is substantially free of $P_2O_5$.

Aspect 65 includes the glass-ceramic article of Aspects 39-63, wherein the glass-ceramic article comprises greater than 0 mol. % to less than or equal to 4 mol. % $P_2O_5$.

Aspect 66 includes the glass-ceramic article of Aspects 39-65, wherein the glass-ceramic article comprise greater than or equal to 1.5 mol. % to less than or equal to 3 mol. % $ZrO_2$.

Aspect 67 includes the glass-ceramic article of Aspects 39-66, wherein the glass-ceramic article comprises greater than 0 mol. % to less than or equal to 7 mol. % $HfO_2$.

Aspect 68 includes the glass-ceramic article of Aspects 39-67, wherein the glass-ceramic article comprises greater than 0 mol. % to less than or equal to 15 mol. % CaO.

Aspect 69 includes the glass-ceramic article of Aspects 39-68, wherein the glass-ceramic article comprises from greater than 0 mol. % to less than or equal to 7 mol. % $La_2O_3$.

Aspect 70 includes the glass-ceramic article of Aspects 39-69, wherein the glass-ceramic article has a density of greater than or equal to 2.65 g/cm$^3$ to less than or equal to 2.95 g/cm$^3$.

Aspect 71 includes the glass-ceramic article of Aspects 39-69, wherein the glass-ceramic article has a density of greater than or equal to 2.50 g/cm$^3$ to less than or equal to 3.70 g/cm$^3$.

Aspect 72 includes the glass-ceramic article of Aspects 39-71, further comprising a $ZrO_2$ crystalline phase.

Aspect 73 includes the glass-ceramic article of Aspects 39-72, further comprising a $ZrTiO_4$ crystalline phase.

Aspect 74 includes the glass-ceramic article of Aspects 39-73, wherein at least some grains of the crystalline phase having the jeffbenite crystalline structure have a dimension greater than or equal to 20 nm to less than or equal to 100 nm.

Aspect 75 includes a consumer electronic device comprising: a housing having a front surface, a back surface, and side surfaces; electrical components provided at least partially within the housing, the electrical components including at least a controller, memory, and a display, the display being at or adjacent the front surface of the housing; and the glass-ceramic article of any preceding aspect at least one of disposed over the display and forming a portion of the housing.

Aspect 76 includes a method of making a glass-ceramic article, the method comprising: heat treating a precursor glass comprising $SiO_2$, $Al_2O_3$, MgO, and $ZrO_2$ to nucleate one or more crystalline phases in the precursor glass, wherein the one or more crystalline phases comprises a jeffbenite crystalline structure and the precursor glass optionally comprises one or more of FeO, $MnO_2$ and ZnO; and growing the one or more crystalline phases in a glass phase.

Aspect 77 includes a method of making a glass-ceramic article, the method comprising: heat treating a precursor glass comprising $SiO_2$, $Al_2O_3$, and MgO to nucleate one or more crystalline phases in the precursor glass, wherein the one or more crystalline phases comprises a jeffbenite crystalline structure; and growing the one or more crystalline phases in a glass phase.

Aspect 78 includes the method of making a glass-ceramic article of Aspect 76 or 77, wherein the heat treating comprises: heating the precursor glass to a first temperature greater than or equal to 700° to less than or equal to 950° C.; and maintaining the precursor glass at the first temperature for a first time greater than or equal to 0.25 hours to less than or equal to 6 hours.

Aspect 79 includes the method of making a glass-ceramic article of Aspect 78, wherein the heat treating further comprises: heating the precursor glass to a second temperature greater than or equal to 7500 to less than or equal to 950° C.; and maintaining the precursor glass at the second temperature for a second time greater than or equal to 0.25 hours to less than or equal to 6 hours.

Aspect 80 includes the method of making a glass-ceramic article of Aspects 76-79, wherein the crystalline phase having the jeffbenite crystalline structure is a primary crystalline phase.

Aspect 81 includes the method of making a glass-ceramic article of Aspects 76-80, wherein the jeffbenite crystalline phase has a composition according to the formula: $(Mg,R^{2+})_{3+x}(Zr,R^{4+})_xAl_{2-2x}Si_3O_{12}$, where x is greater than or equal to 0 to less than 1.

Aspect 82 includes the method of making the glass-ceramic article of Aspects 76-81, wherein the crystalline phase having the jeffbenite crystalline structure has a composition according to the formula: $(Mg,R^{2+})_{3+x}(Zr,R^{4+})_xAl_{2-2x}Si_3O_{12}$, where x is greater than or equal to 0 to less than or equal to 1.

Aspect 83 includes the method of making a glass-ceramic article of Aspects 76-82, wherein the jeffbenite crystalline phase has a composition according to the formula: $(Mg,Fe,Mn,Zn)_{3+x}(Zr,Ti,Sn)_xAl_{2-2x}Si_3O_{12}$, where x is greater than or equal to 0 to less than 1.

Aspect 84 includes the method of making a glass-ceramic article of Aspects 76-83, wherein the jeffbenite crystalline phase has a composition according to the formula: $Mg_{3+x}Zr_xAl_{2-2x}Si_3O_{12}$, where x is greater than or equal to 0 to less than 1.

Aspect 85 includes the method of making a glass-ceramic article of Aspects 76-84, wherein the glass-ceramic article comprises a phase assemblage comprising the one or more crystalline phases and a glass phase.

Aspect 86 includes the method of making a glass-ceramic article of Aspect 85, wherein the one or more crystalline phases comprises one or more accessory crystalline phases.

Aspect 87 includes the method of making a glass-ceramic article of Aspect 86, wherein the one or more accessory crystalline phases comprises $ZrO_2$.

Aspect 88 includes the method of making a glass-ceramic article of Aspect 86, wherein the one or more accessory crystalline phases comprises $ZrTiO_4$.

Aspect 89 includes the method of making a glass-ceramic article of Aspects 85-88, wherein the phase assemblage comprises greater than or equal to 25 wt. % of the one or more crystalline phases and less than or equal to 75 wt. % of the glass phase.

Aspect 90 includes the method of making a glass-ceramic article of Aspects 85-89, wherein at least some grains of the crystalline phase having the jeffbenite crystalline structure have a dimension greater than or equal to 20 nm to less than or equal to 100 nm.

Aspect 91 includes a glass-ceramic article, comprising: a first major surface and a second major surface facing away from the first major surface, edges forming a perimeter of the first and second major surfaces and extending between the first and second major surfaces; wherein a thickness of the article is defined as distance between the first and second major surfaces, a width of the article is defined as a distance along the first major surface orthogonal to the thickness and between the edges, and a length of the article is defined as a distance along the first major surface orthogonal to both the width and thickness and between the edges; wherein the width is greater than or equal to the thickness; wherein the length is greater than or equal to the width; and a body between the first major surface, the second major surface, and the edges, wherein the body comprises glass-ceramic, wherein the glass-ceramic comprises a crystalline phase having a jeffbenite crystalline structure.

Aspect 92 include the glass-ceramic article of Aspect 91, wherein the glass-ceramic article comprises a glass-ceramic sheet.

Aspect 93 includes the glass-ceramic article of Aspect 91 or Aspect 92, wherein grains of the crystalline phase having the jeffbenite crystalline structure are homogeneously distributed throughout the glass-ceramic of the body.

Aspect 94 includes the glass-ceramic article of Aspects 91-93, wherein grains of the crystalline phase having the jeffbenite crystalline structure are randomly oriented within the glass-ceramic of the body.

Aspect 95 includes the glass-ceramic article of Aspects 91-94, wherein grains of the crystalline phase having the jeffbenite crystalline structure overlap and interlock with one another within the glass-ceramic of the body to a degree such that fracture toughness thereof is 0.75 MPa·m$^{1/2}$ or greater.

Aspect 96 includes the glass-ceramic article of Aspects 91-95, wherein the glass-ceramic has isotropic material properties.

Aspect 97 includes the glass-ceramic article of Aspects 91-96, wherein the thickness is greater than or equal to 200 µm and less than or equal to 5 mm.

Aspect 98 includes the glass-ceramic article of Aspects 91-97, wherein the length and the width are both greater than 5 mm.

Aspect 99 includes the glass-ceramic article of Aspects 91-98, wherein the first major surface has an area greater than or equal to 25 mm$^2$.

Aspect 100 includes the glass-ceramic article of Aspects 91-99, wherein a volume of glass-ceramic in the body is greater than or equal to 25 mm$^3$.

Aspect 101 includes the glass-ceramic article of Aspects 91-100, wherein the body consists essentially of the glass-ceramic, and wherein the body is at least partially translucent such that at least 20% of light of 400 to 800 nanometers wavelength directed into the thickness of the sheet passes through the body.

Aspect 102 includes a method of manufacturing a glass-ceramic, comprising: heat-treating precursor glass comprising nucleation sites to grow grains of a crystalline phase having a jeffbenite crystalline structure from the nucleation sites within the precursor glass, to form a glass-ceramic comprising the crystalline phase having the jeffbenite crystalline structure and residual glass; and growing the grains of the crystalline phase having the jeffbenite crystalline structure during the heat-treating so that at least some of the grains of the crystalline phase having the jeffbenite crystalline structure have a dimension greater than or equal to 20 nm.

Aspect 103 includes the method of Aspect 102, wherein the growing occurs at atmospheric pressure.

Aspect 104 includes the method of Aspects 102-103, wherein temperature of the precursor glass during the heat-treating remains less than 1500K throughout the heat-treating.

Aspect 105 includes the method of Aspects 102-104, wherein, after the growing, at least some of the grains of the crystalline phase having the jeffbenite crystalline structure overlap and interlock with one another within the residual glass of the glass-ceramic.

Aspect 106 includes the method of Aspects 102-105, wherein, after the growing, at least some of the grains of the crystalline phase having the jeffbenite crystalline structure have a dimension less than or equal to 5 µm.

Aspect 107 includes the method of Aspects 102-106, wherein the nucleation sites are positioned within the precursor glass such that the grains of the crystalline phase having the jeffbenite crystalline structure are homogenously distributed within the glass-ceramic.

Aspect 108 includes the method of Aspects 102-107, wherein the heat-treating is such that the grains of the crystalline phase having the jeffbenite crystalline structure are grown throughout the glass-ceramic.

Aspect 109 includes the method of Aspects 102-108, wherein the grains of the crystalline phase having the jeffbenite crystalline structure are grown in random orientations with respect to one another and dispersed within the residual glass of the glass-ceramic.

Aspect 110 includes the method of Aspects 102-109, wherein the crystalline phase having the jeffbenite crystalline structure is a primary crystalline phase of the glass-ceramic.

Aspect 111 includes the method of Aspects 102-110, wherein after the growing the glass-ceramic has isotropic material properties Aspect 112 includes a glass-ceramic article, comprising: crystals of pyrope-almandine garnet stoichiometry with tetragonal structure; and amorphous glass surrounding and enveloping the crystals such that the crystals and glass together form the glass-ceramic of the glass-ceramic article.

Aspect 113 includes the glass-ceramic article of Aspect 112, wherein the tetragonal structure falls within the I-42d space group.

Aspect 114 includes a glass-ceramic article, comprising: an "a" lattice parameter greater than or equal to 6.5 Å and less than or equal to 6.7 Å; a "c" lattice parameter greater than or equal to 18.0 Å and less than or equal to 18.5 Å; and an X-ray diffraction spectrum comprising: a first peak between 2-theta angles of 30° to 32°; a second peak between 2-theta angles of 33° to 35°; a third peak between 2-theta angles of 40° to 42°; and a fourth peak and a fifth peak between 2-theta angles of 55° to 58°, wherein the first, second, third, fourth, and fifth peaks correspond to jeffbenite.

Aspect 115 includes a glass-ceramic comprising jeffbenite.

Aspect 116 includes an article, comprising: a surface; and a body interior to the surface, wherein the body comprises the glass-ceramic of Aspect 115.

Aspect 117 includes the article according to Aspect 116, wherein the surface is a first surface, the article further comprising a second surface facing away from the first surface with the body positioned between the first and second surfaces such that the article is a sheet.

Aspect 118 includes a method of manufacturing a material, comprising growing jeffbenite at less than 10 GPa pressure.

Aspect 119 includes the method of aspect 118, wherein the growing is at a temperature of less than 1400K.

Aspect 120 includes the method of aspect 118, wherein the jeffbenite is grown within a glass as a crystalline phase, to form glass-ceramic.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
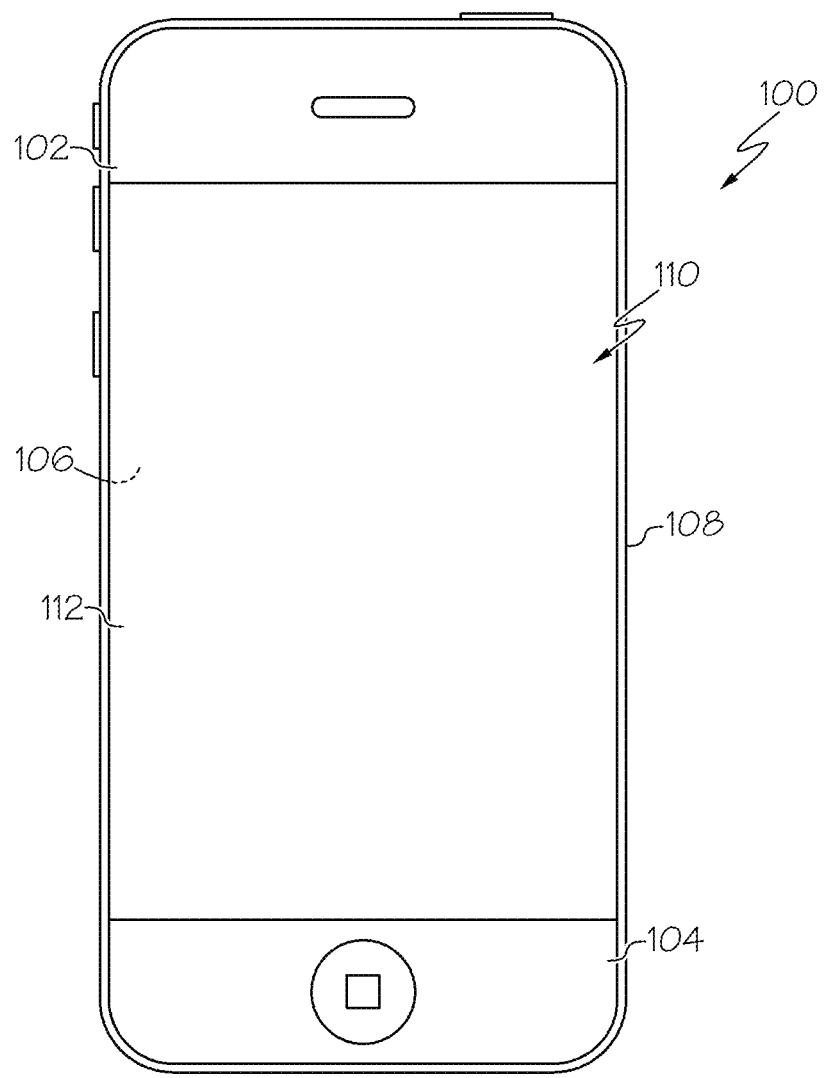
FIG. 1 is a top view of an electronic device comprising a glass-ceramic article.

Reference will now be made in detail to various embodiments of precursor glasses and glass-ceramic articles made therefrom. According to embodiments, a glass-ceramic article includes a first surface, a second surface opposite the first surface, and a perimeter defining a shape of the glass-ceramic article. The glass-ceramic article may further include a phase assemblage comprising one or more crystalline phases and a glass phase, the one or more crystalline phases comprising a crystalline phase comprising a jeffbenite crystalline structure. Various embodiments of precursor glasses, glass-ceramic articles made therefrom, and methods of making glass-ceramic articles will be referred to herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The term "substantially free," when used to describe the concentration and/or absence of a particular constituent component in a precursor glass or glass-ceramic composition, means that the constituent component is not intentionally added to the precursor glass or glass-ceramic composition. However, the precursor glass or class-ceramic composition may contain traces of the constituent component as a contaminant or tramp in amounts of less than 0.05 mol. %.

In the embodiments of the precursor glass or glass-ceramic compositions described herein, the concentrations of constituent components (e.g., $SiO_2$, $Al_2O_3$, and the like) are specified in mole percent (mol. %) on an oxide basis, unless otherwise specified.

Transmittance data (total transmittance) is measured with a Lambda 950 UV/Vis Spectrophotometer manufactured by PerkinElmer Inc. (Waltham, Massachusetts USA). The Lambda 950 apparatus was fitted with a 150 mm integrating sphere. Data was collected using an open beam baseline and a Spectralon® reference reflectance disk. For total transmittance (Total Tx), the sample is fixed at the integrating sphere entry point. For diffuse transmittance (Diffuse Tx), the Spectralon® reference reflectance disk over the sphere exit port is removed to allow on-axis light to exit the sphere and enter a light trap. A zero offset measurement is made, with no sample, of the diffuse portion to determine efficiency of the light trap. To correct diffuse transmittance measurements, the zero offset contribution is subtracted from the sample measurement using the equation: Diffuse $Tx=Diffuse_{Measured}-(Zero\ Offset*(Total\ Tx/100))$. The scatter ratio is measured for all wavelengths as: (% Diffuse Tx/% Total Tx).

The term "transparent," when used to describe an article herein, refers to an article that has an average transmittance of at least 75% for a light in a wavelength range from 400 nm to 800 nm (inclusive of endpoints) at an article thickness of 0.6 mm.

The term "translucent," unless otherwise specified such as in the claims, when used to describe an article herein, refers to an article that has an average transmittance in a range from 20% to less than 75% for light in a wavelength range from 400 nm to 800 nm (inclusive of endpoints) at an article thickness of 0.6 mm.

The term "opaque," when used to describe a glass-ceramic article formed of a glass-ceramic composition herein, means that the glass-ceramic composition has an average transmittance less than 20% when measured at normal incidence for light in a wavelength range from 400 nm to 800 nm (inclusive of endpoints) at an article thickness of 0.6 mm.

The term "CIELAB color space," as used herein, refers to a color space defined by the International Commission on Illumination (CIE) in 1976. It expresses color as three values: L* for the lightness from black (0) to white (100), a* from green (-) to red (+), and b* from blue (-) to yellow (+). Unless otherwise specified, the L*, a*, and b* values are indicated for article thicknesses of 0.4 mm to 5 mm (inclusive of endpoints) in the thickness direction of the sample under F2 illumination and a 10° standard observer angle. Unless otherwise specified, this means that each thickness within the range of thicknesses has L*, a*, and b* coordinates falling within the specified range(s) for L*, a*, and b* coordinates. For example, a colored glass article having an L* value within the range from 55 to 96.5 means that each thickness within the range of 0.4 mm to 5 mm (e.g., 0.6 mm, 0.9 mm, 2 mm, etc.) has an L* in the range of 55 to 96.5.

The dimensions of the grains of a crystalline phase or phases of the glass-ceramics described herein are measured using scanning electron microscopy.

The term "melting point," as used herein, refers to the temperature at which the viscosity of the precursor glass or glass-ceramic composition is 200 poise (20 Pa*s).

The term "softening point," as used herein, refers to the temperature at which the viscosity of the precursor glass or glass-ceramic composition is $1\times10^{7.6}$ poise ($1\times10^{6.6}$ Pa*s). The softening point is measured according to the parallel plate viscosity method, which measures the viscosity of inorganic glass from $10^7$ to $10^9$ poise ($10^6$ to $10^8$ Pa*s) as a function of temperature, similar to ASTM C1351M.

The term "liquidus viscosity," as used herein, refers to the viscosity of the glass-ceramic at the onset of devitrification (i.e., at the liquidus temperature as determined with the gradient furnace method according to ASTM C829-81).

The elastic modulus (also referred to as Young's modulus) of the glass-based article is provided in units of gigapascals (GPa). The elastic modulus of the glass is determined by resonant ultrasound spectroscopy on bulk samples of each glass-based article in accordance with ASTM C623.

Vickers hardness may be measured using ASTM C1326 and C1327 (and its progeny, all herein incorporated by reference) "Standard Test Methods for Vickers Indentation Hardness of Advanced Ceramics," ASTM International, Conshohocken, PA, US. In some embodiments, the glass-ceramics exhibit such Vickers indentation crack initiation load values after being chemically strengthened via ion exchange.

The fracture toughness may be measured using a chevron notch short beam, according to ASTM C1421-10, "Standard Test Methods for Determination of Fracture Toughness of Advanced Ceramics at Ambient Temperature" prior to ion-exchange strengthening of the glass-ceramic.

Compressive stress (including surface compressive stress) is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass-ceramic. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

The phrase "depth of compression" and "DOC" refer to the position in the glass-ceramic where compressive stress transitions to tensile stress.

The phrase "glass precursor" or "precursor glass", as used herein, refers to a glass or glass article containing one or more nucleating agents and/or nucleation sites (e.g., within a body of the material, which may be homogenously distributed therein and throughout the body), which, upon thermal treatment, at least in part causes (e.g., facilitates) the nucleation of at least one crystalline phase in the glass.

Figure 9:
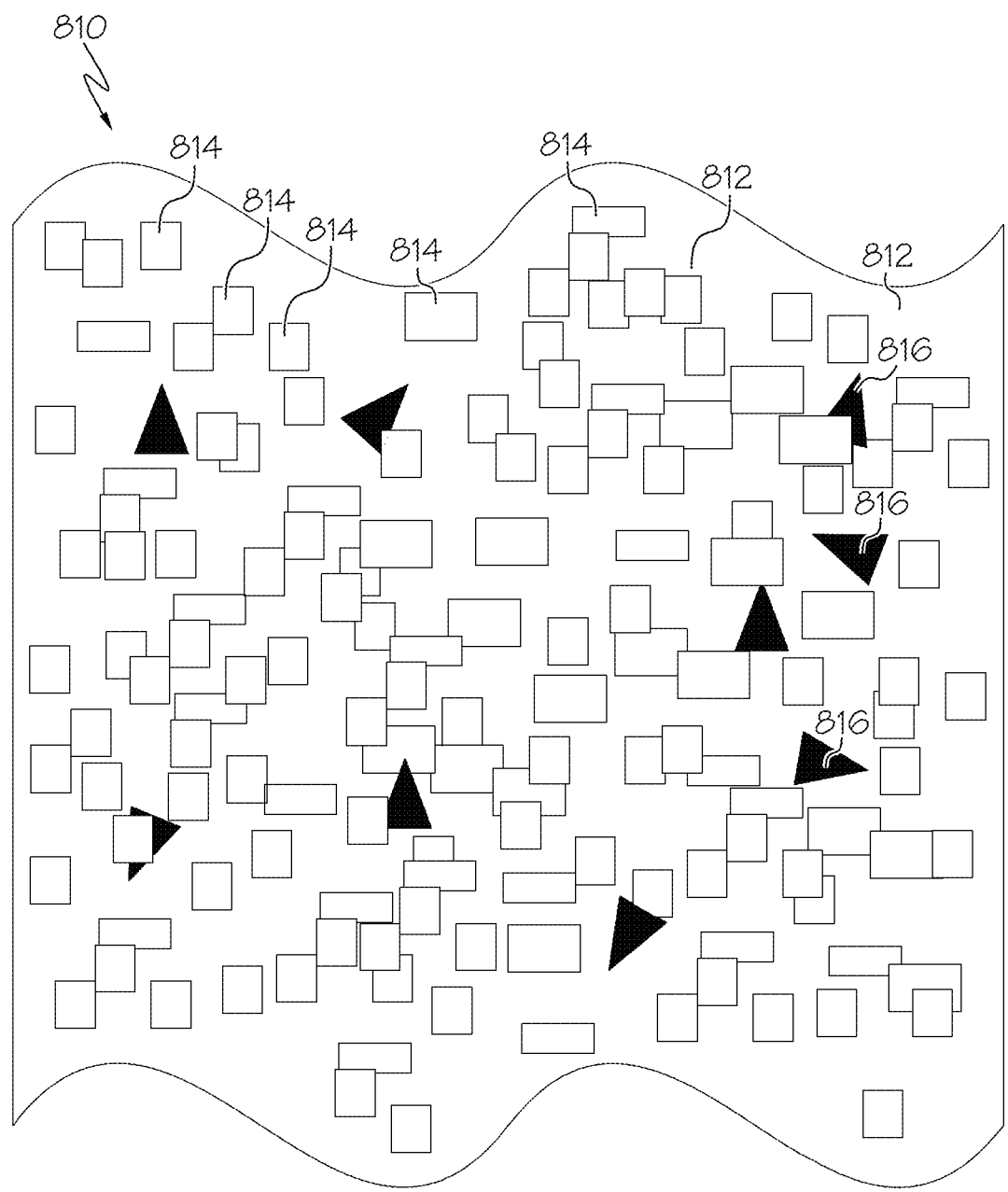
FIG. 9 schematically depicts a glass-ceramic article.

The phrase "glass-ceramic", as used herein, refers to a material or article formed from a precursor glass material following nucleation of at least one crystalline phase in the precursor glass such that the glass-ceramic includes a residual glass phase and at least one crystalline phase (see generally FIG. 9 and related disclosure).

The phrase "primary crystalline phase," as used herein, refers to a crystalline phase present in the glass-ceramic in an amount (in wt. % of the glass-ceramic) greater than the amount (in wt. % of the glass-ceramic) of any other individual crystalline phases present in the glass-ceramic. For example, if a glass-ceramic comprises crystalline phases A, B, and C and crystalline phase A is the primary crystalline phase, the amount of crystalline phase A in the glass-ceramic is greater than the amount of crystalline phase B in the glass-ceramic and greater than the amount of crystalline phase C in the glass-ceramic.

Articles formed from glass-ceramics generally have improved fracture toughness relative to articles formed from glass. This improvement may be due to the presence of crystalline grains in the glass-ceramics, which may impede crack growth. The fracture toughness of glass-ceramics may be improved by decreasing the number of grains per unit volume of the glass-ceramic—that is by increasing the size of the grains of the glass-ceramic. However, the transparency or optical transmission of glass-ceramics may decrease with increasing grain size. In particular, the visible transparency of glass-ceramics may be significantly reduced when the size of the grains is larger than 300 nm. Thus, some glass-ceramics may have relatively good mechanical properties (such as fracture toughness) and relatively poor optical characteristics (such as optical transparency or optical transmittance) or relatively poor mechanical properties and relatively good optical characteristics, but not both relatively good mechanical properties and relatively good optical characteristics.

In addition, some glass-ceramics may be strengthened by ion exchange processes in which smaller alkali metal ions in the glass-ceramic are exchanged for larger alkali metal ions from, for example, a bath of molten alkali metal salts. As an example, a lithium-containing glass-ceramic may be strengthened by ion exchange by placing the glass-ceramic in a bath of molten alkali metal salts, such as salts of sodium and/or potassium, thereby facilitating the exchange of lithium ions in the glass-ceramic with sodium and/or potassium ions in the bath. However, the recent demand for lithium for use in various applications has increased the cost of lithium raw materials and reduced availability, thereby increasing the overall cost for producing glass-ceramics containing lithium which may be strengthened by ion exchange. The glass-ceramics described herein do not require lithium to facilitate desirable ion exchange performance.

Disclosed herein are precursor glasses and glass-ceramics formed therefrom which mitigate the aforementioned problems.

Referring now to FIG. 9 by way of example, a glass-ceramic article 810 is schematically depicted according to one or more embodiments shown and described herein. As noted herein, the phrase "glass-ceramic" refers to a material or article formed from a precursor glass material following nucleation of at least one crystalline phase in the precursor glass such that the glass-ceramic includes a residual glass phase and at least one crystalline phase. Thus, the glass-ceramic article 810 includes both a glass phase 812 (e.g., amorphous glass; single-phase glass or multi-phase glass) and polycrystalline ceramic phase (e.g., grains of the primary crystalline phase 814, optionally with grains of accessory crystalline phase(s) 816). The glass phase 812 may be referred to as "residual glass" or a "residual glass phase." Conceivably, the grains of the crystalline phases 814, 816 may be unevenly distributed or directionally grown, such as by localizing heat via laser, or by positioning and/or orienting nucleation sites to guide growth of the grains of the crystalline phases 814, 816, and contemplated embodiments include such properties; however, generally in the glass-ceramics disclosed herein, the grains of the crystalline phases 814, 816 may be uniformly or homogenously distributed and randomly oriented within the glass phase 812, such as throughout some, most or all of the glass-ceramic article 810. Further, once nucleated from the precursor glass, the grains of the crystalline phases 814, 816 may be grown to contact one another, overlap one another, interlock with one another, and/or fill more of the volume of the glass-ceramic article 810. Growing the grains of the crystalline phases 814, 816 to different sizes may influence properties of the glass-ceramic article 810, and such properties may be isotropic with grains of the crystalline phases 814, 816 uniformly, homogenously positioned, and randomly oriented when the grains of the crystalline phases 814, 816 have grain sizes and the articles have sizes, as disclosed herein. After nucleation and growth of the grains of the crystalline phases 814, 816, the glass phase 812 surrounds (e.g., contacts, envelops, encapsulates) individual or clusters of the grains of the crystalline phases 814, 816. The glass-ceramic article 810 may have more than one glass phase 812 and/or more than one crystalline phase, as shown with crystalline phases 814, 816.

Embodiments of the glass-ceramics described herein, such as the embodiment depicted in FIG. 9, have a phase assemblage comprising one or more crystalline phases and a glass phase. At least one of the crystalline phases comprises a jeffbenite crystalline structure. A crystalline phase having a jeffbenite crystalline structure refers to a crystalline phase identified as jeffbenite by X-ray diffraction (XRD) analysis. For example, XRD data (such as an XRD spectrum) collected from a sample of glass-ceramic material, along with general compositional information about the composition of the sample (such as the batch composition from which the sample was prepared) may be input into MDI Jade powder XRD Analysis software from Materials Data Inc. The software utilizes the input information, along with the International Center For Diffraction Data's Powder Diffraction File version 4 database (ICDD PDF-4 database), to identify the crystalline phases in the sample based on the compositional information of the sample and the crystalline structure of the phases as determined from the XRD data. In embodiments, the phase assemblage of the glass-ceramic may have at least one crystalline phase comprising a jeffbenite crystalline structure as determined by this methodology.

Based on the foregoing, unless otherwise specified or further clarified herein, such as in the claims or elsewhere, the phrase "jeffbenite crystalline structure" means a crystalline phase or grains of a crystalline phase identified by XRD analysis as jeffbenite, as described herein, and the further characterizations provided herein that may aid in clarifying various embodiments and forms of crystalline phases having a jeffbenite crystalline structure that may be included and claimed.

In embodiments, a crystalline phase having a jeffbenite crystalline structure is the primary crystalline phase in the glass-ceramics. The crystalline phase having a jeffbenite crystalline structure may have attributes (e.g., compositional, molecular structural, microstructural) in common with jeffbenite.

Jeffbenite, named after Jeffrey Harris and Ben Harte, is a mineral recently discovered as inclusions in diamonds from "super-deep" (e.g., >300 km deep) within the mantle of the Earth. Prior to its naming, jeffbenite was called tetragonal-almandine-pyrope-phase ("TAPP"). Jeffbenite may comprise tetragonal $Mg_3Al_2Si_3O_{12}$. The term "tetragonal" refers to the otherwise cubic lattice being stretched along one of its lattice vectors to become a rectangular prism with a square base ("a by a") and height ("c," different from "a"), such as within the space group I42d. The tetragonal crystal structure of jeffbenite may include cell edge parameter α of about 6.5, such as 6.5231(1), such as within 0.1 thereof, and parameter c of about 18.2, such as 18.1756(3) angstroms, such as within 0.1 thereof. A crystalline phase having a jeffbenite crystalline structure may have the tetragonal structure of jeffbenite, as described herein.

The density of jeffbenite (itself) may be about 3.6 g/cm$^3$, such as 3.576 g/cm$^3$, such as within 0.1 g/cm$^3$ thereof. The microhardness of jeffbenite (itself) may be about 7, such as within 1 thereof. Jeffbenite (itself) may be uniaxial (−) with refractive indexes ω of about 1.7, such as 1.733(5), such as within 0.1 thereof, and δ of about 1.7, such as 1.721, such as within 0.1 thereof.

While $Mg_3Al_2Si_3O_{12}$ is an ideal form of jeffbenite, jeffbenite can be generally described as a stoichiometric garnet composition, similar to pyrope $(Mg_3Al_2(SiO_4)_3)$-almandine $(Fe_3Al_2(SiO_4)_3)$, but with a tetragonal crystalline structure, and may include other elements. Put another way, structurally, jeffbenite and crystals having a jeffbenite crystalline structure may be described as $(M1)(M2)_2(M3)_2(T1)(T2)_2O_{12}$ where M1 comprises magnesium (e.g., is mostly magnesium), M2 comprises aluminum (e.g., is mostly aluminum), M3 comprises magnesium (e.g., is mostly magnesium), and T1 and T2 comprise silicon (are both mostly silicon), and where two tetrahedra of such crystalline structures do not share any oxygen with one another. Jeffbenite may be categorized as an orthosilicate, such as a silicate containing the tetrahedra group $SiO_4$ where the ratio of silicon to oxygen is 1 to 4.

In embodiments of the glass-ceramics described herein, the crystalline phase comprising the jeffbenite crystalline structure may at least comprise, mostly consist of (>50 wt. %), consist essentially of, or be tetragonal $Mg_3Al_2Si_3O_{12}$.

In embodiments of the glass-ceramics described herein, the crystalline phase comprising the jeffbenite crystalline structure (or a portion thereof) may be modified by the addition of zirconia ($ZrO_2$). Without intending to be bound by any theory, alumina (i.e., an aluminum contribution) may be at least partially replaced in the jeffbenite crystalline structure by magnesia (i.e., a magnesium contribution) and zirconia (i.e., a zirconium contribution). In such embodiments, the crystalline phase comprising the jeffbenite crystalline structure (or a portion thereof) may have a composition according to the following formula: $Mg_{3+x}Zr_xAl_{2-2x}Si_3O_{12}$, where x is greater than or equal to 0 to less than or equal to 1. In embodiments, x may be greater than or equal to 0 to less than or equal to 0.6. For example, without limitation, the crystalline phase having the jeffbenite crystalline structure (or a portion thereof) may have the composition(s): $Mg_3Al_2Si_3O_{12}$, $Mg_{3.1}Zr_{0.1}Al_{1.8}Si_6O_{12}$, $Mg_{3.2}Zr_{0.2}Al_{1.6}Si_3O_{12}$, $Mg_{3.3}Zr_{0.3}Al_{1.4}Si_3O_{12}$, $Mg_{3.4}Zr_{0.4}Al_{1.2}Si_3O_{12}$, $Mg_{3.5}Zr_{0.5}AlSi_3O_{12}$, $Mg_{3.6}Zr_{0.6}Al_{0.8}Si_3O_{12}$, $Mg_{3.7}Zr_{0.7}Al_{0.6}Si_3O_{12}$, $Mg_{3.8}Zr_{0.8}Al_{0.4}Si_3O_{12}$, or $Mg_{3.9}Zr_{0.9}Al_{0.2}Si_3O_{12}$.

In embodiments of the glass-ceramics described herein, the crystalline phase comprising the jeffbenite crystalline structure (or a portion thereof) may be further modified by the addition of titania, tin oxide, iron oxide (FeO), manganese oxide, and/or zinc oxide. For example, titania (i.e., a titanium contribution) and/or tin oxide (i.e., a tin contribution) may be substituted for up to 50% of the zirconium in the jeffbenite crystalline structure. Similarly, iron oxide (i.e., an iron contribution), manganese oxide (i.e., a manganese contribution), and/or zinc oxide (i.e., a zinc contribution) may be substituted for a portion of the magnesium in the jeffbenite crystalline structure. In such embodiments, the crystalline phase comprising the jeffbenite crystalline structure (or a portion thereof) may have a composition according to the following formula: $(Mg,Fe,Mn,Zn)_{3+x}(Zr,Ti,Sn)_xAl_{2-2x}Si_3O_{12}$, where x is greater than or equal to 0 to less than or equal to 1. In embodiments, x may be greater than or equal to 0 to less than or equal to 0.6. For example, without limitation, the crystalline phase having the jeffbenite crystalline structure (or a portion thereof) may have the composition(s): $(Mg,Fe,Mn,Zn)_3Al_2Si_3O_{12}$, $(Mg,Fe,Mn,Zn)_{3.1}(Zr,Ti,Sn)_{0.1}Al_{1.8}Si_3O_{12}$, $(Mg,Fe,Mn,Zn)_{3.2}(Zr,Ti,Sn)_{0.2}Al_{1.6}Si_3O_{12}$, $(Mg,Fe,Mn,Zn)_{3.3}(Zr,Ti,Sn)_{0.3}Al_{1.4}Si_3O_{12}$, $(Mg,Fe,Mn,Zn)_{3.4}(Zr,Ti,Sn)_{0.4}Al_{1.2}Si_3O_{12}$, $(Mg,Fe,Mn,Zn)_{3.5}(Zr,Ti,Sn)_{0.5}AlSi_3O_{12}$, $(Mg,Fe,Mn,Zn)_{3.6}(Zr,Ti,Sn)_{0.6}Al_{0.8}Si_3O_{12}$, $(Mg,Fe,Mn,Zn)_{3.7}(Zr,Ti,Sn)_{0.7}Al_{0.6}Si_3O_{12}$, $(Mg,Fe,Mn,Zn)_{3.5}(Zr,Ti,Sn)_{0.8}Al_{0.4}Si_3O_{12}$, or $(Mg,Fe,Mn,Zn)_{3.9}(Zr,Ti,Sn)_{0.9}Al_{0.2}Si_3O_{12}$. In these embodiments, it should be understood that the Fe, Mn, Zn, Ti, and Sn components in the formulas are each optional and the composition may be formed without one or more of these elements. For example, the composition may be free of Fe, but may include Mn, Ti, and Sn, or be free of Sn but include Fe, Mn, Zn and Ti. As such, it should be understood that the above referenced formulas can be written without one or more of Fe, Mn, Zn, Ti, and Sn.

It should be understood that other substitutions and modifications to the crystalline phase comprising the jeffbenite structure are contemplated and possible. For example, in embodiments of the glass-ceramics described herein, the crystalline phase comprising the jeffbenite crystalline structure (or a portion thereof) may be modified by the addition of metal oxides to the composition as a source of divalent metal cations (expressed as "$R^{2+}$") in substitution for a portion of the magnesium in the jeffbenite crystalline structure. Examples of divalent metal cations include, without limitation, $Ca^{2+}$, $Mn^{2+}$, $Fe^{2+}$, and the like. In these embodiments, the divalent metal cations may have an ionic radius of less than 1 angstrom (0.1 nm). Similarly, the crystalline phase comprising the jeffbenite crystalline structure (or a portion thereof) may be modified by the addition of metal oxides to the composition as a source of tetravalent metal cations (expressed as "$R^{4+}$") in substitution for a portion of the zirconium in the jeffbenite crystalline structure. Examples of tetravalent metal cations include $Ti^{4+}$, $Sn^{4+}$, $Hf^{4+}$, and the like. In such embodiments, the crystalline phase comprising the jeffbenite crystalline structure (or a portion thereof) may have a composition according to the following formula: $(Mg,R^{2+})_{3+x}(Zr,R^{4+})_xAl_{2-2x}Si_3O_{12}$, where x is greater than or equal to 0 to less than or equal to 1. In embodiments, x may be greater than or equal to 0 to less than or equal to 0.6. For example, without limitation, the crystalline phase having the jeffbenite crystalline structure (or a portion thereof) may have the composition(s): $(Mg,R^{2+})_3Al_2Si_3O_{12}$, $(Mg,R^{2+})_{3.1}(Zr,R^{4+})_{0.1}Al_{1.8}Si_3O_{12}$, $(Mg,R^{2+})_{3.2}(Zr,R^{4+})_{0.2}Al_{1.6}Si_3O_{12}$, $(Mg,R^{2+})_{3.3}(Zr,R^{4+})_{0.3}Al_{1.4}Si_3O_{12}$, $(Mg,R^{2+})_{3.4}(Zr,R^{4+})_{0.4}Al_{1.2}Si_3O_{12}$, $(Mg,R^{2+})_{3.5}(Zr,R^{4+})_{0.5}AlSi_3O_{12}$, $(Mg,R^{2+})_{3.6}(Zr,R^{4+})_{0.6}Al_{0.8}Si_6O_{12}$, $(Mg,R^{2+})_{3.7}(Zr,R^{4+})_{0.7}Al_{0.6}Si_3O_{12}$, $(Mg,R^{2+})_{3.5}(Zr,R^{4+})_{0.8}Al_{0.4}Si_3O_{12}$, or $(Mg,R^{2+})_{3.9}(Zr,R^{4+})_{0.9}Al_{0.2}Si_3O_{12}$. In these embodiments, it should be understood that the $R^{2+}$ and $R^{4+}$ components in the formulas are each optional and the composition may be formed without one or the other of these elements. As such, it should be understood that the above referenced formulas can be written without one or the other of $R^{2+}$ and $R^{4+}$.

In embodiments, the one or more crystalline phases of the phase assemblage may comprise one or more accessory crystalline phases. The one or more accessory crystalline phases may be present in the glass-ceramic in an amount less than the primary crystalline phase. In embodiments, the one or more accessory crystalline phases may comprise tetragonal zirconia ($ZrO_2$), $ZrTiO_4$, or a combination thereof. However, it should be understood that other accessory crystalline phases may also be present in the resultant glass-ceramic. In embodiments, one or more of the accessory crystalline phases may enter the structure of the crystalline phase having the jeffbenite crystalline structure (e.g., there may be a secondary phase within the lattice of the jeffbenite crystalline phase.

In embodiments, the phase assemblage of the glass-ceramics described herein comprises greater than or equal to 25 wt. % of the one or more crystalline phases by weight of the glass-ceramic article (i.e., wt. %) and less than or equal to 75 wt. % of the glass phase, greater than or equal to 30 wt. % of the one or more crystalline phases and less than or equal to 70 wt. % of the glass phase, greater than or equal to 40 wt. % of the one or more crystalline phases and less than or equal to 60 wt. % of the glass phase, greater than or equal to 50 wt. % of the one or more crystalline phases and less than or equal to 50 wt. % of the glass phase, greater than or equal to 60 wt. % of the one or more crystalline phases and less than or equal to 40 wt. % of the glass phase, greater than or equal to 70 wt. % of the one or more crystalline phases and less than or equal to 30 wt. % of the glass phase, greater than or equal to 80 wt. % of the one or more crystalline phases and less than or equal to 20 wt. % of the glass phase, as determined according to Rietveld analysis of the XRD spectrum. It should be understood that the crystalline phase content or the glass content may be within a sub-range formed from any and all of the foregoing endpoints. In embodiments, the crystalline phase(s) and glass phase may be homogenously distributed throughout the glass-ceramic. It should further be noted that at least some, most (>50 wt %), or essentially all of such crystalline phase may have a jeffbenite crystalline structure (e.g., as identified by XRD; tetragonal, stoichiometrically garnet, $Mg_3Al_2Si_3O_{12}$ and variations thereof).

$SiO_2$ may be the primary glass former in the precursor glass and glass-ceramic compositions described herein and may function to stabilize the network structure of the glass-ceramics. The concentration of $SiO_2$ in the precursor glass and glass-ceramic compositions should be sufficiently high (e.g., greater than or equal to 35 mol. %) to form the crystalline phase when the precursor glass is heat-treated to convert the precursor glass to a glass-ceramic. The amount of $SiO_2$ may be limited (e.g., to less than or equal to 65 mol. %) to control the melting point of the precursor glass or glass-ceramic composition, as the melting temperature of pure $SiO_2$ or high-$SiO_2$ glasses is undesirably high. Thus, limiting the concentration of $SiO_2$ may aid in improving the meltability and the formability of the precursor glass or glass-ceramic composition.

In embodiments, the precursor glass or glass-ceramic composition may comprise a positive amount of silica, such as an amount greater than tramp (0.05 mol. %. or greater), such as from greater than or equal to 35 mol. % to less than or equal to 65 mol. % $SiO_2$. In embodiments, the precursor glass or glass-ceramic composition may comprise $SiO_2$ in an amount greater than or equal to 35 mol. % to less than or equal to 62 mol. %, greater than or equal to 35 mol. % to less than or equal to 59 mol. %, greater than or equal to 35 mol. % to less than or equal to 56 mol. %, greater than or equal to 35 mol. % to less than or equal to 53 mol. %, greater than or equal to 35 mol. % to less than or equal to 50 mol. %, greater than or equal to 35 mol. % to less than or equal to 47 mol. %, greater than or equal to 35 mol. % to less than or equal to 44 mol. %, greater than or equal to 35 mol. % to less than or equal to 41 mol. %, greater than or equal to 35 mol. % to less than or equal to 38 mol. %, greater than or equal to 38 mol. % to less than or equal to 65 mol. %, greater than or equal to 41 mol. % to less than or equal to 65 mol. %, greater than or equal to 42 mol. % to less than or equal to 65 mol. %, greater than or equal to 43 mol. % to less than or equal to 65 mol. %, greater than or equal to 44 mol. % to less than or equal to 65 mol. %, greater than or equal to 45 mol. % to less than or equal to 65 mol. %, greater than or equal to 46 mol. % to less than or equal to 65 mol. %, greater than or equal to 47 mol. % to less than or equal to 65 mol. %, greater than or equal to 48 mol. % to less than or equal to 65 mol. %, greater than or equal to 49 mol. % to less than or equal to 65 mol. %, greater than or equal to 50 mol. % to less than or equal to 65 mol. %, greater than or equal to 51 mol. % to less than or equal to 65 mol. %, greater than or equal to 52 mol. % to less than or equal to 65 mol. %, greater than or equal to 53 mol. % to less than or equal to 65 mol. %, greater than or equal to 54 mol. % to less than or equal to 65 mol. %, greater than or equal to 55 mol. % to less than or equal to 65 mol. %, greater than or equal to 56 mol. % to less than or equal to 65 mol. %, greater than or equal to 57 mol. % to less than or equal to 65 mol. %, greater than or equal to 58 mol. % to less than or equal to 65 mol. %, greater than or equal to 59 mol. % to less than or equal to 65 mol. %, greater than or equal to 60 mol. % to less than or equal to 65 mol. %, greater than or equal to 61 mol. % to less than or equal to 65 mol. %, or any and all sub-ranges formed from any of these endpoints. In some embodiments, the precursor glass or glass-ceramic composition may comprise from greater than or equal to 48 mol. % to less than or equal to 54 mol. % $SiO_2$. In embodiments, the concentration of $SiO_2$ may be greater than or equal to 40 mol. %, 45 mol. %, or 50 mol. %. In embodiments, the concentration of $SiO_2$ may be less than or equal to 65 mol. %, 60 mol. % or 55 mol. %.

Like $SiO_2$, $Al_2O_3$ may also stabilize the glass network and additionally provides improved mechanical properties and chemical durability to the glass-ceramics. The amount of $Al_2O_3$ may also be tailored to control the viscosity of the precursor glass or glass-ceramic composition. However, if the amount of $Al_2O_3$ is too high, the viscosity of the glass melt may increase. In embodiments, the precursor glass or glass-ceramic composition may comprise from greater than or equal to 5 mol. % to less than or equal to 20 mol. % $Al_2O_3$. In embodiments, the concentration of $Al_2O_3$ in the precursor glass or glass-ceramic composition may be a positive amount, such as an amount greater than tramp (0.05 mol. %. or greater), such as greater than or equal to 5 mol. % to less than or equal to 20 mol. %, greater than or equal to 5 mol. % to less than or equal to 19 mol. %, greater than or equal to 5 mol. % to less than or equal to 18 mol. %, greater than or equal to 5 mol. % to less than or equal to 17 mol. %, greater than or equal to 5 mol. % to less than or equal to 16 mol. %, greater than or equal to 5 mol. % to less than or equal to 15 mol. %, greater than or equal to 5 mol. % to less than or equal to 14 mol. %, greater than or equal to 5 mol. % to less than or equal to 13 mol. %, greater than or equal to 5 mol. % to less than or equal to 12 mol. %, greater than or equal to 5 mol. % to less than or equal to 11 mol. %, greater than or equal to 5 mol. % to less than or equal to 10 mol. %, greater than or equal to 5 mol. % to less than or equal to 9 mol. %, greater than or equal to 5 mol. % to less than or equal to 8 mol. %, greater than or equal to 5 mol. % to less than or equal to 7 mol. %, greater than or equal to 5 mol. % to less than or equal to 6 mol. %, greater than or equal to 6 mol. % to less than or equal to 20 mol. %, greater than or equal to 7 mol. % to less than or equal to 20 mol. %, greater than or equal to 8 mol. % to less than or equal to 20 mol. %, greater than or equal to 9 mol. % to less than or equal to 20 mol. %, greater than or equal to 10 mol. % to less than or equal to 20 mol. %, greater than or equal to 11 mol. % to less than or equal to 20 mol. %, greater than or equal to 12 mol. % to less than or equal to 20 mol. %, greater than or equal to 13 mol. % to less than or equal to 20 mol. %, greater than or equal to 14 mol. % to less than or equal to 20 mol. %, greater than or equal to 15 mol. % to less than or equal to 20 mol. %, greater than or equal to 16 mol. % to less than or equal to 20 mol. %, greater than or equal to 17 mol. % to less than or equal to 20 mol. %, greater than or equal to 18 mol. % to less than or equal to 20 mol. %, greater than or equal to 19 mol. % to less than or equal to 20 mol. %, or any and all sub-ranges formed from any of these endpoints. In embodiments, the concentration of $Al_2O_3$ in the precursor glass or glass-ceramic composition may be from greater than or equal to 9 mol. % to less than or equal to 13 mol. %. In embodiments, the concentration of $Al_2O_3$ in the precursor glass or glass-ceramic composition may be greater than or equal to 5 mol. %, 7 mol. %, or 10 mol. %. In embodiments, the concentration of $Al_2O_3$ may be less than or equal to 20 mol. %, 15 mol. %, 12 mol. %, or 10 mol. %.

In embodiments, the precursor glass or glass-ceramic composition may comprise a positive amount of MgO, such as an amount greater than tramp (0.05 mol. %. or greater), such as from greater than or equal to 10 mol. % to less than or equal to 45 mol. % MgO. In embodiments, the precursor glass or glass-ceramic composition may comprise from greater than or equal to 7 mol. % to less than or equal to 65 mol. % MgO. Additions of MgO may increase the elastic modulus of the glass of the precursor glass and resultant glass-ceramic. MgO may also displace $Al_2O_3$ in the glass network and create a more open network structure, improving ion mobility in the glass network. Without intending to be bound by theory, addition of MgO may increase the crystallinity of the glass-ceramic composition. In embodiments, the concentration of MgO in the precursor glass or glass-ceramic composition may be greater than or equal to 7 mol. % to less than or equal to 65 mol. %, greater than or equal to 7 mol. % to less than or equal to 60 mol. %, greater than or equal to 7 mol. % to less than or equal to 55 mol. %, greater than or equal to 7 mol. % to less than or equal to 50 mol. %, greater than or equal to 7 mol. % to less than or equal to 48 mol. %, greater than or equal to 7 mol. % to less than or equal to 46 mol. %, greater than or equal to 7 mol. % to less than or equal to 44 mol. %, greater than or equal to 7 mol. % to less than or equal to 42 mol. %, greater than or equal to 7 mol. % to less than or equal to 40 mol. %, greater than or equal to 7 mol. % to less than or equal to 38 mol. %, greater than or equal to 7 mol. % to less than or equal to 36 mol. %, greater than or equal to 7 mol. % to less than or equal to 34 mol. %, greater than or equal to 7 mol. % to less than or equal to 32 mol. %, greater than or equal to 7 mol. % to less than or equal to 30 mol. %, greater than or equal to 7 mol. % to less than or equal to 28 mol. %, greater than or equal to 7 mol. % to less than or equal to 26 mol. %, greater than or equal to 7 mol. % to less than or equal to 24 mol. %, greater than or equal to 7 mol. % to less than or equal to 22 mol. %, greater than or equal to 7 mol. % to less than or equal to 20 mol. %, greater than or equal to 7 mol. % to less than or equal to 18 mol. %, greater than or equal to 7 mol. % to less than or equal to 16 mol. %, greater than or equal to 7 mol. % to less than or equal to 14 mol. %, greater than or equal to 7 mol. % to less than or equal to 12 mol. %, greater than or equal to 7 mol. % to less than or equal to 10 mol. %, greater than or equal to 9 mol. % to less than or equal to 50 mol. %, greater than or equal to 10 mol. % to less than or equal to 65 mol. %, greater than or equal to 10 mol. % to less than or equal to 60 mol. %, greater than or equal to 10 mol. % to less than or equal to 55 mol. %, greater than or equal to 10 mol. % to less than or equal to 45 mol. %, greater than or equal to 10 mol. % to less than or equal to 42 mol. %, greater than or equal to 10 mol. % to less than or equal to 40 mol. %, greater than or equal to 10 mol. % to less than or equal to 38 mol. %, greater than or equal to 10 mol. % to less than or equal to 36 mol. %, greater than or equal to 10 mol. % to less than or equal to 34 mol. %, greater than or equal to 10 mol. % to less than or equal to 32 mol. %, greater than or equal to 10 mol. % to less than or equal to 30 mol. %, greater than or equal to 10 mol. % to less than or equal to 28 mol. %, greater than or equal to 10 mol. % to less than or equal to 26 mol. %, greater than or equal to 10 mol. % to less than or equal to 24 mol. %, greater than or equal to 10 mol. % to less than or equal to 22 mol. %, greater than or equal to 10 mol. % to less than or equal to 20 mol. %, greater than or equal to 10 mol. % to less than or equal to 18 mol. %, greater than or equal to 10 mol. % to less than or equal to 16 mol. %, greater than or equal to 10 mol. % to less than or equal to 14 mol. %, greater than or equal to 10 mol. % to less than or equal to 12 mol. %, greater than or equal to 11 mol. % to less than or equal to 50 mol. %, greater than or equal to 12 mol % and less than or equal to 60 mol. %, greater than or equal to 12 mol. % to less than or equal to 45 mol. %, greater than or equal to 13 mol. % and less than or equal to 65 mol. %, greater than or equal to 13 mol. % to less than or equal to 50 mol. %, greater than or equal to 14 mol. % to less than or equal to 60 mol. %, greater than or equal to 14 mol. % to less than or equal to 45 mol. %, greater than or equal to 15 mol. % to less than or equal to 65 mol. %, greater than or equal to 15 mol. % to less than or equal to 50 mol. %, greater than or equal to 16 mol. % to less than or equal to 65 mol. %, greater than or equal to 16 mol. % to less than or equal to 45 mol. %, greater than or equal to 17 mol. % to less than or equal to 65 mol. %, greater than or equal to 17 mol. % to less than or equal to 50 mol. %, greater than or equal to 18 mol. % to less than or equal to 60 mol. %, greater than or equal to 18 mol. % to less than or equal to 45 mol. %, greater than or equal to 19 mol. % to less than or equal to 65 mol. %, greater than or equal to 19 mol. % to less than or equal to 50 mol. %, greater than or equal to 20 mol. % to less than or equal to 65 mol. %, greater than or equal to 20 mol. % to less than or equal to 45 mol. %, greater than or equal to 21 mol. % to less than or equal to 65 mol. %, greater than or equal to 21 mol. % to less than or equal to 50 mol. %, greater than or equal to 22 mol. % to less than or equal to 65 mol. %, greater than or equal to 22 mol. % to less than or equal to 45 mol. %, greater than or equal to 23 mol. % to less than or equal to 65 mol. %, greater than or equal to 23 mol. % to less than or equal to 50 mol. %, greater than or equal to 24 mol. % to less than or equal to 60 mol. %, greater than or equal to 24 mol. % to less than or equal to 45 mol. %, greater than or equal to 25 mol. % to less than or equal to 65 mol. %, greater than or equal to 25 mol. % to less than or equal to 50 mol. %, greater than or equal to 26 mol. % to less than or equal to 60 mol. %, greater than or equal to 26 mol. % to less than or equal to 45 mol. %, greater than or equal to 27 mol. % to less than or equal to 65 mol. %, greater than or equal to 27 mol. % to less than or equal to 50 mol. %, greater than or equal to 28 mol. % to less than or equal to 60 mol. %, greater than or equal to 28 mol. % to less than or equal to 45 mol. %, greater than or equal to 29 mol. % to less than or equal to 65 mol. %, greater than or equal to 29 mol. % to less than or equal to 50 mol. %, greater than or equal to 30 mol. % to less than or equal to 60 mol. %, greater than or equal to 30 mol. % to less than or equal to 45 mol. %, greater than or equal to 31 mol. % to less than or equal to 65 mol. %, greater than or equal to 31 mol. % to less than or equal to 50 mol. %, greater than or equal to 32 mol. % to less than or equal to 60 mol. %, greater than or equal to 32 mol. % to less than or equal to 45 mol. %, greater than or equal to 33 mol. % to less than or equal to 65 mol. %, greater than or equal to 33 mol. % to less than or equal to 50 mol. %, greater than or equal to 34 mol. % to less than or equal to 60 mol. %, greater than or equal to 34 mol. % to less than or equal to 45 mol. %, greater than or equal to 35 mol. % to less than or equal to 65 mol. %, greater than or equal to 35 mol. % to less than or equal to 65 mol. %, greater than or equal to 35 mol. % to less than or equal to 50 mol. %, greater than or equal to 36 mol. % to less than or equal to 60 mol. %, greater than or equal to 36 mol. % to less than or equal to 45 mol. %, greater than or equal to 37 mol. % to less than or equal to 65 mol. %, greater than or equal to 37 mol. % to less than or equal to 50 mol. %, greater than or equal to 38 mol. % to less than or equal to 60 mol. %, greater than or equal to 38 mol. % to less than or equal to 45 mol. %, greater than or equal to 39 mol. % to less than or equal to 65 mol. %, greater than or equal to 39 mol. % to less than or equal to 50 mol. %, greater than or equal to 40 mol. % to less than or equal to 60 mol. %, greater than or equal to 40 mol. % to less than or equal to 45 mol. %, greater than or equal to 41 mol. % to less than or equal to 65 mol. %, greater than or equal to 41 mol. % to less than or equal to 50 mol. %, greater than or equal to 42 mol. % to less than or equal to 60 mol. %, greater than or equal to 42 mol. % to less than or equal to 45 mol. %, greater than or equal to 43 mol. % to less than or equal to 65 mol. %, greater than or equal to 43 mol. % to less than or equal to 50 mol. %, greater than or equal to 45 mol. % to less than or equal to 50 mol. %, greater than or equal to 47 mol. % to less than or equal to 50 mol. %, or any and all sub-ranges formed from any of these endpoints. In embodiments, the concentration of MgO in the precursor glass or glass-ceramic composition may be greater than or equal to 7 mol. %, 10 mol. %, 20 mol. %, 25 mol. %, or 30 mol. %. In embodiments, the concentration of MgO may be less than or equal to 65 mol. %, 60 mol. %, 55 mol %, 50 mol. %, 45 mol. %, 40 mol. %, 35 mol. %, or 30 mol. %. Without intending to be bound by theory, as the concentration of MgO in the glass-ceramic composition increases, then the opacity of the glass-ceramic may increase. Likewise, as the concentration of MgO in the glass-ceramic composition decreases, then the transparency may be improved. However, if the concentration of MgO in the glass-ceramic composition is too low, then the glass-ceramic composition may become hazy.

In embodiments, the precursor glass or glass-ceramic composition may comprise $Na_2O$.

Additions of $Na_2O$ may lower the liquidus viscosity of the glass which, in turn, may aid in forming or shaping the precursor glass. $Na_2O$ may also facilitate ion-exchange strengthening of the resultant glass-ceramic as most of the $Na_2O$ present in the precursor glass is partitioned into the residual glass phase following heat treatment (e.g., ceramming). In embodiments, the concentration of $Na_2O$ in the precursor glass or glass-ceramic composition may be greater than or equal to 0 mol. %, such as a positive amount, such as an amount greater than tramp (0.05 mol. %. or greater), to less than or equal to 15 mol. %, greater than or equal to 0 mol. % to less than or equal to 13 mol. %, greater than or equal to 0 mol. % to less than or equal to 11 mol. %, greater than or equal to 0 mol. % to less than or equal to 9 mol. %, greater than or equal to 0 mol. % to less than or equal to 7 mol. %, greater than or equal to 0 mol. % to less than or equal to 5 mol. %, greater than or equal to 0 mol. % to less than or equal to 3 mol. %, greater than or equal to 0 mol. % to less than or equal to 1 mol. %, greater than or equal to 1 mol. % to less than or equal to 15 mol. %, greater than or equal to 1 mol. % to less than or equal to 13 mol. %, greater than or equal to 1 mol. % to less than or equal to 11 mol. %, greater than or equal to 1 mol. % to less than or equal to 9 mol. %, greater than or equal to 1 mol. % to less than or equal to 7 mol. %, greater than or equal to 1 mol. % to less than or equal to 5 mol. %, greater than or equal to 1 mol. % to less than or equal to 3 mol. %, greater than or equal to 2 mol. % to less than or equal to 15 mol. %, greater than or equal to 2 mol. % to less than or equal to 13 mol. %, greater than or equal to 2 mol. % to less than or equal to 11 mol. %, greater than or equal to 2 mol. % to less than or equal to 9 mol. %, greater than or equal to 2 mol. % to less than or equal to 7 mol. %, greater than or equal to 2 mol. % to less than or equal to 5 mol. %, greater than or equal to 2 mol. % to less than or equal to 3 mol. %, greater than or equal to 3 mol. % to less than or equal to 15 mol. %, greater than or equal to 4 mol. % to less than or equal to 15 mol. %, greater than or equal to 5 mol. % to less than or equal to 15 mol. %, greater than or equal to 6 mol. % to less than or equal to 15 mol. %, greater than or equal to 7 mol. % to less than or equal to 15 mol. %, greater than or equal to 8 mol. % to less than or equal to 15 mol. %, greater than or equal to 9 mol. % to less than or equal to 15 mol. %, greater than or equal to 10 mol. % to less than or equal to 15 mol. %, greater than or equal to 11 mol. % to less than or equal to 15 mol. %, greater than or equal to 12 mol. % to less than or equal to 15 mol. %, greater than or equal to 13 mol. % to less than or equal to 15 mol. %, greater than or equal to 14 mol. % to less than or equal to 15 mol. %, or any and all sub-ranges formed from any of these endpoints. In embodiments, the concentration of Na$_2$O in the precursor glass or glass-ceramic composition may be greater than or equal to 0 mol. %, 5 mol. % or 10 mol. %. In embodiments, the concentration of Na$_2$O may be less than or equal to 15 mol. %, 10 mol. %, or 5 mol. %. In embodiments, the precursor glass or glass-ceramic composition may be substantially free of Na$_2$O.

In embodiments, the precursor glass or glass-ceramic composition may comprise K$_2$O. Additions of K$_2$O may lower the liquidus viscosity of the glass which, in turn, may aid in forming or shaping the precursor glass. K$_2$O may also facilitate ion-exchange strengthening of the resultant glass-ceramic as most of the K$_2$O is partitioned into the glass phase after ceramming. In embodiments, the concentration of K$_2$O in the precursor glass or glass-ceramic composition may be greater than or equal to 0 mol. %, such as a positive amount, such as an amount greater than tramp (0.05 mol. %. or greater), to less than or equal to 15 mol. %, greater than or equal to 0 mol. % to less than or equal to 13 mol. %, greater than or equal to 0 mol. % to less than or equal to 11 mol. %, greater than or equal to 0 mol. % to less than or equal to 9 mol. %, greater than or equal to 0 mol. % to less than or equal to 7 mol. %, greater than or equal to 0 mol. % to less than or equal to 5 mol. %, greater than or equal to 0 mol. % to less than or equal to 3 mol. %, greater than or equal to 0 mol. % to less than or equal to 1 mol. %, greater than or equal to 1 mol. % to less than or equal to 15 mol. %, greater than or equal to 1 mol. % to less than or equal to 13 mol. %, greater than or equal to 1 mol. % to less than or equal to 11 mol. %, greater than or equal to 1 mol. % to less than or equal to 9 mol. %, greater than or equal to 1 mol. % to less than or equal to 7 mol. %, greater than or equal to 1 mol. % to less than or equal to 5 mol. %, greater than or equal to 1 mol. % to less than or equal to 3 mol. %, greater than or equal to 2 mol. % to less than or equal to 15 mol. %, greater than or equal to 2 mol. % to less than or equal to 13 mol. %, greater than or equal to 2 mol. % to less than or equal to 11 mol. %, greater than or equal to 2 mol. % to less than or equal to 9 mol. %, greater than or equal to 2 mol. % to less than or equal to 7 mol. %, greater than or equal to 2 mol. % to less than or equal to 5 mol. %, greater than or equal to 2 mol. % to less than or equal to 3 mol. %, greater than or equal to 3 mol. % to less than or equal to 15 mol. %, greater than or equal to 4 mol. % to less than or equal to 15 mol. %, greater than or equal to 5 mol. % to less than or equal to 15 mol. %, greater than or equal to 5 mol. % to less than or equal to 15 mol. %, greater than or equal to 6 mol. % to less than or equal to 15 mol. %, greater than or equal to 7 mol. % to less than or equal to 15 mol. %, greater than or equal to 8 mol. % to less than or equal to 15 mol. %, greater than or equal to 9 mol. % to less than or equal to 15 mol. %, greater than or equal to 10 mol. % to less than or equal to 15 mol. %, greater than or equal to 11 mol. % to less than or equal to 15 mol. %, greater than or equal to 12 mol. % to less than or equal to 15 mol. %, greater than or equal to 13 mol. % to less than or equal to 15 mol. %, or any and all sub-ranges formed from any of these endpoints. In embodiments, the concentration of K$_2$O in the precursor glass or glass-ceramic composition may be greater than or equal to 0 mol. %, 5 mol. % or 10 mol. %. In embodiments, the concentration of K$_2$O may be less than or equal to 15 mol. %, 10 mol. %, or 5 mol. %. In embodiments, the precursor glass or glass-ceramic composition may be substantially free of K$_2$O.

In embodiments, Na$_2$O (mol. %)+K$_2$O (mol. %) in the precursor glass or glass-ceramic compositions described herein may be greater than or equal to 0 mol. % and less than or equal to 15 mol. %. In embodiments, Na$_2$O (mol. %)+K$_2$O (mol. %) in the precursor glass or glass-ceramic compositions described herein may be greater than or equal to 0 mol. % to less than or equal to 15 mol. %, greater than or equal to 0 mol. % to less than or equal to 13 mol. %, greater than or equal to 0 mol. % to less than or equal to 11 mol. %, greater than or equal to 0 mol. % to less than or equal to 9 mol. %, greater than or equal to 0 mol. % to less than or equal to 7 mol. %, greater than or equal to 0 mol. % to less than or equal to 5 mol. %, greater than or equal to 1 mol. % to less than or equal to 15 mol. %, greater than or equal to 1 mol. % to less than or equal to 13 mol. %, greater than or equal to 1 mol. % to less than or equal to 11 mol. %, greater than or equal to 1 mol. % to less than or equal to 9 mol. %, greater than or equal to 1 mol. % to less than or equal to 7 mol. %, greater than or equal to 1 mol. % to less than or equal to 5 mol. %, greater than or equal to 2 mol. % to less than or equal to 15 mol. %, greater than or equal to 2 mol. % to less than or equal to 13 mol. %, greater than or equal to 2 mol. % to less than or equal to 11 mol. %, greater than or equal to 2 mol. % to less than or equal to 9 mol. %, greater than or equal to 2 mol. % to less than or equal to 7 mol. %, greater than or equal to 2 mol. % to less than or equal to 5 mol. %, greater than or equal to 3 mol. % to less than or equal to 15 mol. %, greater than or equal to 3 mol. % to less than or equal to 13 mol. %, greater than or equal to 3 mol. % to less than or equal to 11 mol. %, greater than or equal to 3 mol. % to less than or equal to 9 mol. %, greater than or equal to 3 mol. % to less than or equal to 7 mol. %, greater than or equal to 3 mol. % to less than or equal to 5 mol. %, greater than or equal to 4 mol. % to less than or equal to 15 mol. %, greater than or equal to 4 mol. % to less than or equal to 13 mol. %, greater than or equal to 4 mol. % to less than or equal to 11 mol. %, greater than or equal to 4 mol. % to less than or equal to 9 mol. %, greater than or equal to 4 mol. % to less than or equal to 7 mol. %, greater than or equal to 4 mol. % to less than or equal to 5 mol. %, greater than or equal to 5 mol. % to less than or equal to 15 mol. %, greater than or equal to 5 mol. % to less than or equal to 13 mol. %, greater than or equal to 5 mol. % to less than or equal to 11 mol. %, greater than or equal to 5 mol. % to less than or equal to 9 mol. %, greater than or equal to 5 mol. % to less than or equal to 7 mol. %, greater than or equal to 6 mol. % to less than or equal to 15 mol. %, greater than or equal to 6 mol. % to less than or equal to 13 mol. %, greater than or equal to 6 mol. % to less than or equal to 11 mol. %, greater than or equal to 6 mol. % to less than or equal to 9 mol. %, greater than or equal to 6 mol. % to less than or equal to 7 mol. %, greater than or equal to 7 mol. % to less than or equal to 15, mol. %, greater than or equal to 7 mol. % to less than or equal to 13 mol. %, greater than or equal to 7 mol. % to less than or equal to 11 mol. %, greater than or equal to 7 mol. % to less than or equal to 9 mol. %, greater than or equal to 8 mol. % to less than or equal to 15 mol. %, greater than or equal to 8 mol. % to less than or equal to 13 mol. %, greater than or equal to 8 mol. % to less than or equal to 11 mol. %, greater than or equal to 8 mol. % to less than or equal to 9 mol. %, greater than or equal to 9 mol. % to less than or equal to 15 mol. %, greater than or equal to 9 mol. % to less than or equal to 13 mol. %, greater than or equal to 9 mol. % to less than or equal to 11 mol. %, greater than or equal to 10 mol. % to less than or equal to 15 mol. %, greater than or equal to 10 mol. % to less than or equal to 13 mol. %, greater than or equal to 10 mol. % to less than or equal to 11 mol. %, greater than or equal to 11 mol. % to less than or equal to 15 mol. %, greater than or equal to 11 mol. % to less than or equal to 13 mol. %, greater than or equal to 13 mol. % to less than or equal to 15 mol. %, or any and all sub-ranges formed from any of these endpoints. In embodiments, the concentration of $Na_2O$ (mol. %)+$K_2O$ (mol. %) in the precursor glass or glass-ceramic composition may be greater than or equal to 2 mol. %, 3 mol. %, 5 mol. % or 10 mol. %. In embodiments, the concentration of $Na_2O$ (mol. %)+$K_2O$ (mol. %) may be less than or equal to 15 mol. %, 10 mol. %, or 5 mol. %. In embodiments, $Na_2O$ (mol. %)/($Na_2O$ (mol. %)+$K_2O$ (mol. %)) may be greater than or equal to 0.2 or even greater than or equal to 0.3 to improve the ion-exchangeability of the resultant glass-ceramic.

In embodiments, the ratio of $Na_2O$ (mol. %) to $K_2O$ (mol. %) may be about 1:3, about 2:5, or about 1:1, such as an amount of $Na_2O$ in mol. % that is at least 33% or more of the amount of $K_2O$ in a particular composition as disclosed herein or vice versa (i.e. an amount of $K_2O$ in mol % that is at least 33% or more of the amount of $Na_2O$) as shown in the Examples, such as an amount of $Na_2O$ in mol. % that is at least 40% or more of the amount of $K_2O$ or vice versa, such as an amount of $Na_2O$ in mol. % that is at least 50% or more of the amount of $K_2O$ or vice versa, such as an amount of $Na_2O$ in mol. % that is at least 60% or more of the amount of $K_2O$ or vice versa, such as an amount of $Na_2O$ in mol. % that is at least 70% or more of the amount of $K_2O$ or vice versa, such as an amount of $Na_2O$ in mol. % that is at least 80% or more of the amount of $K_2O$ or vice versa, such as an amount of $Na_2O$ in mol. % that is at least 90% or more of the amount of $K_2O$ or vice versa. Without wishing to be bound by theory, it is believed that the ratio of $Na_2O$ (mol. %) to $K_2O$ (mol. %) may be adjusted to improve the transparency of the glass-ceramic composition.

In embodiments, the precursor glass or glass-ceramic composition may comprise $ZrO_2$. Without wishing to be bound by theory, it is believed that $ZrO_2$ acts as a nucleating agent that facilitates the nucleation of the crystalline phase having the jeffbenite crystalline structure during heat treatment at ambient atmospheric pressure (i.e., ~ 100 kPa). In embodiments, the $ZrO_2$ may be tetragonal $ZrO_2$. In embodiments, the concentration of $ZrO_2$ in the precursor glass or glass-ceramic composition may be greater than or equal to 0 mol. %, such as a positive amount, such as an amount greater than tramp (0.05 mol. %. or greater), to less than or equal to 7 mol. % $ZrO_2$, greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 7 mol. %, greater than or equal to 1 mol. % to less than or equal to 6 mol. %, greater than or equal to 1 mol. % to less than or equal to 5 mol. %, greater than or equal to 1 mol. % to less than or equal to 4 mol. %, greater than or equal to 1 mol. % to less than or equal to 3 mol. %, greater than or equal to 1 mol. % to less than or equal to 2 mol. %, greater than 1.5 mol. % to less than or equal to 7 mol. %, greater than 1.5 mol. % to less than or equal to 6 mol. %, greater than 1.5 mol. % to less than or equal to 5 mol. %, greater than 1.5 mol. % to less than or equal to 4 mol. %, greater than 1.5 mol. % to less than or equal to 3 mol. %, greater than or equal to 2 mol. % to less than or equal to 7 mol. %, greater than or equal to 2 mol. % to less than or equal to 6 mol. %, greater than or equal to 2 mol. % to less than or equal to 5 mol. %, greater than or equal to 2 mol. % to less than or equal to 4 mol. %, greater than or equal to 2 mol. % to less than or equal to 3 mol. %, greater than or equal to 3 mol. % to less than or equal to 7 mol. %, greater than or equal to 3 mol. % to less than or equal to 6 mol. %, greater than or equal to 3 mol. % to less than or equal to 5 mol. %, greater than or equal to 3 mol. % to less than or equal to 4 mol. %, greater than or equal to 4 mol. % to less than or equal to 7 mol. %, greater than or equal to 4 mol. % to less than or equal to 6 mol. %, greater than or equal to 4 mol. % to less than or equal to 5 mol. %, greater than or equal to 5 mol. % to less than or equal to 7 mol. %, greater than or equal to 5 mol. % to less than or equal to 6 mol. %, greater than or equal to 6 mol. % to less than or equal to 7 mol. %, or any and all sub-ranges formed from any of these endpoints. In embodiments, the concentration of $ZrO_2$ in the precursor glass or glass-ceramic composition may be greater than 1.5 mol. %, greater than or equal to 2 mol. %, 3 mol. % or 4 mol. %. In embodiments, the concentration of $ZrO_2$ may be less than or equal to 7 mol. %, 6 mol. %, or 5 mol. %. In embodiments, the precursor glass or glass-ceramic composition may be substantially free of $ZrO_2$.

In embodiments, the precursor glass or glass-ceramic composition may comprise $HfO_2$. Without wishing to be bound by theory, it is believed that $HfO_2$ acts as a nucleating agent that facilitates the formation of crystalline phases during heat treatment. In embodiments, $HfO_2$ may be used as a nucleating in addition to $ZrO_2$ or as a replacement for $ZrO_2$. Also, $HfO_2$ may help reduce the liquidus of the precursor glass. In embodiments, the concentration of $HfO_2$ in the precursor glass or the glass-ceramic composition may be from greater than or equal to 0 mol. %, such as a positive amount, such as an amount greater than tramp (0.05 mol. %. or greater), to less than or equal to 12 mol. %. In embodiments, the concentration of $HfO_2$ in the precursor glass or the glass-ceramic composition may be from greater than or equal to 0 mol. % to less than or equal to 12 mol. %, greater than or equal to 0 mol. % to less than or equal to 10 mol. %, greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 12 mol. %, greater than or equal to 1 mol. % to less than or equal to 10 mol. %, greater than or equal to 1 mol. % to less than or equal to 7 mol. %, greater than or equal to 1 mol. % to less than or equal to 6 mol. %, greater than or equal to 1 mol. % to less than or equal to 5 mol. %, greater than or equal to 1 mol. % to less than or equal to 4 mol. %, greater than or equal to 1 mol. % to less than or equal to 3 mol. %, greater than or equal to 1 mol. % to less than or equal to 2 mol. %, greater than or equal to 2 mol. % to less than or equal to 12 mol. %, greater than or equal to 2 mol. % to less than or equal to 10 mol. %, greater than or equal to 2 mol. % to less than or equal to 7 mol. %, greater than or equal to 2 mol. % to less than or equal to 6 mol. %, greater than or equal to 2 mol. % to less than or equal to 5 mol. %, greater than or equal to 2 mol. % to less than or equal to 4 mol. %, greater than or equal to 2 mol. % to less than or equal to 3 mol. %, greater than or equal to 3 mol. % to less than or equal to 12 mol. %, greater than or equal to 3 mol. % to less than or equal to 10 mol. %, greater than or equal to 3 mol.

% to less than or equal to 7 mol. %, greater than or equal to 3 mol. % to less than or equal to 6 mol. %, greater than or equal to 3 mol. % to less than or equal to 5 mol. %, greater than or equal to 3 mol. % to less than or equal to 4 mol. %, greater than or equal to 4 mol. % to less than or equal to 12 mol. %, greater than or equal to 4 mol. % to less than or equal to 10 mol. %, greater than or equal to 4 mol. % to less than or equal to 7 mol. %, greater than or equal to 4 mol. % to less than or equal to 6 mol. %, greater than or equal to 4 mol. % to less than or equal to 5 mol. %, greater than or equal to 5 mol. % to less than or equal to 12 mol. %, greater than or equal to 5 mol. % to less than or equal to 10 mol. %, greater than or equal to 5 mol. % to less than or equal to 7 mol. %, greater than or equal to 5 mol. % to less than or equal to 6 mol. %, greater than or equal to 6 mol. % to less than or equal to 12 mol. %, greater than or equal to 6 mol. % to less than or equal to 10 mol. %, greater than or equal to 6 mol. % to less than or equal to 7 mol. %, or any and all sub-ranges formed from any of these endpoints. In embodiments, the concentration of $HfO_2$ in the precursor glass or glass-ceramic composition may be greater than or equal to 1 mol. %, 2 mol. %, or 3 mol. %. In embodiments, the concentration of $HfO_2$ may be less than or equal to less than or equal to 12 mol. %, 10 mol. %, 7 mol. %, 6 mol. % or 5 mol. %. In embodiments, the precursor glass or glass-ceramic composition may be substantially free of $HfO_2$.

In embodiments, the precursor glass or glass-ceramic composition may comprise $TiO_2$. Without wishing to be bound by theory, it is believed that $TiO_2$ acts as a nucleating agent that facilitates the formation of crystalline phases during heat treatment. Increasing concentrations of $TiO_2$ may also impart color to the precursor glass and resultant glass-ceramic. In embodiments, the concentration of $TiO_2$ in the precursor glass or glass-ceramic composition may be greater than or equal to 0 mol. %, such as a positive amount, such as an amount greater than tramp (0.05 mol. %. or greater), to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 0.3 mol. % to less than or equal to 7 mol. %, greater than or equal to 0.3 mol. % to less than or equal to 6 mol. %, greater than or equal to 0.3 mol. % to less than or equal to 5 mol. %, greater than or equal to 0.3 mol. % to less than or equal to 4 mol. %, greater than or equal to 0.3 mol. % to less than or equal to 3 mol. %, greater than or equal to 0.3 mol. % to less than or equal to 2 mol. %, greater than or equal to 0.3 mol. % to less than or equal to 1 mol. %, greater than or equal to 0.5 mol. % to less than or equal to 7 mol. %, greater than or equal to 0.5 mol. % to less than or equal to 6 mol. %, greater than or equal to 0.5 mol. % to less than or equal to 5 mol. %, greater than or equal to 0.5 mol. % to less than or equal to 4 mol. %, greater than or equal to 0.5 mol. % to less than or equal to 3 mol. %, greater than or equal to 0.5 mol. % to less than or equal to 2 mol. %, greater than or equal to 0.5 mol. % to less than or equal to 1 mol. %, greater than or equal to 1 mol. % to less than or equal to 7 mol. %, greater than or equal to 1 mol. % to less than or equal to 6 mol. %, greater than or equal to 1 mol. % to less than or equal to 5 mol. %, greater than or equal to 1 mol. % to less than or equal to 4 mol. %, greater than or equal to 1 mol. % to less than or equal to 3 mol. %, greater than or equal to 1 mol. % to less than or equal to 2 mol. %, greater than or equal to 2 mol. % to less than or equal to 7 mol. %, greater than or equal to 2 mol. % to less than or equal to 6 mol. %, greater than or equal to 2 mol. % to less than or equal to 5 mol. %, greater than or equal to 2 mol. % to less than or equal to 4 mol. %, greater than or equal to 2 mol. % to less than or equal to 3 mol. %, greater than or equal to 3 mol. % to less than or equal to 7 mol. %, greater than or equal to 3 mol. % to less than or equal to 6 mol. %, greater than or equal to 3 mol. % to less than or equal to 5 mol. %, greater than or equal to 3 mol. % to less than or equal to 4 mol. %, greater than or equal to 4 mol. % to less than or equal to 7 mol. %, greater than or equal to 4 mol. % to less than or equal to 6 mol. %, greater than or equal to 4 mol. % to less than or equal to 5 mol. %, greater than or equal to 5 mol. % to less than or equal to 7 mol. %, greater than or equal to 5 mol. % to less than or equal to 6 mol. %, greater than or equal to 6 mol. % to less than or equal to 7 mol. %, or any and all sub-ranges formed from any of these endpoints. In embodiments, the concentration of $TiO_2$ in the precursor glass or glass-ceramic composition may be greater than or equal to 0 mol. %, 1 mol. %, or 2 mol. %. In embodiments, the concentration of $TiO_2$ may be less than or equal to 7 mol. %, 6 mol. %, or 5 mol. %. In embodiments, the precursor glass or glass-ceramic composition may be substantially free of $TiO_2$.

In embodiments, $ZrO_2$ (mol. %)+$TiO_2$ (mol. %) in the precursor glass or glass-ceramic compositions described herein may be greater than or equal to 2.0 mol. %, greater than or equal to 3.0 mol. %, or even greater than or equal to 4.0 mol. %. In embodiments, $ZrO_2$ (mol. %)/($ZrO_2$ (mol. %)+$TiO_2$ (mol. %)) in the precursor glass or glass-ceramic compositions described herein may be greater than or equal to 0.3. Without intending to be bound by theory, when $ZrO_2$ (mol. %)/($ZrO_2$ (mol. %)+$TiO_2$ (mol. %)) in the precursor glass or glass-ceramic compositions is less than 0.3 then the primary crystalline phase in the glass-ceramic may be a forsterite crystalline phase instead of a crystalline phase having a jeffbenite crystalline structure, which may be undesirable.

In embodiments, the precursor glass or glass-ceramic composition may comprise $SnO_2$. $SnO_2$ primarily functions as a fining agent in the precursor glass composition. However, additions of $SnO_2$ may also aid the nucleating agents (such as $TiO_2$ and $ZrO_2$) in nucleating crystalline phases during heat treatment. In embodiments, the concentration of $SnO_2$ in the precursor glass or glass-ceramic composition may be greater than or equal to 0 mol. % to less than or equal to 0.2 mol. %, greater than or equal to 0 mol. %, such as a positive amount, such as an amount greater than tramp (0.05 mol. %. or greater), to less than or equal to 0.18 mol. %, greater than or equal to 0 mol. % to less than or equal to 0.16 mol. %, greater than or equal to 0 mol. % to less than or equal to 0.14 mol. %, greater than or equal to mol. % to less than or equal to 0.12 mol. %, greater than or equal to 0 mol. % to less than or equal to 0.11 mol. %, greater than or equal to 0 mol. % to less than or equal to 0.1 mol. %, greater than or equal to 0.08 mol. % to less than or equal to 0.2 mol. %, greater than or equal to 0.09 mol. % to less than or equal to 0.2 mol. %, greater than or equal to 0.1 mol. % to less than or equal to 0.2 mol. %, greater than or equal to 0.12 mol. % to less than or equal to 0.2 mol. %, greater than or equal to 0.13 mol. % to less than or equal to 0.2 mol. %, greater than or equal to 0.14 mol. % to less than or equal to 0.2 mol. %, or any and all sub-ranges formed from any of these endpoints. In embodiments, the concentration of $SnO_2$ in the precursor glass or glass-ceramic composition may be greater than or equal to 0 mol. %, 0.08 mol. %, or 0.09 mol. %. In embodiments, the concentration of $SnO_2$ may be less than or equal to 0.2 mol. %, 0.18 mol. %, or 0.16 mol. %. In embodiments, the precursor glass or glass-ceramic composition may be substantially free of $SnO_2$.

In embodiments, the precursor glass or glass-ceramic composition may comprise BaO. BaO may increase the refractive index of the residual glass of the glass-ceramic to better match the refractive index of the crystalline phase having the jeffbenite crystalline structure in the glass-ceramic. In embodiments, the concentration of BaO in the precursor glass or glass-ceramic composition may be greater than or equal to 0 mol. %, such as a positive amount, such as an amount greater than tramp (0.05 mol. %. or greater), to less than or equal to 8 mol. %, greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 8 mol. %, greater than or equal to 1 mol. % to less than or equal to 7 mol. %, greater than or equal to 1 mol. % to less than or equal to 6 mol. %, greater than or equal to 1 mol. % to less than or equal to 5 mol. %, greater than or equal to 1 mol. % to less than or equal to 4 mol. %, greater than or equal to 1 mol. % to less than or equal to 3 mol. %, greater than or equal to 1 mol. % to less than or equal to 2 mol. %, greater than or equal to 2 mol. % to less than or equal to 8 mol. %, greater than or equal to 2 mol. % to less than or equal to 7 mol. %, greater than or equal to 2 mol. % to less than or equal to 6 mol. %, greater than or equal to 2 mol. % to less than or equal to 5 mol. %, greater than or equal to 2 mol. % to less than or equal to 4 mol. %, greater than or equal to 2 mol. % to less than or equal to 3 mol. % to less than or equal to 8 mol. %, greater than or equal to 3 mol. % to less than or equal to 7 mol. %, greater than or equal to 3 mol. % to less than or equal to 6 mol. %, greater than or equal to 3 mol. % to less than or equal to 5 mol. %, greater than or equal to 3 mol. % to less than or equal to 4 mol. %, greater than or equal to 4 mol. % to less than or equal to 8 mol. %, greater than or equal to 4 mol. % to less than or equal to 7 mol. %, greater than or equal to 4 mol. % to less than or equal to 6 mol. %, greater than or equal to 4 mol. % to less than or equal to 5 mol. %, greater than or equal to 5 mol. % to less than or equal to 8 mol. %, greater than or equal to 5 mol. % to less than or equal to 7 mol. %, greater than or equal to 5 mol. % to less than or equal to 6 mol. %, greater than or equal to 6 mol. % to less than or equal to 8 mol. %, greater than or equal to 6 mol. % to less than or equal to 7 mol. %, greater than or equal to 7 mol. % to less than or equal to 8 mol. % or any and all sub-ranges formed from any of these endpoints. In embodiments, the precursor glass or glass-ceramic composition may be substantially free of BaO.

In embodiments, the precursor glass or glass-ceramic composition may comprise ZnO. Additions of ZnO may increase the refractive index of the residual glass in the glass-ceramic to better match the refractive index of the crystalline phase having the jeffbenite crystalline structure in the glass-ceramic. While not wishing to be bound by theory, it is believed that additions of ZnO may result in the replacement of at least a portion of the Mg in the jeffbenite crystalline structure with Zn. ZnO may also help stabilize the precursor glass, prevent devitrification, and lower the liquidus viscosity. However, too much ZnO may disrupt the formation of the crystalline phase having the jeffbenite crystalline structure during ceramming. In embodiments, the concentration of ZnO in the precursor glass or glass-ceramic composition may be greater than or equal to 0 mol. %, such as a positive amount, such as an amount greater than tramp (0.05 mol. %. or greater), to less than or equal to 15 mol. %, greater than or equal to 0 mol. % to less than or equal to 14 mol. %, greater than or equal to 0 mol. % to less than or equal to 13 mol. %, greater than or equal to 0 mol. % to less than or equal to 12 mol. %, greater than or equal to 0 mol. % to less than or equal to 11 mol. %, greater than or equal to 0 mol. % to less than or equal to 10 mol. %, greater than or equal to 0 mol. % to less than or equal to 9 mol. %, greater than or equal to 0 mol. % to less than or equal to 8 mol. %, greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 15 mol. %, greater than or equal to 1 mol. % to less than or equal to 14 mol. %, greater than or equal to 1 mol. % to less than or equal to 13 mol. %, greater than or equal to 1 mol. % to less than or equal to 12 mol. %, greater than or equal to 1 mol. % to less than or equal to 11 mol. %, greater than or equal to 1 mol. % to less than or equal to 10 mol. %, greater than or equal to 1 mol. % to less than or equal to 9 mol. %, greater than or equal to 1 mol. % to less than or equal to 8 mol. %, greater than or equal to 1 mol. % to less than or equal to 7 mol. %, greater than or equal to 1 mol. % to less than or equal to 6 mol. %, greater than or equal to 1 mol. % to less than or equal to 5 mol. %, greater than or equal to 1 mol. % to less than or equal to 4 mol. %, greater than or equal to 1 mol. % to less than or equal to 3 mol. %, greater than or equal to 1 mol. % to less than or equal to 2 mol. %, greater than or equal to 2 mol. % to less than or equal to 15 mol. %, greater than or equal to 2 mol. % to less than or equal to 14 mol. %, greater than or equal to 2 mol. % to less than or equal to 13 mol. %, greater than or equal to 2 mol. % to less than or equal to 12 mol. %, greater than or equal to 2 mol. % to less than or equal to 11 mol. %, greater than or equal to 2 mol. % to less than or equal to 10 mol. %, greater than or equal to 2 mol. % to less than or equal to 9 mol. %, greater than or equal to 2 mol. % to less than or equal to 8 mol. %, greater than or equal to 2 mol. % to less than or equal to 7 mol. %, greater than or equal to 2 mol. % to less than or equal to 6 mol. %, greater than or equal to 2 mol. % to less than or equal to 5 mol. %, greater than or equal to 2 mol. % to less than or equal to 4 mol. %, greater than or equal to 2 mol. % to less than or equal to 3 mol. %, greater than or equal to 3 mol. % to less than or equal to 15 mol. %, greater than or equal to 3 mol. % to less than or equal to 14 mol. %, greater than or equal to 3 mol. % to less than or equal to 13 mol. %, greater than or equal to 3 mol. % to less than or equal to 12 mol. %, greater than or equal to 3 mol. % to less than or equal to 11 mol. %, greater than or equal to 3 mol. % to less than or equal to 10 mol. %, greater than or equal to 3 mol. % to less than or equal to 9 mol. %, greater than or equal to 3 mol. % to less than or equal to 8 mol. %, greater than or equal to 3 mol. % to less than or equal to 7 mol. %, greater than or equal to 3 mol. % to less than or equal to 6 mol. %, greater than or equal to 3 mol. % to less than or equal to 5 mol. %, greater than or equal to 3 mol. % to less than or equal to 4 mol. %, greater than or equal to 4 mol. % to less than or equal to 15 mol. %, greater than or equal to 4 mol. % to less than or equal to 14 mol. %, greater than or equal to 4 mol. % to less than or equal to 13 mol. %, greater than or equal to 4 mol. % to less than or equal to 12 mol. %, greater than or equal to 4 mol. % to less than or equal to 11 mol. %, greater than or equal to 4 mol. % to less than or equal to 10 mol. %, greater than or equal to 4 mol. % to less than or equal to 9 mol. %, greater than or equal to 4 mol. % to less than or equal to 8 mol. %, greater than or equal to 4 mol. % to less than or equal to 7 mol. %, greater than or equal to 4 mol. % to less than or equal to 6 mol. %, greater than or equal to 4 mol. % to less than or equal to 5 mol. %, greater than or equal to 5 mol. % to less than or equal to 15 mol. %, greater than or equal to 5 mol. % to less than or equal to 14 mol. %, greater than or equal to 5 mol. % to less than or equal to 13 mol. %, greater than or equal to 5 mol. % to less than or equal to 12 mol. %, greater than or equal to 5 mol. % to less than or equal to 11 mol. %, greater than or equal to 5 mol. % to less than or equal to 10 mol. %, greater than or equal to 5 mol. % to less than or equal to 9 mol. %, greater than or equal to 5 mol. % to less than or equal to 8 mol. %, greater than or equal to 5 mol. % to less than or equal to 7 mol. %, greater than or equal to 5 mol. % to less than or equal to 6 mol. %, greater than or equal to 6 mol. % to less than or equal to 15 mol. %, greater than or equal to 6 mol. % to less than or equal to 14 mol. %, greater than or equal to 6 mol. % to less than or equal to 13 mol. %, greater than or equal to 6 mol. % to less than or equal to 12 mol. %, greater than or equal to 6 mol. % to less than or equal to 11 mol. %, greater than or equal to 6 mol. % to less than or equal to 10 mol. %, greater than or equal to 6 mol. % to less than or equal to 9 mol. %, greater than or equal to 6 mol. % to less than or equal to 8 mol. %, greater than or equal to 6 mol. % to less than or equal to 7 mol. %, greater than or equal to 7 mol. % to less than or equal to 15 mol. %, greater than or equal to 7 mol. % to less than or equal to 14 mol. %, greater than or equal to 7 mol. % to less than or equal to 13 mol. %, greater than or equal to 7 mol. % to less than or equal to 8 mol. %, or any and all sub-ranges formed from any of these endpoints. In embodiments, the precursor glass or glass-ceramic composition may be substantially free of ZnO.

In embodiments, the precursor glass or glass-ceramic composition may comprise FeO. While not wishing to be bound by theory, it is believed that additions of FeO may result in the replacement of at least a portion of the Mg in the jeffbenite crystalline structure with Fe. FeO may also impart color to the precursor glass and glass-ceramic. In embodiments, the concentration of FeO in the precursor glass or glass-ceramic composition may be greater than or equal to 0 mol. %, such as a positive amount, such as an amount greater than tramp (0.05 mol. %. or greater), to less than or equal to 9 mol. %, greater than or equal to 0 mol. % to less than or equal to 8 mol. %, greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 9 mol. %, greater than or equal to 2 mol. % to less than or equal to 9 mol. %, greater than or equal to 3 mol. % to less than or equal to 9 mol. %, greater than or equal to 4 mol. % to less than or equal to 9 mol. %, greater than or equal to 5 mol. % to less than or equal to 9 mol. %, greater than or equal to 6 mol. % to less than or equal to 9 mol. %, greater than or equal to 7 mol. % to less than or equal to 9 mol. %, greater than or equal to 8 mol. % to less than or equal to 9 mol. %, or any and all sub-ranges formed from any of these endpoints. In embodiments, the precursor glass or glass-ceramic composition may be substantially free of FeO.

In embodiments, the precursor glass or glass-ceramic composition may comprise CaO, SrO, or combinations thereof. Additions of CaO, SrO and combinations thereof may increase the amount of residual glass in the glass-ceramic. Without wishing to be bound by theory, including SrO in the glass-ceramic may increase the refractive index of the residual glass to better match the refractive index of the crystalline phase. In embodiments, the concentration of CaO, SrO, or a combination thereof may be greater than or equal to 0 mol. %, such as a positive amount, such as an amount greater than tramp (0.05 mol. %. or greater), to less than or equal to 2.0 mol. %, greater than or equal to 0.2 mol. % to less than or equal to 2.0 mol. %, greater than or equal to 0.4 mol. % to less than or equal to 2.0 mol. %, greater than or equal to 0.6 mol. % to less than or equal to 2.0 mol. %, greater than or equal to 0.8 mol. % to less than or equal to 2.0 mol. %, greater than or equal to 1.0 mol. % to less than or equal to 2.0 mol. %, greater than or equal to 1.2 mol. % to less than or equal to 2.0 mol. %, greater than or equal to 1.4 mol. % to less than or equal to 2.0 mol. %, greater than or equal to 0 mol. % to less than or equal to 1.7 mol. %, greater than or equal to 0.2 mol. % to less than or equal to 1.7 mol. %, greater than or equal to 0.4 mol. % to less than or equal to 1.7 mol. %, greater than or equal to 0.6 mol. % to less than or equal to 1.7 mol. %, greater than or equal to 0.8 mol. % to less than or equal to 1.7 mol. %, greater than or equal to 1.0 mol. % to less than or equal to 1.7 mol. %, greater than or equal to 1.2 mol. % to less than or equal to 1.7 mol. %, greater than or equal to 1.4 mol. % to less than or equal to 1.7 mol. %, greater than or equal to 0 mol. % to less than or equal to 1.4 mol. %, greater than or equal to 0 mol. % to less than or equal to 1.2 mol. %, greater than or equal to 0 mol. % to less than or equal to 1.0 mol. %, greater than or equal to 0 mol. % to less than or equal to 0.8 mol. %, greater than or equal to 0 mol. % to less than or equal to 0.6 mol. %, greater than or equal to 0 mol. % to less than or equal to 0.4 mol. %, greater than or equal to 0 mol. % to less than or equal to 0.2 mol. %, or any and all sub-ranges formed from any of these endpoints. In embodiments, the concentration of CaO may be greater than or equal to 0 mol. % to less than or equal to 10 mol. %, greater than or equal to 1 mol. % to less than or equal to 10 mol. %, greater than or equal to 2 mol. % to less than or equal to 10 mol. %, greater than or equal to 3 mol. % to less than or equal to 10 mol. %, greater than or equal to 4 mol. % to less than or equal to 10 mol. %, greater than or equal to 5 mol. % to less than or equal to 10 mol. %, greater than or equal to 6 mol. % to less than or equal to 10 mol. %, greater than or equal to 7 mol. % to less than or equal to 10 mol. %, greater than or equal to 8 mol. % to less than or equal to 10 mol. %, greater than or equal to 9 mol. % to less than or equal to 10 mol. %, greater than or equal to 0 mol. % to less than or equal to 9 mol. %, greater than or equal to 0 mol. % to less than or equal to 8 mol. %, greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, or any and all subranges formed from any of these endpoints. In embodiments, the precursor glass or glass-ceramic composition may be substantially free of CaO. In embodiments, the precursor glass or glass-ceramic composition may be substantially free of SrO. In embodiments, the precursor glass or glass-ceramic composition may be substantially free of both CaO and SrO.

In embodiments, the precursor glass or glass-ceramic composition may comprise $Cs_2O$. Without wishing to be bound by theory, it is believed that additions of $Cs_2O$ remain in the residual glass following ceramming and function to raise the index of refraction of the residual glass without causing crystallization. In embodiments, the concentration of $Cs_2O$ in the precursor glass or glass-ceramic composition may be greater than or equal to 0 mol. %, such as a positive amount, such as an amount greater than tramp (0.05 mol. %. or greater), to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 5 mol. %, greater than or equal to 2 mol. % to less than or equal to 5 mol. %, greater than or equal to 3 mol. % to less than or equal to 5 mol. %, greater than or equal to 4 mol. % to less than or equal to 5 mol. %, or any and all sub-ranges formed from any of these endpoints. In embodiments, the precursor glass or glass-ceramic composition may be substantially free of $Cs_2O$.

In embodiments, the precursor glass or glass-ceramic composition may comprise $Li_2O$. For example, without limitation, the precursor glass or glass-ceramic composition may comprise less than or equal to 3 mol. %, less than or equal to 2.5 mol. %, less than or equal to 2 mol. %, less than or equal to 1.5 mol. %, less than or equal to 1 mol. %, less than or equal to 0.7 mol. %, less than or equal to 0.5 mol. %, less than or equal to 0.3 mol. %, or less than or equal to 0.1 mol. % $Li_2O$, but a positive amount, such as an amount greater than tramp (0.05 mol. %. or greater), or only tramp amounts at most (i.e. less than 0.05 mol. %). In embodiments, the precursor glass or glass-ceramic composition may be substantially free of $Li_2O$. Without intending to be bound by theory, when the precursor glass comprises less than or equal to 3 mol. % $Li_2O$ the formation of beta quartz during heat treatment may be reduced.

In embodiments, the precursor glass or glass-ceramic composition may comprise $Y_2O_3$. Without wishing to be bound by theory, $Y_2O_3$ may stabilize $ZrO_2$ included in the precursor glass or glass-ceramic composition. In embodiments, the concentration of $Y_2O_3$ may be greater than or equal to 0 mol. %, such as a positive amount, such as an amount greater than tramp (0.05 mol. %. or greater), to less than or equal to 2.0 mol. %, greater than or equal to 0.2 mol. % to less than or equal to 2.0 mol. %, greater than or equal to 0.4 mol. % to less than or equal to 2.0 mol. %, greater than or equal to 0.6 mol. % to less than or equal to 2.0 mol. %, greater than or equal to 0.8 mol. % to less than or equal to 2.0 mol. %, greater than or equal to 1.0 mol. % to less than or equal to 2.0 mol. %, greater than or equal to 1.2 mol. % to less than or equal to 2.0 mol. %, greater than or equal to 1.4 mol. % to less than or equal to 2.0 mol. %, greater than or equal to 1.6 mol. % to less than or equal to 2.0 mol. %, greater than or equal to 1.8 mol. % to less than or equal to 2.0 mol. %, greater than or equal to 0 mol. % to less than or equal to 1.8 mol. %, greater than or equal to 0 mol. % to less than or equal to 1.6 mol. %, greater than or equal to 0 mol. % to less than or equal to 1.4 mol. %, greater than or equal to 0 mol. % to less than or equal to 1.2 mol. %, greater than or equal to 0 mol. % to less than or equal to 1.0 mol. %, greater than or equal to 0 mol. % to less than or equal to 0.8 mol. %, greater than or equal to 0 mol. % to less than or equal to 0.6 mol. %, greater than or equal to 0 mol. % to less than or equal to 0.4 mol. %, greater than or equal to 0 mol. % to less than or equal to 0.2 mol. %, or any and all sub-ranges formed from any of these endpoints. In embodiments, the precursor glass or glass-ceramic composition may be substantially free of $Y_2O_3$.

In embodiments, the precursor glass or glass-ceramic composition may be substantially free from $P_2O_5$. In some embodiments, the precursor glass or glass-ceramic composition may be free from $P_2O_5$. Without wishing to be bound by theory, inclusion of $P_2O_5$ in the precursor glass or glass-ceramic composition may result in the formation of magnesium phosphate and reduced formation of the crystalline phase having the jeffbenite crystalline structure.

In embodiments, the precursor glass or glass-ceramic composition may comprise $P_2O_5$. While not wishing to be bound by theory, it is believed that the addition of $P_2O_5$ may improve diffusivity of the glass-ceramic composition during ion exchange processes. In embodiments, the concentration of $P_2O_5$ in the precursor glass or the glass-ceramic composition may be from greater than or equal to 0 mol. %, such as a positive amount, such as an amount greater than tramp (0.05 mol. %. or greater), to less than or equal to 4 mol. %, greater than or equal to 0 mol. % to less than or equal to 3.5 mol. %, greater than or equal to 0 mol. % to less than or equal to 3 mol. %, greater than or equal to 0 mol. % to less than or equal to 2.5 mol. %, greater than or equal to 0 mol. % to less than or equal to 2 mol. %, greater than or equal to 0 mol. % to less than or equal to 1.5 mol. %, greater than or equal to 0 mol. % to less than or equal to 1 mol. %, greater than or equal to 0 mol. % to less than or equal to 0.5 mol. %, greater than or equal to 0.5 mol. % to less than or equal to 4 mol. %, greater than or equal to 1 mol. % to less than or equal to 4 mol. %, greater than or equal to 1.5 mol. % to less than or equal to 4 mol. %, greater than or equal to 2 mol. % to less than or equal to 4 mol. %, greater than or equal to 2.5 mol. % to less than or equal to 4 mol. %, greater than or equal to 3 mol. % to less than or equal to 4 mol. %, greater than or equal to 3.5 mol. % to less than or equal to 4 mol. %, or any and all sub-ranges formed from any of these endpoints. In embodiments, the $P_2O_5$ comprised in a glass-ceramic composition may remain in the residual glass phase of the glass-ceramic composition. In embodiments, the precursor glass or glass-ceramic composition may be substantially free of $P_2O_5$.

In embodiments, the precursor glass or glass-ceramic composition may comprise $MnO_2$. While not wishing to be bound by theory, it is believed that additions of $MnO_2$ may result in the replacement of at least a portion of the Mg in the jeffbenite crystalline structure with Mn. $MnO_2$ may also impart color to the precursor glass and glass-ceramic. For example, without limitation, the addition of $MnO_2$ may impart a black color to the glass-ceramic. In embodiments, the concentration of $MnO_2$ may be greater than or equal to 0 mol. %, such as a positive amount, such as an amount greater than tramp (0.05 mol. %. or greater), to less than or equal to 10 mol. %, greater than or equal to 0 mol. % to less than or equal to 9 mol. %, greater than or equal to 0 mol. % to less than or equal to 8 mol. %, greater than or equal to 0 mol. % to less than or equal to 7 mol. %, greater than or equal to 0 mol. % to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1.0 mol. %, greater than or equal to 0.1 mol. % to less than or equal to 1 mol. %, greater than or equal to 0.2 mol. % to less than or equal to 1.0 mol. %, greater than or equal to 0.4 mol. % to less than or equal to 1.0 mol. %, greater than or equal to 0.6 mol. % to less than or equal to 1.0 mol. %, greater than or equal to 0.8 mol. % to less than or equal to 1.0 mol. %, greater than or equal to 0 mol. % to less than or equal to 0.8 mol. %, greater than or equal to 0 mol. % to less than or equal to 0.6 mol. %, greater than or equal to 0 mol. % to less than or equal to 0.4 mol. %, greater than or equal to 0 mol. % to less than or equal to 0.2 mol. %, from greater than or equal to 1 mol. % to less than or equal to 10 mol. %, from greater than or equal to 2 mol. % to less than or equal to 10 mol. %, from greater than or equal to 3 mol. % to less than or equal to 10 mol. %, from greater than or equal to 4 mol. % to less than or equal to 10 mol. %, from greater than or equal to 5 mol. % to less than or equal to 10 mol. %, from greater than or equal to 6 mol. % to less than or equal to 10 mol. %, from greater than or equal to 7 mol. % to less than or equal to 10 mol. %, from greater than or equal to 8 mol. % to less than or equal to 10 mol. %, from greater than or equal to 9 mol. % to less than or equal to 10 mol. %, or any and all sub-ranges formed from any of these endpoints. In embodiments, the precursor glass or glass-ceramic composition may be substantially free of $MnO_2$.

In embodiments, the precursor glass or glass-ceramic composition may comprise $La_2O_3$. While not wishing to be bound by theory, it is believed that the addition of $La_2O_3$ may increase the refractive index of the residual glass of a glass-ceramic composition, which may improve transparency of the glass-ceramic composition. In embodiments, the concentration of $La_2O_3$ in the precursor glass or glass-ceramic composition may be from greater than or equal to 0 mol. % to less than or equal to 7 mol. %, greater than or equal to 0 mol. %, such as a positive amount, such as an amount greater than tramp (0.05 mol. %. or greater), to less than or equal to 6 mol. %, greater than or equal to 0 mol. % to less than or equal to 5 mol. %, greater than or equal to 0 mol. % to less than or equal to 4 mol. %, greater than or equal to 0 mol. % to less than or equal to 3 mol. %, greater than or equal to 0 mol. % to less than or equal to 2 mol. %, greater than or equal to 0 mol. % to less than or equal to 1 mol. %, greater than or equal to 1 mol. % to less than or equal to 7 mol. %, greater than or equal to 1 mol. % to less than or equal to 6 mol. %, greater than or equal to 1 mol. % to less than or equal to 5 mol. %, greater than or equal to 1 mol. % to less than or equal to 4 mol. %, greater than or equal to 1 mol. % to less than or equal to 3 mol. %, greater than or equal to 1 mol. % to less than or equal to 2 mol. %, greater than or equal to 2 mol. % to less than or equal to 7 mol. %, greater than or equal to 2 mol. % to less than or equal to 6 mol. %, greater than or equal to 2 mol. % to less than or equal to 5 mol. %, greater than or equal to 2 mol. % to less than or equal to 4 mol. %, greater than or equal to 2 mol. % to less than or equal to 3 mol. %, greater than or equal to 3 mol. % to less than or equal to 7 mol. %, greater than or equal to 3 mol. % to less than or equal to 6 mol. %, greater than or equal to 3 mol. % to less than or equal to 5 mol. %, greater than or equal to 3 mol. % to less than or equal to 4 mol. %, greater than or equal to 4 mol. % to less than or equal to 7 mol. %, greater than or equal to 4 mol. % to less than or equal to 6 mol. %, greater than or equal to 4 mol. % to less than or equal to 5 mol. %, greater than or equal to 5 mol. % to less than or equal to 7 mol. %, greater than or equal to 5 mol. % to less than or equal to 6 mol. %, greater than or equal to 6 mol. % to less than or equal to 7 mol. %, or any and all sub-ranges formed from any of these endpoints. In embodiments, the precursor glass or glass-ceramic composition may be substantially free of $La_2O_3$.

The articles formed from the precursor glass or glass-ceramics described herein may be any suitable thickness depending on the particular application of the glass-ceramic. Glass-ceramic sheet embodiments may have a thickness T of from greater than or equal to 0.2 mm to less than or equal to 10 mm. In embodiments, the glass-ceramic sheet embodiments may have a thickness T of 6 mm or less, 5 mm or less, 4 mm or less, 3 mm or less, 2 mm or less, 1.0 mm or less, 750 µm or less, 500 µm or less, or 250 µm or less. In embodiments, the glass-ceramic sheet embodiments may have a thickness T of from greater than or equal to 200 µm to less than or equal to 5 mm, greater than or equal to 500 µm to less than or equal to 5 mm, greater than or equal to 200 µm to less than or equal to 4 mm, greater than or equal to 200 µm to less than or equal to 2 mm, greater than or equal to 400 µm to less than or equal to 5 mm, or greater than or equal to 400 µm to less than or equal to 2 mm. It should be understood that the thickness of the precursor glass or glass-ceramic article may be within a sub-range formed from any and all of the foregoing endpoints. Alternatively, the glass sheets may be thicker than 10 mm, such as for use in certain armored windows or other uses for example. Alternatively, containers and tubes comprising the glass or glass-ceramics disclosed herein may have such thicknesses as wall thicknesses, and rod and spheres and other articles comprising the glass or glass-ceramics disclosed herein may have similar thicknesses for example.

In embodiments, the precursor glass or glass-ceramic compositions described herein are ion exchangeable to facilitate strengthening the precursor glass or glass-ceramic. In typical ion exchange processes, smaller metal ions in the glass-ceramic are replaced or "exchanged" with larger metal ions of the same valence within a layer that is close to the outer surface of the glass-ceramic. The replacement of smaller ions with larger ions creates a compressive stress within the layer of the glass-ceramic. In embodiments, the metal ions are monovalent metal ions (e.g., $Li^+$, $Na^+$, $K^+$, and the like), and ion exchange is accomplished by immersing the glass-ceramic in a bath comprising at least one molten salt of the larger metal ion that is to replace the smaller metal ion in the glass-ceramic. The ion exchange process or processes that are used to strengthen the glass-ceramic may include, but are not limited to, immersion in a single bath or multiple baths of like or different compositions with washing and/or annealing steps between immersions. In embodiments, the glass-ceramics may be ion exchanged by exposure to molten $KNO_3$ salt, molten $NaNO_3$ salt, or a mixture of molten salts comprising $KNO_3$ and $NaNO_3$. If $Na_2O$ is present in the precursor glass or glass-ceramic, $Na^+$ for $K^+$ ion exchange may occur in a $KNO_3$ salt bath or a salt bath comprising $KNO_3$ in combination with $NaNO_3$. If $Li_2O$ is present in the precursor glass or glass-ceramic, $Na^+$ for $Li^+$ ion exchange may occur in a $NaNO_3$ salt bath or a salt bath comprising $NaNO_3$ in combination with $KNO_3$. In embodiments, the glass-ceramics may be ion exchanged in a molten salt bath at a bath temperature of from greater than or equal to 350° C. to less than or equal to 500° C. For example, without limitation, the glass-ceramics may be ion exchanged at a bath temperature of greater than or equal to 350° C. to less than or equal to 530° C., greater than or equal to 375° C. to less than or equal to 530° C., greater than or equal to 400° C. to less than or equal to 530° C., greater than or equal to 425° C. to less than or equal to 530° C., greater than or equal to 450° C. to less than or equal to 530° C., greater than or equal to 475° C. to less than or equal to 530° C., greater than or equal to 500° C. to less than or equal to 530° C., greater than or equal to 350° C. to less than or equal to 500° C., greater than or equal to 375° C. to less than or equal to 500° C., greater than or equal to 400° C. to less than or equal to 500° C., greater than or equal to 425° C. to less than or equal to 500° C., greater than or equal to 450° C. to less than or equal to 500° C., greater than or equal to 475° C. to less than or equal to 500° C., greater than or equal to 350° C. to less than or equal to 475° C., greater than or equal to 350° C. to less than or equal to 450° C., greater than or equal to 350° C. to less than or equal to 425° C., greater than or equal to 350° C. to less than or equal to 400° C., greater than or equal to 350° C. to less than or equal to 375° C., or any and all sub-ranges formed from any of these endpoints. The ion exchange time may be from greater than or equal to 1 hour to less than or equal to 48 hours. In embodiments, the ion exchange process may develop a surface compressive layer in the glass precursors or glass-ceramic compositions. The development of this surface compression layer is beneficial for achieving a better crack resistance and higher flexural strength compared to non-ion-exchanged materials. The surface compression layer has a higher concentration of the ions exchanged into the glass-ceramic article in comparison to the concentration of the ions exchanged into the glass-ceramic article for the body (i.e., the area not including the surface compression) of the glass-ceramic article.

In embodiments, the precursor glass and/or glass-ceramics may be ion exchanged to achieve a depth of compression of about 30 μm or greater, about 40 μm or greater, about 50 μm or greater, about 60 μm or greater, about 70 μm or greater, about 80 μm or greater, about 90 μm or greater, or about 100 μm or greater. In embodiments, the depth of compression may be greater than or equal to 3% of the thickness of the article formed from the precursor glass and/or the glass-ceramics, greater than or equal to 5% of the thickness, greater than or equal to 10% of the thickness, greater than or equal to 15% of the thickness, greater than or equal to 20% of the thickness, or even greater than or equal to 22% of the thickness. The development of this surface compression layer is beneficial for achieving a better crack resistance and higher flexural strength compared to non-ion-exchanged materials. The surface compression layer has a higher concentration of the ion exchanged into the precursor glass and/or glass-ceramic article in comparison to the concentration of the ion exchanged into the article for the body (i.e., area not including the surface compression) of the article.

In embodiments, the precursor glass and/or glass-ceramics are ion exchanged to achieve a central tension greater than or equal to 10 MPa. In embodiments, the central tension may be greater than or equal to 10 MPa and less than or equal to 200 MPa, greater than or equal to 20 MPa and less than or equal to 200 MPa, greater than or equal to 30 MPa and less than or equal to 200 MPa, greater than or equal to 40 MPa and less than or equal to 200 MPa, greater than or equal to 50 MPa and less than or equal to 200 MPa, greater than or equal to 60 MPa and less than or equal to 200 MPa, greater than or equal to 70 MPa and less than or equal to 200 MPa, greater than or equal to 80 MPa and less than or equal to 200 MPa, greater than or equal to 90 MPa and less than or equal to 200 MPa, greater than or equal to 100 MPa and less than or equal to 200 MPa, greater than or equal to 110 MPa and less than or equal to 200 MPa, greater than or equal to 120 MPa and less than or equal to 200 MPa, greater than or equal to 130 MPa and less than or equal to 200 MPa, greater than or equal to 140 MPa and less than or equal to 200 MPa, greater than or equal to 150 MPa and less than or equal to 200 MPa, greater than or equal to 160 MPa and less than or equal to 200 MPa, greater than or equal to 170 MPa and less than or equal to 200 MPa, greater than or equal to 180 MPa and less than or equal to 200 MPa, greater than or equal to 190 MPa and less than or equal to 200 MPa, or any and all sub-ranges formed from any of these endpoints.

In embodiments, the precursor glass or glass-ceramic can have a surface compressive stress in a range from greater than or equal to 100 MPa to less than or equal to 1 GPa, greater than or equal to 100 MPa to less than or equal to 950 MPa, greater than or equal to 100 MPa to less than or equal to 900 MPa, greater than or equal to 100 MPa to less than or equal to 850 MPa, greater than or equal to 100 MPa to less than or equal to 800 MPa, greater than or equal to 100 MPa to less than or equal to 750 MPa, greater than or equal to 100 MPa to less than or equal to 700 MPa, greater than or equal to 100 MPa to less than or equal to 650 MPa, greater than or equal to 100 MPa to less than or equal to 600 MPa, greater than or equal to 100 MPa to less than or equal to 550 MPa, greater than or equal to 100 MPa to less than or equal to 500 MPa, greater than or equal to 100 MPa to less than or equal to 450 MPa, greater than or equal to 100 MPa to less than or equal to 400 MPa, greater than or equal to 100 MPa to less than or equal to 350 MPa, greater than or equal to 100 MPa to less than or equal to 300 MPa, greater than or equal to 100 MPa to less than or equal to 250 MPa, greater than or equal to 100 MPa to less than or equal to 200 MPa, greater than or equal to 100 MPa to less than or equal to 150 MPa, 150 MPa to less than or equal to 500 MPa, greater than or equal to 150 MPa to less than or equal to 450 MPa, greater than or equal to 150 MPa to less than or equal to 400 MPa, greater than or equal to 150 MPa to less than or equal to 350 MPa, greater than or equal to 150 MPa to less than or equal to 300 MPa, greater than or equal to 150 MPa to less than or equal to 250 MPa, greater than or equal to 150 MPa to less than or equal to 200 MPa, 200 MPa to less than or equal to 500 MPa, greater than or equal to 200 MPa to less than or equal to 450 MPa, greater than or equal to 200 MPa to less than or equal to 400 MPa, greater than or equal to 200 MPa to less than or equal to 350 MPa, greater than or equal to 200 MPa to less than or equal to 300 MPa, greater than or equal to 200 MPa to less than or equal to 250 MPa, 250 MPa to less than or equal to 500 MPa, greater than or equal to 250 MPa to less than or equal to 450 MPa, greater than or equal to 250 MPa to less than or equal to 400 MPa, greater than or equal to 250 MPa to less than or equal to 350 MPa, greater than or equal to 250 MPa to less than or equal to 300 MPa, 300 MPa to less than or equal to 500 MPa, greater than or equal to 300 MPa to less than or equal to 450 MPa, greater than or equal to 300 MPa to less than or equal to 400 MPa, greater than or equal to 300 MPa to less than or equal to 350 MPa, 350 MPa to less than or equal to 500 MPa, greater than or equal to 350 MPa to less than or equal to 450 MPa, greater than or equal to 350 MPa to less than or equal to 400 MPa, 400 MPa to less than or equal to 500 MPa, greater than or equal to 400 MPa to less than or equal to 450 MPa, greater than or equal to 450 MPa to less than or equal to 500 MPa or any and all sub-ranges formed from any of these endpoints. In embodiments, the precursor glass or glass-ceramic can have a surface compressive stress of about 100 MPa or greater, about 150 MPa or greater, about 200 MPa or greater, about 250 MPa or greater, about 300 MPa or greater, about 350 MPa or greater, about 400 MPa or greater, about 450 MPa or greater, or about 500 MPa or greater.

In embodiments, the process for making the glass-ceramic includes melting a batch of constituent components to form the precursor glass. The molten precursor glass may be poured into a mold. In embodiments, the mold may comprise steel. The precursor glass may be annealed. Pucks of the precursor glass may be sectioned and then heat treated to form the glass-ceramic.

Alternatively, the precursor glasses described herein can be manufactured from molten precursor glass and formed into sheets via processes, including but not limited to, slot draw, float, rolling, and other sheet-forming processes known in the art.

In embodiments, the processes for making the glass-ceramic includes heat treating (also referred to herein as "ceramming") the precursor glass at one or more preselected temperatures for one or more preselected times to induce glass homogenization and crystallization (i.e., nucleation and growth) of one or more crystalline phases (e.g., having one or more compositions, amounts, morphologies, sizes or size distributions, etc.). The one or more preselected temperatures may be less than 1500 K throughout the heat treating process. It should be noted that temperature may refer to temperatures within a range, not necessarily a static singular temperature. Similarly, it should be noted that crystal nucleation and/or growth may occur over continuous or multiple discrete heat treatments that add together to achieve a desired crystal growth. Without wishing to be bound by theory, the nucleating agents may function as or form nucleation sites at which nucleation and growth of grains of the crystalline phases occur, including nucleation and growth of grains of the crystalline phases having the jeffbenite crystalline structure. The nucleation sites are positioned and oriented within the precursor glass such that grains of the resultant crystalline phases, including grains of the crystalline phases having the jeffbenite crystalline structure, are homogenously distributed throughout the resultant glass-ceramic and grow in random orientations, resulting in a glass-ceramic with isotropic material properties. In embodiments, the heat treatment may include heating the precursor glass in a heat treatment furnace at a rate of 1-10° C./min until the furnace reaches a first temperature. The first temperature of the furnace may be from greater than or equal to 700° C. to less than or equal to 950° C. In embodiments, the first temperature of the furnace may be greater than or equal to 700° C. to less than or equal to 950° C., greater than or equal to 710° C. to less than or equal to 950° C., greater than or equal to 730° C. to less than or equal to 950° C., greater than or equal to 750° C. to less than or equal to 950° C., greater than or equal to 770° C. to less than or equal to 950° C., greater than or equal to 790° C. to less than or equal to 950° C., greater than or equal to 810° C. to less than or equal to 950° C., greater than or equal to 830° C. to less than or equal to 950° C., greater than or equal to 850° C. to less than or equal to 950° C., greater than or equal to 870° C. to less than or equal to 950° C., greater than or equal to 890° C. to less than or equal to 950° C., greater than or equal to 910° C. to less than or equal to 950° C., greater than or equal to 930° C. to less than or equal to 950° C., greater than or equal to 700° C. to less than or equal to 930° C., greater than or equal to 700° C. to less than or equal to 910° C., greater than or equal to 700° C. to less than or equal to 890° C., greater than or equal to 700° C. to less than or equal to 870° C., greater than or equal to 700° C. to less than or equal to 850° C., greater than or equal to 700° C. to less than or equal to 830° C., greater than or equal to 700° C. to less than or equal to 810° C., greater than or equal to 700° C. to less than or equal to 790° C., greater than or equal to 700° C. to less than or equal to 770° C., greater than or equal to 700° C. to less than or equal to 750° C., greater than or equal to 700° C. to less than or equal to 730° C., greater than or equal to 700° C. to less than or equal to 710° C., or any and all sub-ranges formed from any of these endpoints. Unless otherwise indicated, the temperature of a heat treatment or ion exchange treatment refers to the temperature of the environment to which the article is exposed (such as the furnace for a heat treatment or the molten salt bath for an ion exchange treatment). In embodiments, the processes for making the glass-ceramic includes maintaining the precursor glass at the first temperature for a first time in a range from 0.25 hours to 6 hours. For example, without limitation, the precursor glass may be maintained at the first temperature for a first time in a range from greater than or equal to 0.25 hours to less than or equal to 6 hours, greater than or equal to 0.5 hours to less than or equal to 6 hours, greater than or equal to 0.75 hours to less than or equal to 6 hours, greater than or equal to 1 hour to less than or equal to 6 hours, greater than or equal to 1.25 hours to less than or equal to 6 hours, greater than or equal to 1.5 hours to less than or equal to 6 hours, greater than or equal to 1.75 hours to less than or equal to 6 hours, greater than or equal to 2 hours to less than or equal to 6 hours, greater than or equal to 2.25 hours to less than or equal to 6 hours, greater than or equal to 2.5 hours to less than or equal to 6 hours, greater than or equal to 2.75 hours to less than or equal to 6 hours, greater than or equal to 3 hours to less than or equal to 6 hours, greater than or equal to 3.25 hours to less than or equal to 6 hours, greater than or equal to 3.5 hours to less than or equal to 6 hours, greater than or equal to 3.75 hours to less than or equal to 6 hours, greater than or equal to 4 hours to less than or equal to 6 hours, greater than or equal to 4.25 to less than or equal to 6 hours, greater than or equal to 4.5 hours to less than or equal to 6 hours, greater than or equal to 4.75 hours to less than or equal to 6 hours, greater than or equal to 5 hours to less than or equal to 6 hours, greater than or equal to 5.25 hours to less than or equal to 6 hours, greater than or equal to 5.5 hours to less than or equal to 6 hours, greater than or equal to 5.75 hours to less than or equal to 6 hours, greater than or equal to 0.25 hours to less than or equal to 5.75 hours, greater than or equal to 0.25 hours to less than or equal to 5.5 hours, greater than or equal to 0.25 hours to less than or equal to 5.25 hours greater than or equal to 0.25 hours to less than or equal to 5 hours, greater than or equal to 0.25 hours to less than or equal to 4.75 hours, greater than or equal to 0.25 hours to less than or equal to 4.5 hours, greater than or equal to 0.25 hours to less than or equal to 4.25 hours, greater than or equal to 0.25 hours to less than or equal to 4 hours, greater than or equal to 0.25 hours to less than or equal to 3.75 hours, greater than or equal to 0.25 hours to less than or equal to 3.5 hours, greater than or equal to 0.25 hours to less than or equal to 3.25 hours, greater than or equal to 0.25 hours to less than or equal to 3 hours, greater than or equal to 0.25 hours to less than or equal to 2.75 hours, greater than or equal to 0.25 hours to less than or equal to 2.5 hours, greater than or equal to 0.25 hours to less than or equal to 2.25 hours, greater than or equal to 0.25 hours to less than or equal to 1 hours, greater than or equal to 0.25 hours to less than or equal to 0.75 hours, greater than or equal to 0.25 hours to less than or equal to 0.5 hours, or any and all sub-ranges formed from any of these endpoints. In embodiments, heat treating the precursor glass in the heat treatment furnace at the first temperature for the first time may facilitate both nucleating and growing the desired crystalline phases in the precursor glass to form the glass-ceramic. In other embodiments, heat treating the precursor glass in the heat treatment furnace at the first temperature for the first time may facilitate nucleating the desired crystalline phases in the precursor glass and a second heat treatment step is implemented to grow the nucleated crystalline phases in the precursor glass to form the glass-ceramic.

For example, in embodiments the heat treatment may include a second step of heating the precursor glass in the heat treatment furnace at a rate of 1-10° C./min until the furnace reaches a second temperature. The second temperature may be different than the first temperature. The second temperature of the furnace may be from greater than or equal to 750° C. to less than or equal to 950° C. In embodiments, the second temperature may be greater than or equal to 750° C. to less than or equal to 950° C., greater than or equal to 770° C. to less than or equal to 950° C., greater than or equal to 790° C. to less than or equal to 950° C., greater than or equal to 810° C. to less than or equal to 950° C., greater than or equal to 830° C. to less than or equal to 950° C., greater than or equal to 850° C. to less than or equal to 950° C., greater than or equal to 870° C. to less than or equal to 950° C., greater than or equal to 890° C. to less than or equal to 950° C., greater than or equal to 910° C. to less than or equal to 950° C., greater than or equal to 930° C. to less than or equal to 950° C., greater than or equal to 750° C. to less than or equal to 930° C., greater than or equal to 750° C. to less than or equal to 910° C., greater than or equal to 750° C. to less than or equal to 890° C., greater than or equal to 750° C. to less than or equal to 870° C., greater than or equal to 750° C. to less than or equal to 850° C., greater than or equal to 750° C. to less than or equal to 830° C., greater than or equal to 750° C. to less than or equal to 810° C., greater than or equal to 750° C. to less than or equal to 790° C., greater than or equal to 750° C. to less than or equal to 770° C., or any and all sub-ranges formed from any of these endpoints. In embodiments, the processes for making the glass-ceramic includes maintaining the precursor glass at the second temperature for a second time in a range from greater than or equal to 0.25 hours to less than or equal to 6 hours. For example, without limitation, the precursor glass may be maintained at the second temperature for a second time in a range from greater than or equal to 0.25 hours to less than or equal to 6 hours, greater than or equal to 0.5 hours to less than or equal to 6 hours, greater than or equal to 0.75 hours to less than or equal to 6 hours, greater than or equal to 1 hour to less than or equal to 6 hours, greater than or equal to 1.25 hours to less than or equal to 6 hours, greater than or equal to 1.5 hours to less than or equal to 6 hours, greater than or equal to 1.75 hours to less than or equal to 6 hours, greater than or equal to 2 hours to less than or equal to 6 hours, greater than or equal to 2.25 hours to less than or equal to 6 hours, greater than or equal to 2.5 hours to less than or equal to 6 hours, greater than or equal to 2.75 hours to less than or equal to 6 hours, greater than or equal to 3 hours to less than or equal to 6 hours, greater than or equal to 3.25 hours to less than or equal to 6 hours, greater than or equal to 3.5 hours to less than or equal to 6 hours, greater than or equal to 3.75 hours to less than or equal to 6 hours, greater than or equal to 4 hours to less than or equal to 6 hours, greater than or equal to 4.25 to less than or equal to 6 hours, greater than or equal to 4.5 hours to less than or equal to 6 hours, greater than or equal to 4.75 hours to less than or equal to 6 hours, greater than or equal to 5 hours to less than or equal to 6 hours, greater than or equal to 5.25 hours to less than or equal to 6 hours, greater than or equal to 5.5 hours to less than or equal to 6 hours, greater than or equal to 5.75 hours to less than or equal to 6 hours, greater than or equal to 0.25 hours to less than or equal to 5.75 hours, greater than or equal to 0.25 hours to less than or equal to 5.5 hours, greater than or equal to 0.25 hours to less than or equal to 5.25 hours, greater than or equal to 0.25 hours to less than or equal to 5 hours, greater than or equal to 0.25 hours to less than or equal to 4.75 hours, greater than or equal to 0.25 hours to less than or equal to 4.5 hours, greater than or equal to 0.25 hours to less than or equal to 4.25 hours, greater than or equal to 0.25 hours to less than or equal to 4 hours, greater than or equal to 0.25 hours to less than or equal to 3.75 hours, greater than or equal to 0.25 hours to less than or equal to 3.5 hours, greater than or equal to 0.25 hours to less than or equal to 3.25 hours, greater than or equal to 0.25 hours to less than or equal to 3 hours, greater than or equal to 0.25 hours to less than or equal to 2.75 hours, greater than or equal to 0.25 hours to less than or equal to 2.5 hours, greater than or equal to 0.25 hours to less than or equal to 2.25 hours, greater than or equal to 0.25 hours to less than or equal to 1 hours, greater than or equal to 0.25 hours to less than or equal to 0.75 hours, greater than or equal to 0.25 hours to less than or equal to 0.5 hours, or any and all sub-ranges formed from any of these endpoints. Heat treating the precursor glass with nucleated crystalline phases in the heat treatment furnace at the second temperature for the second time facilitates growing the desired crystalline phases in the precursor glass to form the glass-ceramic.

In embodiments, heat-treating the precursor glass may further comprise heating the precursor glass in the heat treatment furnace to one or more subsequent furnace temperatures, such as from greater than or equal to 750° C. to less than or equal to 950° C., and holding the precursor glass at each subsequent furnace temperature for a time in a range, such as from greater than or equal to 0.25 hours to less than or equal to 6 hours.

In embodiments, heat-treating the precursor glass may occur at ambient pressure. In embodiments, heat-treating the precursor glass may occur at ambient atmospheric pressure (e.g., 101.325 kPa). In embodiments, heat-treating the precursor glass may occur at about 100 kPa. In one or more embodiments, heat treating the precursor glass may occur at a pressure of less than or equal to 15 GPa. For example, without limitation, heat-treating the precursor glass may occur at a pressure of less than or equal to 15 GPa, less than or equal to 10 GPa, less than or equal to 5 GPa, or less than or equal to 1 GPa. According to the methods described herein, jeffbenite may be formed in a glass-ceramic article without the need to such pressurization.

Following heat-treating (i.e., following the nucleation and growth of the crystalline phase(s) in the precursor glass), at least some of the grains of the crystalline phase having the jeffbenite crystalline structure overlap and interlock within one another within the residual glass phase. The grains of the crystalline phase having the jeffbenite crystalline structure may overlap and interlock with one another within the glass-ceramic of the body, such as to a degree that the glass-ceramic has a fracture toughness as disclosed herein, such as about 0.75 MPa·m$^{1/2}$ or other such values as disclosed herein. In other aspects of the present disclosure, overlap and interlock of the jeffbenite crystalline structure occurs within the glass-ceramic of the body, but to a degree that does not provide such fracture toughness. In still other aspects, crystals of the jeffbenite crystalline structure may be present but so sparse so as not to overlap or interlock with one another to any degree whatsoever within the glass-ceramic of the body.

In embodiments, the resultant glass-ceramic may be transparent, translucent, or opaque. In embodiments, the glass-ceramics have an average transmittance of >85% of light over the wavelength range from about 400 nm to about 1,000 nm at an article thickness of 0.85 mm. In embodiments, the average transmittance for the glass-ceramic is about 85% or greater, about 86% or greater, about 87% or greater, about 88% or greater, about 89% or greater, about 90% or greater, about 91% or greater, about 92% or greater, about 93% or greater for light over the wavelength range of about 400 nm to about 1000 nm at an article thickness of 0.85 mm.

In embodiments, the resultant glass-ceramic may be colored. Colored glass-ceramic articles may comprise at least one colorant in a colorant package that functions to impart a desired color to the glass-ceramic. The colorant package may comprise at least one of Au, Ag, $Cr_2O_3$, transition metal oxides (e.g., CuO, NiO, $CO_3O_4$, $TiO_2$, $Cr_2O_3$), rare earth metal oxides (e.g., $CeO_2$), and/or combinations thereof as colorants in the colorant package and the precursor glass or glass-ceramic may include greater than or equal to $1\times10^{-6}$ mol. %, such as greater than 0.0005 mol. %, such as greater than 0.001 mol. %, such as greater than or equal to 0.01 mol. %, such as greater than or equal to 0.1 mol. %, such as greater than or equal to 0.2 mol. %, such as greater than or equal to 0.01 mol. %, and/or less than or equal to 10 mol. % of colorant (i.e., the sum of all colorants in the colorant package), such as less than 5 mol. %, such as less than 2 mol. %, such as less than 1 mol. %, such as less than 0.5 mol. %, such as less than 0.25 mol. % in some cases. For example, a yellow glass or glass-ceramic may comprise rare earth metal oxides, such as greater than about 0.2 mol. % and less than 1 mol. %; a black or gray glass may comprise NiO and $CO_3O_4$ in such quantities; green glass or glass-ceramic may likewise comprise $Cr_2O_3$; and pink, red, or orange glasses or glass-ceramics may comprise small amounts of gold, such as greater than $1\times10^{-6}$ mol. % and less than 0.5 mol. %, in alignment with disclosure of U.S. application Ser. No. 17/691,813. Other colorants may be used as well in such quantities, such as iron oxides for green or brown glasses or glass-ceramics for example, manganese oxides for amber or purple, selenium for red, antimony for white, uranium for glowing colors, copper for red, tin for white, lead for yellow, and other colorants. However, some such colorants, such as lead, antimony, and selenium may be less desirable than others for example. Further redox of colorants, UV-light treatment, and particulates may contribute to colors of the glasses, and Applicant hereby incorporates by reference U.S. Application Nos. 63/433,060 filed Dec. 16, 2022; 63/433,065 filed Dec. 16, 2022; and 63/433,119 filed Dec. 16, 2022 herein in their entireties.

In embodiments, the colored glass-ceramic may form a glass-ceramic sheet. The colored glass-ceramic may be semi-translucent (e.g., >1% total transmittance, >5%, >10%, and/or <95%, <92%, <90%, <85%, <80%, <70%) at some, most, and/or all frequencies in the visible spectrum (e.g., $4\times10^{14}$ to $8\times10^{14}$ Hz; 380 to 750 nanometers wavelengths) at thicknesses disclosed herein. Further, total transmittance of at least one 10 nm wide band within a wavelength range from 380 nm to 750 nm (e.g., 380 to 390 nm; 390 to 400 nm; 385 to 395 nm; and/or 740 to 750 nm) is less than 90%, such as less than 85%, less than 80%, less than 70%, less than 60%, and/or less than 50%, through the glass of the sheet at the primary thickness (e.g., about 1 mm, about 0.6 mm, about 0.8 mm, about 1.2 mm, about 1.6 mm, about 2 mm, where about in this context refers to within 0.2 mm).

In embodiments, the colored glass-ceramics may be opaque, such as a solid color (e.g., white, black, forest green) that is essentially not transmissive to visible light (e.g., less than 1% total transmittance between 380 to 750 nanometers wavelengths). The colored glass-ceramics may also be translucent, such as having transmission, >95%, >96%, and/or <100%) at some, most, and/or all frequencies in the visible spectrum (e.g., $4\times10^{14}$ to $8\times10^{14}$ Hz; 380 to 750 nanometers wavelengths) at thicknesses disclosed herein.

In embodiments, the color of a glass-ceramic may be described using CIELAB color space coordinates L*, a*, and b*. In embodiments, the value for L* may be from 0 to 100, from 10 to 100, from 20 to 100, from 30 to 100, from 40 to 100, from 50 to 100, from 60 to 100, from 70 to 100, from 80 to 100, from 90 to 100, from 0 to 90, from 0 to 80, from 0 to 70, from 0 to 60, from 0 to 50, from 0 to 40, from 0 to 30, from 0 to 20, from 0 to 10, or any and all sub-ranges formed from these endpoints. In embodiments, the L* coordinate may be greater than or equal to 50, greater than or equal to 60, greater than or equal to 70, greater than or equal to 80, and less than or equal to 100. In embodiments, the value for a* may be from −128 to 128, from −120 to 128, from −110 to 128, from −100 to 128, from −90 to 128, from −80 to 128, from −70 to 128, from −60 to 128, from −50 to 128, from −40 to 128, from −30 to 128, from −20 to 128, from −10 to 128, from 0 to 128, from 10 to 128, from 20 to 128, from 30 to 128, from 40 to 128, from 50 to 128, from 60 to 128, from 70 to 128, from 80 to 128, from 90 to 128, from 100 to 128, from 110 to 128, from 120 to 128, or any and all sub-ranges formed from these endpoints. In embodiments, the a* coordinate may be greater than or equal to −100, greater than or equal to −90, greater than or equal to −80, greater than or equal to −70, greater than or equal to −60, greater than or equal to −50 greater than or equal to −40, greater than or equal to −30, or greater than or equal to −20. In embodiments, the a* coordinate may be less than or equal to 100, less than or equal to 90, less than or equal to 80, less than or equal to 70, less than or equal to 60, less than or equal to 50 less than or equal to 40, less than or equal to 30, or less than or equal to 20. In embodiments, the value for b* may be from −128 to 128, from −120 to 128, from −110 to 128, from −100 to 128, from −90 to 128, from −80 to 128, from −70 to 128, from −60 to 128, from −50 to 128, from −40 to 128, from −30 to 128, from −20 to 128, from −10 to 128, from 0 to 128, from 10 to 128, from 20 to 128, from 30 to 128, from 40 to 128, from 50 to 128, from 60 to 128, from 70 to 128, from 80 to 128, from 90 to 128, from 100 to 128, from 110 to 128, from 120 to 128, or any and all sub-ranges formed from these endpoints. In embodiments, the b* coordinate may be greater than or equal to −100, greater than or equal to −90, greater than or equal to −80, greater than or equal to −70, greater than or equal to −60, greater than or equal to −50, greater than or equal to −40, greater than or equal to −30, or greater than or equal to −20. In embodiments, the b* coordinate may be less than or equal to 100, less than or equal to 90, less than or equal to 80, less than or equal to 70, less than or equal to 60, less than or equal to 50, less than or equal to 40, less than or equal to 30, or less than or equal to 20.

In embodiments, the resultant glass-ceramic may have a density from greater than or equal greater than or equal to 2.65 $g/cm^3$ to less than or equal to 2.95 $g/cm^3$. In embodiments, the resultant glass-ceramic may have a density from greater than or equal greater than or equal to 2.50 $g/cm^3$ to less than or equal to 3.70 $g/cm^3$. For example, without limitation, the glass-ceramic may have a density greater than or equal to 2.50 g/cm$^3$ to less than or equal to 3.70 g/cm$^3$, greater than or equal to 2.55 g/cm$^3$ to less than or equal to 3.70 g/cm$^3$, greater than or equal to 2.60 g/cm$^3$ to less than or equal to 3.70 g/cm$^3$, greater than or equal to 2.65 g/cm$^3$ to less than or equal to 3.70 g/cm$^3$, greater than or equal to 2.70 g/cm$^3$ to less than or equal to 3.70 g/cm$^3$, greater than or equal to 2.75 g/cm$^3$ to less than or equal to 3.70 g/cm$^3$, greater than or equal to 2.80 g/cm$^3$ to less than or equal to 3.70, greater than or equal to 2.85 g/cm$^3$ to less than or equal to 3.70, greater than or equal to 2.90 g/cm$^3$ to less than or equal to 3.70 g/cm$^3$, greater than or equal to 3.00 g/cm$^3$ to less than or equal to 3.70 g/cm$^3$, greater than or equal to 3.10 g/cm$^3$ to less than or equal to 3.70 g/cm$^3$, greater than or equal to 3.20 g/cm$^3$ to less than or equal to 3.70 g/cm$^3$, greater than or equal to 3.30 g/cm$^3$ to less than or equal to 3.70 g/cm$^3$, greater than or equal to 3.40 g/cm$^3$ to less than or equal to 3.70 g/cm$^3$, greater than or equal to 2.50 g/cm$^3$ to less than or equal to 3.60 g/cm$^3$, greater than or equal to 2.55 g/cm$^3$ to less than or equal to 3.60 g/cm$^3$, greater than or equal to 2.60 g/cm$^3$ to less than or equal to 3.60 g/cm$^3$, greater than or equal to 2.65 g/cm$^3$ to less than or equal to 3.60 g/cm$^3$, greater than or equal to 2.70 g/cm$^3$ to less than or equal to 3.60 g/cm$^3$, greater than or equal to 2.75 g/cm$^3$ to less than or equal to 3.60 g/cm$^3$, greater than or equal to 2.80 g/cm$^3$ to less than or equal to 3.60, greater than or equal to 2.85 g/cm$^3$ to less than or equal to 3.60, greater than or equal to 2.90 g/cm$^3$ to less than or equal to 3.60 g/cm$^3$, greater than or equal to 3.00 g/cm$^3$ to less than or equal to 3.60 g/cm$^3$, greater than or equal to 3.10 g/cm$^3$ to less than or equal to 3.60 g/cm$^3$, greater than or equal to 3.20 g/cm$^3$ to less than or equal to 3.60 g/cm$^3$, greater than or equal to 3.30 g/cm$^3$ to less than or equal to 3.60 g/cm$^3$, greater than or equal to 3.40 g/cm$^3$ to less than or equal to 3.60 g/cm$^3$, greater than or equal to 2.65 g/cm$^3$ to less than or equal to 2.95 g/cm$^3$, greater than or equal to 2.70 g/cm$^3$ to less than or equal to 2.95 g/cm$^3$, greater than or equal to 2.75 g/cm$^3$ to less than or equal to 2.95 g/cm$^3$, greater than or equal to 2.80 g/cm$^3$ to less than or equal to 2.95 g/cm$^3$, greater than or equal to 2.85 g/cm$^3$ to less than or equal to 2.95 g/cm$^3$, greater than or equal to 2.90 g/cm$^3$ to less than or equal to 2.95 g/cm$^3$, greater than or equal to 2.75 g/cm$^3$ to less than or equal to 2.90 g/cm$^3$, greater than or equal to 2.75 g/cm$^3$ to less than or equal to 2.85 g/cm$^3$, greater than or equal to 2.75 g/cm$^3$ to less than or equal to 2.80 g/cm$^3$, or any and all sub-ranges formed from any of these endpoints. Without intending to be bound by theory, the presence of a crystalline phase having a jeffbenite crystalline structure in the glass-ceramic article may result in a glass-ceramic with a relatively high density when considering the relatively lightweight components of the glass-ceramic precursor.

In embodiments, the resultant glass-ceramic may comprise a crystalline phase having a jeffbenite crystalline structure. In embodiments, at least some of the grains of the crystalline phase having the jeffbenite crystalline structure in the glass-ceramic, or even a majority of the grains, may have a dimension (e.g., measured from a sectioned/polished cut of glass-ceramic, where the "dimension" is a linear cross-sectional dimension, measured from opposite facing outermost surfaces of the grain through a geometric centroid of the grain along a surface of the sectioned/polished cut of glass-ceramic, such as longest cross-sectional dimension, shortest cross-sectional dimension, average cross-sectional dimension; unless otherwise specified, "dimension" in this context refers to the longest such cross-sectional dimension for a given grain; see grains shown in FIGS. 3-4, 6A-6F, and generally in FIG. 9) less than the wavelength of visible light.

For example, without limitation, at least some of the grains of the crystalline phase having the jeffbenite crystalline structure, or even a majority of the grains, may have a dimension of less than or equal to 500 nm, 400 nm, 350 nm, 300 nm, 250 nm, 200 nm, 150 nm, or even less than or equal to 100 nm. In embodiments, at least some of the grains of the crystalline phase having the jeffbenite crystalline structure in the glass-ceramic, or even a majority of the grains, may have a dimension greater than or equal to 20 nm or even greater than or equal to 30 nm. For example, without limitation, at least some of the grains of the crystalline phase having the jeffbenite crystalline structure in the glass-ceramic, or even a majority, may have a dimension greater than or equal to 20 nm to less than or equal to 100 nm, greater than or equal to 30 nm to less than or equal to 100 nm, greater than or equal to 40 nm to less than or equal to 100 nm, greater than or equal to 50 nm to less than or equal to 100 nm, greater than or equal to 60 nm to less than or equal to 100 nm, greater than or equal to 70 nm to less than or equal to 100 nm, greater than or equal to 80 nm to less than or equal to 100 nm, greater than or equal to 90 nm to less than or equal to 100 nm, greater than or equal to 20 nm to less than or equal to 90 nm, greater than or equal to 30 nm to less than or equal to 90 nm, greater than or equal to 20 nm to less than or equal to 80 nm, greater than or equal to 30 nm to less than or equal to 80 nm, greater than or equal to 20 nm to less than or equal to 70 nm, greater than or equal to 30 nm to less than or equal to 70 nm, greater than or equal to 20 nm to less than or equal to 60 nm, greater than or equal to 30 nm to less than or equal to 60 nm, greater than or equal to 20 nm to less than or equal to 50 nm, greater than or equal to 30 nm to less than or equal to 50 nm, greater than or equal to 20 nm to less than or equal to 40 nm, greater than or equal to 30 nm to less than or equal to 40 nm, or any and all sub-ranges formed from any of these endpoints. In embodiments, at least some of the grains of the crystalline phase having the jeffbenite crystalline structure may be in an elongate form. In embodiments, at least some of the grains of the crystalline phase having the jeffbenite crystalline structure may comprise an acicular or tabular shape. In embodiments, the grains of the crystalline phase having the jeffbenite crystalline structure may comprise a bulk elastic modulus of about 170 GPa. In embodiments, the grains of the crystalline phase having the jeffbenite crystalline structure may comprise a hardness of about 1350 VHn.

In embodiments, the resultant glass-ceramic may comprise a phase assemblage in which at least some of the grains of the crystalline phases of the phase assemblage, or even a majority of the grains, have a dimension less than the wavelength of visible light. For example, without limitation, at least some of the grains of the crystalline phases in the phase assemblage, or even a majority, may have a dimension of less than or equal to 500 nm, 400 nm, 350 nm, 300 nm, 250 nm, 200 nm, 150 nm, or even less than or equal to 100 nm. In embodiments, at least some of the grains of the crystalline phases in the phase assemblage, or even a majority, may have a dimension greater than or equal to 20 nm or even greater than or equal to 30 nm. For example, without limitation, at least some of the grains of the crystalline phases in the glass-ceramic, or even a majority, may have a grain size greater than or equal to 20 nm to less than or equal to 100 nm, greater than or equal to 30 nm to less than or equal to 100 nm, greater than or equal to 40 nm to less than or equal to 100 nm, greater than or equal to 50 nm to less than or equal to 100 nm, greater than or equal to 60 nm to less than or equal to 100 nm, greater than or equal to 70 nm to less than or equal to 100 nm, greater than or equal to 80 nm to less than or equal to 100 nm, greater than or equal to 90 nm to less than or equal to 100 nm, greater than or equal to 20 nm to less than or equal to 90 nm, greater than or equal to 30 nm to less than or equal to 90 nm, greater than or equal to 20 nm to less than or equal to 80 nm, greater than or equal to 30 nm to less than or equal to 80 nm, greater than or equal to 20 nm to less than or equal to 70 nm, greater than or equal to 30 nm to less than or equal to 70 nm, greater than or equal to 20 nm to less than or equal to 60 nm, greater than or equal to 30 nm to less than or equal to 60 nm, greater than or equal to 20 nm to less than or equal to 50 nm, greater than or equal to 30 nm to less than or equal to 50 nm, greater than or equal to 20 nm to less than or equal to 40 nm, greater than or equal to 30 nm to less than or equal to 40 nm, or any and all sub-ranges formed from any of these endpoints.

In embodiments, the glass-ceramic may have an elastic modulus greater than or equal to 50 GPa and less than or equal to 200 GPa. In embodiments, the glass-ceramic may have an elastic modulus greater than or equal to 50 GPa, greater than or equal to 80 GPa, greater than or equal to 90 GPa, or even greater than or equal to 100 GPa. In embodiments, the glass-ceramic may have an elastic modulus less than or equal to 200 GPa or even less than or equal to 150 GPa. In embodiments, the glass-ceramic may have an elastic modulus greater than or equal to 50 GPa and less than or equal to 200 GPa, greater than or equal to 50 GPa and less than or equal to 175 GPa, greater than or equal to 60 GPa and less than or equal to 175 GPa, greater than or equal to 60 GPa and less than or equal to 150 GPa, greater than or equal to 70 GPa and less than or equal to 175 GPa, greater than or equal to 70 GPa and less than or equal to 150 GPa, greater than or equal to 80 GPa and less than or equal to 175 GPa, or even greater than or equal to 80 GPa and less than or equal to 150 GPa, or any and all sub-ranges formed from any of these endpoints.

In embodiments, the glass-ceramics exhibit a fracture toughness of about 0.75 MPa·m$^{1/2}$ or greater, about 0.85 MPa·m$^{1/2}$ or greater, about 1.0 MPa·m$^{1/2}$ or greater, about 1.1 MPa·m$^{1/2}$ or greater, 1.2 MPa·m$^{1/2}$ or greater, 1.3 MPa·m$^{1/2}$ or greater, 1.4 MPa·m$^{1/2}$ or greater, 1.5 MPa·m$^{1/2}$ or greater, 1.6 MPa·m$^{1/2}$ or greater, 1.7 MPa·m$^{1/2}$ or greater, 1.8 MPa·m$^{1/2}$ or greater, 1.9 MPa·m$^{1/2}$ or greater, or about 2.0 MPa·m$^{1/2}$ In embodiments, the fracture toughness is in the range from greater than or equal to 0.75 MPa·m$^{1/2}$ to less than or equal to 2 MPa·m$^{1/2}$, or any and all sub-ranges formed from any of these endpoints.

In one or more embodiments, the glass-ceramics have high crack and scratch resistance by exhibiting a Vickers hardness. In some embodiments, a non-ion-exchanged glass-ceramic exhibits a Vickers hardness in the range from greater than or equal to 600 kgf/mm$^2$ to less than or equal to 1400 kgf/mm$^2$, greater than or equal to 600 kgf/mm$^2$ to less than or equal to 1300 kgf/mm$^2$, greater than or equal to 600 kgf/mm$^2$ to less than or equal to 1200 kgf/mm$^2$, greater than or equal to 600 kgf/mm$^2$ to less than or equal to 1100 kgf/mm$^2$, greater than or equal to 600 kgf/mm$^2$ to less than or equal to 1000 kgf/mm$^2$, greater than or equal to 600 kgf/mm$^2$ to less than or equal to 900 kgf/mm$^2$, greater than or equal to 600 kgf/mm$^2$ to less than or equal to 875 kgf/mm$^2$, greater than or equal to 600 kgf/mm$^2$ to less than or equal to 850 kgf/mm$^2$, greater than or equal to 600 kgf/mm$^2$ to less than or equal to 825 kgf/mm$^2$, greater than or equal to 600 kgf/mm$^2$ to less than or equal to 800 kgf/mm$^2$, greater than or equal to 600 kgf/mm$^2$ to less than or equal to 775 kgf/mm$^2$, greater than or equal to 600 kgf/mm$^2$ to less than or equal to 750 kgf/mm$^2$, greater than or equal to 600 kgf/mm$^2$ to less than or equal to 725 kgf/mm$^2$, greater than or equal to 600 kgf/mm$^2$ to less than or equal to 700 kgf/mm$^2$, greater than or equal to 700 kgf/mm$^2$ to less than or equal to 900 kgf/mm$^2$, greater than or equal to 700 kgf/mm$^2$ to less than or equal to 875 kgf/mm$^2$, greater than or equal to 700 kgf/mm$^2$ to less than or equal to 850 kgf/mm$^2$, greater than or equal to 700 kgf/mm$^2$ to less than or equal to 825 kgf/mm$^2$, or greater than or equal to 700 kgf/mm$^2$ to less than or equal to 800 kgf/mm$^2$. In some embodiments, a Vickers hardness is 600 kgf/mm$^2$ or greater, 625 kgf/mm$^2$ or greater, 650 kgf/mm$^2$ or greater, 675 kgf/mm$^2$ or greater, 700 kgf/mm$^2$ or greater, 725 kgf/mm$^2$ or greater, 750 kgf/mm$^2$ or greater, 775 kgf/mm$^2$ or greater, 800 kgf/mm$^2$ or greater, 825 kgf/mm$^2$ or greater, 850 kgf/mm$^2$ or greater, 875 kgf/mm$^2$ or greater, or 900 kgf/mm$^2$ or greater, or any and all sub-ranges formed from any of these endpoints.

The resultant glass-ceramic may be provided as a sheet, which may then be reshaped or reformed by pressing, blowing, bending, sagging, vacuum forming, or other means into curved or bent pieces of uniform thickness. Reforming may be done before thermally treating or the forming step may also serve as a thermal treatment step in which both forming and thermal treating are performed substantially simultaneously.

The glass-ceramics and glass-ceramic articles described herein may be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications. In embodiments, a consumer electronic device (e.g., smartphones, tablet computers, personal computers, ultrabooks, televisions, and cameras), an architectural glass, and/or an automotive glass may comprise a glass article as described herein.

Figure 2:
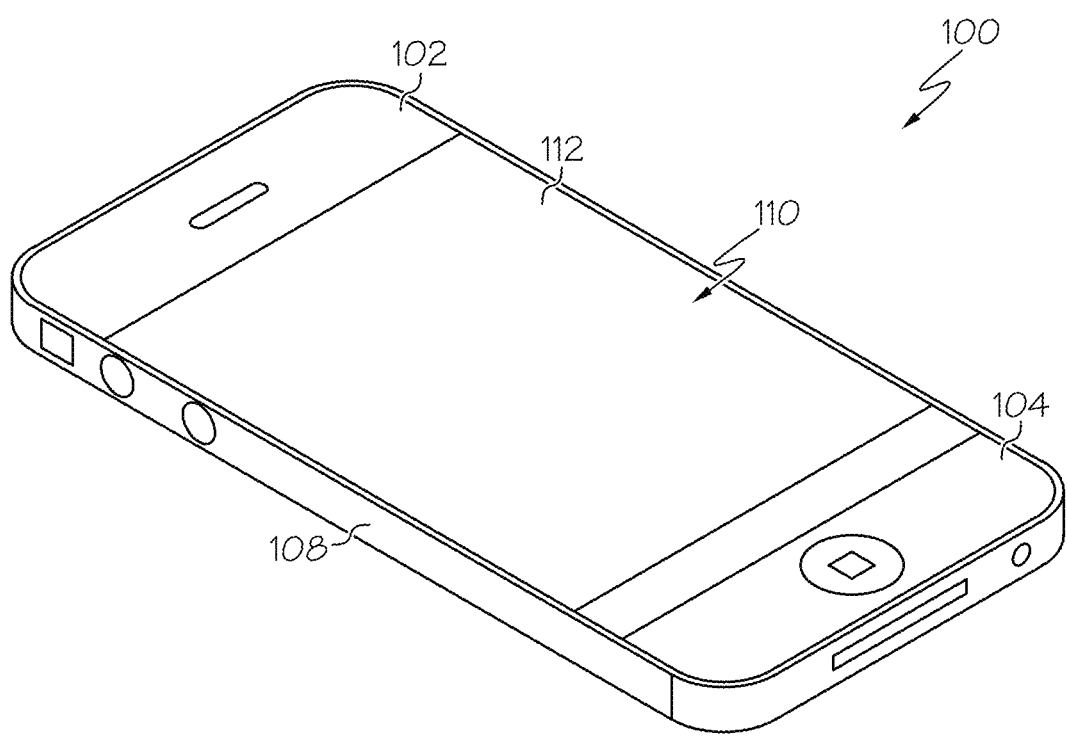
FIG. 2 is a perspective view of an electronic device comprising a glass-ceramic article.

An exemplary electronic device incorporating any of the glass-ceramic articles disclosed herein is shown in FIGS. 1 and 2. Specifically, FIGS. 1 and 2 show a consumer electronic device 100 including a housing 102 having a front surface 104, a back surface 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In embodiments, at least a portion of at least one of the cover substrate 112 and the housing 102 may include any of the glass-ceramic articles disclosed herein.

Figure 8A:
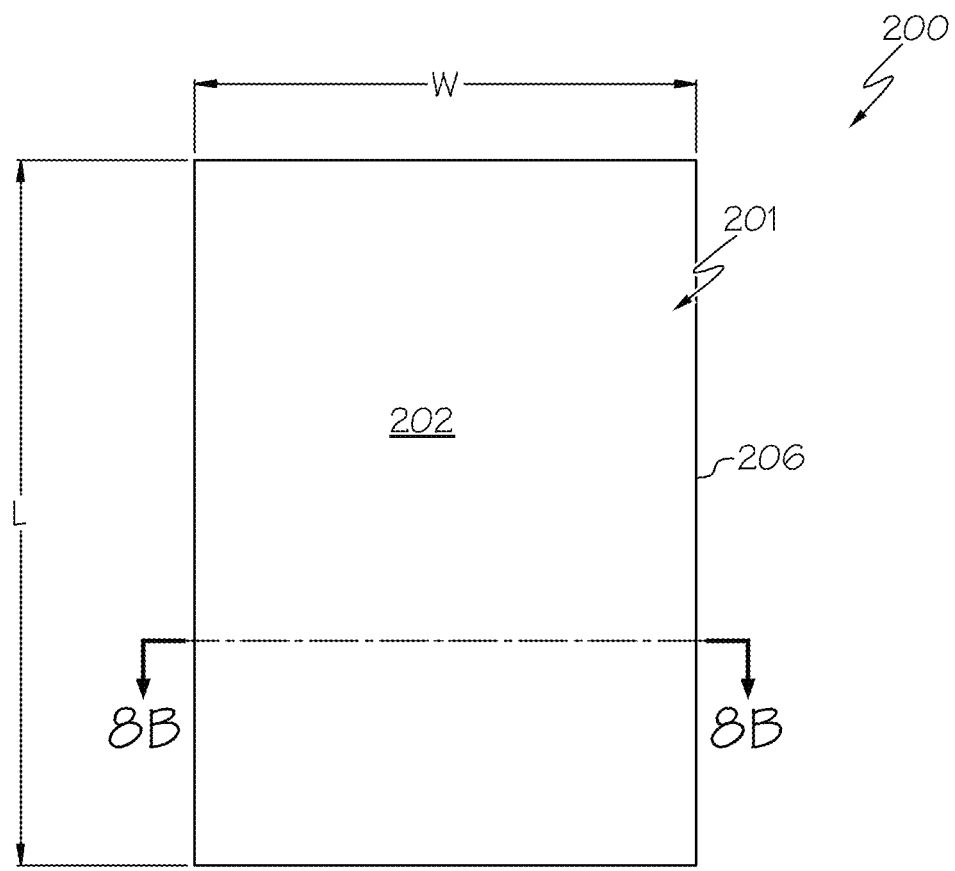
FIG. 8A schematically depicts a glass-ceramic article.
Figure 8B:
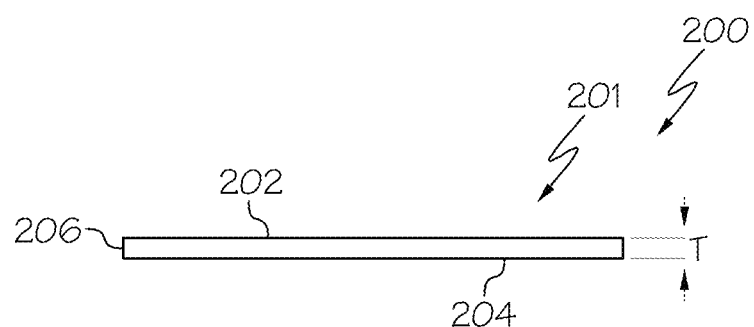
FIG. 8B schematically depicts a cross section of the glass-ceramic article.

Referring now to FIGS. 8A and 8B, an embodiment of a glass-ceramic article 200 formed from glass-ceramics described herein is depicted. In this embodiment, the glass-ceramic article is in the form of a glass sheet and may comprise a body 201 disposed between a first surface 202 opposite a second surface 204. The body 201 comprises or consists essentially of a glass-ceramic as described herein. The first surface 202 and the second surface 204 may be major surfaces of the glass sheet that face away from one another. In embodiments, the first surface 202 and the second surface 204 may be generally planar and spaced apart from one another by a thickness T defined between the first surface 202 and the second surface 204. The first surface 202 and the second surface 204 are delimited by at least one edge surface 206 forming a perimeter that generally defines a shape of the glass-ceramic article 200. In the embodiment depicted in FIGS. 8A and 8B, the glass-ceramic article is rectangular in shape and comprises a length L and a width W. In this embodiment, the width W of the glass sheet is defined as the distance along the first surface 202 orthogonal to the thickness T and between opposing edges. The length L is defined as the distance along the first surface 202 orthogonal to the thickness T and the width W and between opposing edges. In embodiments, the width W may be greater than or equal to the thickness T and the length L may be greater than or equal to the width W. However, it should be understood that other shapes of the glass-ceramic article are contemplated and possible, including, without limitation, squares, circles, and other regular or irregular geometric shapes. For example, a glass-ceramic article may also include a rod, a fiber, a boule, curved sheet, tube, bowl, lens, vial, bottle, or other container.

In embodiments, the thickness T of the glass-ceramic article 200 may be as described herein. The length L and the width W of the glass-ceramic article may be selected according to the specific application in which the glass-ceramic article 200 is employed. In embodiments, the length L and the width W of the glass-ceramic article may be greater than or equal to 5 mm, such as greater than or equal to 10 mm, greater than or equal to 15 mm, greater than or equal to 20 mm, greater than or equal to 25 mm, and greater than or equal to 30 mm. For example, and without limitation, the length L of the glass-ceramic article may be greater than or equal to 30 mm to less than or equal to 1 m, greater than or equal to 30 mm to less than or equal to 75 cm, greater than or equal to 30 mm to less than or equal to 50 cm, greater than or equal 30 mm to less than or equal to 25 cm, greater than or equal to 30 mm to less than or equal to 20 cm, greater than or equal to 30 mm to less than or equal to 15 cm, greater than or equal to 30 mm to less than or equal to 10 cm, greater than or equal to 30 mm to less than or equal to 5 cm, or any and all sub-ranges formed from any of these endpoints. The width W of the glass-ceramic article may be greater than or equal to 30 mm to less than or equal to 1 m, greater than or equal to 30 mm to less than or equal to 75 cm, greater than or equal to 30 mm to less than or equal to 50 cm, greater than or equal 30 mm to less than or equal to 25 cm, greater than or equal to 30 mm to less than or equal to 20 cm, greater than or equal to 30 mm to less than or equal to 15 cm, greater than or equal to 30 mm to less than or equal to 10 cm, greater than or equal to 30 mm to less than or equal to 5 cm, or any and all sub-ranges formed from any of these endpoints. In embodiments where the glass-ceramic article is a glass sheet, as depicted in FIGS. 8A and 8B, the surfaces of the glass sheet may have an area greater than or equal to 25 $mm^2$. In embodiments where the glass-ceramic article is a glass sheet, the glass-ceramic in the body 201 of the glass sheet may have a volume greater than or equal to 25 $mm^3$.

In embodiments, the body 201 of the glass-ceramic article 200 has an average transmittance of at least 75% for light in a wavelength range from 400 nm to 800 nm (inclusive of endpoints) at an article thickness of 0.85 mm such that the glass-ceramic article is transparent. In embodiments, the body 201 of the glass-ceramic article 200 has an average transmittance of greater than or equal to 20% to less than 75% for light in a wavelength range from 400 nm to 800 nm (inclusive of endpoints) at an article thickness of 0.85 mm such that the glass-ceramic article is translucent. In embodiments, the body of the glass-ceramic article has an average transmittance less than 20% when measured at normal incidence for light in a wavelength range from 400 nm to 800 nm (inclusive of endpoints) at an article thickness of 0.85 mm such that the glass-ceramic article is opaque. In embodiments, the body 201 of the glass-ceramic article 200 is at least partially translucent such that at least 20% of light having a wavelength of 400 nm to 800 nm directed into the thickness of the article is transmitted through the body.

Jeffbenite Characterization Method

In embodiments, a glass-ceramic article may be tested by X-ray diffraction to determine whether the glass-ceramic article comprises a jeffbenite crystalline phase, as described in detail herein. The test uses the following equipment and software: X-ray Diffractometer—Bruker-AXS D8 Endeavor equipped with a Cu radiation and a Lynx Eye detector, a Rocklabs Whisper Series Ring Mill, Backfill sample holders (Malvern Panalytical PW1770/10 Powder Sample Preparation Kit and PW18XX sample holder), 6" by 6" weigh papers, glass slides, a spatula, and data analysis software (MDI Jade, Bruker Topas, and Powder Diffraction File Database PDF-4).

A sample of a glass-ceramic article is received as small pieces of glass-ceramic. The pieces of glass-ceramic are broken up in the ring mill so that about 3 grams of the glass-ceramic may be obtained. The 3 gram sample of glass-ceramic is ground to a fine powder using the Rocklabs ring mill for a time of about 30 seconds.

A PW18XX sample holder is filled with the fine powder as described herein. The sample holder ring is clamped to a preparation table. The fine powder is spread in the sample holder ring so that the fine powder is heaped in a conical shape inside the holder ring. The fine power is firmly pressed down in the holder ring using a glass slide. Any excess powder is scraped back into the holder ring using the glass slide. Additional fine powder may be added as necessary to fill the sample holder. This process is repeated until a densely packed powder specimen is obtained. Excess fine powder above the rim of the holder ring is removed using the edge of the glass slide. The bottom plate is placed onto the holder ring and clamped into position. The complete sample holder is removed from the preparation table and loaded into the X-ray diffractometer.

A job file for the sample is created in XRD Commander. The job file includes the position of the sample in the X-ray diffractometer and identifying information for the sample. After the job file is created the X-ray diffractometer scans the sample.

Figure 14:
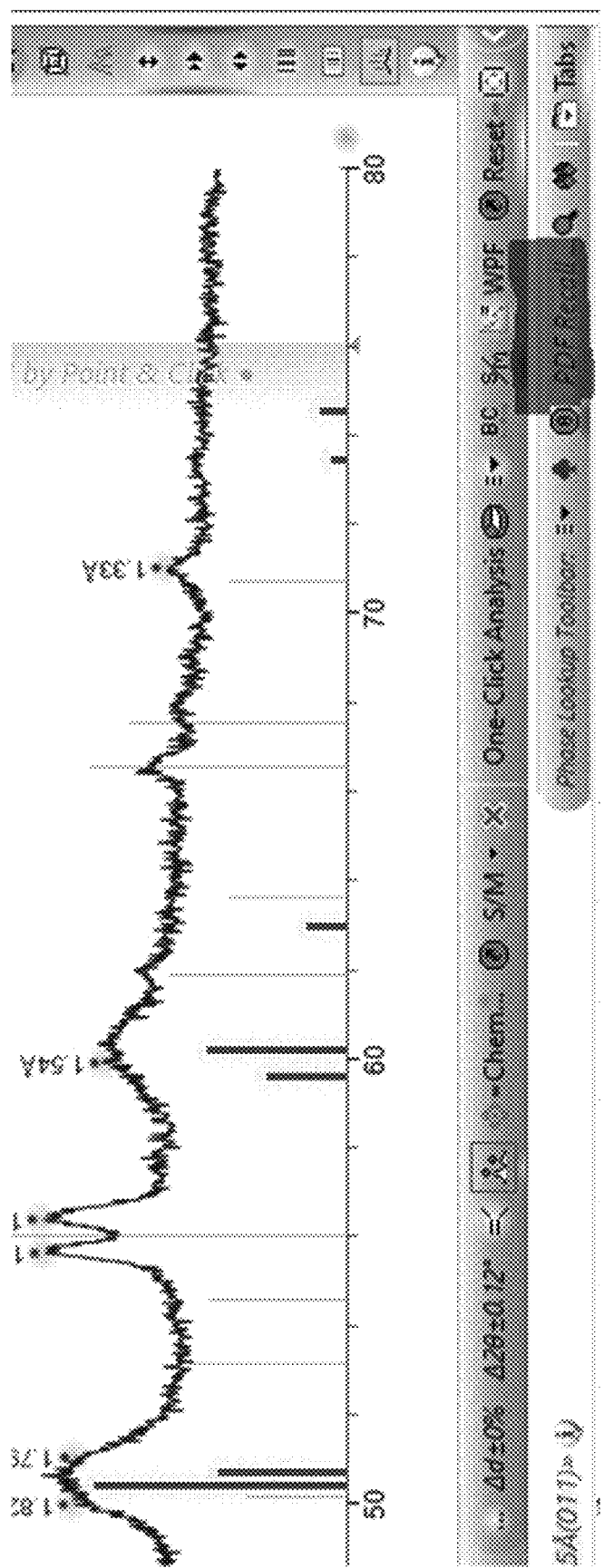
FIG. 14 depicts a window from MDI Jade software used to characterize glass-ceramic articles.

After the sample is scanned by the X-ray diffractometer, the data obtained from the X-ray diffractometer is analyzed using MDI Jade software. A file containing the data from the X-ray diffractometer is opened in MDI Jade. The "Phases" window is used to identify indicator peaks in the data. Table 1 includes indicator peaks for at least some phases that may be present in glass-ceramics comprising jeffbenite. The PDF number for each phase is typed into the "PDF Recall" field. FIG. 14 depicts the location of the PDF Recall field in the Phases window of MDI Jade.

TABLE 1

| Peaks (Angstroms) | Phase | Card Number |
|---|---|---|
| 6.2, 3.2, 2.7 | Jeffbenite | 69-138 |
| 2.95, 2.54, 1.81 | Tetragonal $ZrO_2$ | 50-1089 |
| 3.87, 2.45 | Forsterite | 34-189 |

Figures 15, 16:
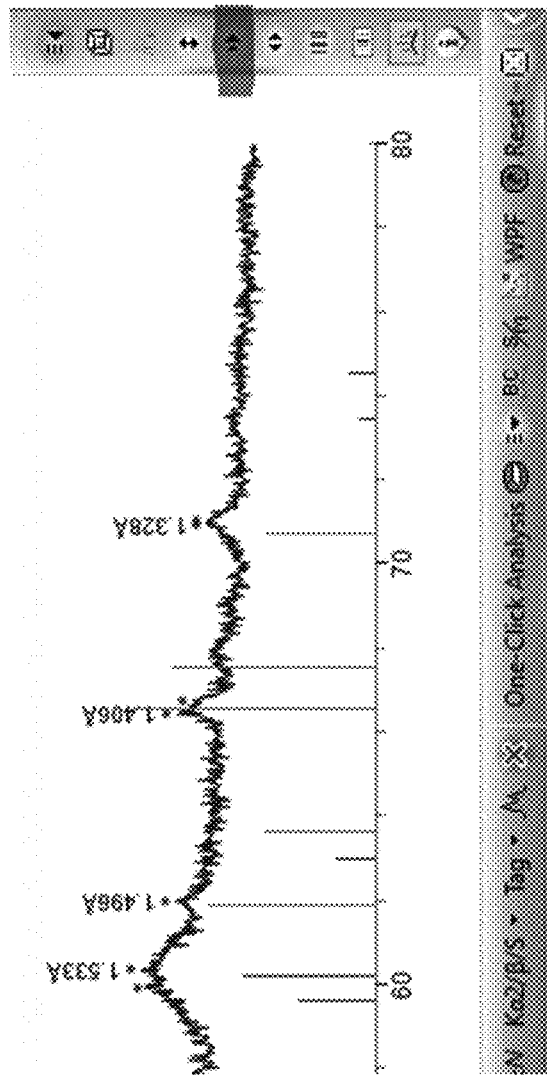
FIG. 15 depicts a window from MDI Jade software used to characterize glass-ceramic articles.
FIG. 16 depicts a window from MDI Jade software used to characterize glass-ceramic articles.

A large number of solid solutions are possible for some phases. The lattice parameter may be scaled so that the card data matches the sample data. To scale the lattice parameters, the name of the phase is selected in the phases tab and ascending size arrows on the right of the main display are selected. The location of the arrows is depicted in FIG. 15. The left and right mouse buttons may be used to increase and decrease the lattice constraints respectively.

The phases listed in Table 1 may be found in glass-ceramic samples comprising jeffbenite. If there are unidentified peaks in the data, the composition of the glass-ceramic and the peak locations may be used to search the PDF-4 database. After all the phases are identified and the lattice is adjusted to match the sample data, the "Assign Phases" functionality on the "Peaks" tab is used. The software lists the peaks and assigns phases to each peak. Some peaks may not have an assigned phase. This is illustrated by peak number 1 in the list of peaks depicted in FIG. 16. If a peak does not include an assigned phase, the peak is evaluated to determine whether it is a real peak or an artifact, either from the instrument or from the peak search algorithm. If the peak is a real peak, the PDF-4 databased is searched manually to match the missing peaks and the chemistry of the sample. While the automated search match programs are robust, the high degree of solid solution in some glass-ceramic articles may be problematic for the automated matching program. Thus, an operator may have to understake the steps described hereinabove.

Figure 17:
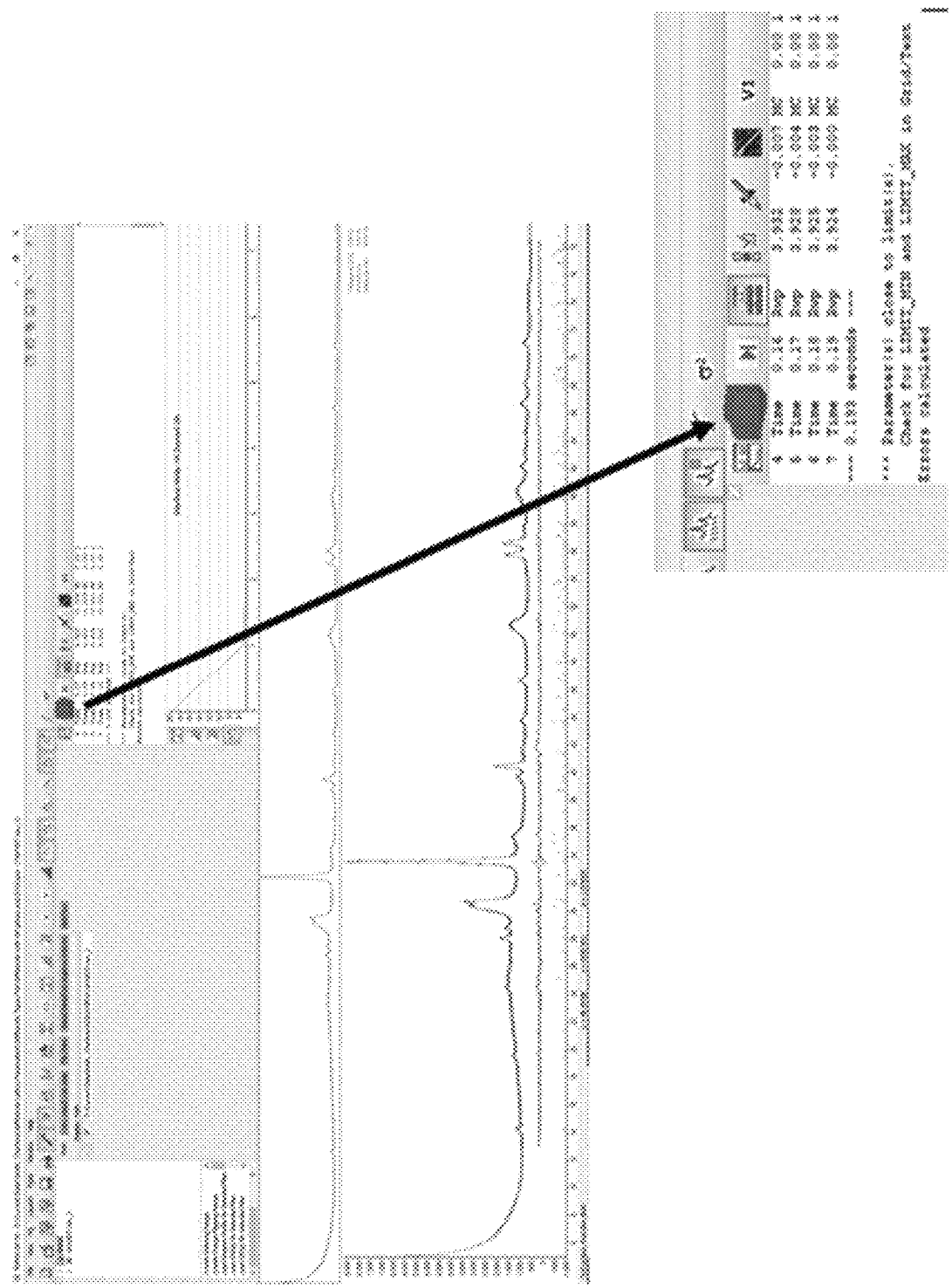
FIG. 17 depicts a window from Bruker Topas software used to characterize glass-ceramic articles.
Figure 18:
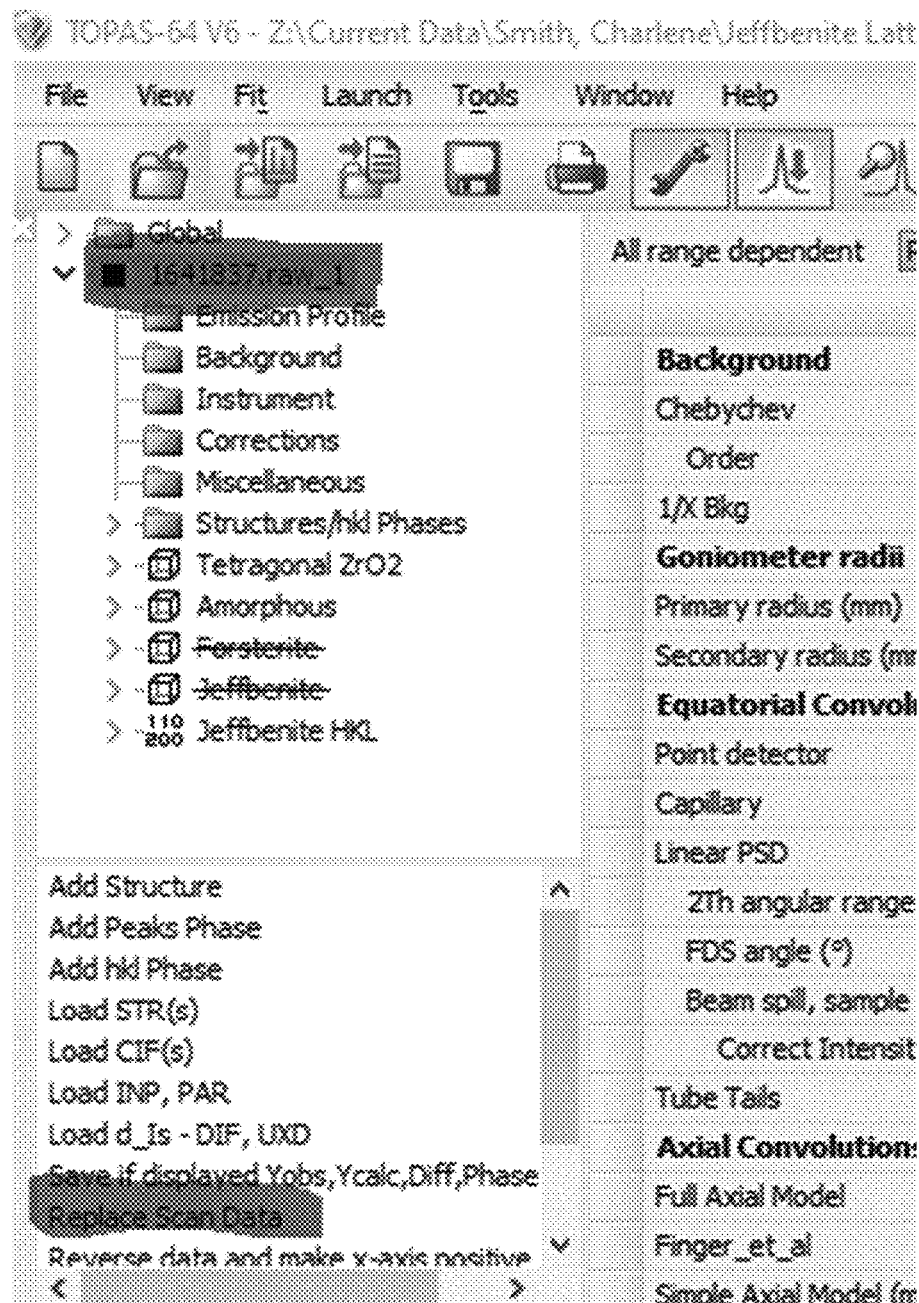
FIG. 18 depicts a window from Bruker Topas software used to characterize glass-ceramic articles.
Figure 19:
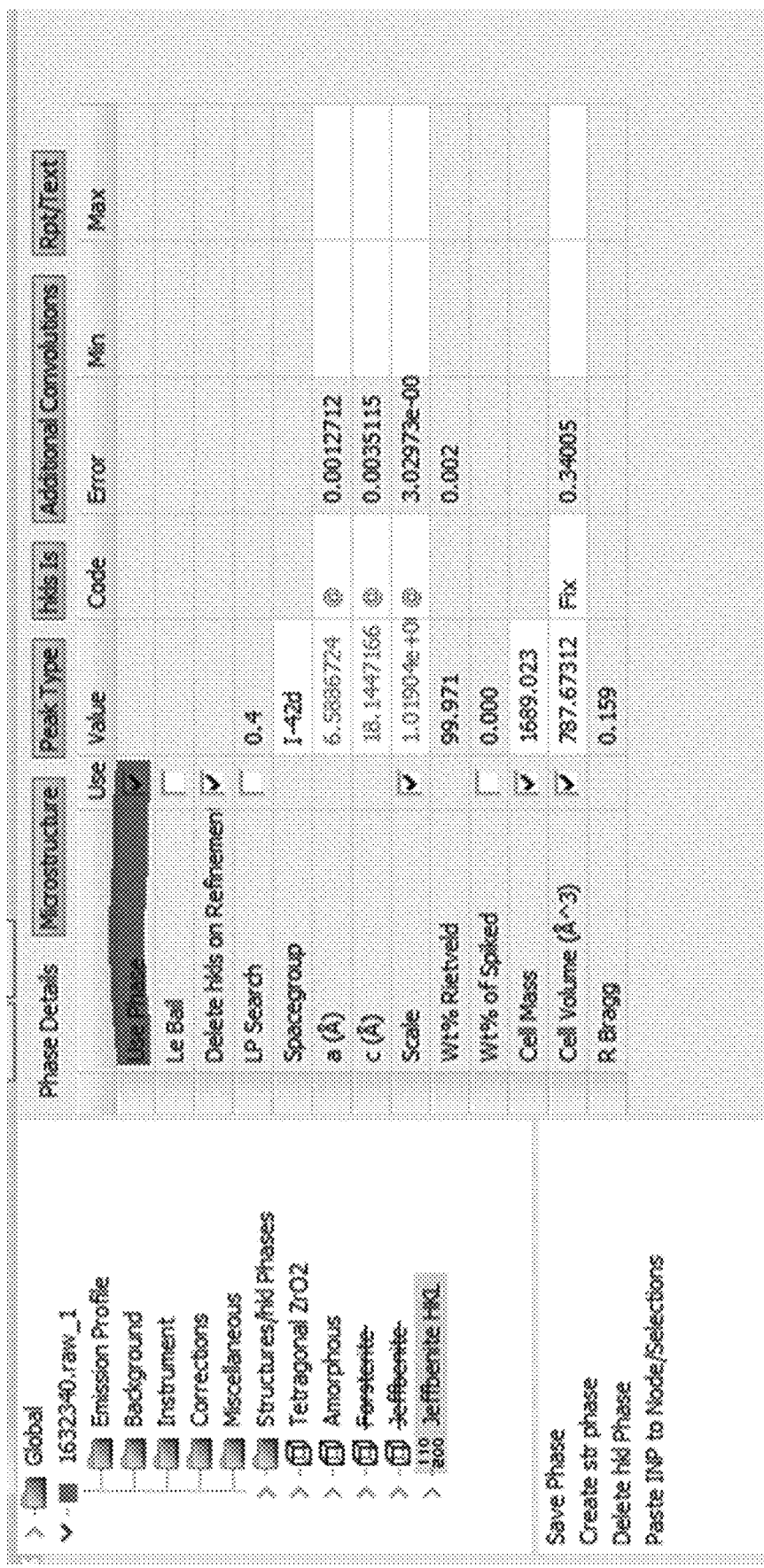
FIG. 19 depicts a window from Bruker Topas software used to characterize glass-ceramic articles.

A Rietveld Analysis is performed to determine lattice constants and cell volume using Topas. The file "Jeffbenite with hkl phase and ZrO2.pro" is opened in Topas. An initial refinement is run by clicking the red run arrow, as shown in FIG. 17. When the refinement converges, the parameters are kept. Then, the scan data from the X-ray diffractometer is loaded into Topas by clicking on the file name at the top of the file tree in the left hand window, selecting "Replace Scan Data," navigating to the folder where the data resides, and double clicking on the file containing the data to load the data. FIG. 18 shows the location of "Replace Scan Data" in Topas. The file tree under the scan may be expanded so that all of the phases are visible. The model is set to represent the phases present in the current sample. This is done by clicking on the phase in the file tree then checking or unchecking the "Use Phase" box in the structure window. If the phase is present, the box is checked, and if the phase is not present, the box is unchecked. The location of the "Use Phase" box is depicted in FIG. 19. The Jeffbenite HKL phase is used in this step if there are no matching structures for the experimental jeffbenite in the database. The lattice parameters and cell volume in the Jeffbenite HKL phase are the best match and are used to characterize jeffbenite in the samples.

Figure 20:
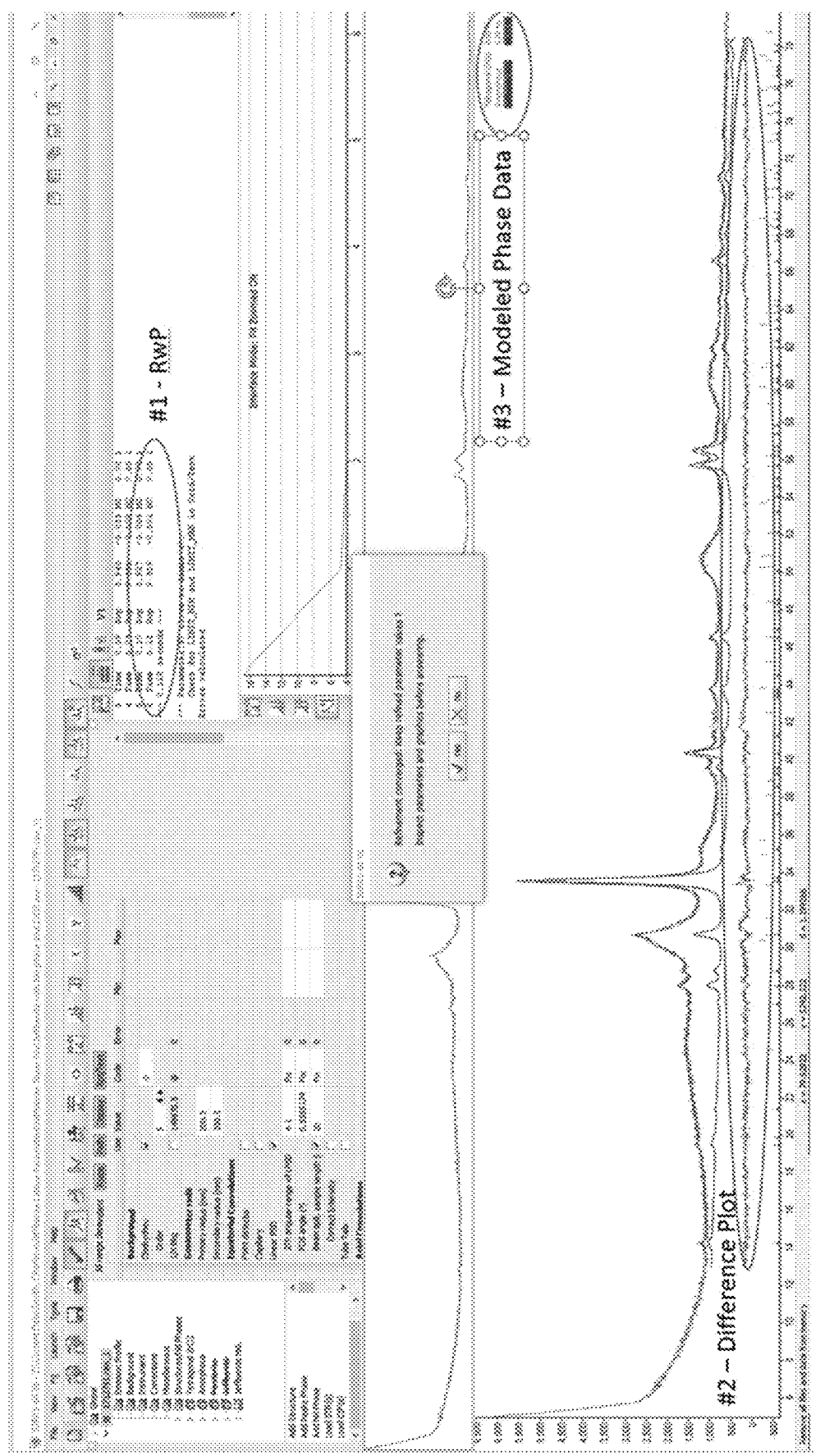
FIG. 20 depicts a window from Bruker Topas software used to characterize glass-ceramic articles.

Once all of the structures and phases are correctly identified for the sample, the red run arrow is clicked, and Topas runs through the refinement until it converges on a solution. After the solution converges, the RwP value, difference plot and Modeled Phase Data are analyzed. The RwP value, Difference Plot, and Modeled Phase Data are depicted in FIG. 20. The RwP value in the upper right window should be less than 5. In the Difference Plot, a curve between experimental data and modeled data (within oval) and stick patterns for the phases is shown. If there are peaks present in the difference curve, there is likely a phase missing. If there is a phase missing, the phase identification step of the analysis is repeated. The Modeled Phase Data is examined to determine if each phase looks reasonable. Reasonable looking phases stay below the background, do not have negative data points, and have peak widths that match experimental data. If the modeled phase data looks unreasonable, then the model is likely stuck in a local minimum. If the model is stuck in a local minimum, the Rietveld Analysis is restarted in Topas. If the RwP value, Difference Plot, and Modeled Phase Data are acceptable, then the lattice constraints and cell volume for jeffbenite are correct, and the lattice constraints and cell volume for the sample are recorded.

In embodiments, the glass-ceramic article may have lattice parameters that correspond to jeffbenite and indicate a jeffbenite crystalline phase is present in the glass-ceramic article. For example, in embodiments, the glass-ceramic article may have an "a" lattice parameter greater than or equal to 6.5 Å and less than or equal to 6.7 Å or even greater than or equal to 6.6 Å and less than or equal to 6.7 Å. In embodiments, the glass-ceramic article may have a "c" lattice parameter greater than or equal to 18.0 Å and less than or equal to 18.5 Å, greater than or equal to 18.1 Å and less than or equal to 18.5 Å, greater than or equal to 18.2 Å and less than or equal to 18.5 Å, greater than or equal to 18.0 Å and less than or equal to 18.4 Å, greater than or equal to 18.1 Å and less than or equal to 18.4 Å, or even greater than or equal to 18.2 and less than or equal to 18.4 Å. In embodiments, the glass-ceramic article may have a lattice volume greater than or equal to 775 Å$^3$ and less than or equal to 825 Å$^3$, greater than or equal to 775 Å$^3$ and less than or equal to 810 Å$^3$, greater than or equal to 790 Å$^3$ and less than or equal to 825 Å$^3$, or even greater than or equal to 790 Å$^3$ and less than or equal to 810 Å$^3$. In embodiments, the glass-ceramic article may have a peak position greater than or equal to 2.55 Å and less than or equal to 2.75 Å, greater than or equal to 2.55 Å and less than or equal to 2.70 Å, greater than or equal to 2.60 Å and less than or equal to 2.75 Å, greater than or equal to 2.60 Å and less than or equal to 2.70 Å, greater than or equal to 2.65 Å and less than or equal to 2.75 Å, or even greater than or equal to 2.65 Å and less than or equal to 2.70 Å.

In embodiments, the glass-ceramic article may have an X-ray diffraction (XRD) spectrum that corresponds to jeffbenite and indicates a jeffbenite crystalline phase is present in the glass-ceramic article. For example, in embodiments, the glass-ceramic article may have an XRD spectrum including a first peak between 2-theta angles of 30° to 32°; a second peak between 2-theta angles of 33° to 35°; a third peak between 2-theta angles of 40° to 42°; and a fourth peak and a fifth peak between 2-theta angles of 55° to 58°, wherein the first, second, third, fourth, and fifth peaks correspond to jeffbenite.

EXAMPLES

In order that various embodiments be more readily understood, reference is made to the following examples, which are intended to illustrate various embodiments of the glass-ceramics described herein.

Table 2 shows example precursor glass compositions AA-DH (in terms of mol. %).

TABLE 2

| | Batched Comp. (mol. %) | | | | | | |
|---|---|---|---|---|---|---|---|
| | AA | AB | AC | AD | AE | AF | AG |
| SiO$_2$ | 54.46 | 50.66 | 41.07 | 52.42 | 48.60 | 45.93 | 52.83 |
| Al$_2$O$_3$ | 9.18 | 8.43 | 13.70 | 11.48 | 9.88 | 11.18 | 9.80 |
| MgO | 23.37 | 28.87 | 41.09 | 25.42 | 32.25 | 35.15 | 25.67 |
| Na$_2$O | 4.65 | 4.25 | 0.00 | 4.63 | 3.23 | 2.09 | 4.06 |
| K$_2$O | 4.75 | 4.26 | 0.00 | 2.36 | 3.16 | 2.10 | 4.10 |

TABLE 2-continued

| | AA | AB | AC | AD | AE | AF | AG |
|---|---|---|---|---|---|---|---|
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $ZrO_2$ | 3.10 | 2.33 | 4.03 | 3.56 | 2.79 | 2.75 | 3.08 |
| $TiO_2$ | 0.37 | 1.08 | 0.00 | 0.00 | 0.00 | 0.71 | 0.37 |
| $P_2O_5$ | 0.00 | 0.00 | 0.00 | 0.00 | 0.00 | 0.00 | 0.00 |
| $SnO_2$ | 0.12 | 0.11 | 0.11 | 0.12 | 0.09 | 0.09 | 0.10 |
| $MnO_2$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $HfO_2$ | 0.00 | 0.00 | 0.00 | 0.00 | 0.00 | 0.00 | 0.00 |
| $Ta_2O_5$ | 0.00 | 0.00 | 0.00 | 0.00 | 0.00 | 0.00 | 0.00 |

| Batched Comp. (mol. %) | | | | | | | |
|---|---|---|---|---|---|---|---|
| | AH | AI | AJ | AK | AL | AM | AN |
| $SiO_2$ | 47.71 | 44.04 | 46.60 | 46.66 | 46.64 | 46.52 | 46.43 |
| $Al_2O_3$ | 11.56 | 7.90 | 11.25 | 11.24 | 11.23 | 11.21 | 11.22 |
| MgO | 32.65 | 44.12 | 33.48 | 33.54 | 33.43 | 33.47 | 33.45 |
| $Na_2O$ | 2.31 | 0.00 | 2.81 | 2.78 | 2.82 | 2.86 | 2.82 |
| $K_2O$ | 2.31 | 0.00 | 1.61 | 0.00 | 0.00 | 0.00 | 0.00 |
| CaO | 0.00 | 0.00 | 0.00 | 1.59 | 0.00 | 0.00 | 0.00 |
| SrO | 0.00 | 0.00 | 0.00 | 0.00 | 1.63 | 0.00 | 0.00 |
| BaO | 0.00 | 0.00 | 0.00 | 0.00 | 0.00 | 1.64 | 0.00 |
| ZnO | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 1.68 |
| $ZrO_2$ | 3.02 | 2.55 | 2.74 | 2.71 | 2.75 | 2.78 | 2.84 |
| $TiO_2$ | 0.36 | 1.31 | 1.41 | 1.39 | 1.41 | 1.43 | 1.46 |
| $P_2O_5$ | 0.00 | 0.00 | 0.00 | 0.00 | 0.00 | 0.00 | 0.00 |
| $SnO_2$ | 0.09 | 0.09 | 0.09 | 0.09 | 0.09 | 0.09 | 0.10 |
| $MnO_2$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $HfO_2$ | 0.00 | 0.00 | 0.00 | 0.00 | 0.00 | 0.00 | 0.00 |
| $Ta_2O_5$ | 0.00 | 0.00 | 0.00 | 0.00 | 0.00 | 0.00 | 0.00 |

| Batched Comp. (mol. %) | | | | | | | |
|---|---|---|---|---|---|---|---|
| | AO | AP | AQ | AR | AS | AT | AU |
| $SiO_2$ | 45.05 | 44.95 | 45.05 | 42.40 | 42.81 | 43.11 | 43.03 |
| $Al_2O_3$ | 9.66 | 9.64 | 9.66 | 11.34 | 12.88 | 12.23 | 12.21 |
| MgO | 37.31 | 29.20 | 29.26 | 36.76 | 35.74 | 36.63 | 27.70 |
| $Na_2O$ | 2.95 | 2.94 | 2.95 | 3.79 | 4.20 | 2.93 | 2.90 |
| $K_2O$ | 1.44 | 1.44 | 1.44 | 0.00 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 8.24 | 0.00 | 0.00 | 0.00 | 0.00 | 8.67 |
| FeO | 0.00 | 0.00 | 8.04 | 0.00 | 0.00 | 0.00 | 0.00 |
| $Li_2O$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $ZrO_2$ | 2.39 | 2.39 | 2.39 | 3.52 | 2.85 | 3.58 | 3.59 |
| $TiO_2$ | 1.11 | 1.10 | 1.11 | 2.11 | 1.44 | 1.44 | 1.45 |
| $P_2O_5$ | 0.00 | 0.00 | 0.00 | 0.00 | 0.00 | 0.00 | 0.00 |
| $SnO_2$ | 0.10 | 0.10 | 0.10 | 0.08 | 0.08 | 0.08 | 0.09 |
| $MnO_2$ | 0.00 | 0.00 | 0.00 | 0.00 | 0.00 | 0.00 | 0.37 |
| $La_2O_3$ | 0.00 | 0.00 | 0.00 | 0.00 | 0.00 | 0.00 | 0.00 |
| $HfO_2$ | 0.00 | 0.00 | 0.00 | 0.00 | 0.00 | 0.00 | 0.00 |
| $Ta_2O_5$ | 0.00 | 0.00 | 0.00 | 0.00 | 0.00 | 0.00 | 0.00 |

| Batched Comp. (mol. %) | | | | | | | |
|---|---|---|---|---|---|---|---|
| | AV | AW | AX | AY | AZ | BA | BB |
| $SiO_2$ | 44.61 | 44.49 | 45.79 | 42.82 | 43.78 | 44.55 | 39.48 |
| $Al_2O_3$ | 8.38 | 7.36 | 10.91 | 11.43 | 11.70 | 9.48 | 10.65 |
| MgO | 38.48 | 27.84 | 33.67 | 39.98 | 37.85 | 36.47 | 36.75 |
| $Na_2O$ | 2.93 | 3.15 | 3.06 | 0.00 | 0.00 | 2.93 | 0.00 |
| $K_2O$ | 0.00 | 0.00 | 0.00 | 0.00 | 0.80 | 1.37 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 7.87 |
| ZnO | 0.00 | 10.69 | 0.00 | 0.00 | 0.00 | 0.00 | 0.00 |
| FeO | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $ZrO_2$ | 3.32 | 4.25 | 4.27 | 4.28 | 4.38 | 3.52 | 3.32 |
| $TiO_2$ | 2.20 | 2.13 | 2.22 | 1.42 | 1.41 | 1.61 | 1.85 |
| $P_2O_5$ | 0.00 | 0.00 | 0.00 | 0.00 | 0.00 | 0.00 | 0.00 |
| $SnO_2$ | 0.08 | 0.08 | 0.08 | 0.08 | 0.08 | 0.08 | 0.09 |
| $MnO_2$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $HfO_2$ | 0.00 | 0.00 | 0.00 | 0.00 | 0.00 | 0.00 | 0.00 |
| $Ta_2O_5$ | 0.00 | 0.00 | 0.00 | 0.00 | 0.00 | 0.00 | 0.00 |

| Batched Comp. (mol. %) | | | | | | | |
|---|---|---|---|---|---|---|---|
| | BC | BD | BE | BF | BG | BH | BI |
| $SiO_2$ | 43.71 | 44.38 | 41.57 | 48.47 | 46.05 | 46.44 | 47.16 |
| $Al_2O_3$ | 13.95 | 14.02 | 10.72 | 9.86 | 11.21 | 11.26 | 11.43 |
| MgO | 32.10 | 22.93 | 27.29 | 32.16 | 35.23 | 33.50 | 34.02 |
| $Na_2O$ | 0.00 | 3.00 | 2.77 | 3.22 | 2.10 | 2.27 | 2.58 |
| $K_2O$ | 4.35 | 1.48 | 1.37 | 3.15 | 2.10 | 2.09 | 1.94 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 8.91 | 11.05 | 0.00 | 0.00 | 0.00 | 0.00 |
| FeO | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $ZrO_2$ | 4.37 | 3.72 | 3.81 | 2.32 | 3.21 | 3.65 | 2.78 |
| $TiO_2$ | 1.44 | 1.50 | 1.38 | 0.71 | 0.00 | 0.70 | 0.00 |
| $P_2O_5$ | 0.00 | 0.00 | 0.00 | 0.00 | 0.00 | 0.00 | 0.00 |
| $SnO_2$ | 0.08 | 0.04 | 0.04 | 0.09 | 0.09 | 0.09 | 0.09 |
| $MnO_2$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $HfO_2$ | 0.00 | 0.00 | 0.00 | 0.00 | 0.00 | 0.00 | 0.00 |
| $Ta_2O_5$ | 0.00 | 0.00 | 0.00 | 0.00 | 0.00 | 0.00 | 0.00 |

| Batched Comp. (mol. %) | | | | | | | |
|---|---|---|---|---|---|---|---|
| | BJ | BK | BL | BM | BN | BO | BP |
| $SiO_2$ | 48.68 | 45.32 | 41.60 | 47.95 | 48.60 | 48.47 | 54.46 |
| $Al_2O_3$ | 10.07 | 8.71 | 9.47 | 11.59 | 9.88 | 9.86 | 9.18 |
| MgO | 32.02 | 38.27 | 45.10 | 31.72 | 32.25 | 32.16 | 23.37 |
| $Na_2O$ | 3.24 | 2.07 | 0.00 | 2.75 | 3.23 | 3.22 | 4.65 |
| $K_2O$ | 3.11 | 2.05 | 0.00 | 1.81 | 3.16 | 3.15 | 4.75 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $ZrO_2$ | 2.79 | 2.09 | 2.31 | 2.31 | 2.79 | 2.32 | 3.10 |
| $TiO_2$ | 0.00 | 1.39 | 1.42 | 1.78 | 0.00 | 0.71 | 0.37 |
| $P_2O_5$ | 0.00 | 0.00 | 0.00 | 0.00 | 0.00 | 0.00 | 0.00 |
| $SnO_2$ | 0.10 | 0.10 | 0.09 | 0.09 | 0.09 | 0.09 | 0.12 |
| $MnO_2$ | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 |
| $HfO_2$ | 0.00 | 0.00 | 0.00 | 0.00 | 0.00 | 0.00 | 0.00 |
| $Ta_2O_5$ | 0.00 | 0.00 | 0.00 | 0.00 | 0.00 | 0.00 | 0.00 |

| Batched Comp. (mol. %) | | | | | | | |
|---|---|---|---|---|---|---|---|
| | BQ | BR | BS | BT | BU | BV | BW |
| $SiO_2$ | 54.46 | 50.66 | 50.66 | 48.01 | 43.73 | 48.68 | 46.60 |
| $Al_2O_3$ | 9.18 | 8.61 | 8.99 | 10.07 | 11.25 | | |
| MgO | 23.37 | 28.87 | 28.87 | 33.64 | 39.55 | 32.02 | 33.48 |
| $Na_2O$ | 4.65 | 4.25 | 4.25 | 3.18 | 2.36 | 3.24 | 2.81 |
| $K_2O$ | 4.75 | 4.26 | 4.26 | 3.11 | 2.17 | 3.11 | 1.61 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 |
| $ZrO_2$ | 3.10 | 2.33 | 2.33 | 2.23 | 2.37 | 2.79 | 2.74 |
| $TiO_2$ | 0.37 | 1.08 | 1.08 | 1.12 | 0.73 | 0.00 | 1.41 |
| $P_2O_5$ | 0.00 | 0.00 | 0.00 | 0.00 | 0.00 | 0.00 | 0.00 |

TABLE 2-continued

| | BX | BY | BZ | CA | CB | CC | CD |
|---|---|---|---|---|---|---|---|
| SnO$_2$ | 0.12 | 0.11 | 0.11 | 0.10 | 0.10 | 0.10 | 0.09 |
| MnO$_2$ | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 0.00 |
| HfO$_2$ | 0.00 | 0.00 | 0.00 | 0.00 | 0.00 | 0.00 | 0.00 |
| Ta$_2$O$_5$ | 0.00 | 0.00 | 0.00 | 0.00 | 0.00 | 0.00 | 0.00 |

Batched Comp (mol. %)

| | BX | BY | BZ | CA | CB | CC | CD |
|---|---|---|---|---|---|---|---|
| SiO$_2$ | 45.05 | 42.81 | 42.40 | 42.86 | 54.46 | 54.46 | 54.43 |
| Al$_2$O$_3$ | 9.66 | 12.88 | 11.34 | 11.45 | 9.18 | 9.18 | 9.18 |
| MgO | 29.26 | 35.74 | 36.76 | 37.06 | 23.37 | 23.37 | 23.36 |
| Na$_2$O | 2.95 | 4.20 | 3.79 | 0.00 | 4.65 | 4.65 | 4.10 |
| K$_2$O | 1.44 | 0.00 | 0.00 | 2.87 | 4.75 | 4.75 | 5.33 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 8.04 | 0.00 | 0.00 | 0.00 | 0.00 | 0.00 | 0.00 |
| FeO | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 |
| ZrO$_2$ | 2.39 | 2.85 | 3.52 | 4.29 | 3.10 | 3.10 | 3.11 |
| TiO$_2$ | 1.11 | 1.44 | 2.11 | 1.39 | 0.37 | 0.37 | 0.37 |
| P$_2$O$_5$ | 0.00 | 0.00 | 0.00 | 0.00 | 0.00 | 0.00 | 0.00 |
| SnO$_2$ | 0.10 | 0.08 | 0.08 | 0.08 | 0.12 | 0.12 | 0.12 |
| MnO$_2$ | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 0.00 |
| HfO$_2$ | 0.00 | 0.00 | 0.00 | 0.00 | 0.00 | 0.00 | 0.00 |
| Ta$_2$O$_5$ | 0.00 | 0.00 | 0.00 | 0.00 | 0.00 | 0.00 | 0.00 |

Batched Comp (mol. %)

| | CE | CF | CG | CH | CI | CJ | CK |
|---|---|---|---|---|---|---|---|
| SiO$_2$ | 50.47 | 45.94 | 53.07 | 52.38 | 50.37 | 54.46 | 50.47 |
| Al$_2$O$_3$ | 9.67 | 10.94 | 9.34 | 9.43 | 9.61 | 9.18 | 9.67 |
| MgO | 29.52 | 33.33 | 25.33 | 26.34 | 29.21 | 23.37 | 29.52 |
| Na$_2$O | 3.68 | 2.98 | 4.35 | 4.23 | 3.68 | 4.65 | 3.68 |
| K$_2$O | 1.70 | 1.31 | 3.72 | 3.18 | 1.70 | 4.75 | 1.70 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 |
| ZrO$_2$ | 4.10 | 4.65 | 3.56 | 3.80 | 3.80 | 3.10 | 4.10 |
| TiO$_2$ | 0.77 | 0.77 | 0.55 | 0.55 | 1.54 | 0.37 | 0.77 |
| P$_2$O$_5$ | 0.00 | 0.00 | 0.00 | 0.00 | 0.00 | 0.00 | 0.00 |
| SnO$_2$ | 0.08 | 0.08 | 0.08 | 0.08 | 0.08 | 0.12 | 0.08 |
| MnO$_2$ | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 0.00 |
| HfO$_2$ | 0.00 | 0.00 | 0.00 | 0.00 | 0.00 | 0.00 | 0.00 |
| Ta$_2$O$_5$ | 0.00 | 0.00 | 0.00 | 0.00 | 0.00 | 0.00 | 0.00 |

Batched Comp (mol. %)

| | CL | CM | CN | CO | CP | CQ | CR |
|---|---|---|---|---|---|---|---|
| SiO$_2$ | 46.60 | 53.07 | 52.38 | 50.37 | 43.50 | 42.96 | 47.47 |
| Al$_2$O$_3$ | 11.25 | 9.34 | 9.43 | 9.61 | 11.38 | 11.36 | 11.17 |
| MgO | 33.48 | 25.33 | 26.34 | 29.21 | 36.80 | 36.79 | 27.78 |
| Na$_2$O | 2.81 | 4.35 | 4.23 | 3.68 | 3.76 | 3.78 | 3.84 |
| K$_2$O | 1.6 | 3.72 | 3.18 | 1.70 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 5.69 |
| FeO | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 |
| ZrO$_2$ | 2.74 | 3.56 | 3.80 | 3.80 | 3.01 | 3.26 | 2.84 |
| TiO$_2$ | 1.41 | 0.55 | 0.55 | 1.54 | 1.50 | 1.80 | 1.17 |
| P$_2$O$_5$ | 0.00 | 0.00 | 0.00 | 0.00 | 0.00 | 0.00 | 0.00 |
| SnO$_2$ | 0.09 | 0.08 | 0.08 | 0.08 | 0.04 | 0.04 | 0.04 |
| MnO$_2$ | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 0.00 |
| HfO$_2$ | 0.00 | 0.00 | 0.00 | 0.00 | 0.00 | 0.00 | 0.00 |
| Ta$_2$O$_5$ | 0.00 | 0.00 | 0.00 | 0.00 | 0.00 | 0.00 | 0.00 |

Batched Comp (mol. %)

| | CS | CT | CU | CV | CW | CX | CY |
|---|---|---|---|---|---|---|---|
| SiO$_2$ | 46.17 | 57.23 | 54.37 | 51.08 | 47.18 | 53.76 | 53.76 |
| Al$_2$O$_3$ | 11.00 | 3.12 | 9.16 | 10.41 | 11.86 | 11.84 | 10.52 |
| MgO | 29.39 | 18.96 | 23.33 | 28.07 | 32.98 | 18.78 | 21.19 |
| Na$_2$O | 3.22 | 10.27 | 4.65 | 3.46 | 2.58 | 6.11 | 5.28 |
| K$_2$O | 0.00 | 0.00 | 4.74 | 3.45 | 1.82 | 5.75 | 5.25 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 5.97 | 0.00 | 0.00 | 0.00 | 0.00 | 0.00 | 0.00 |
| FeO | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 |
| ZrO$_2$ | 3.04 | 8.78 | 1.43 | 3.06 | 2.78 | 2.81 | 3.07 |
| TiO$_2$ | 1.17 | 1.59 | 2.21 | 0.36 | 0.71 | 0.82 | 0.80 |
| P$_2$O$_5$ | 0.00 | 0.00 | 0.00 | 0.00 | 0.00 | 0.00 | 0.00 |
| SnO$_2$ | 0.04 | 0.04 | 0.12 | 0.10 | 0.09 | 0.13 | 0.13 |
| MnO$_2$ | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 0.00 |
| HfO$_2$ | 0.00 | 0.00 | 0.00 | 0.00 | 0.00 | 0.00 | 0.00 |
| Ta$_2$O$_5$ | 0.00 | 0.00 | 0.00 | 0.00 | 0.00 | 0.00 | 0.00 |

Batched Comp (mol. %)

| | CZ | DA | DB | DC | DD | DE | DF |
|---|---|---|---|---|---|---|---|
| SiO$_2$ | 39.99 | 52.39 | 48.51 | 52.21 | 53.50 | 42.91 | 50.90 |
| Al$_2$O$_3$ | 6.71 | 9.45 | 11.88 | 9.40 | 10.40 | 8.54 | 9.80 |
| MgO | 46.60 | 26.40 | 26.36 | 26.25 | 21.20 | 37.05 | 29.8 |
| Na$_2$O | 0.00 | 3.76 | 3.76 | 3.74 | 5.20 | 2.92 | 2.70 |
| K$_2$O | 0.00 | 3.74 | 3.30 | 3.72 | 5.20 | 0.00 | 2.70 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 |
| ZrO$_2$ | 4.01 | 3.07 | 3.78 | 3.66 | 3.00 | 4.29 | 2.10 |
| TiO$_2$ | 2.70 | 0.00 | 0.81 | 0.94 | 0.80 | 1.43 | 0.00 |
| P$_2$O$_5$ | 0.00 | 1.11 | 1.51 | 0.00 | 0.00 | 0.00 | 0.00 |
| SnO$_2$ | 0.00 | 0.08 | 0.09 | 0.08 | 0.10 | 0.00 | 0.10 |
| MnO$_2$ | 0.00 | 0.00 | 0.00 | 0.00 | 0.00 | 0.00 | 0.00 |
| La$_2$O$_3$ | 0.00 | 0.00 | 0.00 | 0.00 | 0.60 | 2.86 | 0.00 |
| HfO$_2$ | 0.00 | 0.00 | 0.00 | 0.00 | 0.00 | 0.00 | 1.90 |
| Ta$_2$O$_5$ | 0.00 | 0.00 | 0.00 | 0.00 | 0.00 | 0.00 | 0.00 |

Batched Comp (mol. %)

| | DG | DH |
|---|---|---|
| SiO$_2$ | 50.80 | 57.67 |
| Al$_2$O$_3$ | 9.80 | 11.72 |
| MgO | 29.80 | 15.07 |
| Na$_2$O | 2.70 | 7.03 |
| K$_2$O | 2.70 | 4.69 |
| CaO | 0.00 | 0.00 |
| SrO | 0.00 | 0.00 |
| BaO | 0.00 | 0.00 |
| ZnO | 0.00 | 0.00 |
| FeO | 0.00 | 0.00 |
| Li$_2$O | 0.00 | 0.00 |
| Y$_2$O$_3$ | 1.00 | 0.00 |
| ZrO$_2$ | 2.10 | 3.70 |
| TiO$_2$ | 0.00 | 0.00 |
| P$_2$O$_5$ | 0.00 | 0.00 |
| SnO$_2$ | 0.10 | 0.13 |
| MnO$_2$ | 0.00 | 0.00 |
| La$_2$O$_3$ | 0.00 | 0.00 |
| HfO$_2$ | 0.00 | 0.00 |
| Ta$_2$O$_5$ | 1.00 | 0.00 |

Individual samples were formed by melting a batch of constituent components to form the precursor glass having the indicated composition. The molten precursor glass was then poured into a steel mold and cooled to form pucks. Pucks of the precursor glass were sectioned and then heat treated to form the glass-ceramic. Samples of the glass-ceramic were approximately 1 cm thick (unless otherwise specified).

Properties of the glass-ceramics were determined, including the crystalline phases, the appearance of the sample, the % volume decrease upon crystallization of the sample (i.e., the shrinkage), the precursor glass density, the glass-ceramic (GC) density, the % increase in density, the elastic modulus, the Shear Modulus, Poisson's ratio, fracture toughness, and Vickers hardness. The crystalline phases of the glass-ceramics were determined by the "Jeffbenite Characterization Method" described hereinabove. The ceram schedule for achieving the glass-ceramics GC1-GC97 and the respective properties of the glass-ceramics are shown in Tables 3-6.

Figure 30:
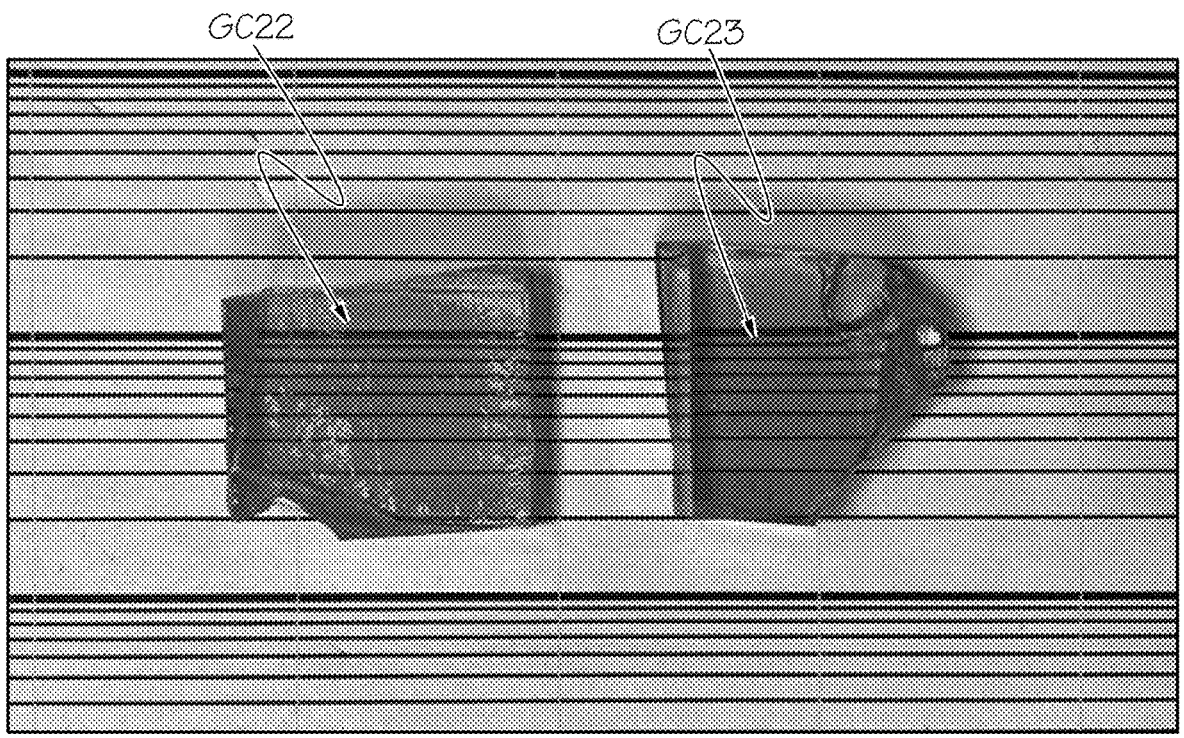
FIG. 30 is a photograph of transparent glass-ceramic articles comprising a crystalline phase having a jeffbenite crystalline structure.

When describing the appearance of the samples, the term "white" refers to glass-ceramics that were white and opaque. The term "opal" refers to glass-ceramics that were white and slightly translucent. The term "transparent opal" refers to glass-ceramics that were white but more translucent. Additionally, some samples listed in Tables 3-6 were transparent, such as the glass-ceramics GC22 and GC23 formed from Batched Comp. CX and Batched Comp. CY as shown in FIG. 30.

Tables 3-6 include several samples of glass-ceramics that include jeffbenite. Tables 3-6 also includes comparative examples, where the crystalline phase does not include jeffbenite. For example, some compositions in Tables 3-6 (i.e., Batched Comp. AE, BI, BN, etc.) include $ZrO_2$ as the crystalline phase and no jeffbenite is present.

TABLE 3

| Glass-ceramic | GC1 | GC2 | GC3 | GC4 | GC5 | GC6 |
|---|---|---|---|---|---|---|
| Batched Comp. | AA | AA | AA | AB | AB | AV |
| Ceram Schedule (Temperature ° C.-Hours) | 780-4, 850-4 | 850-4 | 800-4, 925-4 | 725-4, 850-4 | 800-4, 925-4 | 800-4, 900-4 |
| Crystalline Phase | Jeffbentie | Jeffbenite | Jeffbenite, $ZrO_2$ | Jeffbenite | — | Jeffbenite, Mg-Titanate |
| Appearance | Transparent | — | Opaque | Translucent | Opaque | White |

| Glass-ceramic | GC7 | GC8 | GC9 | GC10 | GC11 | GC12 |
|---|---|---|---|---|---|---|
| Batched Comp. | AX | BA | BB | BE | CG | CH |
| Ceram Schedule (Temperature ° C.-Hours) | 780-4, 850-4 | 780-4, 850-4 | 780-4, 850-4 | 740-4, 790-4 | 780-4, 850-4 | 780-4, 850-4 |
| Crystalline Phase | Jeffbenite, $ZrO_2$ | Jeffbenite, $ZrO_2$ | Jeffbenite | Jeffbenite, $ZrO_2$ | Jeffbenite | Jeffbenite |
| Appearance | Translucent | Opal | — | Opal to Translucent | Translucent, Opal | Translucent, Opal |

| Glass-ceramic | GC13 | GC14 | GC15 | GC16 | GC17 | GC18 |
|---|---|---|---|---|---|---|
| Batched Comp. | CI | CP | CQ | CR | CS | CT |
| Ceram Schedule (Temperature ° C.-Hours) | 750-4, 825-4 | 780-4, 850-4 | 780-4, 850-4 | 780-4, 850-4 | 780-4, 850-4 | 780-4, 850-4 |
| Crystalline Phase | Jeffbenite | Jeffbenite, $ZrO_2$ | Jeffbenite, $ZrO_2$ | None (Glass only) | None (Glass only) | $ZrO_2$ |
| Appearance | Translucent | Opaque | Opaque | — | — | — |

| Glass-ceramic | GC19 | GC20 | GC21 | GC22 | GC23 | GC24 |
|---|---|---|---|---|---|---|
| Batched Comp. | CU | CV | CW | CX | CY | CZ |
| Ceram Schedule (Temperature ° C.-Hours) | 725-4, 850-2 | 750-4, 850-4 | 800-4, 850-4 | 780-4, 850-4 | 780-4, 850-4 | 780-4, 850-4 |
| Crystalline Phase | Jeffbenite | Jeffbenite | Jeffbenite | Jeffbenite | Jeffbenite | Jeffbenite |
| Appearance | — | — | — | Transparent | Transparent | — |

| Glass-ceramic | GC25 | GC26 | GC98 | GC99 | GC100 | GC101 |
|---|---|---|---|---|---|---|
| Batched Comp. | DA | DB | DD | DE | DF | DG |
| Ceram Schedule (Temperature ° C.-Hours) | 780-4, 850-4 | 780-4, 850-4 | 780-4, 850-4 | 780-4, 850-4 | 780-4, 850-4 | 780-4, 850-4 |
| Crystalline Phase | Jeffbenite | Jeffbenite | Jeffbenite | Jeffbenite | Jeffbenite, $ZrO_2$ | Jeffbenite, $ZrO_2$ |
| Appearance | — | — | Transparent with Haze | Opaque | Opaque | Opaque |

TABLE 4

| Glass-ceramic | GC27 | GC28 | GC29 | GC30 | GC31 | GC32 |
|---|---|---|---|---|---|---|
| Batched Comp. | AF | AG | AH | AK | AL | AM |
| Ceram Schedule (Temperature ° C.-Hours) | 750-4, 800-4 | 765-6, 825-2 | 765-4, 800-6 | 800-4, 900-4 | 800-4, 900-4 | 780-4, 850-4 |
| Crystalline Phase | — | Jeffbenite, $ZrO_2$ | Jeffbenite | Jeffbenite | Jeffbenite | Jeffbenite |
| Appearance | — | Translucent | Hazy Transparent | Transparent Areas | Translucent | Translucent |
| % Volume Decrease on Crystallization | −2.66 | −7.74 | −19.11 | −14.66 | −11.73 | −48.41 |

| Glass-ceramic | GC33 | GC34 | GC35 | GC36 | GC37 | GC38 |
|---|---|---|---|---|---|---|
| Batched Comp. | AN | AP | AU | AW | BC | BD |
| Ceram Schedule (Temperature ° C.-Hours) | 800-4, 900-4 | 750-4, 800-4 | — | — | 780-4, 850-4 | 740-4, 790-4 |
| Crystalline Phase | Jeffbenite, $Y_2ZrO_5$ | Jeffbenite | — | — | Jeffbenite, $ZrO_2$ | Jeffbenite, $Mg_2Zr_5O_{12}$ |
| Appearance | Opaque | White Opaque | — | — | — | Translucent |
| % Volume Decrease on Crystallization | −17.09 | −10.86 | −17.3 | −9.92 | −22.49 | −14.03 |

TABLE 5

| Glass-ceramic | GC39 | GC40 | GC41 | GC42 | GC43 | GC44 |
|---|---|---|---|---|---|---|
| Batched Comp. | BH | BI | BJ | BK | BL | BS |
| Ceram Schedule (Temperature ° C.-Hours) | 780-4, 900-4 | 780-4, 850-4 | 780-4, 900-4 | 780-4, 900-4 | 780-4, 850-4 | 775-4, 850-4 |
| Crystalline Phase | — | $ZrO_2$ | Jeffbenite | Jeffbenite | Jeffbenite | Jeffbenite |
| Appearance | — | Translucent | Opaque, White | Opaque, White | Opaque, White | Opaque, White |
| Glass Density (g/cm³) | 2.76 | 2.74 | 2.722 | 2.78 | 2.898 | 2.677 |
| Glass-ceramic Density (g/cm³) | 2.96 | 2.74 | 2.85 | 2.97 | 2.97 | — |

| Glass-ceramic | GC45 | GC46 | GC47 | GC48 | GC49 | GC50 |
|---|---|---|---|---|---|---|
| Batched Comp. | CE | CF | CJ | CK | CL | CM |
| Ceram Schedule (Temperature ° C.-Hours) | 780-4, 850-4 | 780-4, 850-4 | 725-4, 850-2 | 780-4, 850-4 | 800-4, 900-4 | 780-4, 850-4 |
| Crystalline Phase | Jeffbenite | Jeffbenite | Jeffbenite | Jeffbenite | Jeffbenite | Jeffbenite |
| Appearance | Opaque | Opaque | Translucent | Opaque, Opal | Opaque, White | Translucent, Opal |
| Glass Density (g/cm³) | 2.753 | 2.827 | 2.65 | 2.753 | 2.75 | 2.686 |
| Glass-ceramic Density (g/cm³) | 2.884 | 3.021 | 2.712 | 2.902 | 2.926 | 2.767 |

| Glass-ceramic | GC51 | GC52 |
|---|---|---|
| Batched Comp. | CN | CO |
| Ceram Schedule (Temperature ° C.-Hours) | 780-4, 850-4 | 780-4, 850-4 |
| Crystalline Phase | Jeffbenite | Jeffbenite |
| Appearance | Translucent, Opal | — |
| Glass Density (g/cm³) | 2.705 | 2.753 |
| Glass-ceramic Density (g/cm³) | 2.796 | 2.886 |

TABLE 6

| Glass-ceramic | GC53 | GC54 | GC55 | GC56 | GC57 | GC58 |
|---|---|---|---|---|---|---|
| Batched Comp. | AA | AA | AE | AE | AE | AF |
| Ceram Schedule (Temperature ° C.-Hours) | 725-4, 850-2 | 780-4, 900-4 | 750-4, 800-4 | 750-4, 825-4 | 750-4, 850-4 | 750-4. 825-4 |
| Crystalline Phase | Jeffbenite, ZrO$_2$ | — | ZrO$_2$ | — | — | Jeffbenite |
| Appearance | Translucent | — | Translucent | — | — | Opaque |
| % Volume Decrease on Crystallization | −5.16 | — | −6.99 | — | −3.6 | — |
| Glass Density (g/cm$^3$) | 2.6409 | — | 2.721 | — | — | — |
| Glass-ceramic Density (g/cm$^3$) | 2.72 | 2.6843 | — | 2.823 | 2.818 | 2.841 |
| % Increase | 2.64 | — | — | — | — | — |
| Glass-ceramic Mohs' Hardness | 7.5 | 7.5 | — | 7.5 | 7.5 | 7.5 |
| Elastic Modulus (GPa) | 90.39 | — | 93.3583 | — | — | 112.87115 |
| Shear Modulus (GPa) | 37.51 | — | 37.30195 | — | — | 45.2312 |
| Poisson's Ratio | 0.21 | — | 0.252 | — | — | 0.248 |
| Fracture Toughness (MPa√m) | 0.85 | — | — | — | — | — |
| Vickers Hardness (Kgf/mm$^2$) | 680.9 | — | — | — | — | — |
| Refractive Index | — | — | — | — | — | — |

| Glass-ceramic | GC59 | GC60 | GC61 | GC62 | GC63 | GC64 |
|---|---|---|---|---|---|---|
| Batched Comp. | AF | AI | AJ | AO | AQ | AR |
| Ceram Schedule (Temperature ° C.-Hours) | 750-4, 850-4 | 800-4, 900-4 | 800-4, 900-4 | 780-4, 850-4 | 780-4, 850-4 | 780-4, 850-4 |
| Crystalline Phase | — | Jeffbenite, Enstatite | Jeffbenite | Jeffbenite | Jeffbenite | Jeffbenite |
| Appearance | — | White Opal | Opaque White | Translucent Opal | Black | Translucent |
| % Volume Decrease on Crystallization | −6.89 | −10.43 | −7.02 | −22.13 | −6.98 | −4.89 |
| Glass Density (g/cm$^3$) | — | 2.76 | 2.762 | 2.92 | 2.86 | 2.8 |
| Glass-ceramic Density (g/cm$^3$) | 2.948 | 2.95 | 2.947 | 2.98 | 3.06 | 2.98 |
| % Increase | — | 6.7 | — | 2.05 | 6.99 | 6.43 |
| Glass-ceramic Mohs' Hardness | 7.5 | — | — | — | — | — |
| Elastic Modulus (GPa) | — | 120.94 | 120.9383 | — | 132.8 | 124.94 |
| Shear Modulus (GPa) | — | 49.02 | 49.02345 | — | 53.57 | 50.33 |
| Poisson's Ratio | — | 0.23 | 0.234 | — | 0.24 | 0.24 |
| Fracture Toughness (MPa√m) | — | 1.11 | 1.11 | — | — | — |
| Vickers Hardness (Kgf/mm$^2$) | — | — | 827 | — | — | 918 |
| Refractive Index | — | — | — | — | — | — |

| Glass-ceramic | GC65 | GC66 | GC67 | GC68 | GC69 | GC70 |
|---|---|---|---|---|---|---|
| Batched Comp. | AR | AS | AS | AY | AZ | BF |
| Ceram Schedule (Temperature ° C.-Hours) | 780-4, 850-4 | 780-4, 850-5 | 780-4, 850-5 | 780-4, 875-4 | 780-4, 850-4 | 750-4, 800-4 |
| Crystalline Phase | Jeffbenite | Jeffbenite, ZrO$_2$ | Jeffbenite | Jeffbenite, Unknown Phase, ZrO$_2$ | Jeffbenite, ZrO$_2$ | Jeffbenite |
| Appearance | Translucent Opal | White Opal | Opaque White | Grey-white | Translucent to Transparent | Translucent |
| % Volume Decrease on Crystallization | — | — | — | — | −5.4 | −1.41 |
| Glass Density (g/cm$^3$) | 2.855 | — | 2.803 | 2.86 | — | 2.718 |
| Glass-ceramic Density (g/cm$^3$) | 3.06 | — | 2.983 | 3.1 | — | — |
| % Increase | — | — | — | 8.22 | — | — |
| Glass-ceramic Mohs' Hardness | — | — | — | — | — | — |

TABLE 6-continued

| | | | | | | |
|---|---|---|---|---|---|---|
| Elastic Modulus (GPa) | 132.7977 | — | 124.9374 | — | — | 96.8058 |
| Shear Modulus (GPa) | 53.57415 | — | 50.3335 | — | — | 38.68095 |
| Poisson's Ratio | 0.239 | — | 0.241 | — | — | 0.25 |
| Fracture Toughness (MPa√m) | 1.02 | — | 1.04 | — | — | — |
| Vickers Hardness (Kgf/mm$^2$) | 940 | 819 | 832 | — | 961 | — |
| Refractive Index | — | — | — | — | — | — |

| Glass-ceramic | GC71 | GC72 | GC73 | GC74 | GC75 | GC76 |
|---|---|---|---|---|---|---|
| Batched Comp. | BF | BF | BG | BG | BG | BH |
| Ceram Schedule (Temperature ° C.-Hours) | 750-4, 825-4 | 750-4, 850-4 | 750-4, 850-4 | 750-4, 800-4 | 750-4, 825-4 | 770-4, 820-4 |
| Crystalline Phase | Jeffbenite | — | Jeffbenite, ZrO$_2$ | — | — | Jeffbenite |
| Appearance | — | — | Opaque, White | — | — | Opaque, White |
| % Volume Decrease on Crystallization | — | −6.67 | −6.47 | −4.75 | — | −4.15 |
| Glass Density (g/cm$^3$) | 2.718 | 2.718 | 2.771 | 2.771 | 2.771 | 2.76 |
| Glass-ceramic Density (g/cm$^3$) | 2.802 | 2.841 | 2.951 | — | 2.782 | 2.88 |
| % Increase | — | — | — | — | — | — |
| Glass-ceramic Mohs' Hardness | 7.5 | 7.5 | 7.5 | — | 7.5 | — |
| Elastic Modulus (GPa) | — | — | — | — | — | — |
| Shear Modulus (GPa) | — | — | — | — | — | — |
| Poisson's Ratio | — | — | — | — | — | — |
| Fracture Toughness (MPa√m) | — | — | — | — | — | — |
| Vickers Hardness (Kgf/mm$^2$) | — | — | — | — | — | — |
| Refractive Index | — | — | — | — | — | — |

| Glass-ceramic | GC77 | GC78 | GC79 | GC80 | GC81 | GC82 |
|---|---|---|---|---|---|---|
| Batched Comp. | BH | BM | BN | BO | BP | BQ |
| Ceram Schedule (Temperature ° C.-Hours) | 760-4, 800-4 | 780-4, 900-4 | 750-4, 800-4 | 750-4, 800-4 | 725-4, 850-4 | 725-4, 850-4 |
| Crystalline Phase | — | Jeffbenite | ZrO$_2$ | Jeffbenite | Jeffbenite | Jeffbenite |
| Appearance | — | Opaque, White | Translucent | Translucent | Translucent | Translucent |
| % Volume Decrease on Crystallization | −1.78 | — | — | — | — | — |
| Glass Density (g/cm$^3$) | 2.76 | 2.741 | — | — | 2.648 | 2.647 |
| Glass-ceramic Density (g/cm$^3$) | — | 2.925 | — | — | 2.718 | — |
| % Increase | — | — | — | — | — | — |
| Glass-ceramic Mohs' Hardness | — | — | — | — | — | — |
| Elastic Modulus (GPa) | — | 117.69765 | 95.5647 | 97.15055 | 90.39345 | — |
| Shear Modulus (GPa) | — | 47.8513 | 38.26725 | 38.95675 | 37.5088 | — |
| Poisson's Ratio | — | 0.23 | 0.249 | 0.247 | 0.206 | — |
| Fracture Toughness (MPa√m) | — | 1.03 | 0.92 | 1 | 0.846 | — |
| Vickers Hardness (Kgf/mm$^2$) | — | — | 716.5 | 709.7 | 680.9 | — |
| Refractive Index | — | — | 1.5683 | — | — | 1.5587 |

| Glass-ceramic | GC83 | GC84 | GC85 | GC86 | GC87 | GC88 |
|---|---|---|---|---|---|---|
| Batched Comp. | BQ | BR | BR | BT | BU | BV |
| Ceram Schedule (Temperature ° C.-Hours) | 775-4, 850-4 | 775-4, 850-4 | 800-4, 950-4 | 780-4, 850-4 | 780-4, 850-4 | 780-4, 850-4 |
| Crystalline Phase | — | Jeffbenite | — | Jeffbenite | Jeffbenite | Jeffbenite |
| Appearance | — | Opaque, White | — | Opaque, White | Opaque, White | Opaque, White |

TABLE 6-continued

| | | | | | | |
|---|---|---|---|---|---|---|
| % Volume Decrease on Crystallization | — | — | — | — | — | — |
| Glass Density (g/cm³) | 2.647 | 2.677 | 2.677 | — | — | 2.721 |
| Glass-ceramic Density (g/cm³) | — | 2.755 | 2.765 | — | — | 2.83 |
| % Increase | — | — | — | — | — | — |
| Glass-ceramic Mohs' Hardness | — | — | — | — | — | 7.5 |
| Elastic Modulus (GPa) | — | 97.7711 | 99.35695 | 108.18255 | 121.4899 | 107.8378 |
| Shear Modulus (GPa) | — | 39.991 | 40.6805 | 44.128 | 49.16135 | 43.9901 |
| Poisson's Ratio | — | 0.221 | 0.221 | 0.225 | 0.235 | 0.226 |
| Fracture Toughness (MPa√m) | — | 0.839 | 0.85 | 0.914 | 1.036 | 0.99 |
| Vickers Hardness (Kgf/mm²) | — | 720.2 | 731.1 | 799.4 | 750.2 | 780.2 |
| Refractive Index | 1.5581 | — | — | — | — | 1.5901 |

| Glass-ceramic | GC89 | GC90 | GC91 | GC92 | GC93 | GC94 |
|---|---|---|---|---|---|---|
| Batched Comp. | BW | BX | BY | BZ | CA | CB |
| Ceram Schedule (Temperature ° C.-Hours) | 800-4, 900-4 | 750-4, 800-4 | 780-4, 850-4 | 780-4, 850-4 | 780-4, 850-4 | 725-4, 850-2 |
| Crystalline Phase Appearance | Jeffbenite Opaque, White | — | Jeffbenite Opaque, White | Jeffbenite Translucent Opal | Jeffbenite Translucent Opal | Jeffbenite Translucent |
| % Volume Decrease on Crystallization | — | — | — | — | — | — |
| Glass Density (g/cm³) | 2.766 | 2.916 | 2.808 | 2.853 | 2.855 | — |
| Glass-ceramic Density (g/cm³) | 2.949 | 2.976 | 2.99 | 3.077 | 3.095 | — |
| % Increase | — | — | — | — | — | — |
| Glass-ceramic Mohs' Hardness | 7.5 | 7.5 | 7.5 | 7.5 | 7.5 | — |
| Elastic Modulus (GPa) | 121.42095 | 119.6972 | 126.24745 | 134.24565 | 133.4872 | 93.3583 |
| Shear Modulus (GPa) | 49.0924 | 48.05815 | 51.023 | 54.1947 | 53.9189 | 38.0604 |
| Poisson's Ratio | 0.236 | 0.245 | 0.237 | 0.239 | 0.239 | 0.227 |
| Fracture Toughness (MPa√m) | 1.07 | 1.0475 | 1.09 | 1.05 | 1.04 | 0.83 |
| Vickers Hardness (Kgf/mm²) | 826.8 | — | 819.3 | 918 | 961.2 | — |
| Refractive Index | 1.6185 | 1.6099 | 1.6288 | 1.646 | 1.6435 | 1.5018 |

| Glass-ceramic | GC95 | GC96 | GC97 |
|---|---|---|---|
| Batched Comp. | CC | CD | DH |
| Ceram Schedule (Temperature ° C.-Hours) | 750-5, 850-4 | 750-5, 850-4 | 780-4, 850-4 |
| Crystalline Phase Appearance | Jeffbenite Translucent | Jeffbenite Translucent | Jeffbenite Opaque |
| % Volume Decrease on Crystallization | — | — | — |
| Glass Density (g/cm³) | — | — | — |
| Glass-ceramic Density (g/cm³) | — | — | — |
| % Increase | — | — | — |
| Glass-ceramic Mohs' Hardness | — | — | — |
| Elastic Modulus (GPa) | — | — | — |
| Shear Modulus (GPa) | — | — | — |
| Poisson's Ratio | — | — | — |
| Fracture Toughness (MPa√m) | — | — | — |
| Vickers Hardness (Kgf/mm²) | — | — | — |
| Refractive Index | 1.5581 | 1.5579 | — |

The lattice parameters of glass-ceramics formed from precursor glass compositions were determined according to the "Jeffbenite Characterization Method" described hereinabove. The batched composition, ceram schedule, corresponding glass-ceramic, and lattice parameters are given in Table 7.

TABLE 7

| Batched Comp. | Ceram Schedule (Temperature °C.-Hours) | Glass-ceramic | Jeffbenite a Lattice (Å) | Jeffbenite c Lattice (Å) | Jeffbenite Lattice Vol. (Å³) | (024) Peak Position (Å) |
|---|---|---|---|---|---|---|
| CU | 725-4, 850-2 | GC19 | 6.638 | 18.333 | 807.8 | 2.689 |
| AA | 850-4 | GC2 | 6.626 | 18.254 | 801.5 | 2.681 |
| AB | 725-4, 850-2 | — | 6.634 | 18.300 | 805.4 | 2.686 |
| BF | 750-4, 825-4 | GC71 | 6.608 | 18.227 | 795.9 | 2.675 |
| CV | 750-4, 850-4 | GC20 | 6.588 | 18.143 | 787.5 | 2.665 |
| CW | 800-4, 850-4 | GC21 | 6.610 | 18.276 | 798.5 | 2.677 |
| CZ | 780-4, 850-4 | GC24 | 6.593 | 18.231 | 792.3 | 2.671 |

Figure 21:
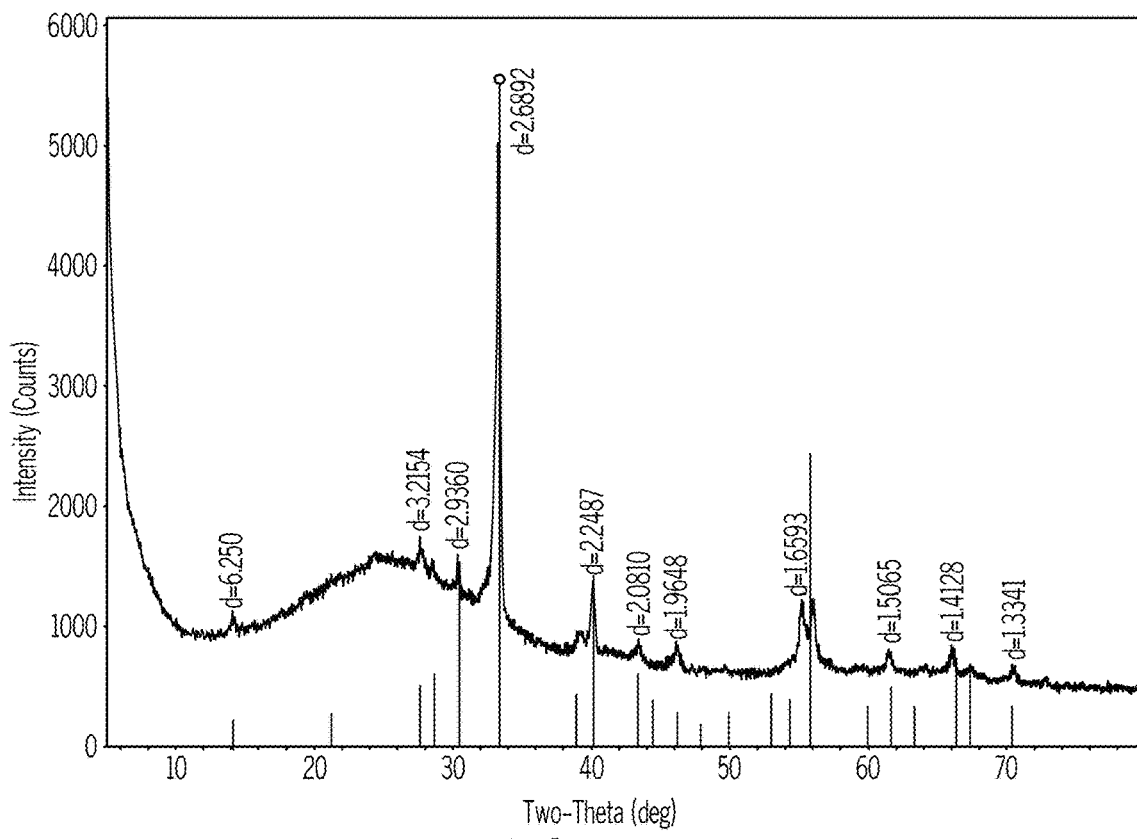
FIG. 21 depicts an XRD spectrum of a glass-ceramic article comprising a crystalline phase having a jeffbenite crystalline structure.
Figure 22:
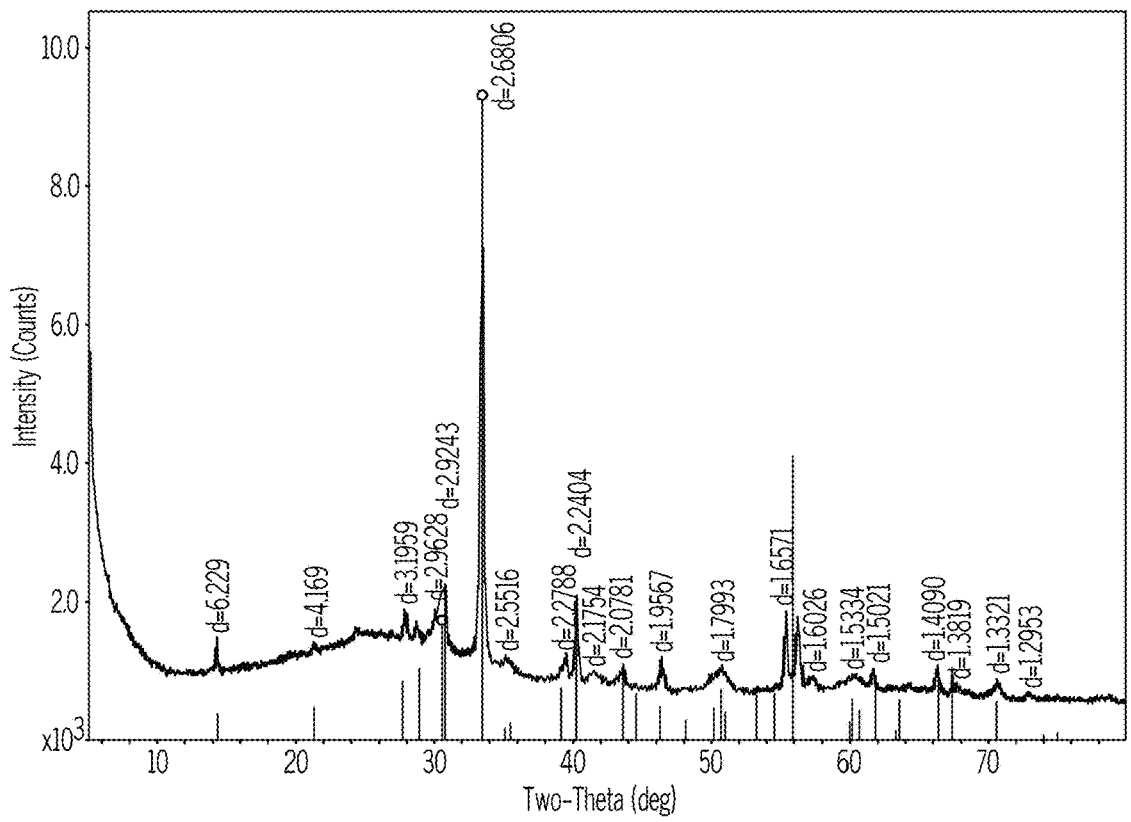
FIG. 22 depicts an XRD spectrum of a glass-ceramic article comprising a crystalline phase having a jeffbenite crystalline structure.
Figure 23:
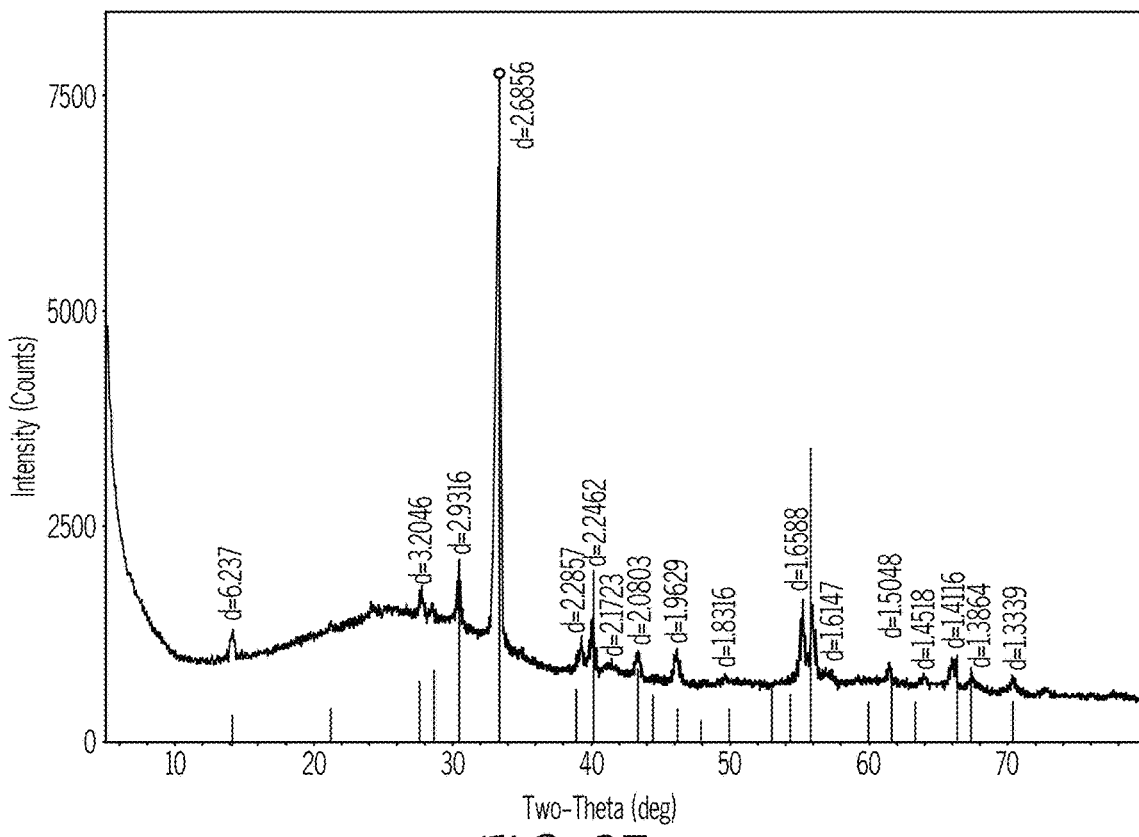
FIG. 23 depicts an XRD spectrum of a glass-ceramic article comprising a crystalline phase having a jeffbenite crystalline structure.
Figure 24:
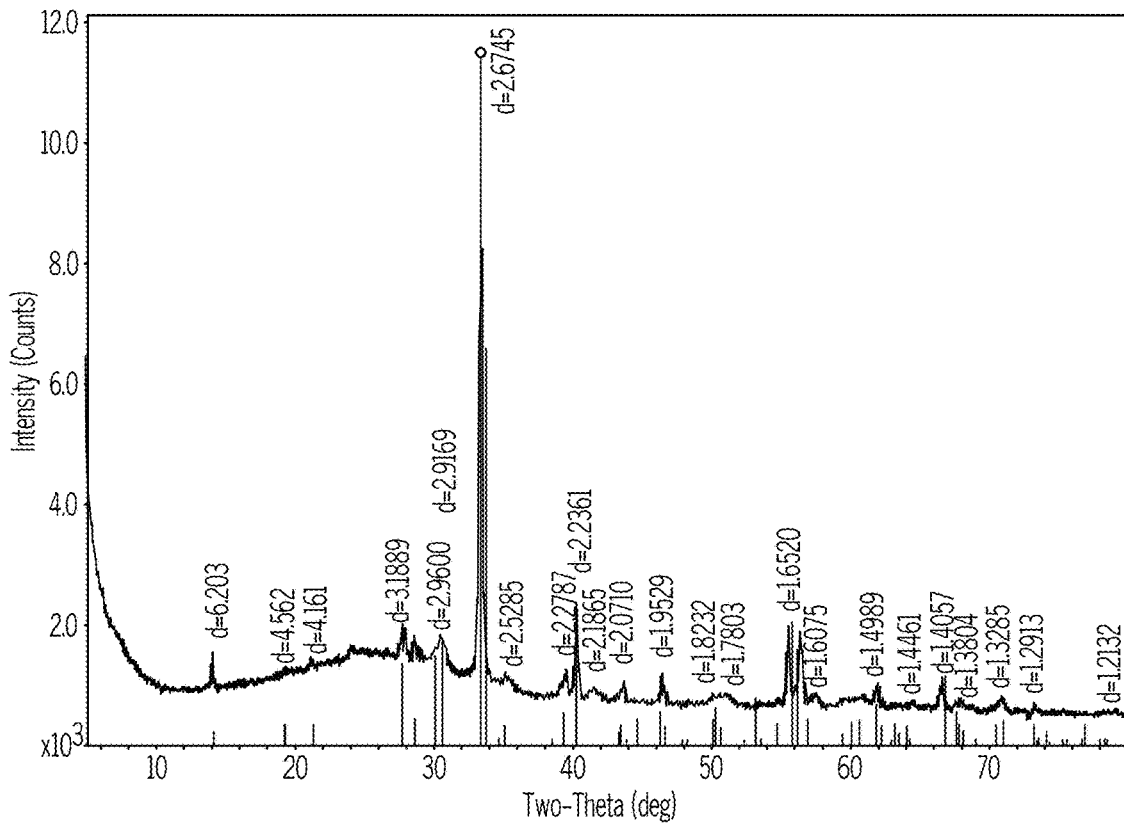
FIG. 24 depicts an XRD spectrum of a glass-ceramic article comprising a crystalline phase having a jeffbenite crystalline structure.
Figure 25:
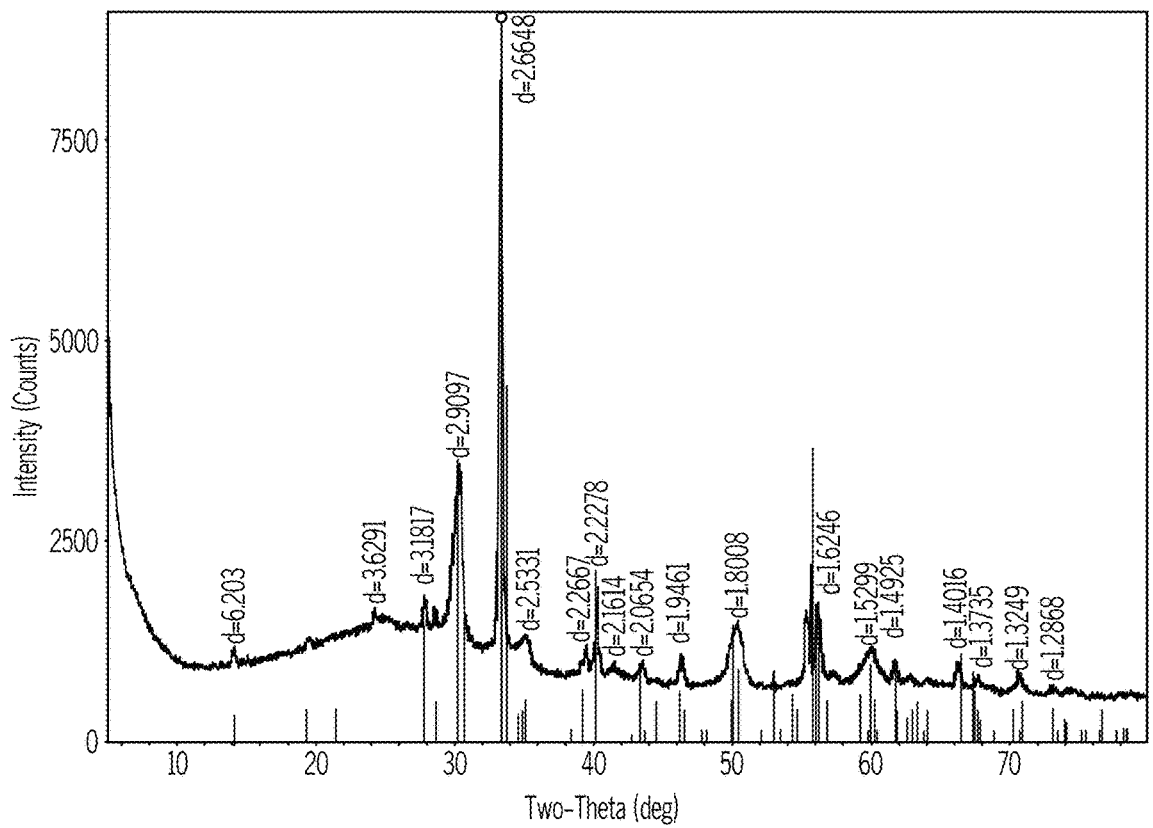
FIG. 25 depicts an XRD spectrum of a glass-ceramic article comprising a crystalline phase having a jeffbenite crystalline structure.
Figure 26:
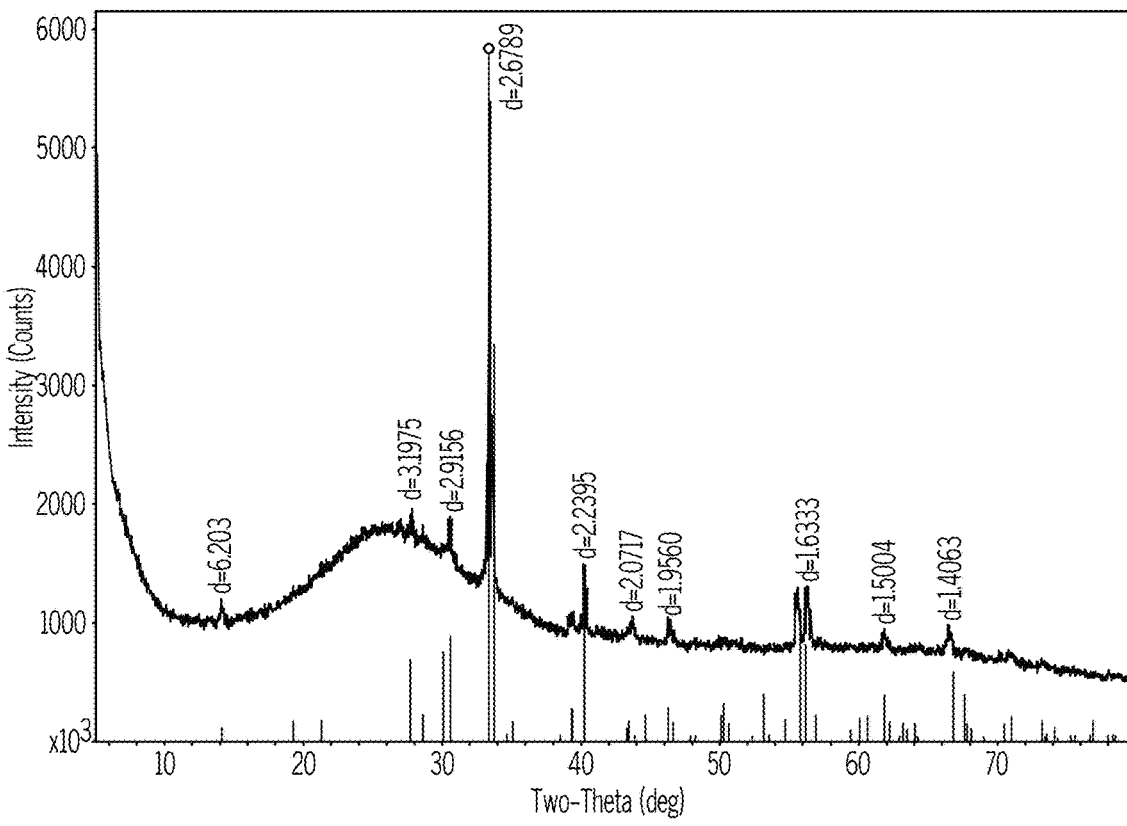
FIG. 26 depicts an XRD spectrum of a glass-ceramic article comprising a crystalline phase having a jeffbenite crystalline structure.
Figure 27:
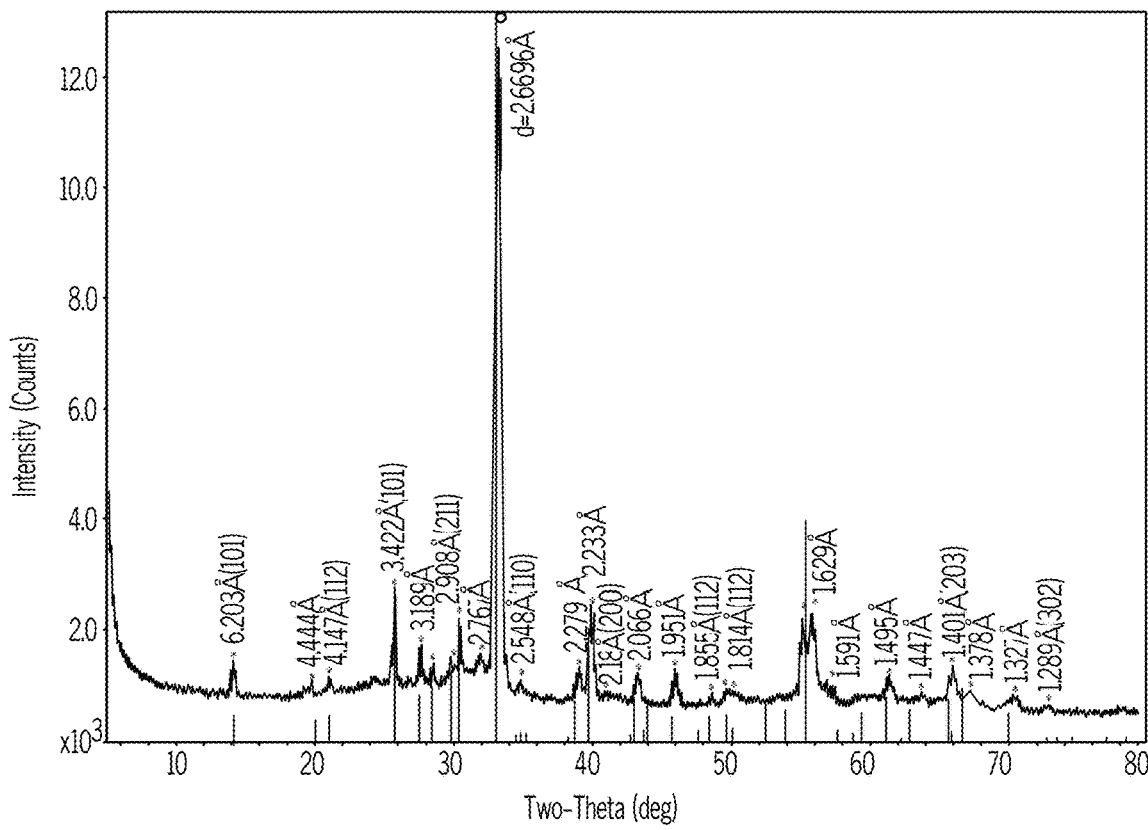
FIG. 27 depicts an XRD spectrum of a glass-ceramic article comprising a crystalline phase having a jeffbenite crystalline structure.

The XRD spectra for glass-ceramics were obtained according to the "Jeffbenite Characterization Method" described hereinabove. The XRD spectra for several glass-ceramic articles are included in the figures. The XRD spectrum for glass-ceramic GC19 of Table 7 is depicted in FIG. 21. The XRD spectrum for glass-ceramic GC2 of Table 7 is depicted in FIG. 22. The XRD spectrum for the glass-ceramic formed from heat treating Batched Comp. AB as shown in Table 7 is depicted in FIG. 23. The XRD spectrum for glass-ceramic GC71 of Table 7 is depicted in FIG. 24. The XRD spectrum for glass-ceramic GC20 of Table 7 is depicted in FIG. 25. The XRD spectrum for glass-ceramic GC21 of Table 7 is depicted in FIG. 26. The XRD spectrum for glass-ceramic GC24 of Table 7 is depicted in FIG. 27.

Figure 28:
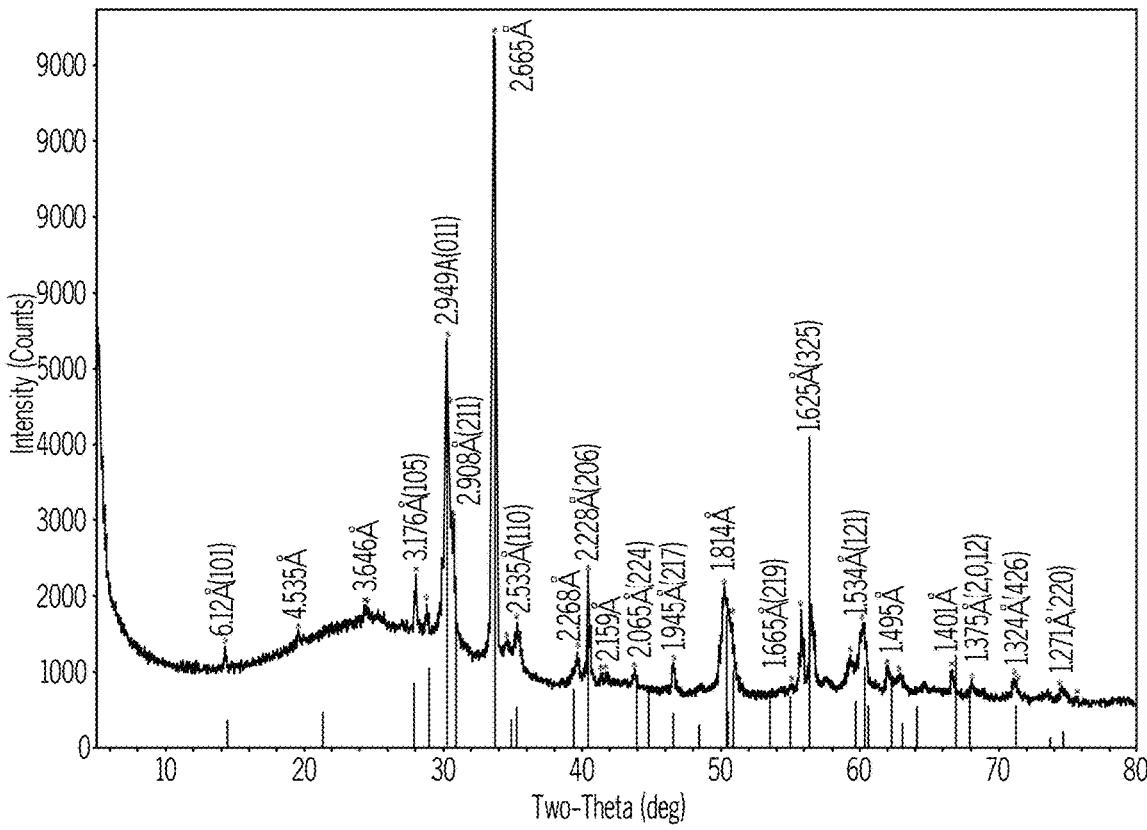
FIG. 28 depicts an XRD spectrum of a glass-ceramic article comprising a crystalline phase having a jeffbenite crystalline structure.
Figure 29:
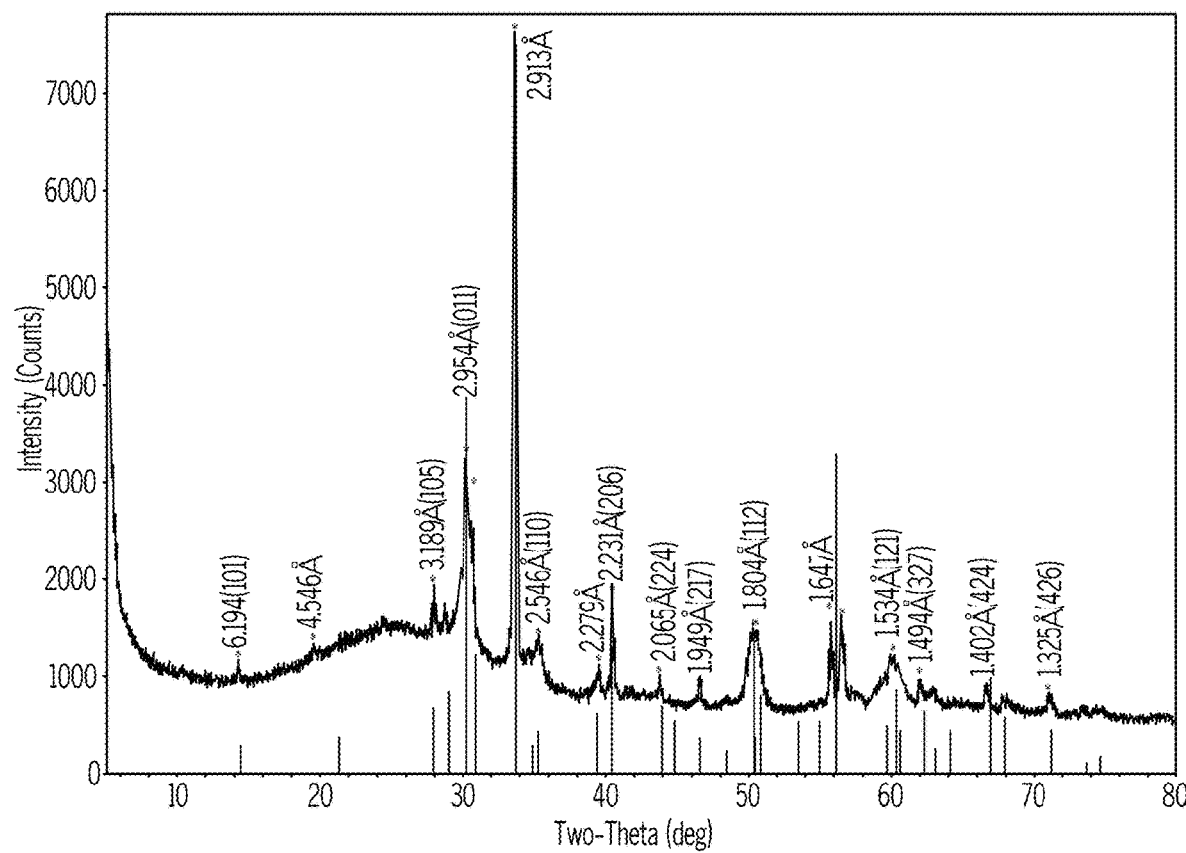
FIG. 29 depicts an XRD spectrum of a glass-ceramic article comprising a crystalline phase having a jeffbenite crystalline structure.

The XRD spectrum for glass-ceramic GC25 of Table 3 is depicted in FIG. 28. The XRD spectrum for glass-ceramic GC26 of Table 3 is depicted in FIG. 29. Glass-ceramics GC25 and GC26 of Table 3 both included $P_2O_5$, which may improve diffusivity during ion exchange processes. The XRD spectra for glass-ceramics GC25 and GC26 of Table 3 exemplify that jeffbenite may be formed in glass-ceramic articles including $P_2O_5$.

Figure 3:
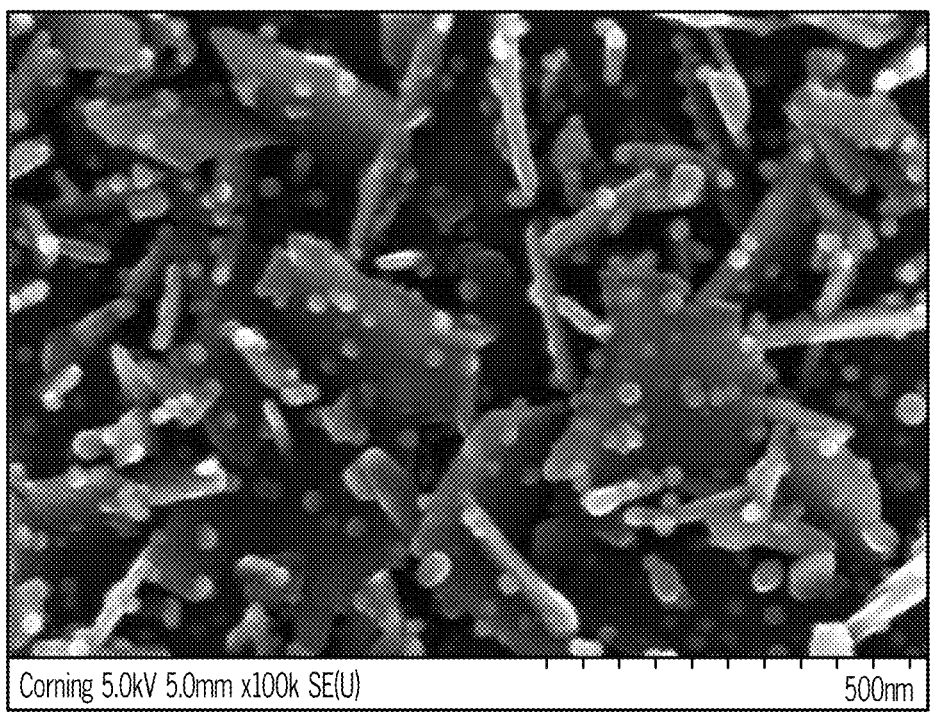
FIG. 3 is an SEM micrograph of the crystalline structure of a glass-ceramic comprising a crystalline phase having a jeffbenite crystalline structure.
Figure 4:
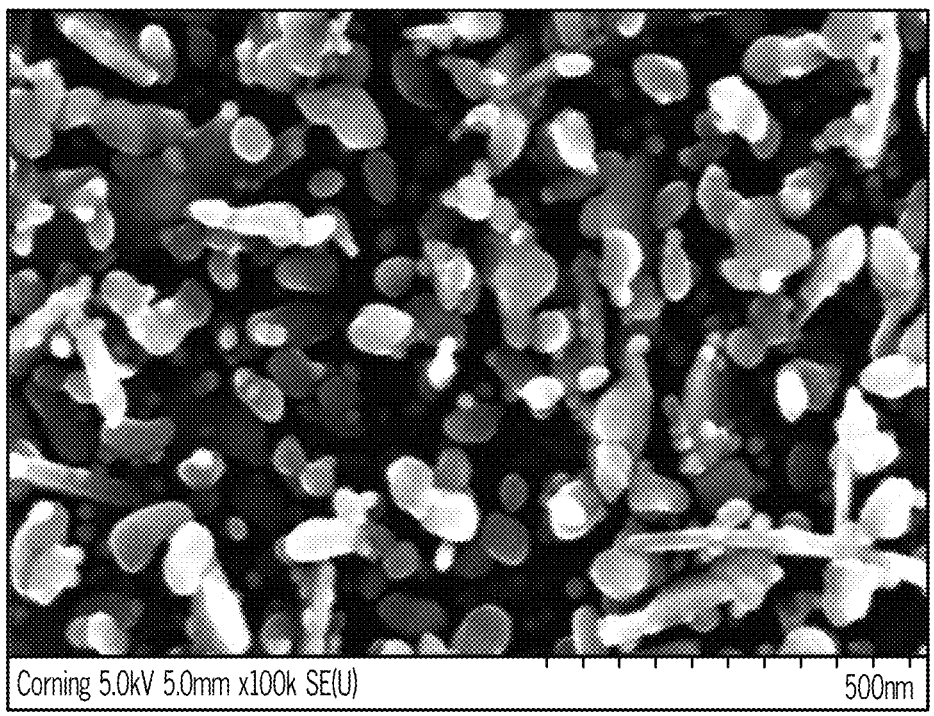
FIG. 4 is an SEM micrograph of the crystalline structure of a glass-ceramic comprising a crystalline phase having a jeffbenite crystalline structure.

FIG. 3 depicts the microstructure of the glass-ceramic GC53. FIG. 4 depicts the microstructure of the glass-ceramic GC4. FIG. 3 also depicts $ZrO_2$ crystals (lighter colored areas) in the microstructure of the glass-ceramic.

Figure 5:
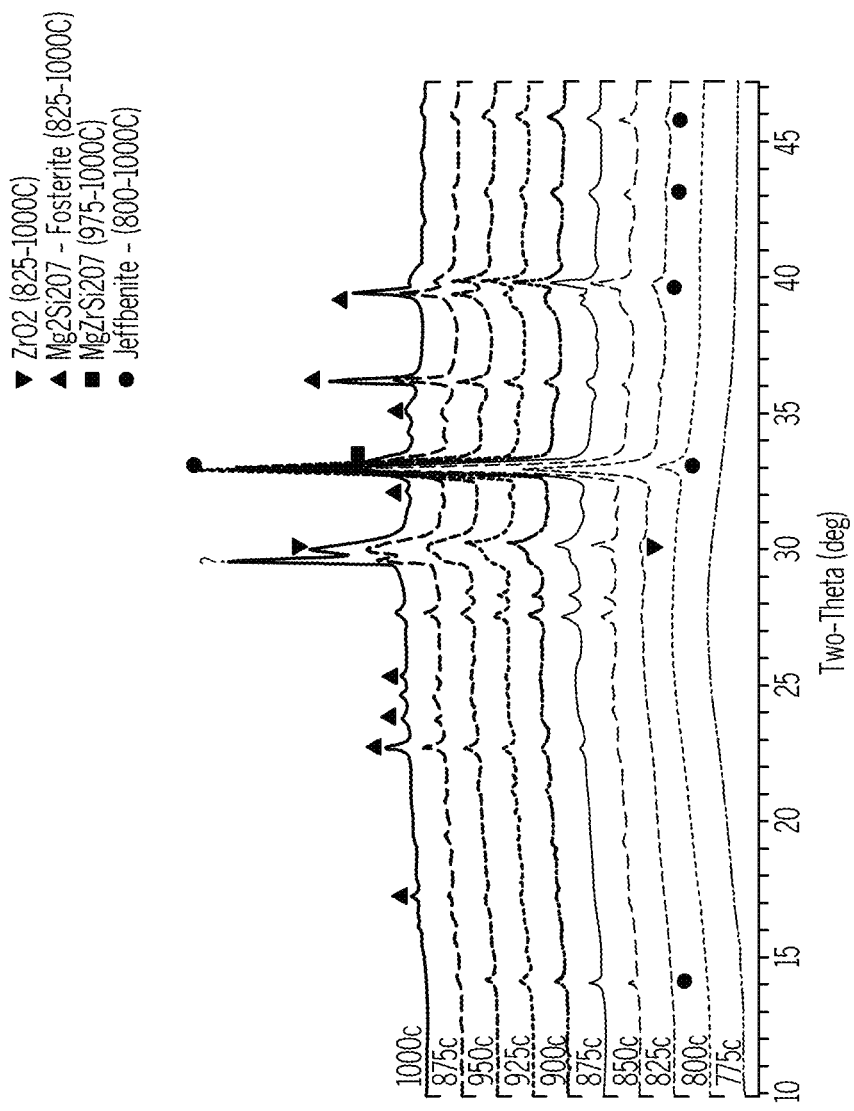
FIG. 5 is a high temperature X-ray diffraction two-theta plot indicating the ranges of stability of the various crystalline phases in glass-ceramic comprising a crystalline phase having a jeffbenite crystalline structure and a tetragonal zirconia crystalline phase as a function of temperature.
Figure 6A:
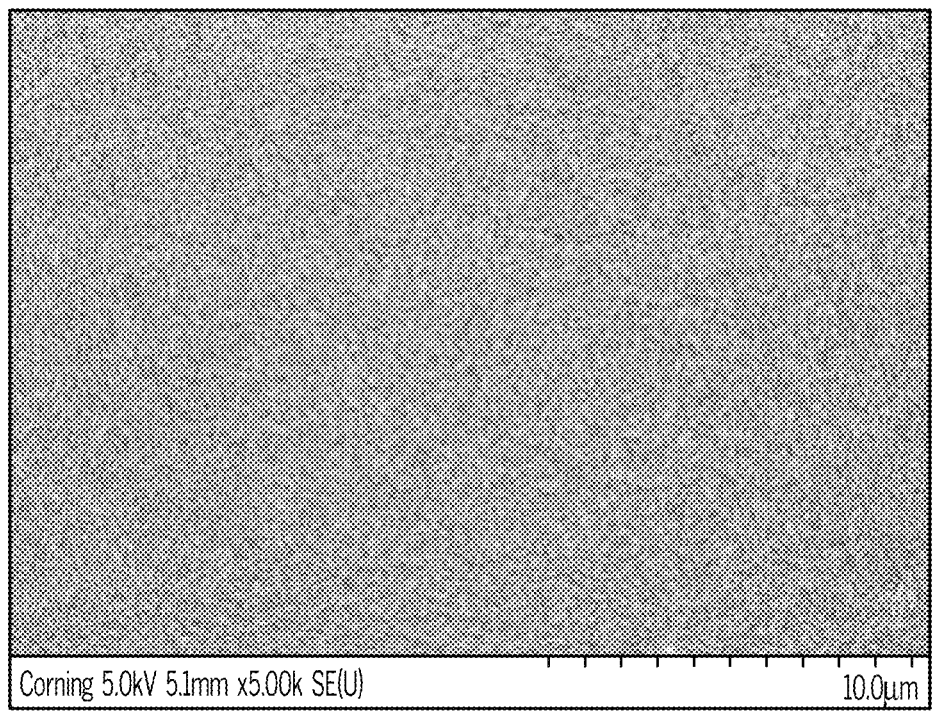
FIG. 6A is an SEM micrograph of the crystalline structure of a glass-ceramic comprising a crystalline phase having a jeffbenite crystalline structure.
Figure 6B:
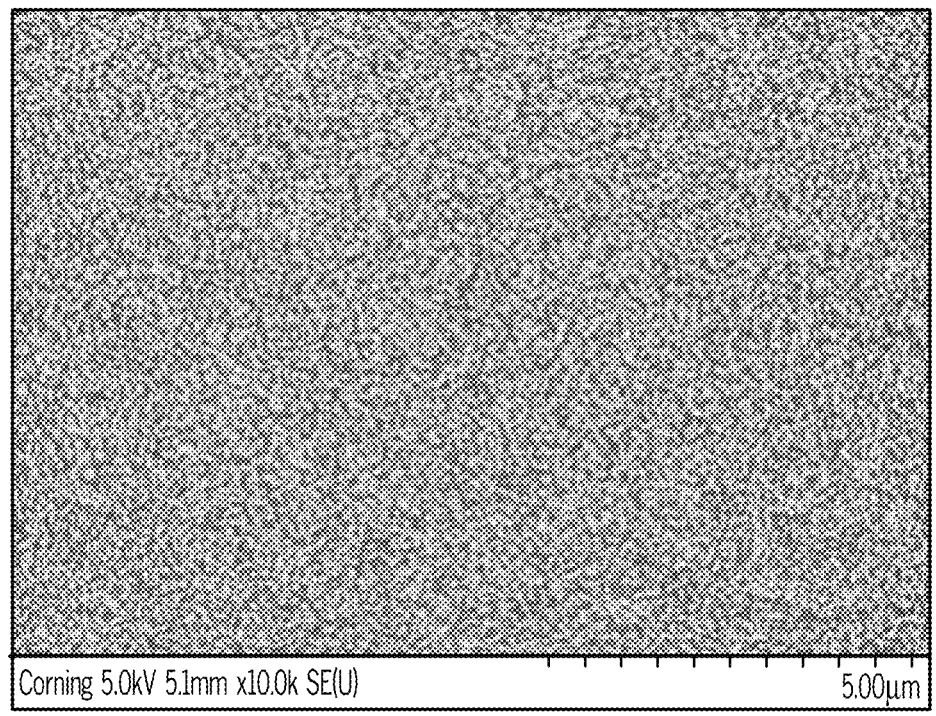
FIG. 6B is an SEM micrograph of the crystalline structure of a glass-ceramic comprising a crystalline phase having a jeffbenite crystalline structure.
Figure 6C:
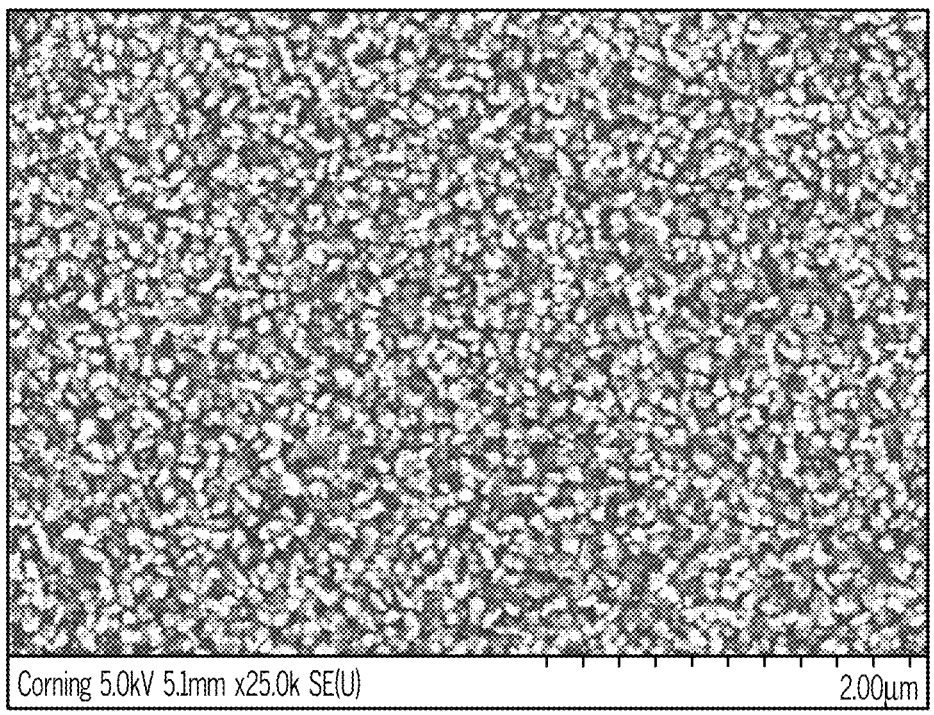
FIG. 6C is an SEM micrograph of the crystalline structure of a glass-ceramic comprising a crystalline phase having a jeffbenite crystalline structure.
Figure 6D:
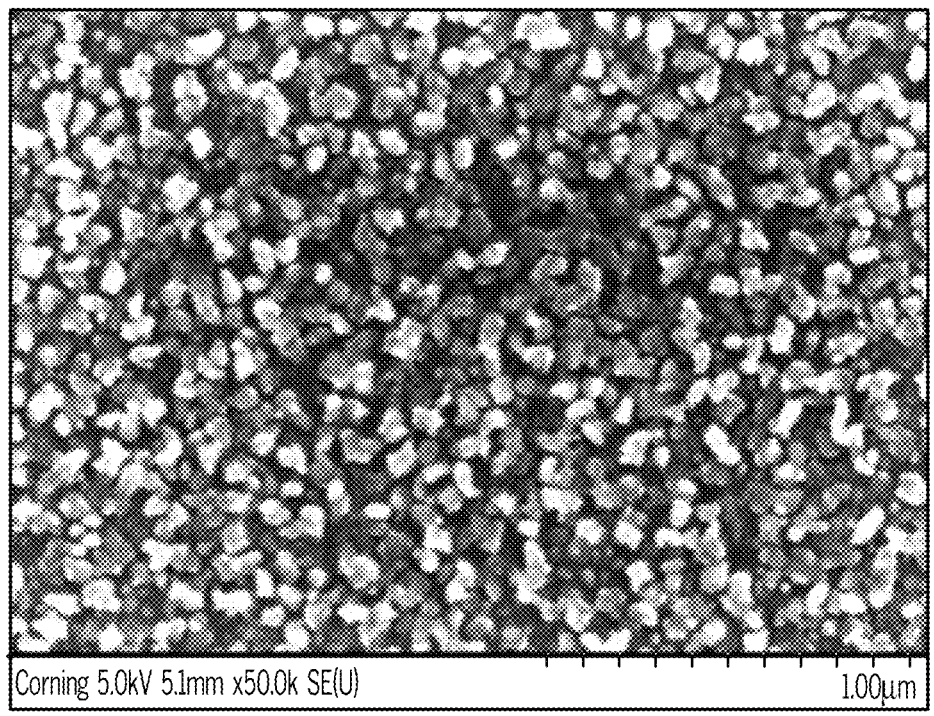
FIG. 6D is an SEM micrograph of the crystalline structure of a glass-ceramic comprising a crystalline phase having a jeffbenite crystalline structure.
Figure 6E:
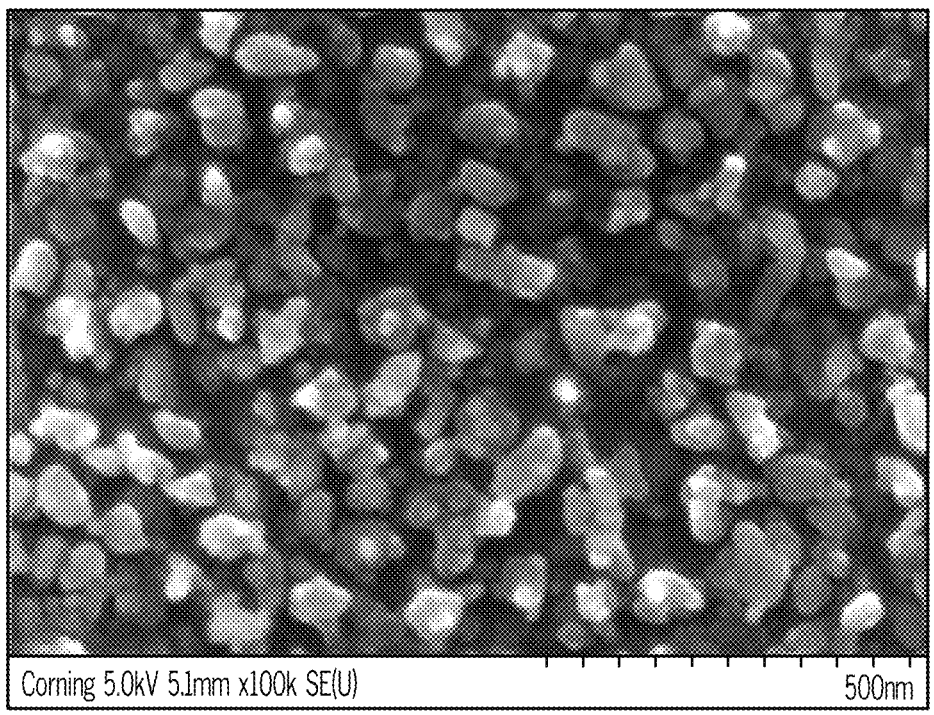
FIG. 6E is an SEM micrograph of the crystalline structure of a glass-ceramic comprising a crystalline phase having a jeffbenite crystalline structure.
Figure 6F:
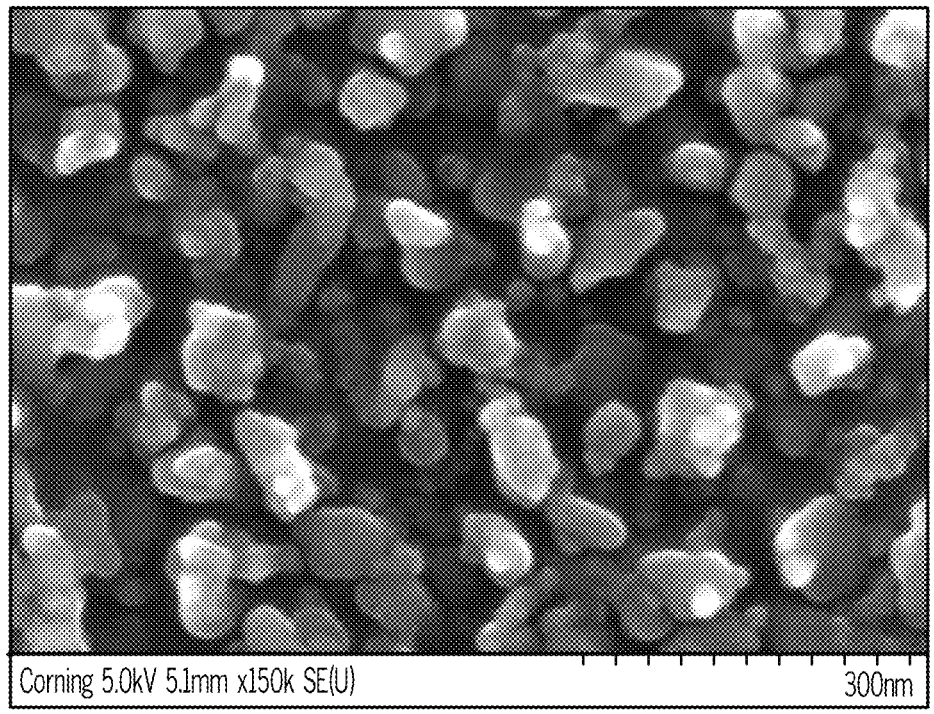
FIG. 6F is an SEM micrograph of the crystalline structure of a glass-ceramic comprising a crystalline phase having a jeffbenite crystalline structure.

A sample of the glass-ceramic composition of Batched Comp. AB was analyzed by high temperature X-ray diffraction (XRD). The sample was held for one hour at each of the following temperatures: 800° C., 825° C., 850° C., 875° C., 900° C., 925° C., 950° C., 975° C., and 1000° C. The XRD spectrum of the sample was obtained in the last fifteen minutes during which the sample was held at a specific temperature. The XRD spectra are depicted in FIG. 5. The high temperature XRD analysis indicates the ranges of stability of various crystalline phases in the sample. As depicted in FIG. 5, the sample included a crystalline phase having a jeffbenite crystalline structure and a tetragonal $ZrO_2$ crystalline phase.

The surface of the glass-ceramic GC53 was observed by scanning electron microscopy (SEM). The sample appeared to be translucent. To enable imaging by SEM, the surface of the sample was etched in 0.5% HF for 10 seconds. Then, a conductive carbon coating was evaporated on the sample to reduce charging. SEM images were taken of the surface of the sample using a Hitachi SU70, 5 kv scanning electron microscope. SEM images were obtained at magnifications from 5K to 150K. FIGS. 6A-6F depict the surface of the sample. The magnification of the SEM micrograph increases from FIG. 6A to FIG. 6F. The grain size of the crystals in the sample were determined to be about 30 nm.

Figure 7:
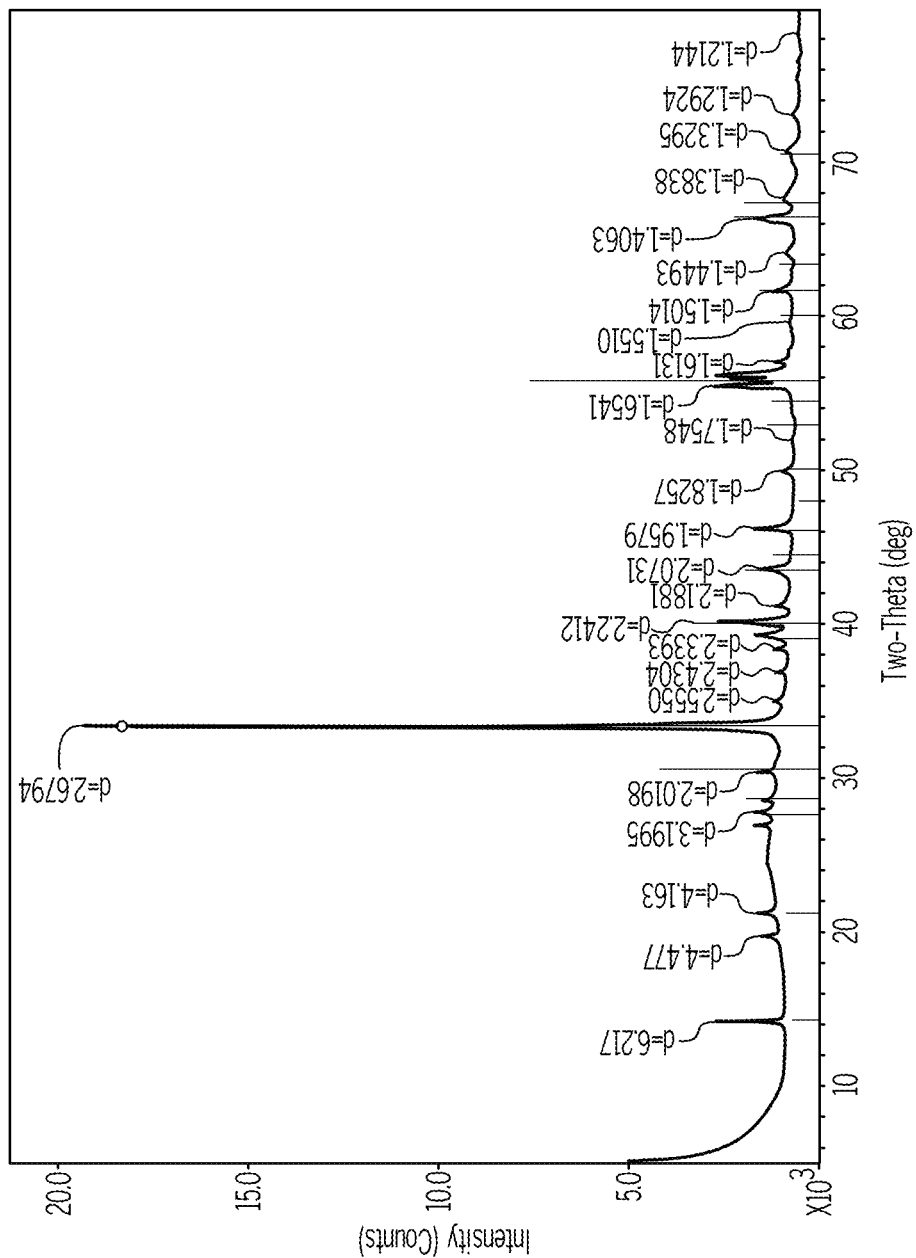
FIG. 7 is an X-ray diffraction two-theta plot indicating a crystalline phase having a jeffbenite crystalline structure in an example glass-ceramic article.

Referring now to FIG. 7, a sample of the precursor glass composition of Batched Comp. AP was heat treated at 780° C. for 4 hours and 850° C. for 4 hours to form a glass-ceramic. The resultant glass-ceramic was then analyzed by X-ray diffraction resulting in the diffraction pattern depicted in FIG. 7. The X-ray diffraction pattern depicted in FIG. 7 shows that compositions in which a portion of MgO is substituted for ZnO (in this case 21.5% of the MgO was replaced with ZnO) may still result in the formation of a crystalline phase having a jeffbenite crystalline structure upon heat treatment without producing other crystalline phases.

Samples formed from the composition of Batched Comp. AA and having a thickness of 0.6 mm were heat treated at 725° C. for 4 hours and 850° C. for 4 hours to form glass-ceramics. Samples formed from the composition of Batched Comp. AA and having a thickness of 0.6 mm were heat treated at 775° C. for 4 hours and 850° C. for 4 hours to form glass-ceramics. Samples of the glass-ceramics were then ion exchanged in a bath of 100 wt % $KNO_3$ for 1 hour, 2 hours, 4 hours, 8 hours, 16 hours, and 32 hours. The samples were then analyzed to determine the maximum surface compressive stress and maximum central tension as a function of ion exchange time. The results are reported in Table 8.

TABLE 8

| Batched Comp. | Ceram Schedule (Temperature ° C.-Hours) | Ion Exchange Time (hours) | Maximum Central Tension (MPa) | Surface Compressive Stress (MPa) |
|---|---|---|---|---|
| AA | 725-4, 850-4 | 1 | 51.62 | 350.43 |
| AA | 725-4, 850-4 | 2 | 84.04 | 189.28 |
| AA | 725-4, 850-4 | 4 | 102.1 | 268.21 |
| AA | 725-4, 850-4 | 8 | 155.04 | 241.3 |
| AA | 725-4, 850-4 | 16 | 187.08 | 309.39 |

TABLE 8-continued

| Batched Comp. | Ceram Schedule (Temperature ° C.-Hours) | Ion Exchange Time (hours) | Maximum Central Tension (MPa) | Surface Compressive Stress (MPa) |
|---|---|---|---|---|
| AA | 725-4, 850-4 | 32 | 157.98 | 260.74 |
| AA | 775-4, 850-4 | 1 | 47.15 | 336.61 |
| AA | 775-4, 850-4 | 2 | 70.4 | 468.29 |
| AA | 775-4, 850-4 | 4 | 93.53 | 690.57 |
| AA | 775-4, 850-4 | 8 | 135.8 | 296.62 |
| AA | 775-4, 850-4 | 16 | 177.5 | 253.39 |
| AA | 775-4, 850-4 | 32 | 153.98 | 330.68 |

As indicated in Table 8, maximum central tensions of up to 187.08 MPa and maximum surface compressive stresses of 690.57 MPa were achieved with different ion exchange times, indicating that the stress profile in the glass-ceramics could be tailored to meet different performance criteria.

Figure 10:
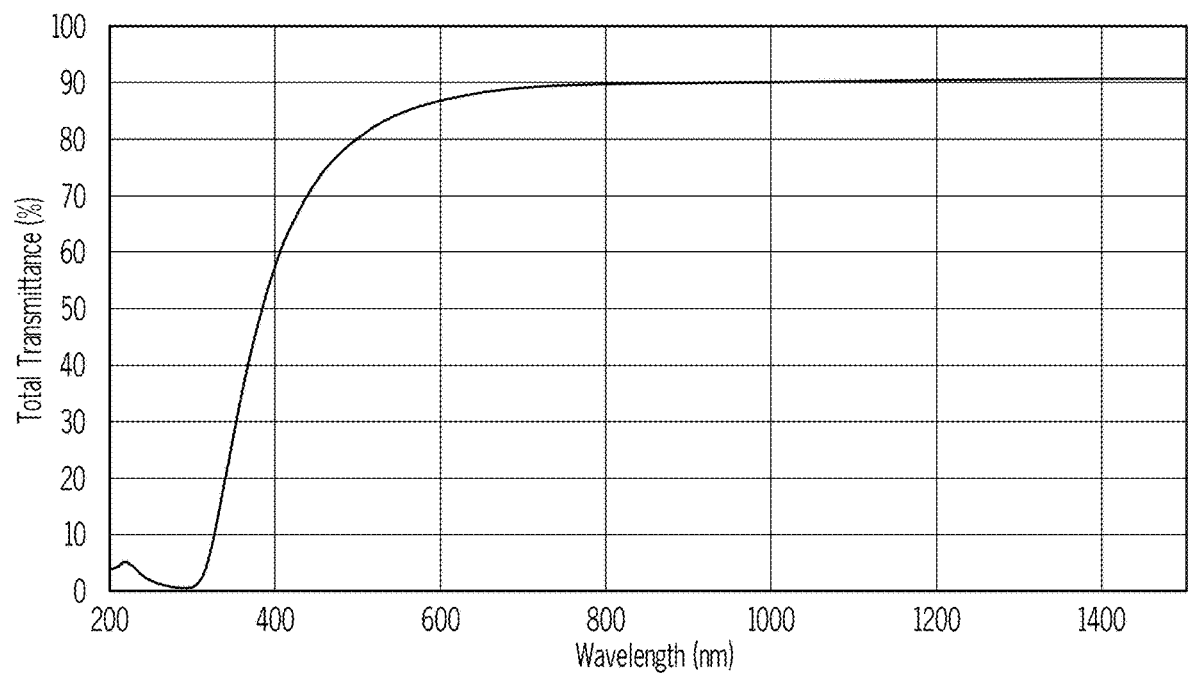
FIG. 10 depicts the total transmittance of a glass-ceramic article comprising a crystalline phase having a jeffbenite crystalline structure as a function of wavelength.
Figure 11:
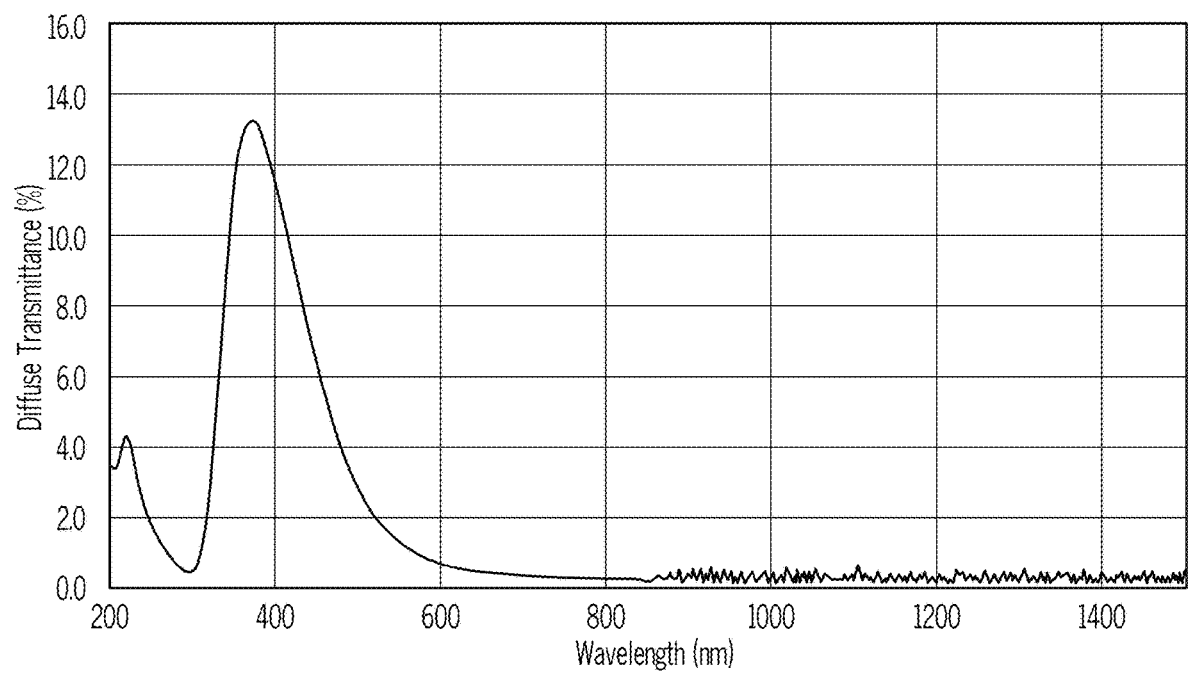
FIG. 11 depicts the diffuse transmittance of a glass-ceramic article comprising a crystalline phase having a jeffbenite crystalline structure as a function of wavelength.
Figure 12:
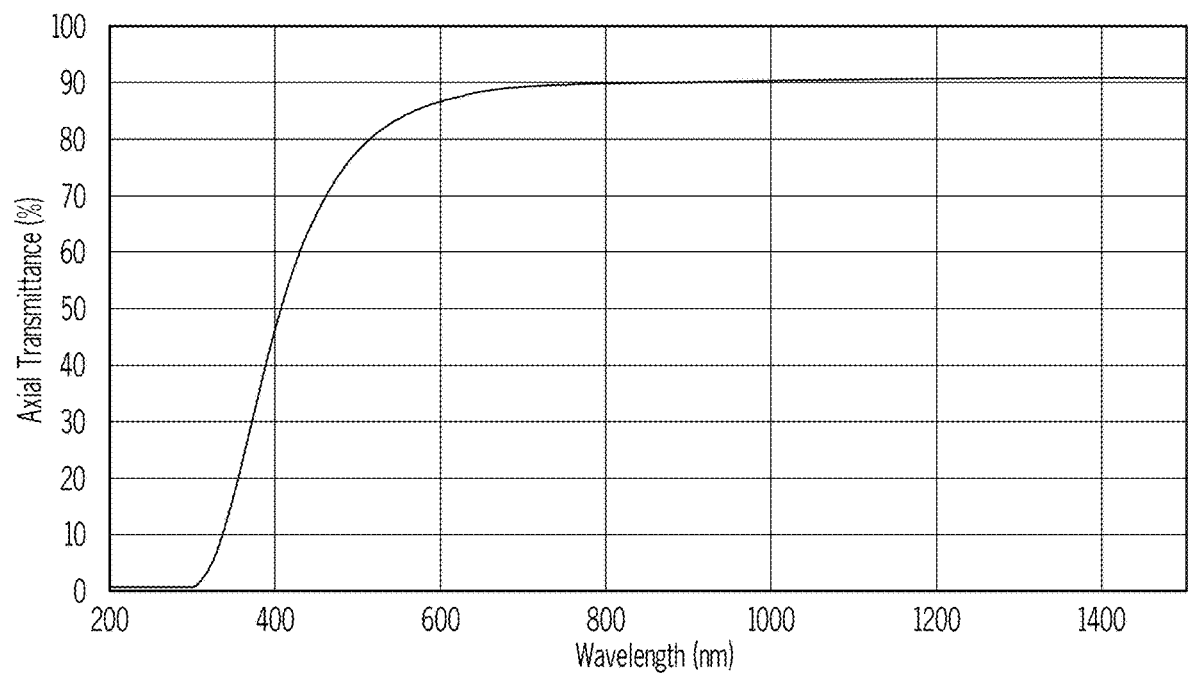
FIG. 12 depicts the axial transmittance of a glass-ceramic article comprising a crystalline phase having a jeffbenite crystalline structure as a function of wavelength.
Figure 13:
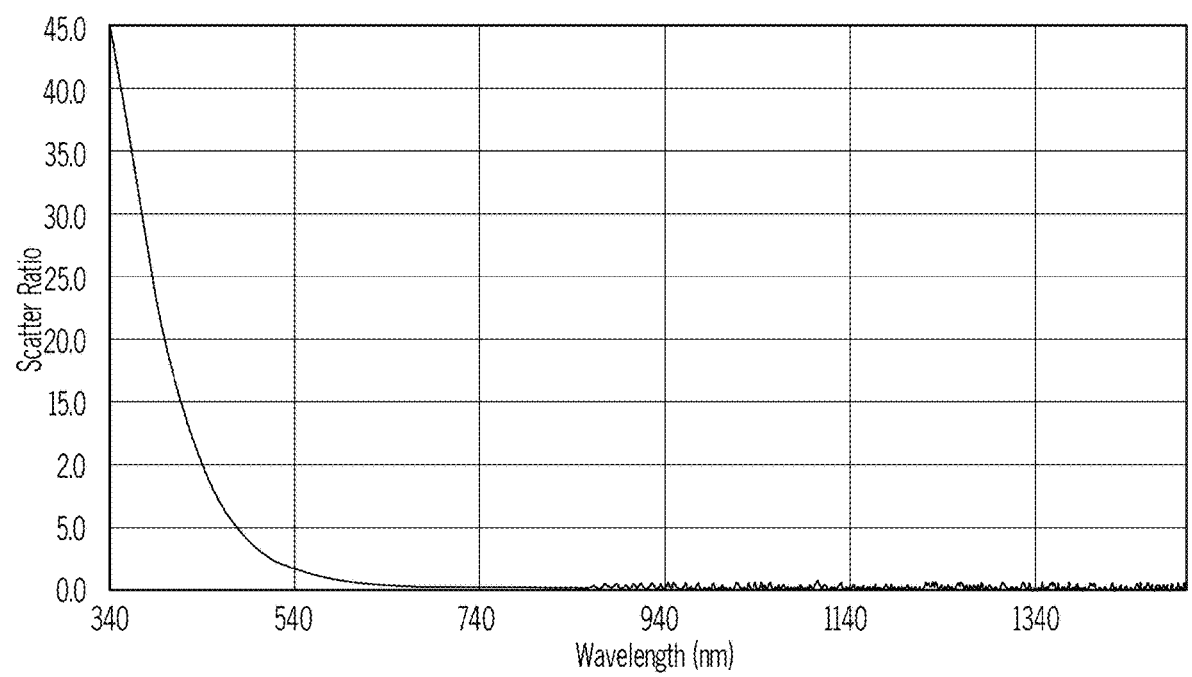
FIG. 13 depicts the scatter ratio of a glass-ceramic article comprising a crystalline phase having a jeffbenite crystalline structure as a function of wavelength.

The transmittance of a sample of the glass-ceramic composition of Batched Comp. AA, cerammed at 725° C. for 4 hours and at 850° C. for 4 hours, was measured using the following procedure. The transmittance measurements were performed on a Lambda 950 UV-Vis-NIR Spectrophotometer manufactured by PerkinElmer Inc. (Waltham, Massachusetts USA). In the present examples, the spectrophotometer used the following instrument settings: 150 mm integrating sphere; a data interval of 2 nm; a detector changeover (InGaAs to PMT) at 860 nm; a lamp change at 340 nm; a tungsten-halogen source; an InGaAs spectral band width of servo; an InGaAs gain of 15; an InGaAs averaging time of 0.4 seconds; a PMT spectral band width of 3.5 nm; a PMT averaging time of 0.2 seconds; and a beam mode of Double. For total transmittance (Total Tx), the sample was fixed at the integrating sphere entry point. For diffuse transmittance (Diffuse Tx), the Spectralon® reference reflectance disk over the sphere exit port was removed to allow on-axis light to exit the sphere and enter a light trap. A zero offset measurement was made, with no sample, of the diffuse portion to determine efficiency of the light trap. To correct diffuse transmittance measurements, the zero offset contribution is subtracted from the sample measurement using the equation: Diffuse Tx=Diffuse$_{Measured}$−(Zero Offset*(Total Tx/100)). The scatter ratio was measured for all wavelengths as: (% Diffuse Tx/% Total Tx). The axial transmittance was also measured. The axial transmittance measurement is a measurement using the on-axis light that escapes the integrating sphere through the exit port. The total transmittance of the glass-ceramic of Example A is depicted in FIG. 10. The diffuse transmittance of the glass-ceramic is depicted in FIG. 11. The axial transmittance of the glass-ceramic is depicted in FIG. 12, and the scatter ratio of the glass-ceramic is depicted in FIG. 13.

The transmittance of five glass-ceramic articles were measured using the procedure described hereinabove. The batch composition, ceram schedule, corresponding glass-ceramic, and thickness are listed in Table 9.

TABLE 9

| Batched Comp. | Ceram Schedule (Temperature ° C.-Hours) | Glass-ceramic | Thickness (mm) |
|---|---|---|---|
| CM | 780-4, 850-4 | GC50 | 0.62 |
| CN | 780-4, 850-4 | GC51 | 0.58 |
| DC | 780-4, 850-4 | GC97 | 0.63 |
| CX | 780-4, 850-4 | GC22 | 0.63 |
| CY | 780-4, 850-4 | GC23 | 0.63 |

Figure 31:
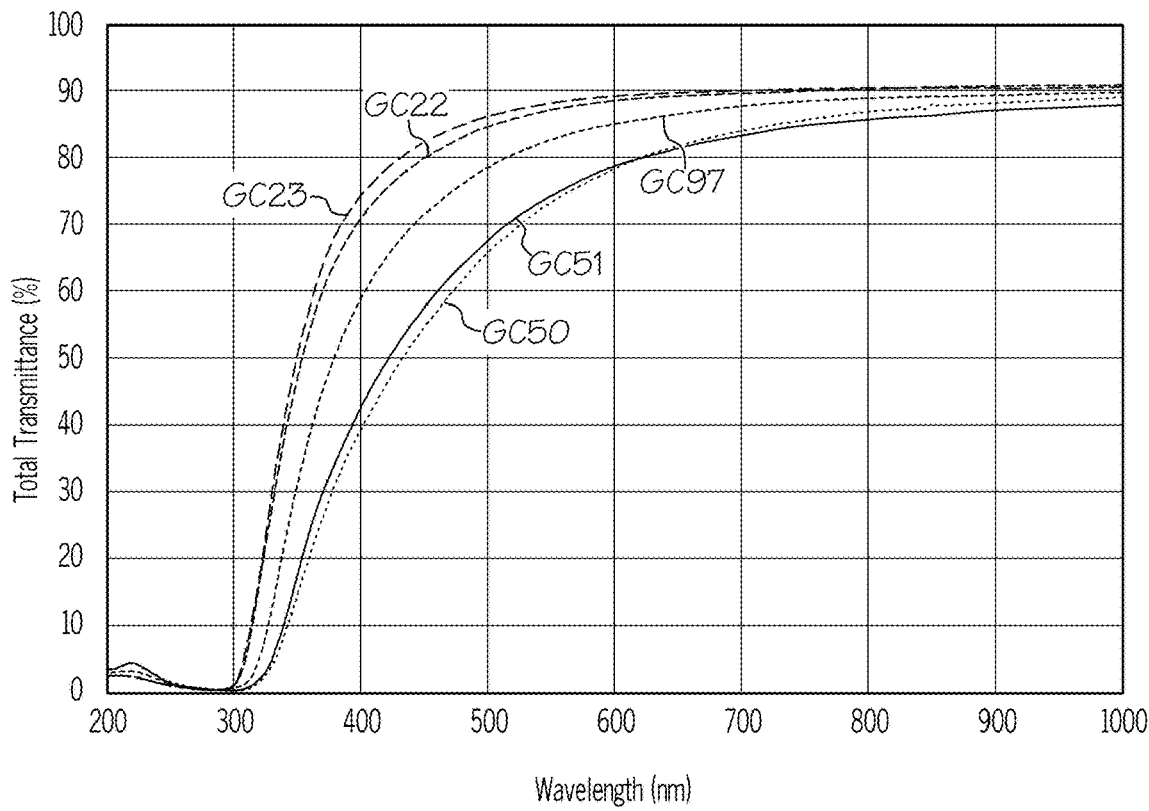
FIG. 31 depicts the total transmittance of glass-ceramic articles comprising crystalline phases having a jeffbenite crystalline structure as a function of wavelength.
Figure 32:
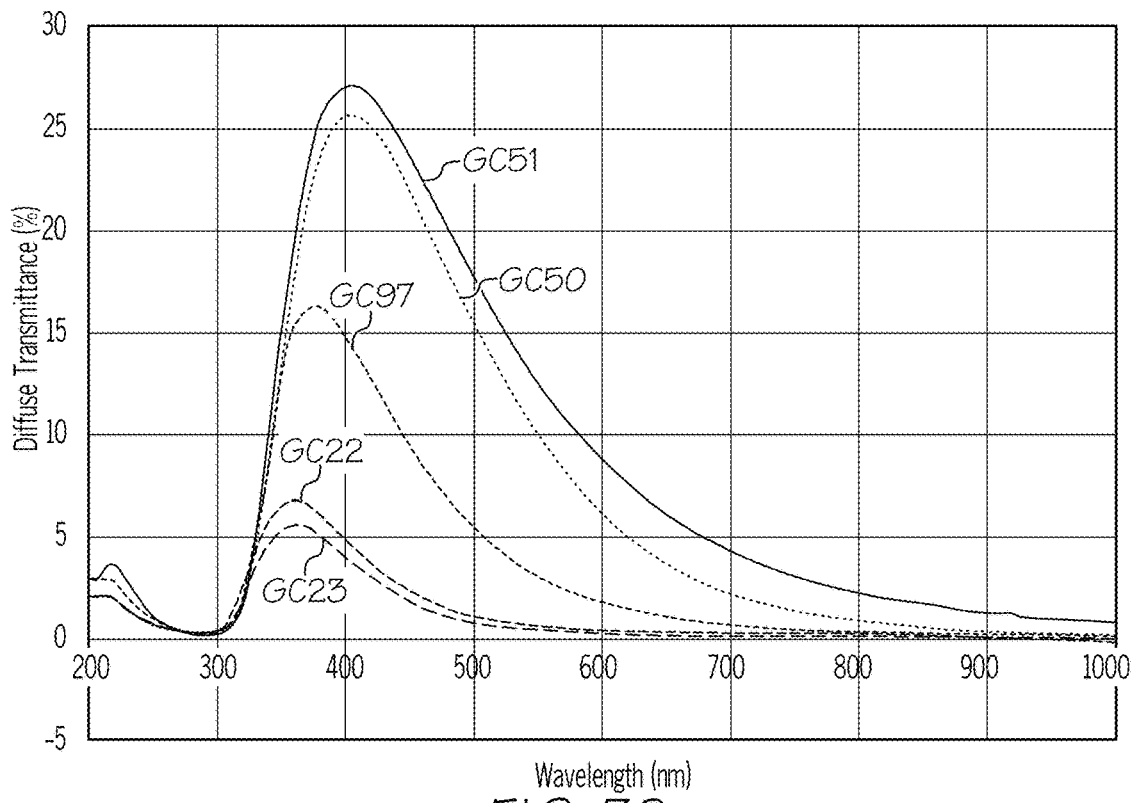
FIG. 32 depicts the diffuse transmittance of glass-ceramic articles comprising crystalline phases having a jeffbenite crystalline structure as a function of wavelength.
Figure 33:
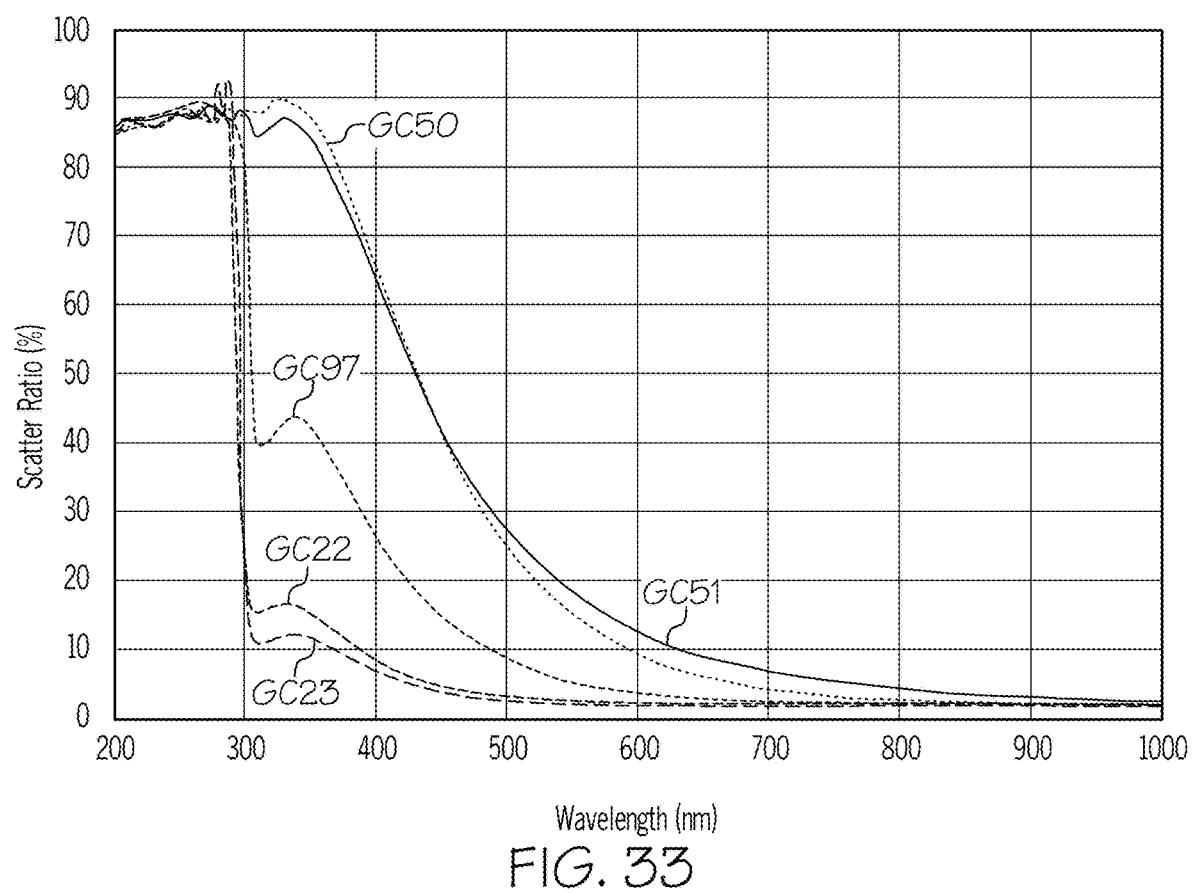
FIG. 33 depicts the scatter ratio of glass-ceramic articles comprising crystalline phases having a jeffbenite crystalline structure as a function of wavelength.

The total transmittance of each of the glass-ceramics of Table 9 is depicted in FIG. 31. The diffuse transmittance of each of the glass-ceramics of Table 9 is depicted in FIG. 32. The scatter ratio of each the glass-ceramics of Table 9 is depicted in FIG. 33. The scatter ratio given in FIG. 33 was calculated using the following equation: % Scatter Ratio=(% Diffuse Tx/% Total Tx)*100.

The color coordinates of each of the glass-ceramics listed in Table 9 were determined using the following procedure. Color measurements were performed on a Lambda 950 UV-Vis-NIR Spectrophotometer manufactured by PerkinElmer Inc. (Waltham, Massachusetts USA), as previously described. Color coordinates are generally calculated using a weighting and summation of the object spectral transmittance, the human eye "standard observer" spectral functions, and the illuminant power spectral distribution. The color coordinates for each sample were calculated from transmittance data taken using three illuminants, Illuminant CIE D65, Illuminant CIE A, and Illuminant CIE F2. Measurements were taken using 2 and 100 observer angles, and a wavelength range of 770 nm to 380 nm (with a 2 nm interval) was used. A first set of color coordinates were calculated using the total transmittance data, and a second set of color coordinates were calculated using diffuse transmittance data from each glass-ceramic article listed in Table 9. The color measurements made using total transmittance are included below in Table 10. The color measurements made using diffuse transmittance are included below in Table 11. Tables 10 and 11 includes CIE L*A*B* color space data as well as CIE Yxy color space data.

TABLE 10

| Glass-Ceramic | Illuminant and Observer Angle (°) | L* | A* | B* | X | Y | Z | x | y | z |
|---|---|---|---|---|---|---|---|---|---|---|
| GC50 | F2 2 | 89.23 | −0.37 | 17.82 | 73.84 | 74.65 | 36.61 | 0.3989 | 0.4033 | 0.1978 |
| GC50 | A 2 | 89.49 | 3.99 | 15.82 | 84.83 | 75.21 | 20.38 | 0.4702 | 0.4169 | 0.1129 |
| GC50 | D65 2 | 88.64 | −0.46 | 15.79 | 69.56 | 73.41 | 60.72 | 0.3415 | 0.3604 | 0.2981 |
| GC50 | F2 10 | 88.97 | 0.31 | 18.03 | 76.65 | 74.10 | 37.06 | 0.4081 | 0.3946 | 0.1973 |
| GC50 | A 10 | 89.30 | 4.22 | 16.35 | 85.49 | 74.81 | 19.84 | 0.4746 | 0.4153 | 0.1102 |
| GC50 | D65 10 | 88.21 | 0.56 | 15.82 | 69.00 | 72.51 | 59.02 | 0.3441 | 0.3616 | 0.2943 |
| GC51 | F2 2 | 89.59 | −0.48 | 15.48 | 74.55 | 75.43 | 38.65 | 0.3952 | 0.3999 | 0.2049 |
| GC51 | A 2 | 89.82 | 3.31 | 13.68 | 85.23 | 75.91 | 21.39 | 0.4669 | 0.4159 | 0.1172 |
| GC51 | D65 2 | 89.09 | −0.63 | 13.70 | 70.38 | 74.36 | 63.95 | 0.3373 | 0.3563 | 0.3064 |
| GC51 | F2 10 | 89.37 | 0.11 | 15.67 | 77.42 | 74.95 | 39.19 | 0.4042 | 0.3913 | 0.2046 |
| GC51 | A 10 | 89.65 | 3.52 | 14.16 | 85.94 | 75.56 | 20.87 | 0.4712 | 0.4143 | 0.1144 |
| GC51 | D65 10 | 88.72 | 0.25 | 13.75 | 69.87 | 73.57 | 62.26 | 0.3397 | 0.3577 | 0.3027 |
| GC97 | F2 2 | 93.13 | −0.57 | 9.32 | 82.26 | 83.26 | 47.82 | 0.3856 | 0.3903 | 0.2242 |
| GC97 | A 2 | 93.25 | 1.73 | 8.14 | 92.80 | 83.54 | 26.05 | 0.4585 | 0.4128 | 0.1287 |
| GC97 | D65 2 | 92.84 | −0.79 | 8.24 | 78.12 | 82.60 | 78.60 | 0.3264 | 0.3451 | 0.3284 |
| GC97 | F2 10 | 92.99 | −0.21 | 9.46 | 85.52 | 82.95 | 48.69 | 0.3938 | 0.3820 | 0.2242 |
| GC97 | A 10 | 93.15 | 1.87 | 8.46 | 93.71 | 83.32 | 25.56 | 0.4626 | 0.4113 | 0.1262 |
| GC97 | D65 10 | 92.62 | −0.27 | 8.30 | 77.70 | 82.10 | 76.90 | 0.3283 | 0.3468 | 0.3249 |
| GC22 | F2 2 | 94.95 | −0.47 | 5.63 | 86.50 | 87.50 | 53.51 | 0.3802 | 0.3846 | 0.2352 |
| GC22 | A 2 | 95.01 | 0.90 | 4.88 | 96.84 | 87.65 | 28.87 | 0.4539 | 0.4108 | 0.1353 |
| GC22 | D65 2 | 94.78 | −0.66 | 4.98 | 82.44 | 87.09 | 87.60 | 0.3206 | 0.3387 | 0.3407 |
| GC22 | F2 10 | 94.87 | −0.25 | 5.72 | 89.98 | 87.30 | 54.61 | 0.3880 | 0.3765 | 0.2355 |
| GC22 | A 10 | 94.95 | 0.99 | 5.08 | 97.87 | 87.51 | 28.42 | 0.4578 | 0.4093 | 0.1329 |
| GC22 | D65 10 | 94.64 | −0.34 | 5.03 | 82.10 | 86.78 | 85.96 | 0.3222 | 0.3405 | 0.3373 |
| GC23 | F2 2 | 95.34 | −0.43 | 4.54 | 87.43 | 88.42 | 55.04 | 0.3787 | 0.3829 | 0.2384 |
| GC23 | A 2 | 95.38 | 0.67 | 3.91 | 97.67 | 88.53 | 29.62 | 0.4525 | 0.4102 | 0.1373 |
| GC23 | D65 2 | 95.20 | −0.60 | 4.01 | 83.42 | 88.09 | 90.03 | 0.3190 | 0.3368 | 0.3442 |
| GC23 | F2 10 | 95.27 | −0.24 | 4.62 | 90.97 | 88.26 | 56.22 | 0.3864 | 0.3749 | 0.2388 |
| GC23 | A 10 | 95.34 | 0.75 | 4.08 | 98.74 | 88.42 | 29.19 | 0.4564 | 0.4087 | 0.1349 |
| GC23 | D65 10 | 95.09 | −0.34 | 4.06 | 83.10 | 87.84 | 88.41 | 0.3204 | 0.3387 | 0.3409 |

TABLE 11

| Glass-Ceramic | Illuminant and Observer Angle (°) | L* | A* | B* | X | Y | Z | x | y | z |
|---|---|---|---|---|---|---|---|---|---|---|
| | Color Calculated from Diffuse Transmittance Data | | | | | | | | | |
| GC50 | F2 2 | 35.91 | −1.02 | −30.66 | 8.77 | 8.96 | 14.51 | 0.2719 | 0.2780 | 0.4500 |
| GC50 | A 2 | 35.10 | −14.39 | −29.52 | 7.67 | 8.55 | 7.24 | 0.3269 | 0.3644 | 0.3087 |
| GC50 | D65 2 | 37.59 | −1.57 | −26.75 | 9.18 | 9.86 | 23.02 | 0.2183 | 0.2344 | 0.5473 |
| GC50 | F2 10 | 36.61 | −2.83 | −30.05 | 9.28 | 9.33 | 15.09 | 0.2753 | 0.2769 | 0.4478 |
| GC50 | A 10 | 35.65 | −14.73 | −29.48 | 7.99 | 8.83 | 7.33 | 0.3309 | 0.3656 | 0.3035 |
| GC50 | D65 10 | 38.67 | −4.18 | −25.59 | 9.40 | 10.47 | 23.09 | 0.2189 | 0.2436 | 0.5375 |
| GC51 | F2 2 | 40.40 | −1.48 | −25.98 | 11.19 | 11.49 | 15.64 | 0.2920 | 0.2999 | 0.4081 |
| GC51 | A 2 | 39.68 | −12.25 | −25.04 | 10.39 | 11.06 | 7.89 | 0.3540 | 0.3770 | 0.2690 |
| GC51 | D65 2 | 41.76 | −2.18 | −22.76 | 11.43 | 12.35 | 24.92 | 0.2347 | 0.2535 | 0.5118 |
| GC51 | F2 10 | 40.96 | −2.85 | −25.53 | 11.80 | 11.84 | 16.23 | 0.2960 | 0.2970 | 0.4071 |
| GC51 | A 10 | 40.13 | −12.46 | −25.06 | 10.74 | 11.33 | 7.96 | 0.3578 | 0.3772 | 0.2650 |
| GC51 | D65 10 | 42.64 | −4.22 | −21.85 | 11.65 | 12.92 | 24.94 | 0.2353 | 0.2610 | 0.5037 |
| GC97 | F2 2 | 18.98 | 3.75 | −30.73 | 2.93 | 2.74 | 6.31 | 0.2443 | 0.2289 | 0.5268 |
| GC97 | A 2 | 18.41 | −9.30 | −28.59 | 2.36 | 2.61 | 3.02 | 0.2954 | 0.3265 | 0.3782 |
| GC97 | D65 2 | 20.52 | 4.67 | −26.78 | 3.24 | 3.12 | 9.84 | 0.1999 | 0.1927 | 0.6074 |
| GC97 | F2 10 | 19.72 | 1.58 | −30.23 | 3.11 | 2.92 | 6.63 | 0.2455 | 0.2307 | 0.5238 |
| GC97 | A 10 | 18.95 | −10.04 | −28.75 | 2.47 | 2.74 | 3.10 | 0.2974 | 0.3291 | 0.3735 |
| GC97 | D65 10 | 21.62 | 1.80 | −25.84 | 3.34 | 3.41 | 10.01 | 0.1994 | 0.2035 | 0.5971 |
| GC22 | F2 2 | 5.09 | 4.63 | −21.31 | 0.68 | 0.56 | 1.60 | 0.2379 | 0.1982 | 0.5639 |
| GC22 | A 2 | 4.90 | −1.90 | −18.93 | 0.54 | 0.54 | 0.74 | 0.2974 | 0.2974 | 0.4052 |
| GC22 | D65 2 | 5.80 | 6.50 | −18.96 | 0.77 | 0.64 | 2.46 | 0.1986 | 0.1658 | 0.6356 |
| GC22 | F2 10 | 5.49 | 3.43 | −21.30 | 0.72 | 0.61 | 1.70 | 0.2372 | 0.2007 | 0.5621 |
| GC22 | A 10 | 5.16 | −2.47 | −19.43 | 0.56 | 0.57 | 0.77 | 0.2962 | 0.2999 | 0.4039 |
| GC22 | D65 10 | 6.44 | 4.92 | −18.71 | 0.80 | 0.71 | 2.54 | 0.1967 | 0.1762 | 0.6271 |
| GC23 | F2 2 | 3.34 | 3.94 | −19.83 | 0.47 | 0.37 | 1.26 | 0.2229 | 0.1765 | 0.6006 |
| GC23 | A 2 | 3.18 | −1.42 | −17.40 | 0.35 | 0.35 | 0.57 | 0.2727 | 0.2770 | 0.4504 |
| GC23 | D65 2 | 3.90 | 5.54 | −17.73 | 0.55 | 0.43 | 1.92 | 0.1884 | 0.1490 | 0.6626 |
| GC23 | F2 10 | 3.66 | 2.96 | −19.95 | 0.50 | 0.41 | 1.34 | 0.2219 | 0.1810 | 0.5971 |
| GC23 | A 10 | 3.39 | −1.88 | −17.99 | 0.36 | 0.38 | 0.60 | 0.2717 | 0.2807 | 0.4476 |
| GC23 | D65 10 | 4.42 | 4.28 | −17.69 | 0.57 | 0.49 | 1.99 | 0.1867 | 0.1608 | 0.6526 |

In addition to the foregoing examples and disclosure concerning glass-ceramic comprising jeffbenite, as part of exploring the presently disclosed technology of precursor glass compositions and glass-ceramics formed therefrom, the following tables provide additional compositions that were melted by Applicants as described herein, which correspond to information disclosed herein as well as other samples disclosed and further described herein. The additional compositions are presented in mol. % on an oxide basis and are listed in Table 12.

TABLE 12

| Composition (mol. %) | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| $SiO_2$ | 54.37 | 54.58 | 54.46 | 50.66 | 54.66 | 48.25 | 45.76 | 43.33 | 41.07 | 50.34 | 52.42 |
| $Al_2O_3$ | 9.16 | 9.20 | 9.18 | 8.43 | 9.20 | 13.79 | 13.76 | 13.73 | 13.70 | 13.77 | 11.48 |
| MgO | 23.33 | 23.42 | 23.37 | 28.87 | 23.43 | 30.89 | 34.39 | 37.79 | 41.09 | 27.62 | 25.42 |
| $Na_2O$ | 4.65 | 4.66 | 4.65 | 4.25 | 4.66 | 3.44 | 2.29 | 1.17 | 0.00 | 4.61 | 4.63 |
| $K_2O$ | 4.74 | 4.76 | 4.75 | 4.26 | 1.85 | 0.00 | 0.00 | 0.00 | 0.00 | 0.00 | 2.36 |
| CaO | 0.00 | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 2.51 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 | 0.00 |
| $ZrO_2$ | 1.43 | 2.15 | 3.10 | 2.33 | 2.44 | 3.51 | 3.69 | 3.86 | 4.03 | 3.55 | 3.56 |
| $TiO_2$ | 2.21 | 1.11 | 0.37 | 1.08 | 1.13 | 0.00 | 0.00 | 0.00 | 0.00 | 0.00 | 0.00 |
| $P_2O_5$ | 0.00 | 0.00 | 0.00 | 0.00 | 0.00 | 0.00 | 0.00 | 0.00 | 0.00 | 0.00 | 0.00 |
| $SnO_2$ | 0.12 | 0.12 | 0.12 | 0.11 | 0.12 | 0.11 | 0.11 | 0.11 | 0.11 | 0.12 | 0.12 |

| Composition (mol. %) | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|
| $SiO_2$ | 51.34 | 53.05 | 48.60 | 48.47 | 46.05 | 45.93 | 43.54 | 43.44 | 52.83 | 51.08 | 49.36 |
| $Al_2O_3$ | 12.66 | 12.14 | 9.88 | 9.86 | 11.21 | 11.18 | 12.50 | 12.47 | 10.41 | 10.41 | 10.96 |
| MgO | 26.53 | 25.64 | 32.25 | 32.16 | 35.23 | 35.15 | 38.14 | 38.05 | 25.67 | 28.07 | 30.43 |
| $Na_2O$ | 4.62 | 4.33 | 3.23 | 3.22 | 2.10 | 2.09 | 1.08 | 1.08 | 4.06 | 3.46 | 2.88 |
| $K_2O$ | 1.18 | 1.18 | 3.16 | 3.15 | 2.10 | 2.10 | 1.01 | 1.01 | 4.10 | 3.45 | 2.87 |
| CaO | 0.00 | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 | 0.00 |
| $ZrO_2$ | 3.56 | 3.55 | 2.79 | 2.32 | 3.21 | 2.75 | 3.63 | 3.17 | 3.08 | 3.06 | 3.04 |
| $TiO_2$ | 0.00 | 0.00 | 0.00 | 0.71 | 0.00 | 0.71 | 0.00 | 0.70 | 0.37 | 0.36 | 0.36 |
| $P_2O_5$ | 0.00 | 0.00 | 0.00 | 0.00 | 0.00 | 0.00 | 0.00 | 0.00 | 0.00 | 0.00 | 0.00 |
| $SnO_2$ | 0.12 | 0.12 | 0.09 | 0.09 | 0.09 | 0.09 | 0.09 | 0.09 | 0.10 | 0.10 | 0.10 |

| Composition (mol. %) | Ex. 23 | Ex. 24 | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|---|---|
| $SiO_2$ | 47.71 | 46.15 | 46.87 | 46.65 | 46.44 | 48.09 | 47.92 | 47.46 | 47.23 | 47.16 | 48.68 |
| $Al_2O_3$ | 11.56 | 12.15 | 11.36 | 11.31 | 11.26 | 9.77 | 9.74 | 10.57 | 10.52 | 11.43 | 10.07 |
| MgO | 32.65 | 34.82 | 33.81 | 33.65 | 33.50 | 31.85 | 31.88 | 33.82 | 33.65 | 34.02 | 32.02 |
| $Na_2O$ | 2.31 | 1.74 | 2.29 | 2.28 | 2.27 | 2.69 | 2.17 | 2.67 | 2.66 | 2.58 | 3.24 |
| $K_2O$ | 2.31 | 1.69 | 2.11 | 2.10 | 2.09 | 2.63 | 2.11 | 2.60 | 2.59 | 1.94 | 3.11 |
| CaO | 0.00 | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 1.13 | 2.29 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 | 0.00 |
| $ZrO_2$ | 3.02 | 3.00 | 2.76 | 3.21 | 3.65 | 3.04 | 3.08 | 2.78 | 1.84 | 2.78 | 2.79 |
| $TiO_2$ | 0.36 | 0.36 | 0.71 | 0.71 | 0.70 | 0.72 | 0.73 | 0.00 | 1.42 | 0.00 | 0.00 |
| $P_2O_5$ | 0.00 | 0.00 | 0.00 | 0.00 | 0.00 | 0.00 | 0.00 | 0.00 | 0.00 | 0.00 | 0.00 |
| $SnO_2$ | 0.09 | 0.09 | 0.09 | 0.09 | 0.09 | 0.10 | 0.10 | 0.09 | 0.09 | 0.09 | 0.10 |

| Composition (mol. %) | Ex. 34 | Ex. 35 | Ex. 36 | Ex. 37 | Ex. 38 | Ex. 39 | Ex. 40 | Ex. 41 | Ex. 42 | Ex. 43 | Ex. 44 |
|---|---|---|---|---|---|---|---|---|---|---|---|
| $SiO_2$ | 46.83 | 51.04 | 50.79 | 48.01 | 45.32 | 43.73 | 41.60 | 49.65 | 48.59 | 47.59 | 47.18 |
| $Al_2O_3$ | 12.23 | 9.91 | 9.86 | 8.61 | 8.71 | 8.99 | 9.47 | 9.36 | 10.29 | 11.23 | 11.86 |
| MgO | 34.20 | 28.82 | 28.68 | 33.64 | 38.27 | 39.55 | 45.10 | 30.06 | 31.41 | 32.51 | 32.98 |
| $Na_2O$ | 2.58 | 3.66 | 3.64 | 3.18 | 2.07 | 2.36 | 0.00 | 3.87 | 3.40 | 3.03 | 2.58 |
| $K_2O$ | 1.28 | 3.64 | 3.62 | 3.11 | 2.05 | 2.17 | 0.00 | 3.46 | 2.72 | 2.06 | 1.82 |
| CaO | 0.00 | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 | 0.00 |
| $ZrO_2$ | 2.78 | 2.83 | 1.88 | 2.23 | 2.09 | 2.37 | 2.31 | 2.78 | 2.78 | 2.77 | 2.78 |
| $TiO_2$ | 0.00 | 0.00 | 1.45 | 1.12 | 1.39 | 0.73 | 1.42 | 0.72 | 0.71 | 0.71 | 0.71 |
| $P_2O_5$ | 0.00 | 0.00 | 0.00 | 0.00 | 0.00 | 0.00 | 0.00 | 0.00 | 0.00 | 0.00 | 0.00 |
| $SnO_2$ | 0.09 | 0.10 | 0.10 | 0.10 | 0.10 | 0.10 | 0.09 | 0.09 | 0.09 | 0.09 | 0.09 |

TABLE 12-continued

| Composition (mol. %) | Ex. 45 | Ex. 46 | Ex. 47 | Ex. 48 | Ex. 49 | Ex. 50 | Ex. 51 | Ex. 52 | Ex. 53 | Ex. 54 | Ex. 55 |
|---|---|---|---|---|---|---|---|---|---|---|---|
| $SiO_2$ | 50.57 | 45.77 | 48.18 | 48.12 | 47.95 | 50.63 | 50.57 | 48.60 | 48.60 | 48.47 | 48.47 |
| $Al_2O_3$ | 10.31 | 10.55 | 11.65 | 11.63 | 11.59 | 9.61 | 9.60 | 9.88 | 9.88 | 9.86 | 9.86 |
| MgO | 28.66 | 33.42 | 31.87 | 31.83 | 31.72 | 31.45 | 31.41 | 32.25 | 32.25 | 32.16 | 32.16 |
| $Na_2O$ | 3.45 | 3.47 | 2.76 | 2.76 | 2.75 | 2.91 | 2.90 | 3.23 | 3.23 | 3.22 | 3.22 |
| $K_2O$ | 3.37 | 2.88 | 1.82 | 1.82 | 1.81 | 1.73 | 1.73 | 3.16 | 3.16 | 3.15 | 3.15 |
| CaO | 0.00 | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 | 0.00 |
| $ZrO_2$ | 2.81 | 2.76 | 2.55 | 2.31 | 2.31 | 2.51 | 2.28 | 2.79 | 2.79 | 2.32 | 2.32 |
| $TiO_2$ | 0.72 | 1.06 | 1.07 | 1.43 | 1.78 | 1.06 | 1.41 | 0.00 | 0.00 | 0.71 | 0.71 |
| $P_2O_5$ | 0.00 | 0.00 | 0.00 | 0.00 | 0.00 | 0.00 | 0.00 | 0.00 | 0.00 | 0.00 | 0.00 |
| $SnO_2$ | 0.10 | 0.09 | 0.09 | 0.09 | 0.09 | 0.09 | 0.09 | 0.09 | 0.09 | 0.09 | 0.09 |

| Composition (mol. %) | Ex. 56 | Ex. 57 | Ex. 58 | Ex. 59 | Ex. 60 | Ex. 61 | Ex. 62 | Ex. 63 | Ex. 64 | Ex. 65 | Ex. 66 |
|---|---|---|---|---|---|---|---|---|---|---|---|
| $SiO_2$ | 45.93 | 45.93 | 54.46 | 54.46 | 50.66 | 50.66 | 48.93 | 48.71 | 48.59 | 48.47 | 48.26 |
| $Al_2O_3$ | 11.18 | 11.18 | 9.18 | 9.18 | 8.43 | 8.43 | 9.63 | 9.59 | 9.56 | 9.54 | 9.50 |
| MgO | 35.15 | 35.15 | 23.37 | 23.37 | 28.87 | 28.87 | 35.16 | 35.00 | 34.91 | 34.83 | 34.67 |
| $Na_2O$ | 2.09 | 2.09 | 4.65 | 4.65 | 4.25 | 4.25 | 2.70 | 2.69 | 2.68 | 2.68 | 2.66 |
| $K_2O$ | 2.10 | 2.10 | 4.75 | 4.75 | 4.26 | 4.26 | 0.77 | 0.77 | 0.76 | 0.76 | 0.76 |
| CaO | 0.00 | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 | 0.00 |
| $ZrO_2$ | 2.75 | 2.75 | 3.10 | 3.10 | 2.33 | 2.33 | 2.72 | 3.15 | 2.70 | 2.24 | 2.68 |
| $TiO_2$ | 0.71 | 0.71 | 0.37 | 0.37 | 1.08 | 1.08 | 0.00 | 0.00 | 0.69 | 1.38 | 1.38 |
| $P_2O_5$ | 0.00 | 0.00 | 0.00 | 0.00 | 0.00 | 0.00 | 0.00 | 0.00 | 0.00 | 0.00 | 0.00 |
| $SnO_2$ | 0.09 | 0.09 | 0.12 | 0.12 | 0.11 | 0.11 | 0.09 | 0.09 | 0.09 | 0.09 | 0.09 |

| Composition (mol. %) | Ex. 67 | Ex. 68 | Ex. 69 | Ex. 70 | Ex. 71 | Ex. 72 | Ex. 73 | Ex. 74 | Ex. 75 | Ex. 76 | Ex. 77 |
|---|---|---|---|---|---|---|---|---|---|---|---|
| $SiO_2$ | 44.04 | 46.60 | 46.66 | 46.64 | 46.52 | 46.62 | 46.43 | 44.36 | 45.05 | 45.02 | 45.05 |
| $Al_2O_3$ | 7.90 | 11.25 | 11.24 | 11.23 | 11.21 | 11.26 | 11.22 | 11.15 | 9.66 | 9.65 | 9.66 |
| MgO | 44.12 | 33.48 | 33.54 | 33.43 | 33.47 | 33.50 | 33.45 | 36.54 | 37.31 | 29.25 | 29.26 |
| $Na_2O$ | 0.00 | 2.81 | 2.78 | 2.82 | 2.86 | 2.80 | 2.82 | 2.80 | 2.95 | 2.95 | 2.95 |
| $K_2O$ | 0.00 | 1.61 | 0.00 | 0.00 | 0.00 | 0.00 | 0.00 | 1.60 | 1.44 | 1.44 | 1.44 |
| CaO | 0.00 | 0.00 | 1.59 | 0.00 | 0.00 | 0.00 | 0.00 | 0.00 | 0.00 | 8.09 | 0.00 |
| SrO | 0.00 | 0.00 | 0.00 | 1.63 | 0.00 | 0.00 | 0.00 | 0.00 | 0.00 | 0.00 | 0.00 |
| BaO | 0.00 | 0.00 | 0.00 | 0.00 | 1.64 | 0.00 | 0.00 | 0.00 | 0.00 | 0.00 | 0.00 |
| ZnO | 0.00 | 0.00 | 0.00 | 0.00 | 0.00 | 1.58 | 0.00 | 0.00 | 0.00 | 0.00 | 8.04 |
| FeO | 0.00 | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 1.68 | 0.00 | 0.00 | 0.00 | 0.00 |
| $ZrO_2$ | 2.55 | 2.74 | 2.71 | 2.75 | 2.78 | 2.73 | 2.84 | 2.27 | 2.39 | 2.39 | 2.39 |
| $TiO_2$ | 1.31 | 1.41 | 1.39 | 1.41 | 1.43 | 1.40 | 1.46 | 0.00 | 1.11 | 1.11 | 1.11 |
| $P_2O_5$ | 0.00 | 0.00 | 0.00 | 0.00 | 0.00 | 0.00 | 0.00 | 1.18 | 0.00 | 0.00 | 0.00 |
| $SnO_2$ | 0.09 | 0.09 | 0.09 | 0.09 | 0.09 | 0.09 | 0.10 | 0.09 | 0.10 | 0.10 | 0.10 |

| Composition (mol. %) | Ex. 78 | Ex. 79 | Ex. 80 | Ex. 81 | Ex. 82 | Ex. 83 | Ex. 84 | Ex. 85 | Ex. 86 | Ex. 87 | Ex. 88 |
|---|---|---|---|---|---|---|---|---|---|---|---|
| $SiO_2$ | 45.67 | 45.05 | 48.01 | 48.01 | 43.73 | 43.73 | 48.81 | 46.20 | 47.47 | 45.45 | 46.21 |
| $Al_2O_3$ | 10.05 | 9.66 | 8.61 | 8.61 | 8.99 | 8.99 | 10.82 | 9.93 | 10.40 | 8.68 | 9.93 |
| MgO | 33.89 | 29.26 | 33.64 | 33.64 | 39.55 | 39.55 | 31.27 | 35.98 | 33.60 | 38.14 | 31.43 |
| $Na_2O$ | 3.00 | 2.95 | 3.18 | 3.18 | 2.36 | 2.36 | 3.72 | 2.87 | 3.29 | 2.82 | 2.87 |
| $K_2O$ | 0.00 | 1.44 | 3.11 | 3.11 | 2.17 | 2.17 | 1.54 | 0.69 | 1.15 | 1.36 | 0.69 |
| CaO | 0.00 | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 | 4.55 |
| FeO | 0.00 | 8.04 | 0.00 | 0.00 | 0.00 | 0.00 | 0.00 | 0.00 | 0.00 | 0.00 | 0.00 |
| $Li_2O$ | 1.60 | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 | 0.00 |
| $ZrO_2$ | 3.89 | 2.39 | 2.23 | 2.23 | 2.37 | 2.37 | 2.07 | 2.31 | 2.19 | 2.08 | 2.31 |
| $TiO_2$ | 1.80 | 1.11 | 1.12 | 1.12 | 0.73 | 0.73 | 1.67 | 1.93 | 1.80 | 1.38 | 1.93 |
| $P_2O_5$ | 0.00 | 0.00 | 0.00 | 0.00 | 0.00 | 0.00 | 0.00 | 0.00 | 0.00 | 0.00 | 0.00 |
| $SnO_2$ | 0.10 | 0.10 | 0.10 | 0.10 | 0.10 | 0.10 | 0.10 | 0.10 | 0.10 | 0.10 | 0.10 |

TABLE 12-continued

| Composition (mol. %) | Ex. 89 | Ex. 90 | Ex. 91 | Ex. 92 | Ex. 93 | Ex. 94 | Ex. 95 | Ex. 96 | Ex. 97 | Ex. 98 | Ex. 99 |
|---|---|---|---|---|---|---|---|---|---|---|---|
| $SiO_2$ | 46.21 | 44.62 | 44.62 | 43.79 | 43.79 | 42.91 | 42.91 | 42.82 | 42.40 | 43.40 | 42.81 |
| $Al_2O_3$ | 9.93 | 14.20 | 14.20 | 12.40 | 12.40 | 10.70 | 10.70 | 11.45 | 11.34 | 13.02 | 12.88 |
| MgO | 31.43 | 42.90 | 42.90 | 44.70 | 44.70 | 46.50 | 46.50 | 37.06 | 36.76 | 36.19 | 35.74 |
| $Na_2O$ | 2.87 | 0.00 | 0.00 | 0.00 | 0.00 | 0.00 | 0.00 | 0.00 | 3.79 | 0.00 | 4.20 |
| $K_2O$ | 0.69 | 0.00 | 0.00 | 0.00 | 0.00 | 0.00 | 0.00 | 0.00 | 0.00 | 0.00 | 0.00 |
| CaO | 4.54 | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 2.88 | 0.00 | 2.99 | 0.00 |
| $Y_2O_3$ | 0.00 | 0.00 | 0.00 | 0.00 | 0.00 | 0.00 | 0.00 | 0.00 | 0.00 | 0.00 | 0.00 |
| $ZrO_2$ | 2.31 | 0.00 | 0.00 | 1.79 | 1.79 | 3.58 | 3.58 | 3.56 | 3.52 | 2.90 | 2.85 |
| $TiO_2$ | 1.93 | 0.00 | 0.00 | 0.00 | 0.00 | 0.00 | 0.00 | 2.15 | 2.11 | 1.42 | 1.44 |
| $P_2O_5$ | 0.00 | 0.00 | 0.00 | 0.00 | 0.00 | 0.00 | 0.00 | 0.00 | 0.00 | 0.00 | 0.00 |
| $SnO_2$ | 0.10 | 0.00 | 0.00 | 0.00 | 0.00 | 0.00 | 0.00 | 0.08 | 0.08 | 0.08 | 0.08 |

| Composition (mol. %) | Ex. 100 | Ex. 101 | Ex. 102 | Ex. 103 | Ex. 104 | Ex. 105 | Ex. 106 | Ex. 107 | Ex. 108 | Ex. 109 |
|---|---|---|---|---|---|---|---|---|---|---|
| $SiO_2$ | 44.72 | 47.88 | 44.74 | 43.11 | 43.08 | 44.40 | 43.03 | 40.00 | 40.01 | 44.61 |
| $Al_2O_3$ | 14.94 | 11.58 | 14.92 | 12.23 | 12.24 | 14.06 | 12.21 | 6.67 | 6.64 | 8.38 |
| MgO | 31.29 | 31.76 | 31.26 | 36.63 | 36.61 | 31.86 | 27.70 | 46.55 | 33.29 | 38.48 |
| $Na_2O$ | 0.00 | 2.81 | 4.53 | 2.93 | 0.00 | 4.42 | 2.90 | 0.00 | 0.00 | 2.93 |
| $K_2O$ | 0.00 | 0.00 | 0.00 | 0.00 | 2.94 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 1.78 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 8.67 | 0.00 | 13.36 | 0.00 |
| FeO | 0.00 | 0.00 | 0.00 | 0.00 | 0.00 | 0.00 | 0.00 | 0.00 | 0.00 | 0.00 |
| $Li_2O$ | 4.49 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 2.97 | 2.32 | 2.99 | 3.58 | 3.59 | 3.69 | 3.59 | 4.00 | 3.98 | 3.32 |
| $TiO_2$ | 1.53 | 1.79 | 1.48 | 1.44 | 1.46 | 1.48 | 1.45 | 2.70 | 2.64 | 2.20 |
| $P_2O_5$ | 0.00 | 0.00 | 0.00 | 0.00 | 0.00 | 0.00 | 0.00 | 0.00 | 0.00 | 0.00 |
| $SnO_2$ | 0.08 | 0.08 | 0.08 | 0.08 | 0.08 | 0.08 | 0.09 | 0.08 | 0.08 | 0.08 |
| $MnO_2$ | 0.00 | 0.00 | 0.00 | 0.00 | 0.00 | 0.00 | 0.37 | 0.00 | 0.00 | 0.00 |

| Composition (mol. %) | Ex. 110 | Ex. 111 | Ex. 112 | Ex. 113 | Ex. 114 | Ex. 115 | Ex. 116 | Ex. 117 | Ex. 118 | Ex. 119 |
|---|---|---|---|---|---|---|---|---|---|---|
| $SiO_2$ | 44.55 | 44.15 | 44.38 | 44.49 | 39.47 | 39.51 | 45.08 | 45.86 | 45.79 | 45.48 |
| $Al_2O_3$ | 8.38 | 7.24 | 7.33 | 7.36 | 5.29 | 5.27 | 10.68 | 10.89 | 10.91 | 10.79 |
| MgO | 29.10 | 39.08 | 32.24 | 27.84 | 47.29 | 36.80 | 36.63 | 33.65 | 33.67 | 35.10 |
| $Na_2O$ | 2.92 | 2.93 | 3.07 | 3.15 | 0.00 | 0.00 | 2.98 | 3.07 | 3.06 | 3.02 |
| $K_2O$ | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 9.43 | 0.00 | 6.48 | 10.69 | 0.00 | 10.50 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.34 | 4.32 | 4.28 | 4.25 | 5.25 | 5.25 | 2.99 | 4.83 | 4.27 | 3.93 |
| $TiO_2$ | 2.19 | 2.20 | 2.15 | 2.13 | 2.63 | 2.60 | 1.56 | 1.61 | 2.22 | 1.59 |
| $P_2O_5$ | 0.00 | 0.00 | 0.00 | 0.00 | 0.00 | 0.00 | 0.00 | 0.00 | 0.00 | 0.00 |
| $SnO_2$ | 0.08 | 0.08 | 0.08 | 0.08 | 0.08 | 0.08 | 0.08 | 0.08 | 0.08 | 0.08 |

| Composition (mol. %) | Ex. 120 | Ex. 121 | Ex. 122 | Ex. 123 | Ex. 124 | Ex. 125 | Ex. 126 | Ex. 127 | Ex. 128 | Ex. 129 |
|---|---|---|---|---|---|---|---|---|---|---|
| $SiO_2$ | 45.51 | 42.85 | 47.19 | 42.82 | 46.64 | 45.68 | 46.96 | 43.78 | 47.66 | 44.55 |
| $Al_2O_3$ | 10.78 | 11.40 | 12.32 | 11.43 | 12.23 | 10.84 | 12.31 | 11.70 | 11.15 | 9.48 |
| MgO | 35.05 | 39.93 | 32.68 | 39.98 | 32.29 | 33.68 | 30.07 | 37.85 | 33.08 | 36.47 |
| $Na_2O$ | 3.02 | 0.00 | 3.05 | 0.00 | 3.03 | 3.00 | 3.11 | 0.00 | 2.97 | 2.93 |
| $K_2O$ | 0.00 | 0.00 | 0.00 | 0.00 | 1.16 | 2.23 | 2.90 | 0.80 | 0.00 | 1.37 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.67 | 3.58 | 2.92 | 4.28 | 3.44 | 3.36 | 3.48 | 4.38 | 3.44 | 3.52 |

TABLE 12-continued

| Composition (mol. %) | | | | | | | | | |
|---|---|---|---|---|---|---|---|---|---|
| TiO$_2$ | 1.89 | 2.16 | 1.76 | 1.42 | 1.14 | 1.13 | 1.09 | 1.41 | 1.62 | 1.61 |
| P$_2$O$_5$ | 0.00 | 0.00 | 0.00 | 0.00 | 0.00 | 0.00 | 0.00 | 0.00 | 0.00 | 0.00 |
| SnO$_2$ | 0.08 | 0.08 | 0.08 | 0.08 | 0.08 | 0.08 | 0.08 | 0.08 | 0.08 | 0.08 |

| Composition (mol. %) | Ex. 130 | Ex. 131 | Ex. 132 | Ex. 133 | Ex. 134 | Ex. 135 | Ex. 136 | Ex. 137 | Ex. 138 | Ex. 139 |
|---|---|---|---|---|---|---|---|---|---|---|
| SiO$_2$ | 42.29 | 42.82 | 40.29 | 39.48 | 43.71 | 45.05 | 43.43 | 44.97 | 44.72 | 42.85 |
| Al$_2$O$_3$ | 9.84 | 11.46 | 8.08 | 10.65 | 13.95 | 15.00 | 12.34 | 14.99 | 14.91 | 11.42 |
| MgO | 42.18 | 37.10 | 40.25 | 36.75 | 32.10 | 29.37 | 34.78 | 30.01 | 31.30 | 34.27 |
| Na$_2$O | 0.00 | 2.83 | 0.00 | 0.00 | 0.00 | 2.99 | 0.00 | 0.00 | 2.34 | 0.00 |
| K$_2$O | 0.00 | 0.00 | 0.00 | 0.00 | 4.35 | 2.24 | 3.65 | 5.01 | 2.21 | 2.85 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 5.37 | 7.87 | 0.00 | 0.00 | 0.00 | 0.00 | 0.00 | 2.87 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 | 0.00 | 0.00 | 0.00 |
| ZrO$_2$ | 4.19 | 4.27 | 4.01 | 3.32 | 4.37 | 3.74 | 4.32 | 4.49 | 2.97 | 4.28 |
| TiO$_2$ | 1.43 | 1.44 | 1.90 | 1.85 | 1.44 | 1.52 | 1.41 | 0.49 | 1.50 | 1.42 |
| P$_2$O$_5$ | 0.00 | 0.00 | 0.00 | 0.00 | 0.00 | 0.00 | 0.00 | 0.00 | 0.00 | 0.00 |
| SnO$_2$ | 0.08 | 0.08 | 0.08 | 0.09 | 0.08 | 0.08 | 0.08 | 0.04 | 0.04 | 0.04 |

| Composition (mol. %) | Ex. 140 | Ex. 141 | Ex. 142 | Ex. 143 | Ex. 144 | Ex. 145 | Ex. 146 | Ex. 147 | Ex. 148 | Ex. 149 |
|---|---|---|---|---|---|---|---|---|---|---|
| SiO$_2$ | 42.81 | 44.72 | 10.20 | 43.49 | 45.89 | 42.84 | 43.44 | 43.50 | 42.90 | 42.91 |
| Al$_2$O$_3$ | 11.45 | 14.90 | 3.07 | 13.02 | 11.00 | 12.86 | 10.13 | 10.12 | 8.55 | 8.54 |
| MgO | 34.20 | 31.35 | 85.02 | 36.15 | 36.54 | 37.13 | 36.28 | 36.25 | 37.07 | 37.05 |
| Na$_2$O | 2.88 | 0.00 | 0.69 | 0.00 | 0.00 | 0.00 | 2.90 | 2.92 | 2.90 | 2.92 |
| K$_2$O | 0.00 | 4.47 | 0.00 | 2.94 | 1.93 | 1.44 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 2.87 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 2.90 | 0.00 | 2.87 | 0.00 |
| ZrO$_2$ | 4.30 | 3.00 | 0.68 | 2.89 | 3.69 | 4.30 | 2.91 | 2.88 | 4.27 | 4.29 |
| TiO$_2$ | 1.44 | 1.52 | 0.34 | 1.46 | 0.91 | 1.39 | 1.45 | 1.43 | 1.44 | 1.43 |
| P$_2$O$_5$ | 0.00 | 0.00 | 0.00 | 0.00 | 0.00 | 0.00 | 0.00 | 0.00 | 0.00 | 0.00 |
| SnO$_2$ | 0.04 | 0.04 | 0.01 | 0.04 | 0.04 | 0.04 | 0.00 | 0.00 | 0.00 | 0.00 |
| MnO$_2$ | 0.00 | 0.00 | 0.00 | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 2.90 | 0.00 | 2.86 | 0.00 |

| Composition (mol. %) | Ex. 150 | Ex. 151 | Ex. 152 | Ex. 153 | Ex. 154 | Ex. 155 | Ex. 156 | Ex. 157 | Ex. 158 | Ex. 159 |
|---|---|---|---|---|---|---|---|---|---|---|
| SiO$_2$ | 44.47 | 48.68 | 46.60 | 45.05 | 42.81 | 42.40 | 42.86 | 40.85 | 41.02 | 43.41 |
| Al$_2$O$_3$ | 14.12 | 10.07 | 11.25 | 9.66 | 12.88 | 11.34 | 11.45 | 8.86 | 9.60 | 13.01 |
| MgO | 31.82 | 32.02 | 33.48 | 29.26 | 35.74 | 36.76 | 37.06 | 31.93 | 34.27 | 29.01 |
| Na$_2$O | 2.94 | 3.24 | 2.81 | 2.95 | 4.20 | 3.79 | 0.00 | 0.00 | 0.00 | 0.00 |
| K$_2$O | 1.47 | 3.11 | 1.61 | 1.44 | 0.00 | 0.00 | 2.87 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 8.04 | 0.00 | 0.00 | 0.00 | 13.57 | 10.96 | 7.26 |
| FeO | 0.00 | 0.00 | 0.00 | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 0.00 | 0.00 | 0.00 | 2.94 |
| Y$_2$O$_3$ | 0.00 | 0.00 | 0.00 | 0.00 | 0.00 | 0.00 | 0.00 | 0.00 | 0.00 | 0.00 |
| ZrO$_2$ | 3.67 | 2.79 | 2.74 | 2.39 | 2.85 | 3.52 | 4.29 | 3.41 | 3.42 | 3.62 |
| TiO$_2$ | 1.50 | 0.00 | 1.41 | 1.11 | 1.44 | 2.11 | 1.39 | 1.34 | 0.70 | 0.71 |
| P$_2$O$_5$ | 0.00 | 0.00 | 0.00 | 0.00 | 0.00 | 0.00 | 0.00 | 0.00 | 0.00 | 0.00 |
| SnO$_2$ | 0.00 | 0.10 | 0.09 | 0.10 | 0.08 | 0.08 | 0.08 | 0.04 | 0.04 | 0.04 |

| Composition (mol. %) | Ex. 160 | Ex. 161 | Ex. 162 | Ex. 163 | Ex. 164 | Ex. 165 | Ex. 166 | Ex. 167 | Ex. 168 | Ex. 169 |
|---|---|---|---|---|---|---|---|---|---|---|
| SiO$_2$ | 43.54 | 43.44 | 43.48 | 43.40 | 43.23 | 44.36 | 42.27 | 44.38 | 42.53 | 40.53 |
| Al$_2$O$_3$ | 13.02 | 13.04 | 13.06 | 13.05 | 12.98 | 14.07 | 9.84 | 14.02 | 13.50 | 8.13 |
| MgO | 28.97 | 31.92 | 31.94 | 32.03 | 31.75 | 30.39 | 29.55 | 22.93 | 21.93 | 32.39 |
| Na$_2$O | 2.88 | 2.89 | 2.86 | 2.85 | 2.85 | 2.97 | 0.00 | 3.00 | 2.84 | 0.00 |
| K$_2$O | 0.00 | 0.00 | 0.00 | 0.00 | 0.00 | 1.48 | 0.00 | 1.48 | 0.00 | 0.00 |
| CaO | 0.00 | 4.30 | 0.00 | 0.00 | 0.00 | 0.00 | 0.00 | 0.00 | 0.00 | 0.00 |
| SrO | 0.00 | 0.00 | 4.28 | 0.00 | 0.00 | 0.00 | 0.00 | 0.00 | 0.00 | 0.00 |
| BaO | 0.00 | 0.00 | 0.00 | 4.32 | 0.00 | 0.00 | 0.00 | 0.00 | 0.00 | 0.00 |
| ZnO | 7.21 | 0.00 | 0.00 | 0.00 | 4.80 | 1.48 | 9.85 | 8.91 | 8.50 | 13.50 |
| FeO | 0.00 | 0.00 | 0.00 | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 2.82 | 0.00 | 5.68 | 0.00 |

TABLE 12-continued

| Composition (mol. %) | | | | | | | | | | |
|---|---|---|---|---|---|---|---|---|---|---|
| $Y_2O_3$ | 0.00 | 0.00 | 0.00 | 0.00 | 0.00 | 0.00 | 0.00 | 0.00 | 0.00 | 0.00 |
| $ZrO_2$ | 3.62 | 4.37 | 3.29 | 3.24 | 4.35 | 3.71 | 4.22 | 3.72 | 3.53 | 4.08 |
| $TiO_2$ | 0.72 | 0.00 | 1.03 | 1.07 | 0.00 | 1.51 | 1.41 | 1.50 | 1.44 | 1.34 |
| $P_2O_5$ | 0.00 | 0.00 | 0.00 | 0.00 | 0.00 | 0.00 | 0.00 | 0.00 | 0.00 | 0.00 |
| $SnO_2$ | 0.04 | 0.04 | 0.04 | 0.04 | 0.04 | 0.04 | 0.04 | 0.04 | 0.04 | 0.04 |

| Composition (mol. %) | Ex. 170 | Ex. 171 | Ex. 172 | Ex. 173 | Ex. 174 | Ex. 175 | Ex. 176 | Ex. 177 | Ex. 178 | Ex. 179 |
|---|---|---|---|---|---|---|---|---|---|---|
| $SiO_2$ | 41.60 | 41.57 | 43.40 | 44.87 | 44.02 | 45.06 | 44.31 | 44.06 | 43.47 | 43.50 |
| $Al_2O_3$ | 10.71 | 10.72 | 10.14 | 11.33 | 9.88 | 10.93 | 11.01 | 10.95 | 11.41 | 11.38 |
| MgO | 27.26 | 27.29 | 28.34 | 26.28 | 28.91 | 26.87 | 27.06 | 26.90 | 31.78 | 36.80 |
| $Na_2O$ | 4.15 | 2.77 | 2.87 | 3.11 | 3.05 | 3.08 | 3.10 | 3.09 | 3.79 | 3.76 |
| $K_2O$ | 0.00 | 1.37 | 1.41 | 1.36 | 1.34 | 1.35 | 1.36 | 1.35 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 11.05 | 11.05 | 9.43 | 8.68 | 8.51 | 8.61 | 8.67 | 8.62 | 5.02 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.81 | 3.81 | 3.09 | 3.13 | 3.07 | 2.84 | 3.64 | 2.59 | 3.01 | 3.01 |
| $TiO_2$ | 1.37 | 1.38 | 1.27 | 1.21 | 1.18 | 1.20 | 0.80 | 2.40 | 1.47 | 1.50 |
| $P_2O_5$ | 0.00 | 0.00 | 0.00 | 0.00 | 0.00 | 0.00 | 0.00 | 0.00 | 0.00 | 0.00 |
| $SnO_2$ | 0.04 | 0.04 | 0.04 | 0.04 | 0.04 | 0.04 | 0.04 | 0.04 | 0.04 | 0.04 |

| Composition (mol. %) | Ex. 180 | Ex. 181 | Ex. 182 | Ex. 183 | Ex. 184 | Ex. 185 | Ex. 186 | Ex. 187 | Ex. 188 | Ex. 189 |
|---|---|---|---|---|---|---|---|---|---|---|
| $SiO_2$ | 43.48 | 42.96 | 42.44 | 44.27 | 45.43 | 47.47 | 45.44 | 46.17 | 46.56 | 47.24 |
| $Al_2O_3$ | 11.38 | 11.36 | 11.39 | 11.08 | 11.38 | 11.17 | 11.34 | 11.00 | 11.63 | 10.61 |
| MgO | 28.01 | 36.79 | 29.76 | 29.73 | 28.16 | 27.78 | 29.45 | 29.39 | 27.86 | 28.23 |
| $Na_2O$ | 3.79 | 3.78 | 3.77 | 2.83 | 3.46 | 3.84 | 3.53 | 3.22 | 4.25 | 3.83 |
| $K_2O$ | 0.00 | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 8.80 | 0.00 | 6.98 | 7.63 | 7.28 | 5.69 | 5.99 | 5.97 | 5.70 | 5.61 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 2.98 | 3.26 | 3.48 | 3.16 | 3.07 | 2.84 | 3.04 | 3.04 | 2.85 | 3.35 |
| $TiO_2$ | 1.51 | 1.80 | 2.13 | 1.26 | 1.18 | 1.17 | 1.17 | 1.17 | 1.10 | 1.10 |
| $P_2O_5$ | 0.00 | 0.00 | 0.00 | 0.00 | 0.00 | 0.00 | 0.00 | 0.00 | 0.00 | 0.00 |
| $SnO_2$ | 0.04 | 0.04 | 0.04 | 0.04 | 0.04 | 0.04 | 0.04 | 0.04 | 0.04 | 0.04 |

| Composition (mol. %) | Ex. 190 | Ex. 191 | Ex. 192 | Ex. 193 | Ex. 194 | Ex. 195 | Ex. 196 | Ex. 197 | Ex. 198 | Ex. 199 |
|---|---|---|---|---|---|---|---|---|---|---|
| $SiO_2$ | 45.12 | 57.23 | 54.46 | 54.45 | 54.48 | 54.47 | 54.46 | 54.42 | 52.13 | 51.48 |
| $Al_2O_3$ | 10.72 | 3.12 | 9.18 | 9.18 | 9.18 | 9.18 | 9.18 | 9.18 | 10.69 | 9.74 |
| MgO | 29.91 | 18.96 | 23.36 | 23.36 | 23.37 | 23.37 | 23.37 | 18.39 | 25.02 | 26.67 |
| $Na_2O$ | 3.53 | 10.27 | 2.85 | 4.75 | 6.55 | 8.45 | 4.65 | 4.72 | 4.47 | 4.03 |
| $K_2O$ | 0.00 | 0.00 | 6.56 | 4.68 | 2.81 | 0.94 | 4.75 | 4.69 | 3.55 | 3.98 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 5.91 | 0.00 | 0.00 | 0.00 | 0.00 | 0.00 | 0.00 | 4.95 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.60 | 8.78 | 3.10 | 3.10 | 3.11 | 3.11 | 3.10 | 3.11 | 3.22 | 3.35 |
| $TiO_2$ | 1.17 | 1.59 | 0.37 | 0.37 | 0.37 | 0.37 | 0.37 | 0.41 | 0.79 | 0.63 |
| $P_2O_5$ | 0.00 | 0.00 | 0.00 | 0.00 | 0.00 | 0.00 | 0.00 | 0.00 | 0.00 | 0.00 |
| $SnO_2$ | 0.04 | 0.04 | 0.12 | 0.12 | 0.12 | 0.12 | 0.12 | 0.13 | 0.13 | 0.12 |

| Composition (mol. %) | Ex. 200 | Ex. 201 | Ex. 202 | Ex. 203 | Ex. 204 | Ex. 205 | Ex. 206 | Ex. 207 | Ex. 208 | Ex. 209 |
|---|---|---|---|---|---|---|---|---|---|---|
| $SiO_2$ | 51.70 | 48.46 | 52.64 | 46.17 | 46.94 | 46.54 | 53.14 | 52.88 | 53.97 | 53.96 |
| $Al_2O_3$ | 9.15 | 10.23 | 8.21 | 11.52 | 11.74 | 9.20 | 0.00 | 3.80 | 9.01 | 9.00 |
| MgO | 27.58 | 24.14 | 26.18 | 34.42 | 27.28 | 34.24 | 22.98 | 24.51 | 27.93 | 27.93 |
| $Na_2O$ | 4.09 | 4.23 | 4.18 | 3.62 | 3.65 | 3.22 | 0.00 | 1.96 | 4.02 | 4.05 |
| $K_2O$ | 4.07 | 2.31 | 4.24 | 0.51 | 0.55 | 1.80 | 0.00 | 1.96 | 0.97 | 0.97 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 6.05 | 0.00 | 0.00 | 6.04 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 17.84 | 9.67 | 0.00 | 0.00 |

TABLE 12-continued

| | | | | | | | | | | |
|---|---|---|---|---|---|---|---|---|---|---|
| $Y_2O_3$ | 0.00 | 0.00 | 0.00 | 0.00 | 0.00 | 0.00 | 0.00 | 0.00 | 0.00 | 0.00 |
| $ZrO_2$ | 2.91 | 3.32 | 4.10 | 3.64 | 3.67 | 4.13 | 5.94 | 5.11 | 3.21 | 3.97 |
| $TiO_2$ | 0.39 | 1.12 | 0.31 | 0.00 | 0.00 | 0.76 | 0.00 | 0.00 | 0.76 | 0.00 |
| $P_2O_5$ | 0.00 | 0.00 | 0.00 | 0.00 | 0.00 | 0.00 | 0.00 | 0.00 | 0.00 | 0.00 |
| $SnO_2$ | 0.12 | 0.13 | 0.12 | 0.12 | 0.13 | 0.12 | 0.11 | 0.11 | 0.12 | 0.12 |

| Composition (mol. %) | Ex. 210 | Ex. 211 | Ex. 212 | Ex. 213 | Ex. 214 | Ex. 215 | Ex. 216 | Ex. 217 | Ex. 218 | Ex. 219 |
|---|---|---|---|---|---|---|---|---|---|---|
| $SiO_2$ | 48.63 | 51.33 | 50.70 | 51.26 | 47.96 | 47.88 | 46.08 | 46.28 | 46.18 | 46.28 |
| $Al_2O_3$ | 8.10 | 8.55 | 9.41 | 10.40 | 11.31 | 10.18 | 10.11 | 11.23 | 10.10 | 11.21 |
| MgO | 34.92 | 31.48 | 32.18 | 31.55 | 35.17 | 36.05 | 38.30 | 37.39 | 34.27 | 32.40 |
| $Na_2O$ | 2.87 | 3.59 | 3.02 | 3.01 | 2.47 | 2.49 | 1.90 | 1.88 | 1.86 | 1.85 |
| $K_2O$ | 0.32 | 0.45 | 0.77 | 0.77 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 4.02 | 4.98 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 4.00 | 3.81 | 3.82 | 2.89 | 2.24 | 3.32 | 3.49 | 2.37 | 3.49 | 2.40 |
| $TiO_2$ | 1.04 | 0.68 | 0.00 | 0.00 | 0.74 | 0.00 | 0.00 | 0.73 | 0.00 | 0.76 |
| $P_2O_5$ | 0.00 | 0.00 | 0.00 | 0.00 | 0.00 | 0.00 | 0.00 | 0.00 | 0.00 | 0.00 |
| $SnO_2$ | 0.12 | 0.12 | 0.12 | 0.12 | 0.12 | 0.08 | 0.12 | 0.12 | 0.08 | 0.12 |

| Composition (mol. %) | Ex. 220 | Ex. 221 | Ex. 222 | Ex. 223 | Ex. 224 | Ex. 225 | Ex. 226 | Ex. 227 | Ex. 228 | Ex. 229 |
|---|---|---|---|---|---|---|---|---|---|---|
| $SiO_2$ | 46.95 | 47.87 | 47.32 | 48.24 | 48.82 | 47.68 | 48.62 | 54.46 | 54.43 | 54.47 |
| $Al_2O_3$ | 7.78 | 8.87 | 9.01 | 10.12 | 11.33 | 9.60 | 10.74 | 9.18 | 9.18 | 9.17 |
| MgO | 37.33 | 34.19 | 36.80 | 33.65 | 32.87 | 36.35 | 33.17 | 23.37 | 23.36 | 23.36 |
| $Na_2O$ | 2.47 | 3.48 | 2.47 | 3.49 | 3.51 | 2.49 | 3.51 | 4.65 | 4.10 | 5.20 |
| $K_2O$ | 0.00 | 0.00 | 0.00 | 0.00 | 0.00 | 0.00 | 0.00 | 4.75 | 5.33 | 4.17 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 4.01 | 4.08 | 3.30 | 3.36 | 3.39 | 3.80 | 3.88 | 3.10 | 3.11 | 3.14 |
| $TiO_2$ | 1.40 | 1.43 | 1.03 | 1.05 | 0.00 | 0.00 | 0.00 | 0.37 | 0.37 | 0.37 |
| $P_2O_5$ | 0.00 | 0.00 | 0.00 | 0.00 | 0.00 | 0.00 | 0.00 | 0.00 | 0.00 | 0.00 |
| $SnO_2$ | 0.08 | 0.08 | 0.08 | 0.08 | 0.08 | 0.08 | 0.08 | 0.12 | 0.12 | 0.12 |

| Composition (mol. %) | Ex. 230 | Ex. 231 | Ex. 232 | Ex. 233 | Ex. 234 | Ex. 235 | Ex. 236 | Ex. 237 | Ex. 238 | Ex. 239 |
|---|---|---|---|---|---|---|---|---|---|---|
| $SiO_2$ | 54.38 | 54.45 | 54.35 | 44.75 | 46.13 | 46.74 | 45.99 | 45.46 | 44.69 | 54.32 |
| $Al_2O_3$ | 9.17 | 9.19 | 9.16 | 8.43 | 10.58 | 9.86 | 11.25 | 11.23 | 11.02 | 9.20 |
| MgO | 23.35 | 23.40 | 23.31 | 34.10 | 36.24 | 36.53 | 33.60 | 33.74 | 30.99 | 23.43 |
| $Na_2O$ | 5.80 | 6.34 | 7.11 | 2.93 | 2.89 | 2.38 | 2.95 | 2.96 | 3.02 | 6.36 |
| $K_2O$ | 3.63 | 2.94 | 2.34 | 0.00 | 0.00 | 0.56 | 1.49 | 1.37 | 1.33 | 2.92 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 4.17 | 0.00 | 0.00 | 0.00 | 0.00 | 3.84 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.18 | 3.21 | 3.25 | 3.98 | 3.34 | 2.73 | 3.27 | 3.78 | 3.70 | 3.30 |
| $TiO_2$ | 0.37 | 0.36 | 0.36 | 1.52 | 0.75 | 1.11 | 1.37 | 1.38 | 1.33 | 0.39 |
| $P_2O_5$ | 0.00 | 0.00 | 0.00 | 0.00 | 0.00 | 0.00 | 0.00 | 0.00 | 0.00 | 0.00 |
| $SnO_2$ | 0.12 | 0.12 | 0.12 | 0.12 | 0.08 | 0.08 | 0.08 | 0.08 | 0.08 | 0.08 |

| Composition (mol. %) | Ex. 240 | Ex. 241 | Ex. 242 | Ex. 243 | Ex. 244 | Ex. 245 | Ex. 246 | Ex. 247 | Ex. 248 | Ex. 249 |
|---|---|---|---|---|---|---|---|---|---|---|
| $SiO_2$ | 52.06 | 49.82 | 46.60 | 46.68 | 49.18 | 46.22 | 49.02 | 44.73 | 44.65 | 33.74 |
| $Al_2O_3$ | 9.70 | 10.19 | 11.31 | 11.32 | 9.30 | 8.89 | 9.32 | 14.92 | 10.87 | 8.21 |
| MgO | 26.08 | 28.70 | 33.51 | 33.45 | 29.78 | 33.33 | 29.90 | 31.33 | 37.71 | 27.09 |
| $Na_2O$ | 5.52 | 4.69 | 2.79 | 2.78 | 4.27 | 3.53 | 1.95 | 4.48 | 1.73 | 1.59 |
| $K_2O$ | 2.51 | 2.10 | 0.00 | 0.00 | 0.48 | 0.20 | 0.47 | 0.00 | 1.01 | 0.90 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 1.61 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 2.35 | 0.00 | 0.00 | 0.00 |

TABLE 12-continued

| | | | | | | | | | | |
|---|---|---|---|---|---|---|---|---|---|---|
| $Y_2O_3$ | 0.00 | 0.00 | 0.00 | 0.00 | 2.31 | 2.59 | 2.32 | 0.00 | 0.00 | 0.00 |
| $ZrO_2$ | 3.43 | 3.56 | 2.70 | 2.69 | 3.46 | 3.86 | 3.47 | 2.99 | 3.05 | 27.63 |
| $TiO_2$ | 0.62 | 0.85 | 1.39 | 1.40 | 1.13 | 1.29 | 1.12 | 1.48 | 0.90 | 0.78 |
| $P_2O_5$ | 0.00 | 0.00 | 0.00 | 0.00 | 0.00 | 0.00 | 0.00 | 0.00 | 0.00 | 0.00 |
| $SnO_2$ | 0.08 | 0.08 | 0.08 | 0.08 | 0.09 | 0.09 | 0.08 | 0.08 | 0.08 | 0.06 |
| $MnO_2$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Cs_2O$ | 0.00 | 0.00 | 0.00 | 1.61 | 0.00 | 0.00 | 0.00 | 0.00 | 0.00 | 0.00 |

| Composition (mol. %) | Ex. 250 | Ex. 251 | Ex. 252 | Ex. 253 | Ex. 254 | Ex. 255 | Ex. 256 | Ex. 257 | Ex. 258 | Ex. 259 |
|---|---|---|---|---|---|---|---|---|---|---|
| $SiO_2$ | 45.91 | 45.83 | 43.91 | 53.76 | 53.11 | 52.37 | 51.54 | 50.82 | 50.11 | 49.39 |
| $Al_2O_3$ | 11.13 | 11.10 | 10.76 | 9.26 | 9.28 | 9.31 | 9.39 | 9.48 | 9.50 | 9.58 |
| MgO | 34.89 | 34.92 | 31.87 | 24.37 | 25.51 | 26.64 | 27.77 | 28.89 | 30.01 | 31.10 |
| $Na_2O$ | 2.53 | 2.57 | 1.42 | 4.47 | 4.15 | 3.93 | 3.71 | 3.50 | 3.19 | 2.97 |
| $K_2O$ | 1.41 | 0.00 | 0.00 | 4.48 | 4.26 | 3.98 | 3.76 | 3.48 | 3.28 | 3.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 1.44 | 0.74 | 0.00 | 0.00 | 0.00 | 0.00 | 0.00 | 0.00 | 0.00 |
| ZnO | 0.00 | 0.00 | 7.31 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 2.84 | 2.83 | 3.20 | 3.22 | 3.26 | 3.34 | 3.43 | 3.52 | 3.61 | 3.64 |
| $TiO_2$ | 1.21 | 1.23 | 0.71 | 0.32 | 0.31 | 0.31 | 0.31 | 0.23 | 0.23 | 0.23 |
| $P_2O_5$ | 0.00 | 0.00 | 0.00 | 0.00 | 0.00 | 0.00 | 0.00 | 0.00 | 0.00 | 0.00 |
| $SnO_2$ | 0.08 | 0.08 | 0.08 | 0.13 | 0.12 | 0.12 | 0.08 | 0.08 | 0.08 | 0.08 |

| Composition (mol. %) | Ex. 260 | Ex. 261 | Ex. 262 | Ex. 263 | Ex. 264 | Ex. 265 | Ex. 266 | Ex. 267 | Ex. 268 | Ex. 269 |
|---|---|---|---|---|---|---|---|---|---|---|
| $SiO_2$ | 57.41 | 52.36 | 50.78 | 49.35 | 54.93 | 55.43 | 51.93 | 47.19 | 47.70 | 44.57 |
| $Al_2O_3$ | 3.03 | 9.27 | 9.47 | 9.61 | 9.27 | 9.32 | 8.77 | 11.42 | 11.56 | 10.76 |
| MgO | 26.09 | 26.66 | 28.89 | 31.06 | 23.62 | 23.74 | 22.34 | 33.83 | 34.15 | 31.93 |
| $Na_2O$ | 4.75 | 3.97 | 3.51 | 3.06 | 4.75 | 4.81 | 4.50 | 2.92 | 2.90 | 2.77 |
| $K_2O$ | 0.00 | 0.00 | 0.00 | 0.00 | 4.79 | 4.82 | 4.51 | 1.60 | 1.65 | 1.56 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 4.80 | 3.97 | 3.46 | 3.01 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.47 | 3.36 | 3.48 | 3.59 | 2.29 | 1.51 | 2.99 | 2.06 | 1.36 | 2.64 |
| $TiO_2$ | 0.35 | 0.32 | 0.32 | 0.24 | 0.24 | 0.23 | 0.32 | 0.91 | 0.60 | 1.30 |
| $P_2O_5$ | 0.00 | 0.00 | 0.00 | 0.00 | 0.00 | 0.00 | 0.00 | 0.00 | 0.00 | 0.00 |
| $SnO_2$ | 0.09 | 0.09 | 0.08 | 0.08 | 0.12 | 0.12 | 0.08 | 0.08 | 0.08 | 0.08 |
| $MnO_2$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 4.55 | 0.00 | 0.00 | 4.40 |

| Composition (mol. %) | Ex. 270 | Ex. 271 | Ex. 272 | Ex. 273 | Ex. 274 | Ex. 275 | Ex. 276 | Ex. 277 | Ex. 278 | Ex. 279 |
|---|---|---|---|---|---|---|---|---|---|---|
| $SiO_2$ | 46.94 | 45.44 | 50.54 | 47.37 | 47.53 | 53.15 | 51.85 | 50.30 | 48.88 | 50.33 |
| $Al_2O_3$ | 8.08 | 8.84 | 8.73 | 9.18 | 8.62 | 9.19 | 9.21 | 9.42 | 9.50 | 9.42 |
| MgO | 21.23 | 28.66 | 22.87 | 29.81 | 25.53 | 24.23 | 26.36 | 28.62 | 30.67 | 28.64 |
| $Na_2O$ | 3.89 | 2.69 | 4.18 | 2.88 | 3.42 | 4.36 | 3.89 | 3.33 | 2.98 | 3.24 |
| $K_2O$ | 2.02 | 1.38 | 3.15 | 2.16 | 1.72 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 3.51 |
| BaO | 0.00 | 0.00 | 0.00 | 0.00 | 0.00 | 4.39 | 3.91 | 3.45 | 2.99 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 2.83 | 3.36 | 3.02 | 3.50 | 3.19 | 3.80 | 3.91 | 4.03 | 4.14 | 4.02 |
| $TiO_2$ | 0.24 | 0.23 | 0.32 | 0.23 | 0.23 | 0.74 | 0.73 | 0.73 | 0.72 | 0.71 |
| $P_2O_5$ | 0.00 | 0.00 | 0.00 | 0.00 | 0.00 | 0.00 | 0.00 | 0.00 | 0.00 | 0.00 |
| $SnO_2$ | 0.13 | 0.08 | 0.13 | 0.08 | 0.08 | 0.13 | 0.13 | 0.13 | 0.13 | 0.12 |
| $MnO_2$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 | 0.00 | 0.00 | 0.00 |
| $B_2O_3$ | 14.66 | 9.32 | 7.07 | 4.78 | 9.67 | 0.00 | 0.00 | 0.00 | 0.00 | 0.00 |

TABLE 12-continued

| Composition (mol. %) | Ex. 280 | Ex. 281 | Ex. 282 | Ex. 283 | Ex. 284 | Ex. 285 | Ex. 286 | Ex. 287 | Ex. 288 | Ex. 289 |
|---|---|---|---|---|---|---|---|---|---|---|
| $SiO_2$ | 45.66 | 46.64 | 46.74 | 46.77 | 46.92 | 46.59 | 46.48 | 46.45 | 50.47 | 50.59 |
| $Al_2O_3$ | 11.00 | 11.30 | 11.28 | 11.32 | 11.37 | 11.22 | 11.24 | 11.20 | 9.67 | 9.70 |
| MgO | 32.70 | 33.56 | 33.64 | 33.73 | 33.70 | 33.37 | 33.28 | 33.19 | 29.52 | 29.71 |
| $Na_2O$ | 2.76 | 2.84 | 2.83 | 2.83 | 2.82 | 2.85 | 2.85 | 2.86 | 3.68 | 3.67 |
| $K_2O$ | 0.00 | 1.61 | 1.61 | 1.60 | 1.60 | 1.61 | 1.62 | 1.62 | 1.70 | 1.70 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 2.56 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.60 | 2.61 | 2.46 | 2.30 | 2.16 | 2.91 | 3.07 | 3.22 | 4.10 | 3.79 |
| $TiO_2$ | 1.59 | 1.37 | 1.36 | 1.36 | 1.36 | 1.37 | 1.37 | 1.38 | 0.77 | 0.77 |
| $P_2O_5$ | 0.00 | 0.00 | 0.00 | 0.00 | 0.00 | 0.00 | 0.00 | 0.00 | 0.00 | 0.00 |
| $SnO_2$ | 0.13 | 0.08 | 0.08 | 0.08 | 0.08 | 0.08 | 0.08 | 0.08 | 0.08 | 0.08 |

| Composition (mol. %) | Ex. 290 | Ex. 291 | Ex. 292 | Ex. 293 | Ex. 294 | Ex. 295 | Ex. 296 | Ex. 297 | Ex. 298 | Ex. 299 |
|---|---|---|---|---|---|---|---|---|---|---|
| $SiO_2$ | 50.71 | 50.83 | 50.86 | 50.04 | 50.27 | 50.15 | 50.02 | 50.05 | 49.92 | 50.92 |
| $Al_2O_3$ | 9.72 | 9.74 | 9.83 | 9.39 | 9.45 | 9.37 | 9.34 | 9.32 | 9.30 | 9.27 |
| MgO | 29.90 | 30.10 | 30.30 | 28.53 | 28.70 | 28.49 | 28.42 | 28.40 | 28.33 | 30.06 |
| $Na_2O$ | 3.65 | 3.64 | 3.63 | 3.52 | 3.53 | 3.54 | 3.53 | 3.55 | 3.54 | 3.81 |
| $K_2O$ | 1.69 | 1.68 | 1.68 | 0.00 | 0.00 | 0.00 | 0.00 | 0.00 | 0.00 | 1.93 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 3.44 | 3.44 | 3.45 | 3.44 | 3.46 | 3.45 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.48 | 3.17 | 2.86 | 3.55 | 3.81 | 4.19 | 3.71 | 4.41 | 3.93 | 2.21 |
| $TiO_2$ | 0.77 | 0.76 | 0.76 | 1.45 | 0.72 | 0.73 | 1.45 | 0.73 | 1.45 | 1.67 |
| $P_2O_5$ | 0.00 | 0.00 | 0.00 | 0.00 | 0.00 | 0.00 | 0.00 | 0.00 | 0.00 | 0.00 |
| $SnO_2$ | 0.08 | 0.08 | 0.08 | 0.09 | 0.09 | 0.09 | 0.09 | 0.09 | 0.09 | 0.12 |

| Composition (mol. %) | Ex. 300 | Ex. 301 | Ex. 302 | Ex. 303 | Ex. 304 | Ex. 305 | Ex. 306 | Ex. 307 | Ex. 308 | Ex. 309 |
|---|---|---|---|---|---|---|---|---|---|---|
| $SiO_2$ | 50.17 | 49.42 | 53.12 | 53.22 | 53.09 | 50.05 | 50.97 | 50.85 | 50.75 | 51.30 |
| $Al_2O_3$ | 9.32 | 9.37 | 9.33 | 9.31 | 9.24 | 9.31 | 9.73 | 9.70 | 9.72 | 9.83 |
| MgO | 30.22 | 30.38 | 25.62 | 25.72 | 25.40 | 30.32 | 29.84 | 29.64 | 29.55 | 29.97 |
| $Na_2O$ | 3.83 | 3.85 | 4.14 | 4.13 | 4.15 | 3.78 | 3.70 | 3.71 | 3.72 | 3.72 |
| $K_2O$ | 1.94 | 1.95 | 4.25 | 4.24 | 4.27 | 0.13 | 1.71 | 1.72 | 1.72 | 1.72 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 2.72 | 3.23 | 3.10 | 2.94 | 3.41 | 2.72 | 3.97 | 4.29 | 4.45 | 3.39 |
| $TiO_2$ | 1.68 | 1.69 | 0.31 | 0.31 | 0.31 | 1.66 | 0.00 | 0.00 | 0.00 | 0.00 |
| $P_2O_5$ | 0.00 | 0.00 | 0.00 | 0.00 | 0.00 | 0.00 | 0.00 | 0.00 | 0.00 | 0.00 |
| $SnO_2$ | 0.12 | 0.12 | 0.12 | 0.12 | 0.12 | 0.00 | 0.08 | 0.08 | 0.08 | 0.08 |
| $MnO_2$ | 0.00 | 0.00 | 0.00 | 0.00 | 0.00 | 0.00 | 0.00 | 0.00 | 0.00 | 0.00 |
| $La_2O_3$ | 0.00 | 0.00 | 0.00 | 0.00 | 0.00 | 0.00 | 0.00 | 0.00 | 0.00 | 0.00 |
| $Cs_2O$ | 0.00 | 0.00 | 0.00 | 0.00 | 0.00 | 0.00 | 0.00 | 0.00 | 0.00 | 0.00 |
| $B_2O_3$ | 0.00 | 0.00 | 0.00 | 0.00 | 0.00 | 0.00 | 0.00 | 0.00 | 0.00 | 0.00 |
| PbO | 0.00 | 0.00 | 0.00 | 0.00 | 0.00 | 2.01 | 0.00 | 0.00 | 0.00 | 0.00 |
| $ThO_2$ | 0.00 | 0.00 | 0.00 | 0.00 | 0.00 | 0.23 | 0.24 | 0.24 | 0.47 | |

| Composition (mol. %) | Ex. 310 | Ex. 311 | Ex. 312 | Ex. 313 | Ex. 314 | Ex. 315 | Ex. 316 | Ex. 317 | Ex. 318 | Ex. 319 |
|---|---|---|---|---|---|---|---|---|---|---|
| $SiO_2$ | 51.28 | 51.25 | 46.43 | 46.25 | 45.94 | 46.86 | 46.68 | 47.04 | 49.15 | 48.98 |
| $Al_2O_3$ | 9.79 | 9.80 | 11.00 | 10.97 | 10.94 | 11.71 | 11.68 | 11.74 | 9.43 | 9.40 |
| MgO | 29.87 | 29.76 | 33.32 | 33.25 | 33.33 | 32.09 | 32.02 | 32.16 | 30.56 | 30.49 |
| $Na_2O$ | 3.72 | 3.73 | 2.97 | 2.98 | 2.98 | 3.00 | 3.00 | 2.99 | 3.76 | 3.77 |
| $K_2O$ | 1.72 | 1.72 | 1.30 | 1.31 | 1.31 | 1.31 | 1.32 | 1.31 | 1.76 | 1.76 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |

TABLE 12-continued

| Composition (mol. %) | | | | | | | | | | |
|---|---|---|---|---|---|---|---|---|---|---|
| Y₂O₃ | 0.00 | 0.00 | 0.00 | 0.00 | 0.00 | 0.00 | 0.00 | 0.00 | 0.00 | 0.00 |
| ZrO₂ | 3.54 | 3.65 | 4.13 | 4.39 | 4.65 | 4.17 | 4.43 | 3.91 | 3.73 | 3.99 |
| TiO₂ | 0.00 | 0.00 | 0.77 | 0.77 | 0.77 | 0.77 | 0.78 | 0.77 | 1.53 | 1.54 |
| P₂O₅ | 0.00 | 0.00 | 0.00 | 0.00 | 0.00 | 0.00 | 0.00 | 0.00 | 0.00 | 0.00 |
| SnO₂ | 0.08 | 0.08 | 0.08 | 0.08 | 0.08 | 0.08 | 0.08 | 0.08 | 0.08 | 0.08 |
| MnO₂ | 0.00 | 0.00 | 0.00 | 0.00 | 0.00 | 0.00 | 0.00 | 0.00 | 0.00 | 0.00 |
| La₂O₃ | 0.00 | 0.00 | 0.00 | 0.00 | 0.00 | 0.00 | 0.00 | 0.00 | 0.00 | 0.00 |
| Cs₂O | 0.00 | 0.00 | 0.00 | 0.00 | 0.00 | 0.00 | 0.00 | 0.00 | 0.00 | 0.00 |
| B₂O₃ | 0.00 | 0.00 | 0.00 | 0.00 | 0.00 | 0.00 | 0.00 | 0.00 | 0.00 | 0.00 |
| PbO | 0.00 | 0.00 | 0.00 | 0.00 | 0.00 | 0.00 | 0.00 | 0.00 | 0.00 | 0.00 |
| ThO₂ | 0.47 | 0.47 | 0.00 | 0.00 | 0.00 | 0.00 | 0.00 | 0.00 | 0.00 | 0.00 |

| Composition (mol. %) | Ex. 320 | Ex. 321 | Ex. 322 | Ex. 323 | Ex. 324 | Ex. 325 | Ex. 326 | Ex. 327 | Ex. 328 | Ex. 329 |
|---|---|---|---|---|---|---|---|---|---|---|
| SiO₂ | 48.93 | 49.41 | 49.24 | 43.91 | 44.25 | 48.85 | 53.07 | 51.71 | 52.38 | 51.34 |
| Al₂O₃ | 9.37 | 9.46 | 9.43 | 9.37 | 12.64 | 10.06 | 9.34 | 9.53 | 9.43 | 9.58 |
| MgO | 30.28 | 30.50 | 30.43 | 28.46 | 33.37 | 30.66 | 25.33 | 27.34 | 26.34 | 27.78 |
| Na₂O | 3.78 | 3.77 | 3.78 | 3.08 | 3.01 | 3.49 | 4.35 | 4.02 | 4.23 | 4.01 |
| K₂O | 1.77 | 1.76 | 1.77 | 1.49 | 1.32 | 1.57 | 3.72 | 2.71 | 3.18 | 2.44 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 7.83 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| Li₂O | 0.00 | 0.00 | 0.00 | 0.00 | 0.00 | 0.00 | 0.00 | 0.00 | 0.00 | 0.00 |
| Y₂O₃ | 0.00 | 0.00 | 0.00 | 0.00 | 0.00 | 0.00 | 0.00 | 0.00 | 0.00 | 0.00 |
| ZrO₂ | 4.25 | 4.24 | 4.50 | 4.65 | 4.55 | 4.51 | 3.56 | 3.99 | 3.80 | 4.14 |
| TiO₂ | 1.54 | 0.77 | 0.77 | 1.12 | 0.78 | 0.77 | 0.55 | 0.62 | 0.55 | 0.62 |
| P₂O₅ | 0.00 | 0.00 | 0.00 | 0.00 | 0.00 | 0.00 | 0.00 | 0.00 | 0.00 | 0.00 |
| SnO₂ | 0.08 | 0.08 | 0.08 | 0.08 | 0.08 | 0.08 | 0.08 | 0.08 | 0.08 | 0.08 |

| Composition (mol. %) | Ex. 330 | Ex. 331 | Ex. 332 | Ex. 333 | Ex. 334 | Ex. 335 | Ex. 336 | Ex. 337 | Ex. 338 | Ex. 339 |
|---|---|---|---|---|---|---|---|---|---|---|
| SiO₂ | 46.71 | 50.49 | 50.45 | 50.50 | 50.37 | 50.27 | 50.46 | 46.19 | 50.28 | 50.38 |
| Al₂O₃ | 8.82 | 9.69 | 9.71 | 9.73 | 9.61 | 9.57 | 9.61 | 12.36 | 9.01 | 9.35 |
| MgO | 26.43 | 29.43 | 29.47 | 29.38 | 29.21 | 29.12 | 29.36 | 30.48 | 30.41 | 29.92 |
| Na₂O | 3.09 | 3.39 | 3.09 | 2.80 | 3.68 | 3.69 | 3.68 | 4.43 | 3.36 | 3.38 |
| K₂O | 1.90 | 2.03 | 2.30 | 2.60 | 1.70 | 1.71 | 1.70 | 1.85 | 2.02 | 2.02 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 7.37 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| Li₂O | 0.00 | 0.00 | 0.00 | 0.00 | 0.00 | 0.00 | 0.00 | 0.00 | 0.00 | 0.00 |
| Y₂O₃ | 0.00 | 0.00 | 0.00 | 0.00 | 0.00 | 0.00 | 0.00 | 0.00 | 0.00 | 0.00 |
| ZrO₂ | 4.40 | 4.11 | 4.12 | 4.10 | 3.80 | 4.01 | 3.95 | 3.59 | 4.08 | 4.09 |
| TiO₂ | 1.20 | 0.77 | 0.77 | 0.81 | 1.54 | 1.55 | 1.16 | 1.01 | 0.77 | 0.77 |
| P₂O₅ | 0.00 | 0.00 | 0.00 | 0.00 | 0.00 | 0.00 | 0.00 | 0.00 | 0.00 | 0.00 |
| SnO₂ | 0.08 | 0.08 | 0.08 | 0.08 | 0.08 | 0.08 | 0.08 | 0.08 | 0.08 | 0.08 |

| Composition (mol. %) | Ex. 340 | Ex. 341 | Ex. 342 | Ex. 343 | Ex. 344 | Ex. 345 | Ex. 346 | Ex. 347 | Ex. 348 | Ex. 349 |
|---|---|---|---|---|---|---|---|---|---|---|
| SiO₂ | 50.59 | 50.70 | 50.81 | 50.92 | 50.47 | 50.57 | 52.34 | 52.39 | 52.28 | 52.37 |
| Al₂O₃ | 10.04 | 10.39 | 10.74 | 11.09 | 9.75 | 9.77 | 9.38 | 9.41 | 9.39 | 9.38 |
| MgO | 28.94 | 28.44 | 27.94 | 27.43 | 29.45 | 29.35 | 26.22 | 26.29 | 26.24 | 26.23 |
| Na₂O | 3.40 | 3.42 | 3.43 | 3.45 | 2.51 | 2.21 | 3.25 | 3.74 | 3.74 | 2.94 |
| K₂O | 2.04 | 2.05 | 2.06 | 2.07 | 2.90 | 3.17 | 4.21 | 3.73 | 3.72 | 4.61 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| Li₂O | 0.00 | 0.00 | 0.00 | 0.00 | 0.00 | 0.00 | 0.00 | 0.00 | 0.00 | 0.00 |
| Y₂O₃ | 0.00 | 0.00 | 0.00 | 0.00 | 0.00 | 0.00 | 0.00 | 0.00 | 0.00 | 0.00 |
| ZrO₂ | 4.13 | 4.15 | 4.16 | 4.18 | 4.14 | 4.14 | 3.83 | 3.82 | 3.45 | 3.68 |
| TiO₂ | 0.78 | 0.78 | 0.78 | 0.79 | 0.78 | 0.78 | 0.79 | 0.63 | 1.18 | 0.79 |
| P₂O₅ | 0.00 | 0.00 | 0.00 | 0.00 | 0.00 | 0.00 | 0.00 | 0.00 | 0.00 | 0.00 |
| SnO₂ | 0.08 | 0.08 | 0.08 | 0.08 | 0.00 | 0.00 | 0.00 | 0.00 | 0.00 | 0.00 |
| MnO₂ | 0.00 | 0.00 | 0.00 | 0.00 | 0.00 | 0.00 | 0.00 | 0.00 | 0.00 | 0.00 |
| La₂O₃ | 0.00 | 0.00 | 0.00 | 0.00 | 0.00 | 0.00 | 0.00 | 0.00 | 0.00 | 0.00 |
| Cs₂O | 0.00 | 0.00 | 0.00 | 0.00 | 0.00 | 0.00 | 0.00 | 0.00 | 0.00 | 0.00 |
| B₂O₃ | 0.00 | 0.00 | 0.00 | 0.00 | 0.00 | 0.00 | 0.00 | 0.00 | 0.00 | 0.00 |
| PbO | 0.00 | 0.00 | 0.00 | 0.00 | 0.00 | 0.00 | 0.00 | 0.00 | 0.00 | 0.00 |
| ThO₂ | 0.00 | 0.00 | 0.00 | 0.00 | 0.00 | 0.00 | 0.00 | 0.00 | 0.00 | 0.00 |
| SeO₂ | 0.00 | 0.00 | 0.00 | 0.00 | 0.11 | 0.11 | 0.11 | 0.11 | 0.11 | 0.11 |

TABLE 12-continued

| Composition (mol. %) | Ex. 350 | Ex. 351 | Ex. 352 | Ex. 353 | Ex. 354 | Ex. 355 | Ex. 356 | Ex. 357 | Ex. 358 | Ex. 359 |
|---|---|---|---|---|---|---|---|---|---|---|
| $SiO_2$ | 52.09 | 52.17 | 50.77 | 50.80 | 50.76 | 53.07 | 50.09 | 50.15 | 50.15 | 50.12 |
| $Al_2O_3$ | 9.43 | 9.47 | 9.49 | 9.51 | 9.44 | 9.94 | 9.72 | 9.69 | 9.67 | 9.69 |
| MgO | 24.17 | 26.29 | 28.92 | 28.84 | 26.67 | 25.16 | 29.66 | 29.60 | 29.72 | 31.76 |
| $Na_2O$ | 4.26 | 4.25 | 2.70 | 2.71 | 2.72 | 3.70 | 3.70 | 3.71 | 3.72 | 3.74 |
| $K_2O$ | 3.20 | 1.60 | 2.70 | 1.32 | 1.33 | 1.76 | 1.71 | 1.71 | 1.72 | 1.68 |
| CaO | 2.24 | 0.00 | 0.00 | 0.00 | 2.23 | 0.00 | 0.00 | 0.00 | 0.00 | 0.00 |
| SrO | 0.00 | 1.63 | 0.00 | 1.38 | 1.39 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.77 | 3.77 | 3.82 | 3.83 | 3.85 | 3.93 | 3.12 | 2.12 | 0.00 | 0.00 |
| $TiO_2$ | 0.79 | 0.78 | 1.55 | 1.56 | 1.56 | 2.39 | 1.01 | 1.01 | 1.02 | 1.01 |
| $P_2O_5$ | 0.00 | 0.00 | 0.00 | 0.00 | 0.00 | 0.00 | 1.00 | 2.01 | 4.00 | 3.01 |
| $SnO_2$ | 0.04 | 0.04 | 0.04 | 0.04 | 0.04 | 0.04 | 0.00 | 0.00 | 0.00 | 0.00 |

| Composition (mol. %) | Ex. 360 | Ex. 361 | Ex. 362 | Ex. 363 | Ex. 364 | Ex. 365 | Ex. 366 | Ex. 367 | Ex. 368 | Ex. 369 |
|---|---|---|---|---|---|---|---|---|---|---|
| $SiO_2$ | 54.46 | 50.47 | 46.60 | 53.07 | 52.38 | 50.37 | 54.46 | 50.47 | 46.60 | 53.07 |
| $Al_2O_3$ | 9.18 | 9.67 | 11.25 | 9.34 | 9.43 | 9.61 | 9.18 | 9.67 | 11.25 | 9.34 |
| MgO | 23.37 | 29.52 | 33.48 | 25.33 | 26.34 | 29.21 | 23.37 | 29.52 | 33.48 | 25.33 |
| $Na_2O$ | 4.65 | 3.68 | 2.81 | 4.35 | 4.23 | 3.68 | 4.65 | 3.68 | 2.81 | 4.35 |
| $K_2O$ | 4.75 | 1.70 | 1.61 | 3.72 | 3.18 | 1.70 | 4.75 | 1.70 | 1.61 | 3.72 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.10 | 4.10 | 2.74 | 3.56 | 3.80 | 3.80 | 3.10 | 4.10 | 2.74 | 3.56 |
| $TiO_2$ | 0.37 | 0.77 | 1.41 | 0.55 | 0.55 | 1.54 | 0.37 | 0.77 | 1.41 | 0.55 |
| $P_2O_5$ | 0.00 | 0.00 | 0.00 | 0.00 | 0.00 | 0.00 | 0.00 | 0.00 | 0.00 | 0.00 |
| $SnO_2$ | 0.12 | 0.08 | 0.09 | 0.08 | 0.08 | 0.08 | 0.12 | 0.08 | 0.09 | 0.08 |

| Composition (mol. %) | Ex. 370 | Ex. 371 | Ex. 372 | Ex. 373 | Ex. 374 | Ex. 375 | Ex. 376 | Ex. 377 | Ex. 378 | Ex. 379 |
|---|---|---|---|---|---|---|---|---|---|---|
| $SiO_2$ | 52.38 | 50.37 | 50.40 | 50.12 | 50.42 | 52.08 | 52.45 | 50.52 | 52.48 | 52.72 |
| $Al_2O_3$ | 9.43 | 9.61 | 9.45 | 9.89 | 8.40 | 8.33 | 8.91 | 10.46 | 9.43 | 9.48 |
| MgO | 26.34 | 29.21 | 29.65 | 30.26 | 28.60 | 28.36 | 27.98 | 26.34 | 26.34 | 26.46 |
| $Na_2O$ | 4.23 | 3.68 | 3.73 | 3.71 | 3.76 | 3.73 | 3.74 | 3.74 | 3.73 | 3.72 |
| $K_2O$ | 3.18 | 1.70 | 1.73 | 1.72 | 3.88 | 2.78 | 2.26 | 1.73 | 3.71 | 3.71 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.80 | 3.80 | 2.13 | 1.06 | 2.10 | 2.08 | 1.58 | 1.58 | 3.45 | 3.44 |
| $TiO_2$ | 0.55 | 1.54 | 0.00 | 0.00 | 0.00 | 0.00 | 0.00 | 0.00 | 0.78 | 0.39 |
| $P_2O_5$ | 0.00 | 0.00 | 2.91 | 3.24 | 2.84 | 2.64 | 3.09 | 2.87 | 0.00 | 0.00 |
| $SnO_2$ | 0.08 | 0.08 | 0.00 | 0.00 | 0.00 | 0.00 | 0.00 | 0.00 | 0.08 | 0.08 |

| Composition (mol. %) | Ex. 380 | Ex. 381 | Ex. 382 | Ex. 383 | Ex. 384 | Ex. 385 | Ex. 386 | Ex. 387 | Ex. 388 | Ex. 389 |
|---|---|---|---|---|---|---|---|---|---|---|
| $SiO_2$ | 52.55 | 52.72 | 52.39 | 51.90 | 52.16 | 51.65 | 51.39 | 50.70 | 50.19 | 50.05 |
| $Al_2O_3$ | 9.44 | 9.44 | 9.45 | 8.75 | 9.41 | 9.72 | 9.70 | 10.44 | 10.55 | 10.52 |
| MgO | 26.37 | 26.51 | 26.40 | 27.70 | 26.28 | 28.16 | 28.14 | 27.94 | 28.21 | 28.17 |
| $Na_2O$ | 3.73 | 3.73 | 3.76 | 3.72 | 3.74 | 3.54 | 3.46 | 4.27 | 4.29 | 4.23 |
| $K_2O$ | 3.72 | 3.71 | 3.74 | 3.71 | 3.73 | 1.66 | 1.61 | 2.09 | 2.17 | 2.12 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.70 | 3.80 | 3.07 | 3.04 | 3.82 | 3.82 | 3.84 | 3.70 | 3.41 | 4.05 |
| $TiO_2$ | 0.39 | 0.00 | 0.00 | 0.00 | 0.78 | 0.00 | 0.00 | 0.77 | 0.77 | 0.78 |
| $P_2O_5$ | 0.00 | 0.00 | 1.11 | 1.10 | 0.00 | 1.37 | 1.78 | 0.00 | 0.00 | 0.00 |
| $SnO_2$ | 0.08 | 0.08 | 0.08 | 0.08 | 0.08 | 0.08 | 0.08 | 0.08 | 0.41 | 0.08 |

TABLE 12-continued

| Composition (mol. %) | Ex. 390 | Ex. 391 | Ex. 392 | Ex. 393 | Ex. 394 | Ex. 395 | Ex. 396 | Ex. 397 | Ex. 398 | Ex. 399 |
|---|---|---|---|---|---|---|---|---|---|---|
| $SiO_2$ | 44.71 | 44.23 | 43.87 | 49.73 | 49.36 | 48.91 | 59.92 | 57.17 | 55.57 | 54.81 |
| $Al_2O_3$ | 9.54 | 9.50 | 9.39 | 8.64 | 8.58 | 8.53 | 8.11 | 8.62 | 11.06 | 10.10 |
| MgO | 28.96 | 28.73 | 28.35 | 26.37 | 26.09 | 25.83 | 20.51 | 21.97 | 18.66 | 21.10 |
| $Na_2O$ | 3.04 | 3.06 | 3.09 | 2.72 | 2.74 | 2.77 | 4.14 | 4.36 | 5.75 | 5.26 |
| $K_2O$ | 1.47 | 1.48 | 1.49 | 1.33 | 1.34 | 1.35 | 4.12 | 4.47 | 5.71 | 5.23 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 7.94 | 7.85 | 7.84 | 7.22 | 7.20 | 7.17 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.16 | 3.95 | 4.77 | 2.89 | 3.58 | 4.33 | 2.69 | 2.90 | 2.79 | 3.06 |
| $TiO_2$ | 1.10 | 1.11 | 1.12 | 1.02 | 1.02 | 1.03 | 0.39 | 0.39 | 0.32 | 0.32 |
| $P_2O_5$ | 0.00 | 0.00 | 0.00 | 0.00 | 0.00 | 0.00 | 0.00 | 0.00 | 0.00 | 0.00 |
| $SnO_2$ | 0.08 | 0.08 | 0.08 | 0.08 | 0.08 | 0.08 | 0.12 | 0.12 | 0.13 | 0.13 |

| Composition (mol. %) | Ex. 400 | Ex. 401 | Ex. 402 | Ex. 403 | Ex. 404 | Ex. 405 | Ex. 406 | Ex. 407 | Ex. 408 | Ex. 409 |
|---|---|---|---|---|---|---|---|---|---|---|
| $SiO_2$ | 56.36 | 55.99 | 54.22 | 52.88 | 52.13 | 53.33 | 52.17 | 51.72 | 52.21 | 51.97 |
| $Al_2O_3$ | 9.82 | 9.38 | 9.10 | 9.34 | 9.24 | 9.39 | 9.40 | 9.44 | 9.40 | 9.81 |
| MgO | 20.41 | 21.54 | 23.03 | 23.71 | 26.11 | 24.63 | 26.24 | 26.53 | 26.25 | 26.13 |
| $Na_2O$ | 5.04 | 4.80 | 4.69 | 5.00 | 3.74 | 4.26 | 3.74 | 3.73 | 3.74 | 3.72 |
| $K_2O$ | 5.08 | 4.78 | 4.76 | 4.23 | 3.72 | 4.20 | 3.72 | 3.72 | 3.72 | 3.71 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 2.85 | 2.98 | 3.13 | 3.39 | 3.66 | 3.42 | 3.61 | 3.55 | 3.66 | 3.64 |
| $TiO_2$ | 0.32 | 0.40 | 0.95 | 0.79 | 1.18 | 0.79 | 1.02 | 1.17 | 0.94 | 0.94 |
| $P_2O_5$ | 0.00 | 0.00 | 0.00 | 0.00 | 0.00 | 0.00 | 0.00 | 0.00 | 0.00 | 0.00 |
| $SnO_2$ | 0.13 | 0.13 | 0.13 | 0.13 | 0.12 | 0.13 | 0.12 | 0.12 | 0.08 | 0.08 |

| Composition (mol. %) | Ex. 410 | Ex. 411 | Ex. 412 | Ex. 413 | Ex. 414 | Ex. 415 | Ex. 416 | Ex. 417 | Ex. 418 | Ex. 419 |
|---|---|---|---|---|---|---|---|---|---|---|
| $SiO_2$ | 52.45 | 51.53 | 52.87 | 52.12 | 52.30 | 53.76 | 54.38 | 53.76 | 56.55 | 57.67 |
| $Al_2O_3$ | 8.98 | 9.27 | 9.51 | 9.38 | 9.41 | 11.84 | 11.81 | 10.52 | 11.92 | 11.72 |
| MgO | 26.38 | 27.22 | 25.33 | 26.21 | 26.30 | 18.78 | 18.73 | 21.19 | 16.30 | 15.07 |
| $Na_2O$ | 3.76 | 3.69 | 3.78 | 3.73 | 3.74 | 6.11 | 6.09 | 5.28 | 6.15 | 7.03 |
| $K_2O$ | 3.74 | 3.67 | 3.77 | 3.72 | 3.73 | 5.75 | 5.73 | 5.25 | 5.79 | 4.69 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 3.68 | 3.61 | 3.70 | 3.83 | 3.49 | 2.81 | 2.80 | 3.07 | 2.83 | 3.70 |
| $TiO_2$ | 0.94 | 0.93 | 0.95 | 0.94 | 0.94 | 0.82 | 0.33 | 0.80 | 0.33 | 0.00 |
| $P_2O_5$ | 0.00 | 0.00 | 0.00 | 0.00 | 0.00 | 0.00 | 0.00 | 0.00 | 0.00 | 0.00 |
| $SnO_2$ | 0.08 | 0.08 | 0.08 | 0.08 | 0.08 | 0.13 | 0.13 | 0.13 | 0.13 | 0.13 |

| Composition (mol. %) | Ex. 420 | Ex. 421 | Ex. 422 | Ex. 423 | Ex. 424 | Ex. 425 | Ex. 426 | Ex. 427 | Ex. 428 | Ex. 429 |
|---|---|---|---|---|---|---|---|---|---|---|
| $SiO_2$ | 54.71 | 50.34 | 48.51 | 52.12 | 52.19 | 52.21 | 39.99 | 55.56 | 55.41 | 54.57 |
| $Al_2O_3$ | 9.19 | 10.39 | 11.88 | 9.42 | 9.40 | 9.36 | 6.71 | 11.10 | 11.03 | 11.95 |
| MgO | 23.08 | 26.28 | 26.36 | 26.32 | 26.27 | 26.30 | 46.60 | 18.62 | 18.55 | 18.76 |
| $Na_2O$ | 4.56 | 3.81 | 3.76 | 3.75 | 3.70 | 3.75 | 0.00 | 6.26 | 5.77 | 5.78 |
| $K_2O$ | 4.82 | 3.52 | 3.30 | 2.73 | 1.73 | 3.75 | 0.00 | 5.22 | 5.66 | 5.67 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 1.00 | 2.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Y_2O_3$ | 0.00 | 0.00 | 0.00 | 0.00 | 0.00 | 0.00 | 0.00 | 0.00 | 0.00 | 0.00 |
| $ZrO_2$ | 0.00 | 3.78 | 3.78 | 3.79 | 3.77 | 2.26 | 4.01 | 2.78 | 3.11 | 2.80 |
| $TiO_2$ | 0.41 | 0.80 | 0.81 | 0.79 | 0.79 | 2.33 | 2.70 | 0.32 | 0.33 | 0.33 |
| $P_2O_5$ | 0.00 | 0.99 | 1.51 | 0.00 | 0.00 | 0.00 | 0.00 | 0.00 | 0.00 | 0.00 |
| $SnO_2$ | 0.13 | 0.08 | 0.09 | 0.08 | 0.08 | 0.08 | 0.00 | 0.13 | 0.13 | 0.13 |
| $MnO_2$ | 0.00 | 0.00 | 0.00 | 0.00 | 0.00 | 0.00 | 0.00 | 0.00 | 0.00 | 0.00 |

TABLE 12-continued

| | | | | | | | | | | |
|---|---|---|---|---|---|---|---|---|---|---|
| La$_2$O$_3$ | 0.00 | 0.00 | 0.00 | 0.00 | 0.00 | 0.00 | 0.00 | 0.00 | 0.00 | 0.00 |
| Cs$_2$O | 0.00 | 0.00 | 0.00 | 0.00 | 0.00 | 0.00 | 0.00 | 0.00 | 0.00 | 0.00 |
| B$_2$O$_3$ | 0.00 | 0.00 | 0.00 | 0.00 | 0.00 | 0.00 | 0.00 | 0.00 | 0.00 | 0.00 |
| PbO | 0.00 | 0.00 | 0.00 | 0.00 | 0.00 | 0.00 | 0.00 | 0.00 | 0.00 | 0.00 |
| ThO$_2$ | 0.00 | 0.00 | 0.00 | 0.00 | 0.00 | 0.00 | 0.00 | 0.00 | 0.00 | 0.00 |
| SeO$_2$ | 0.00 | 0.00 | 0.00 | 0.00 | 0.00 | 0.00 | 0.00 | 0.00 | 0.00 | 0.00 |
| HfO$_2$ | 3.09 | 0.00 | 0.00 | 0.00 | 0.00 | 0.00 | 0.00 | 0.00 | 0.00 | 0.00 |

| Composition (mol. %) | Ex. 430 | Ex. 431 | Ex. 432 | Ex. 433 | Ex. 434 | Ex. 435 | Ex. 436 | Ex. 437 | Ex. 438 | Ex. 439 |
|---|---|---|---|---|---|---|---|---|---|---|
| SiO$_2$ | 53.60 | 57.90 | 53.71 | 47.52 | 49.04 | 50.53 | 52.15 | 52.18 | 52.21 | 53.73 |
| Al$_2$O$_3$ | 12.99 | 13.97 | 13.01 | 7.86 | 8.49 | 9.14 | 9.81 | 9.42 | 9.42 | 11.47 |
| MgO | 18.72 | 10.02 | 10.01 | 31.96 | 29.42 | 26.79 | 24.04 | 26.25 | 26.33 | 19.50 |
| Na$_2$O | 5.82 | 6.96 | 5.85 | 3.93 | 4.20 | 4.58 | 4.97 | 3.77 | 3.68 | 5.87 |
| K$_2$O | 5.64 | 6.98 | 5.66 | 3.91 | 4.18 | 4.52 | 4.88 | 2.76 | 1.71 | 5.59 |
| CaO | 0.00 | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 0.00 | 0.00 | 0.00 | 0.00 |
| ZrO$_2$ | 2.77 | 3.00 | 2.77 | 0.00 | 0.74 | 1.50 | 2.25 | 3.64 | 3.65 | 2.90 |
| TiO$_2$ | 0.33 | 1.03 | 0.34 | 4.76 | 3.86 | 2.86 | 1.81 | 0.89 | 0.92 | 0.81 |
| P$_2$O$_5$ | 0.00 | 0.00 | 0.00 | 0.00 | 0.00 | 0.00 | 0.00 | 0.00 | 0.00 | 0.00 |
| SnO$_2$ | 0.13 | 0.14 | 0.00 | 0.08 | 0.08 | 0.08 | 0.08 | 0.09 | 0.09 | 0.13 |
| MnO$_2$ | 0.00 | 0.00 | 8.65 | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 0.00 | 1.00 | 1.98 | 0.00 |

| Composition (mol. %) | Ex. 440 | Ex. 441 | Ex. 442 | Ex. 443 | Ex. 444 | Ex. 445 | Ex. 446 |
|---|---|---|---|---|---|---|---|
| SiO$_2$ | 53.74 | 53.73 | 53.65 | 53.84 | 53.64 | 50.90 | 50.80 |
| Al$_2$O$_3$ | 11.17 | 10.81 | 12.12 | 11.84 | 10.79 | 9.80 | 9.80 |
| MgO | 20.07 | 20.63 | 18.66 | 18.72 | 21.07 | 29.8 | 29.80 |
| Na$_2$O | 5.64 | 5.51 | 6.12 | 6.14 | 5.29 | 2.70 | 2.70 |
| K$_2$O | 5.50 | 5.40 | 5.69 | 5.71 | 5.19 | 2.70 | 2.70 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 |
| FeO | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 0.00 |
| Y$_2$O$_3$ | 0.00 | 0.00 | 0.00 | 0.00 | 0.00 | 0.00 | 1.00 |
| ZrO$_2$ | 2.94 | 2.98 | 2.81 | 3.62 | 3.08 | 2.10 | 2.10 |
| TiO$_2$ | 0.81 | 0.81 | 0.82 | 0.00 | 0.81 | 0.00 | 0.00 |
| P$_2$O$_5$ | 0.00 | 0.00 | 0.00 | 0.00 | 0.00 | 0.00 | 0.00 |
| SnO$_2$ | 0.13 | 0.13 | 0.13 | 0.13 | 0.13 | 0.10 | 0.10 |
| MnO$_2$ | 0.00 | 0.00 | 0.00 | 0.00 | 0.00 | 0.00 | 0.00 |
| La$_2$O$_3$ | 0.00 | 0.00 | 0.00 | 0.00 | 0.00 | 0.00 | 0.00 |
| HfO$_2$ | 0.00 | 0.00 | 0.00 | 0.00 | 0.00 | 1.90 | 0.00 |
| Ta$_2$O$_5$ | 0.00 | 0.00 | 0.00 | 0.00 | 0.00 | 0.00 | 1.00 |

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass-ceramic comprising:
   a glass phase, and
   a crystalline phase comprising crystals of tetragonal structure and $(Mg,R^{2+})_{3+x}(Zr,R^{4+})_xAl_{2-2x}Si_3O_{12}$, composition, where the $R^{2+}$ are divalent metal cations, the $R^{4+}$ are tetravalent metal cations, and the x is greater than or equal to 0 to less than or equal to 1.

2. The glass-ceramic of claim 1, wherein the tetragonal structure falls within I-42d space group.

3. The glass-ceramic of claim 1, wherein the crystals of tetragonal structure and $(Mg,R^{2+})_{3+x}(Zr,R^{4+})_xAl_{2-2x}Si_3O_{12}$ composition are a primary phase of crystals of the crystalline phase.

4. The glass-ceramic of claim 1, comprising greater than or equal to 25 wt. % of the the crystalline phase.

5. The glass-ceramic of claim 1, wherein the $R^{2+}$ are one or more divalent metal cations selected from the group consisting of $Ca^{2+}$, $Mn^{2+}$, and $Fe^{2+}$; and wherein the $R^{4+}$ are one or more tetravalent metal cations selected from the group consisting of $Ti^{4+}$, $Sn^{4+}$, and $Hf^{4+}$.

6. The glass-ceramic of claim 1, wherein the glass-ceramic has an average transmittance of at least 75% for a light in a wavelength range from 400 nm to 800 nm through a thickness of 0.6 mm of the glass-ceramic.

7. The glass-ceramic of claim 1, comprising in mole percent (mol. %) on an oxide basis:
   greater than or equal to 35 mol. % to less than or equal to 65 mol. % SiO$_2$;
   greater than or equal to 5 mol. % to less than or equal to 20 mol. % Al$_2$O$_3$;

greater than or equal to 7 mol. % to less than or equal to 65 mol. % MgO;

greater than or equal to 0 mol. % to less than or equal to 7 mol. % $ZrO_2$;

greater than or equal to 0 mol. % to less than or equal to 15 mol. % $Na_2O$;

greater than or equal to 0 mol. % to less than or equal to 15 mol. % $K_2O$;

greater than or equal to 0 mol. % to less than or equal to 9 mol. % FeO;

greater than or equal to 0 mol. % to less than or equal to 10 mol. % $MnO_2$; and greater than or equal to 0 mol. % to less than or equal to 15 mol. % ZnO.

8. The glass-ceramic of claim 7, further comprising less than or equal to 3 mol. % $Li_2O$.

9. The glass-ceramic of claim 8, wherein the glass-ceramic article is substantially free of $Li_2O$.

10. The glass-ceramic of claim 7, comprising greater than or equal to 1.5 mol. % to less than or equal to 3 mol. % $ZrO_2$.

11. The glass-ceramic of claim 7, further comprising wherein greater than 0 mol. % to less than or equal to 12 mol. % $HfO_2$.

12. The glass-ceramic of claim 7, further comprising greater than or equal to 0.3 mol. % to less than or equal to 7 mol. % $TiO_2$.

13. The glass-ceramic of claim 12, wherein $ZrO_2$ (mol. %)+$TiO_2$ (mol. %) is greater than or equal to 2 mol. %.

14. The glass-ceramic of claim 12, wherein $ZrO_2$ (mol. %)/($ZrO_2$ (mol. %)+$TiO_2$ (mol. %)) is greater than or equal to 0.3.

15. The glass-ceramic of claim 1, comprising:
an "a" lattice parameter greater than or equal to 6.5 Å and less than or equal to 6.7 Å;
a "c" lattice parameter greater than or equal to 18.0 Å and less than or equal to 18.5 Å; and
an X-ray diffraction spectrum comprising:
a first peak between 2-theta angles of 30° to 32°;
a second peak between 2-theta angles of 33° to 35°;
a third peak between 2-theta angles of 40° to 42°; and
a fourth peak and a fifth peak between 2-theta angles of 55° to 58°.

16. The glass-ceramic of claim 1, wherein the crystals are homogenously distributed throughout the glass-ceramic.

17. A sheet of the glass-ceramic of claim 1.

18. The sheet of claim 17, wherein the sheet is at least partially translucent such that at least 20% of light of 400 to 800 nanometers wavelength directed into a thickness of the sheet passes through the sheet.

19. The sheet of claim 17, wherein length and width of the sheet are both greater than 5 mm.

20. An electronic device comprising a display thereof and a housing therefor, wherein the sheet of claim 17 overlays the display and/or the housing comprises the sheet of claim 17.

* * * * *